United States Patent [19]
Hirose et al.

[11] Patent Number: 6,018,140
[45] Date of Patent: Jan. 25, 2000

[54] IMAGE FORMING APPARATUS, CONTROL METHOD FOR CONTROLLING THE SAME AND TEMPERATURE CONTROL APPARATUS

[75] Inventors: Kazunori Hirose; Takashi Matsuya; Akihiro Komuro; Nobuyuki Hayashida; Kazuo Shimada; Keisuke Nakamura; Yutaka Yamauchi; Tokio Muta; Yoshihiro Takamatsuya; Mitsuo Nakamura, all of Kawasaki, Japan

[73] Assignee: Fujitsu Limited, Kawasaki, Japan

[21] Appl. No.: 09/028,255

[22] Filed: Feb. 23, 1998

Related U.S. Application Data

[62] Division of application No. 08/573,410, Dec. 15, 1995, Pat. No. 5,758,228.

[30] Foreign Application Priority Data

Jan. 9, 1995 [JP] Japan ................................. 7-017532
Oct. 19, 1995 [JP] Japan ................................. 7-271289

[51] Int. Cl.$^7$ ................................................ G03G 15/20
[52] U.S. Cl. ............................. 219/216; 399/69; 399/70
[58] Field of Search ................................ 219/216; 399/69, 399/70; 323/235, 319

[56] References Cited

U.S. PATENT DOCUMENTS

| | | | |
|---|---|---|---|
| 4,603,245 | 7/1986 | Yagasaki | 219/216 |
| 4,737,818 | 4/1988 | Tanaka et al. | 399/70 |
| 4,928,055 | 5/1990 | Kaieda et al. | 323/300 |
| 5,220,389 | 6/1993 | Kishimoto et al. | 399/69 |
| 5,448,339 | 9/1995 | Kokaji et al. | 399/69 |
| 5,481,346 | 1/1996 | Ohzeki et al. | 399/68 X |
| 5,504,567 | 4/1996 | Satoh et al. | 399/331 |
| 5,681,494 | 10/1997 | Suzuki et al. | 219/497 |

FOREIGN PATENT DOCUMENTS

| | | |
|---|---|---|
| 26 12 282 | 4/1986 | Germany . |
| 33 30 407 | 10/1986 | Germany . |
| 40 35 744 | 5/1991 | Germany . |
| 42 20 203 | 1/1993 | Germany . |
| 52-85825 | 7/1977 | Japan . |
| 60-12822 | 1/1985 | Japan . |

*Primary Examiner*—Joseph Pelham
*Attorney, Agent, or Firm*—Armstrong, Westerman, Hattori, McLeland & Naughton

[57] ABSTRACT

An image forming apparatus includes a fixing unit having a heat source, a temperature detecting unit for detecting a temperature of the fixing unit, an initial operation necessity detecting unit for determining whether an initial operation should be performed in the image forming apparatus, an initial operation selecting control unit for selecting an initial operation from among a plurality of predetermined initial operations based on the temperature detected by the temperature detecting unit when the initial operation necessity detecting unit detects that the initial operation should be performed, and a control unit for controlling the fixing unit so that the fixing unit performs the initial operation selected by the initial operation selecting control unit. Furthermore, a temperature control apparatus includes a determination unit for determining, based on the detected temperature of the body, whether the temperature of the body should be increased or decreased, a temperature increasing control unit for applying an AC voltage from the AC power supply to the heater so that the temperature of the body is increased when the determination unit determines that the temperature of the body should be increased, and a temperature decreasing control unit for applying to the heater a pulse-shaped AC voltage which is repeatedly turned on and off at a frequency so that the temperature of the body is decreased when the determination unit determined that the temperature of the body should be decreased, the frequency being generally not perceived by people.

3 Claims, 85 Drawing Sheets

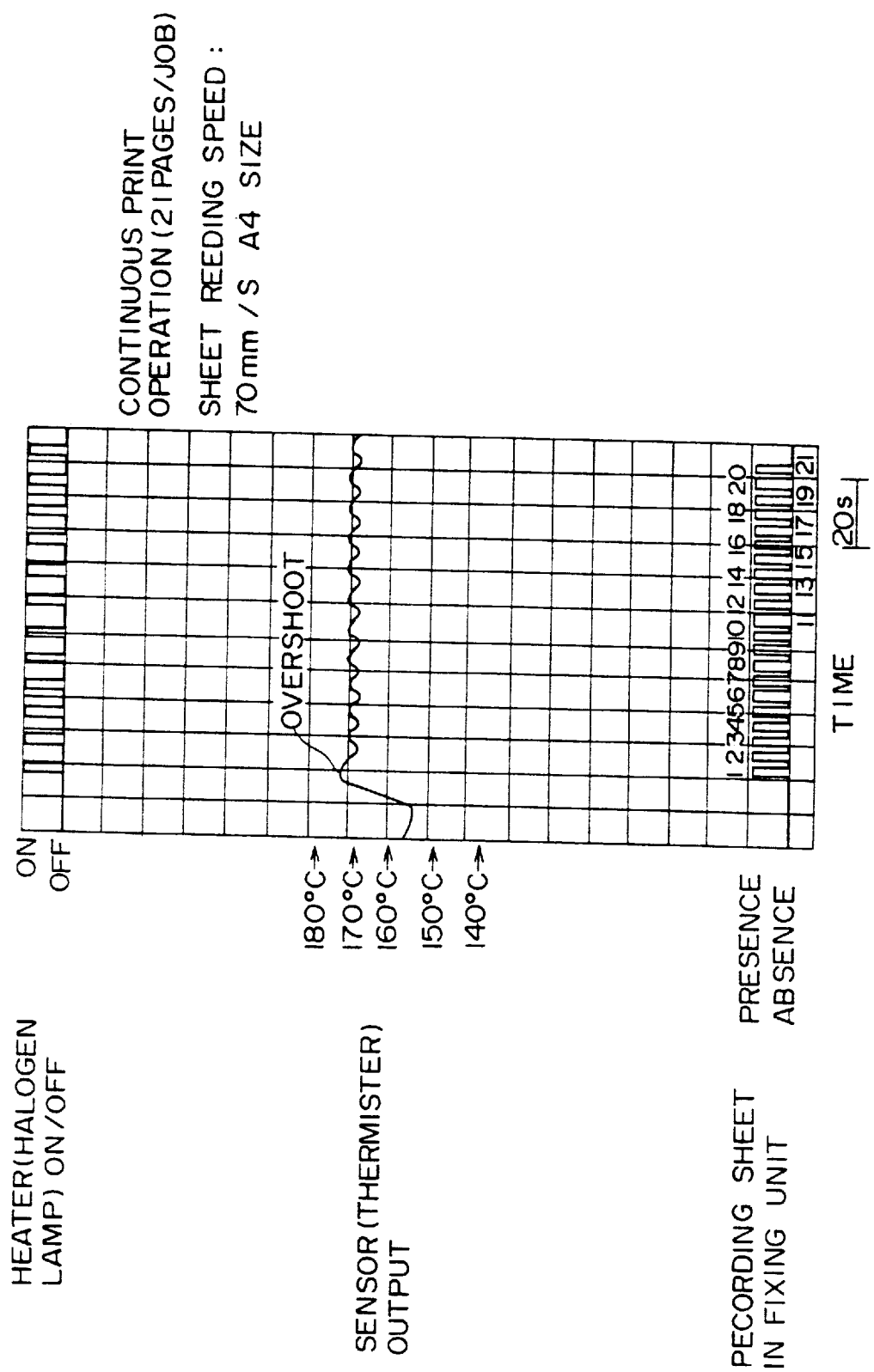

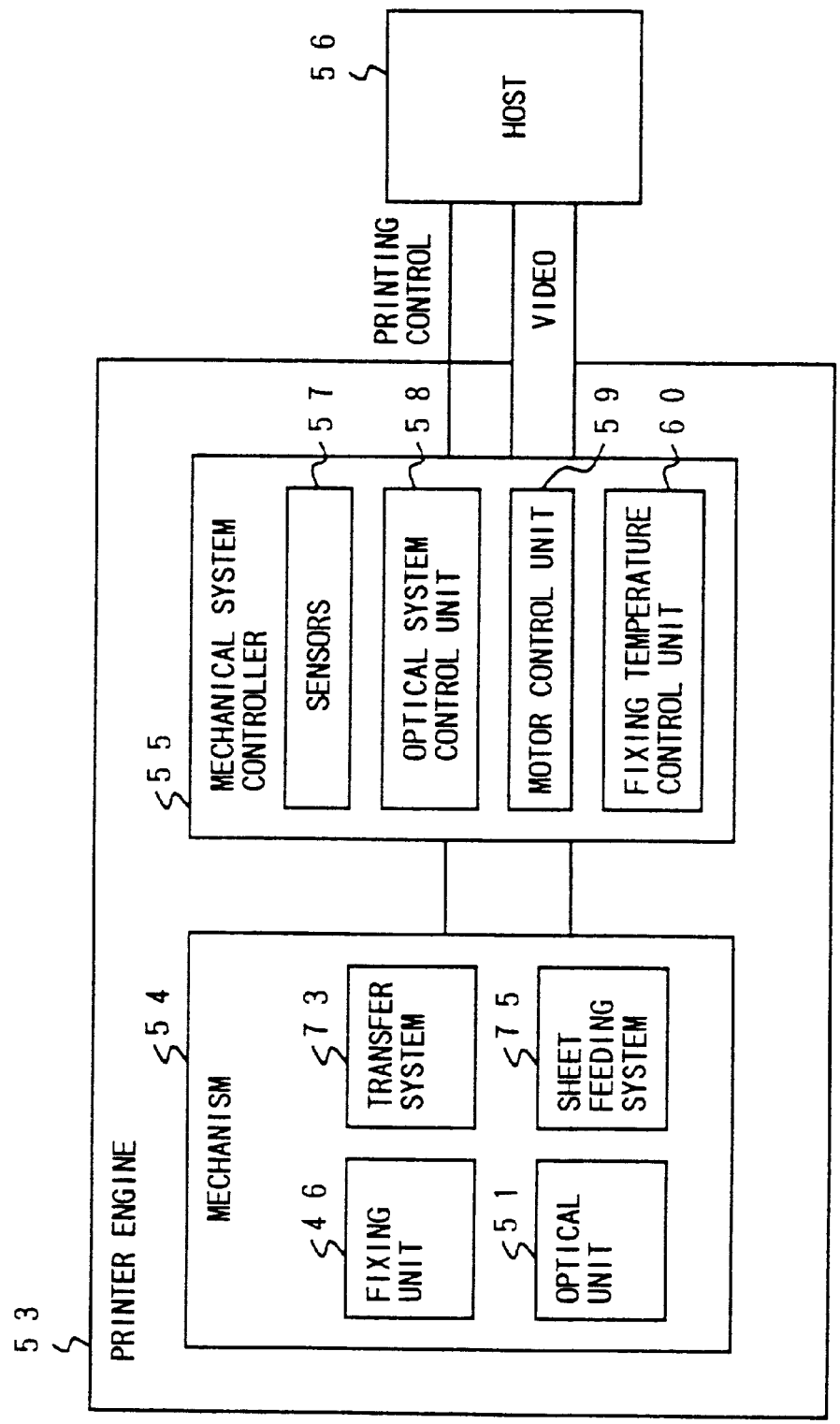

FIG. 29

OCCURRENCE OF POSITIVE CURL OF RECORDING SHEET

| PERIOD | TEMP. OF ROLLER | FIXING FACTOR | POSITIVE CURL | CAUSE |
|---|---|---|---|---|
| FIXING UNIT HAS NOT BEEN WARMED UP | TEMP. OF HEAT ROLLER : A CONTROLLED TEMP.<br><br>TEMP. OF PRESSURE ROLLER : LOW | MIN. VALUE~ | SMALL | — |
| FIXING UNIT HAS BEEN WARMED UP | TEMP. OF HEAT ROLLER : A CONTROLLED TEMP.<br><br>TEMP. OF PRESSURE ROLLER : HIGH | SUFFICIENT VALUE ~ EXCESSIVE VALUE | LARGE | (1) INCREASING TEMPERATURE OF PRESSURE ROLLER<br>1. PRESSURE ROLLER IS FREELY WARMED UP.<br>2. FIXING TEMPERATURE AFTER PRINTING OPERATION IS MAINTAINED.<br>3. PRESSURE ROLLER IS EXCESSIVELY WARMED UP IN INITIAL OPERATION.<br><br>(2) OVERSHOOTING TEMPERATURE OF HEAT ROLLER AT THE START OF PRINTING OPERATION. |

FIG. 30

OCCURRENCE OF REVERSE CURL OF RECORDING SHEET

| PERIOD | TEMP. OF ROLLER | FIXING FACTOR | POSITIVE CURL | CAUSE |
|---|---|---|---|---|
| FIXING UNIT HAS NOT BEEN WARMED UP | TEMP. OF HEAT ROLLER : A CONTROLLED TEMP.<br>TEMP. OF PRESSURE ROLLER : LOW | MIN. VALUE~ | LARGE | PRESSURE ROLLER IS NOT SUFFICIENTLY HEATED, SO THAT TEMPERATURE OF PRESSURE ROLLER IS LOW. |
| FIXING UNIT HAS BEEN WARMED UP | TEMP. OF HEAT ROLLER : A CONTROLLED TEMP.<br>TEMP. OF PRESSURE ROLLER : HIGH | SUFFICIENT VALUE ~ EXCESSIVE VALUE | SMALL | — |

POSITIVE CURL

REVERSE CURL

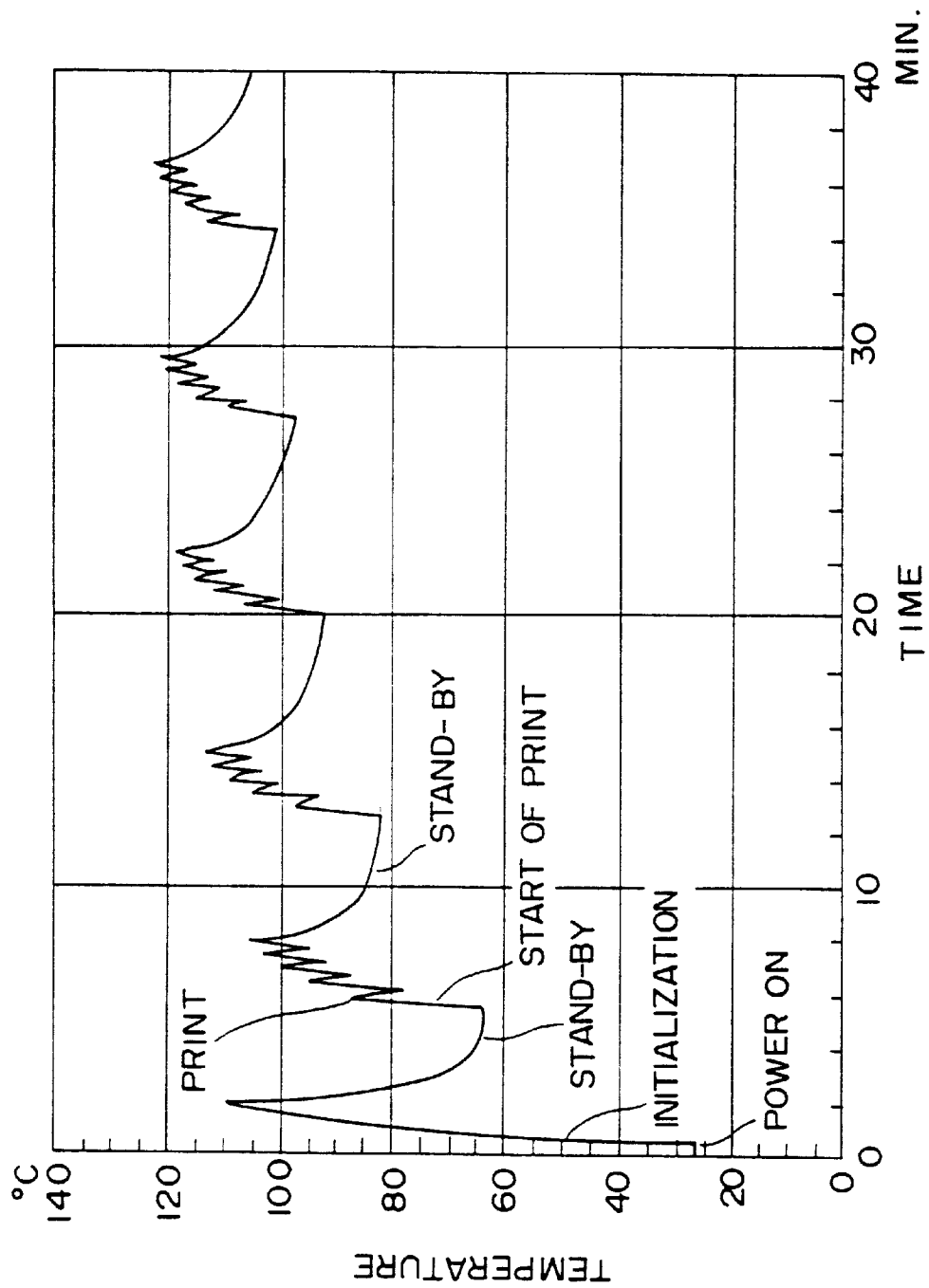

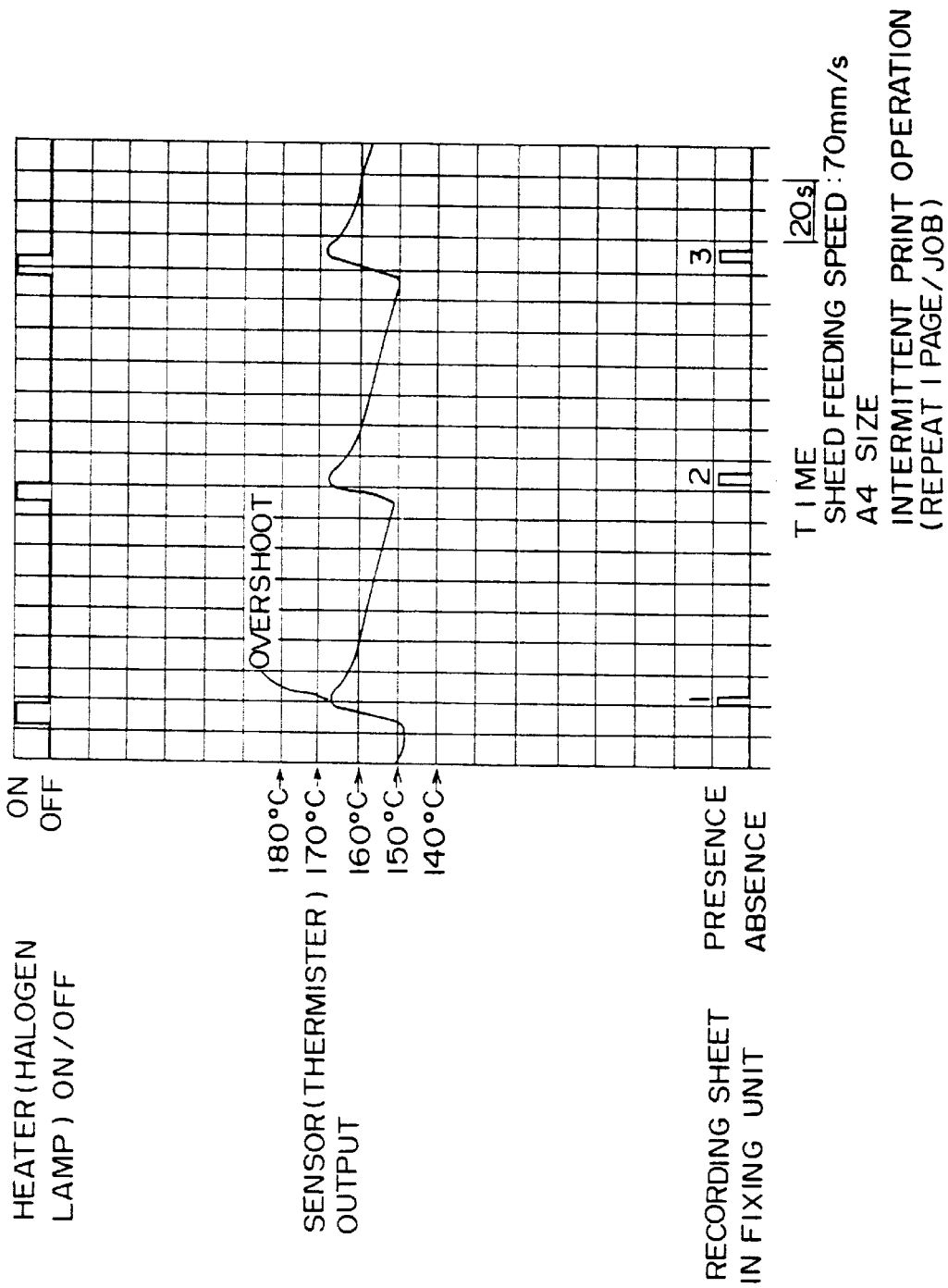

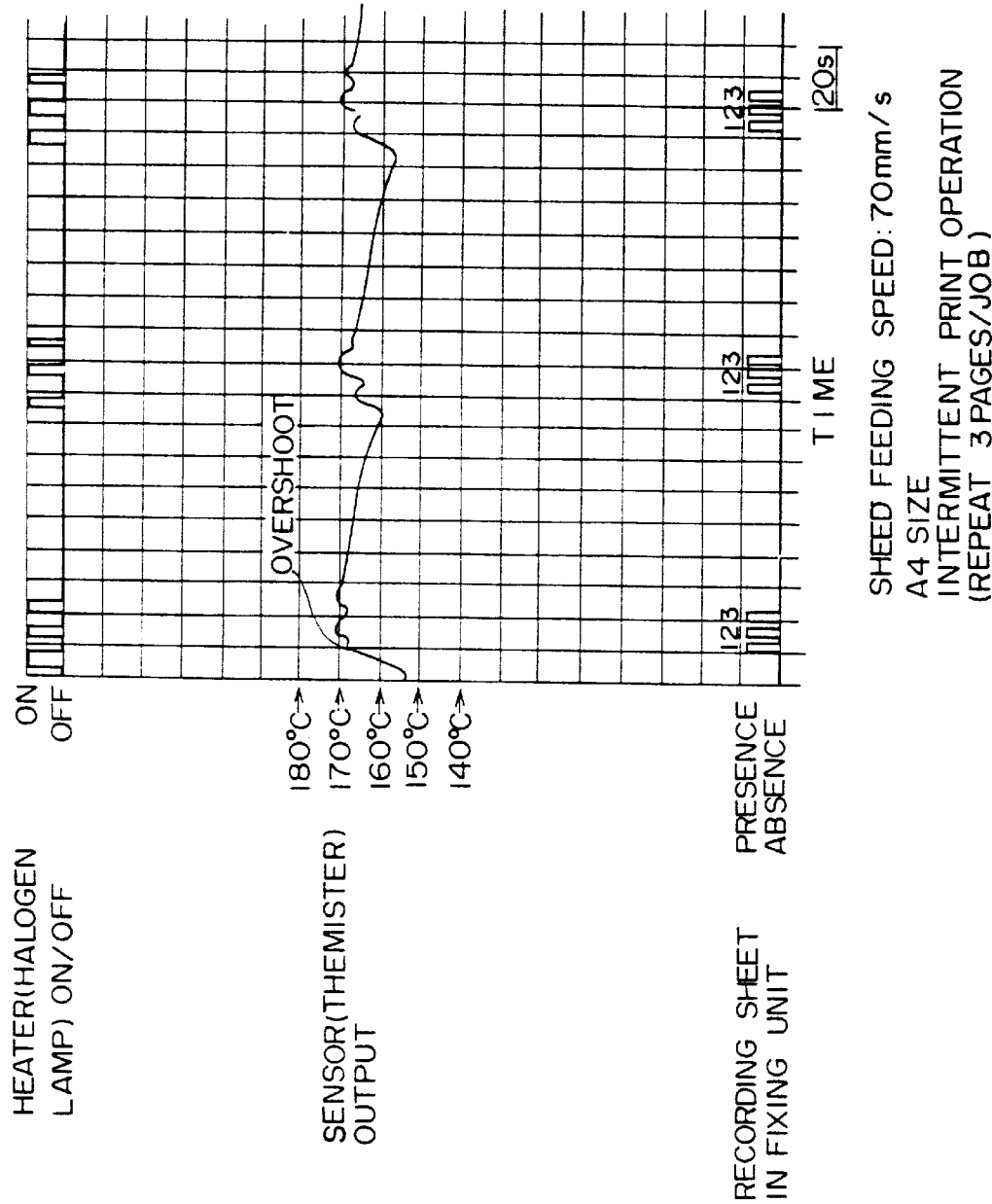

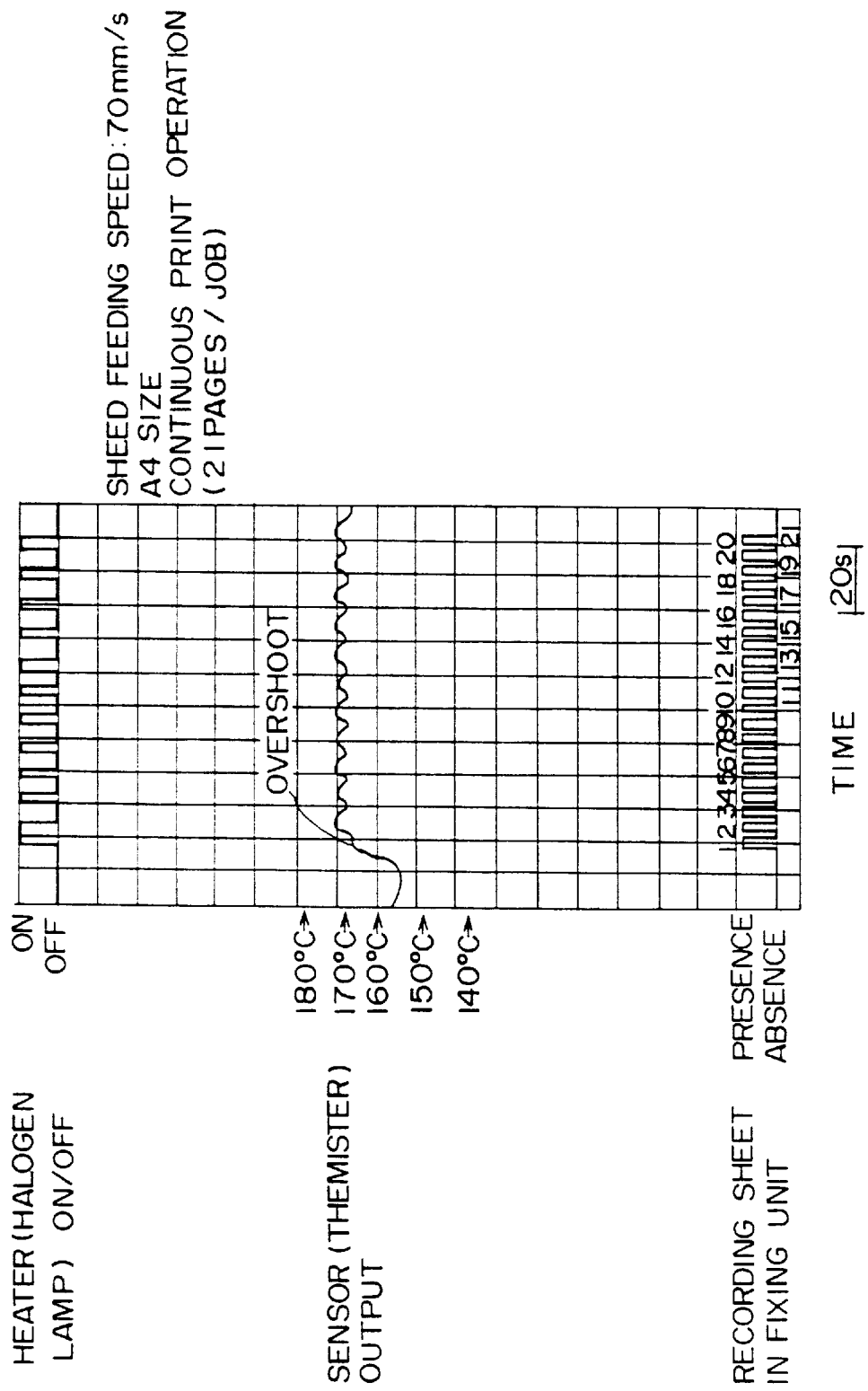

FIG. 48A
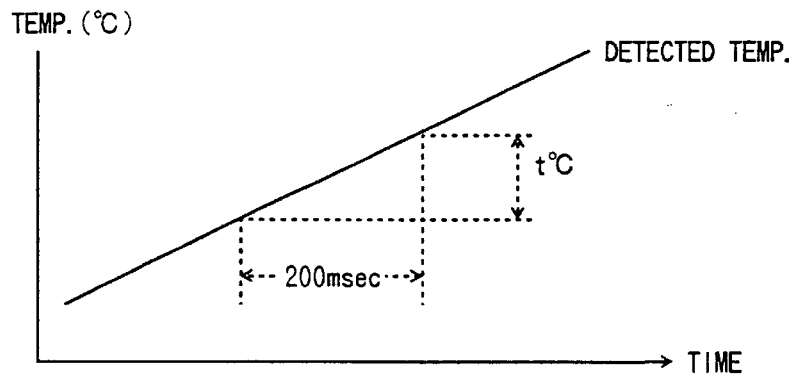
IN A CASE WHERE TEMP. IS DETECTED AT INTERVALS OF 200msec.
FIG. 48B
| INCREASING OF TEMP. (t°C) | "A" OF CLOCK SIGNAL C | "B" OF CLOCK SIGNAL C | A/B |
|---|---|---|---|
| t ≥ 0.2 | 200msec | 2000msec | 10% |
| 0.1 ≤ t < 0.2 | 100msec | 500msec | 20% |
| 0 ≤ t < 0.1 | 20msec | 40msec | 50% |
| t ≤ 0 | 10msec | 10msec | 100% |
FIG. 48C
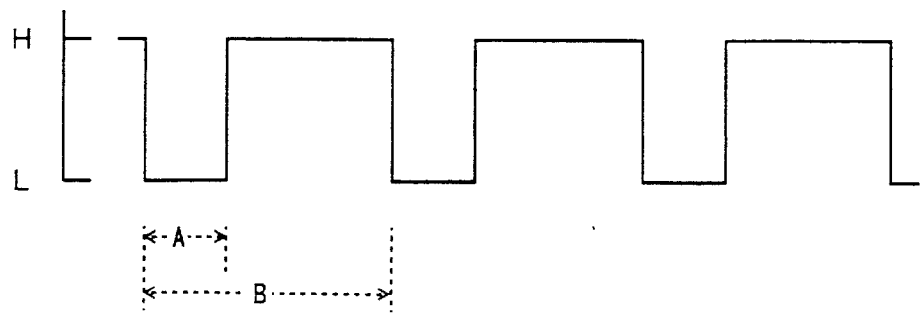

FIG. 84
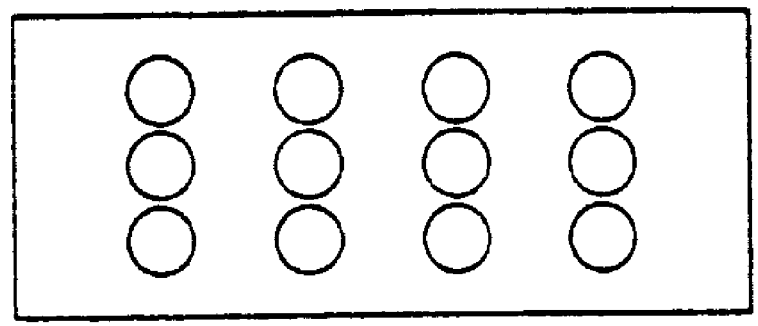
MOVING

IMAGE FORMING APPARATUS, CONTROL METHOD FOR CONTROLLING THE SAME AND TEMPERATURE CONTROL APPARATUS

This application is a division of U.S. application Ser. No. 08/573,410 (allowed) filed Dec. 15, 1995, now U.S. Pat. No. 5,758,228.

BACKGROUND OF THE INVENTION (1) Field of the Invention

The present invention generally relates to an image forming apparatus, such as a copy machine, a facsimile machine and a printer, for forming images in accordance with an electrophotographic process, and particularly to an image forming apparatus having a heat source used for fixing of developer in the electrophotographic process and a control method for controlling the image forming apparatus.

The preset invention further relates to a temperature control unit for controlling a temperature of a body, such as a fixing unit used in a laser printer, which is to be heated by a heater connected to an AC power supply line so that the temperature of the body is maintained in a predetermined temperature range, and an image forming apparatus using the temperature control unit.

(2) Description of the Related Art

FIG. 1 shows a first example of a conventional image forming apparatus. Referring to FIG. 1, a fixing unit 191, a temperature detecting device 195, an initial operation necessity detecting unit 197, a maximum temperature driving instruction unit 198, a temperature control unit 196 and a driving control unit 199. The fixing unit 191 is used for fixing of developer on a recording medium (a recording sheet) in a laser printer (the image forming apparatus for forming images in accordance with the electrophotographic process). The fixing unit 191 has a heat roller 192 including a heat source 193 such as a halogen lamp and a pressure roller 194 for pressing a recording medium against the heat roller 192. The temperature detecting device 195, which is made, for example, of a thermistor, detects a surface temperature of the heat roller. After a power of the image forming apparatus is turned on, after open-and-close operations of covers of the image forming apparatus are performed to remove jammed papers, to change consumables or do other things, and when a reset signal is received from an external unit, such as a computer unit, for supplying printing data, predetermined initial operations must be performed. The initial operation necessity detecting unit 198 determines whether or not the initial operations should be performed. In a case where the initial operations are required, the fixing unit 191 operates in a maximum temperature mode. In the maximum temperature mode, the maximum temperature of a plurality of temperatures is set as a target temperature of the heat roller 192, and immediately after the initial operations starts, the heat source 193 is turned on and the heat roller 192 is rotated to heat the pressure roller 194. The maximum temperature driving instruction unit 198 supplies instructions for the maximum temperature mode to the temperature control unit 196 and the driving control unit 199. The temperature control unit 196 controls the fixing unit 191 so that detected temperature from the temperature detecting device 195 is equal to the target temperature set in the apparatus. The driving control unit 199 carries out driving control of the fixing unit 191.

The initial operation are operations carried out to provide for thermal fixing of toner on a recording medium (a recording sheet). By the initial operation, the heat source 193 is activated while the heat roller 193 is being rotated so that the fixing unit 191 is heated. That is, the pressure roller 194 is heated at a temperature so that the minimum fixing factor is obtained. The fixing factor indicates a degree of whether the developer (the toner) is fixed on the recording sheet.

In the initial operations, the maximum temperature of a plurality of temperatures is set as the target temperature, so that a waiting time required for starting of the printing operation can be decreased.

As shown in FIG. 2, in a case where a detected temperature is less than 100° C. (step S53), the maximum temperature 180° C. is selected as the target temperature. The target temperature is further controlled based on whether the detected temperature is less than 40° C. On the other hand, when the detected temperature is equal to or greater than 100° C., a temperature of 170° C. which is to be set in a continuous printing operation is set as the target temperature.

After the initial operations have been performed, the target temperature is selected from among the plurality of temperatures based on conditions of the recording medium (the recording sheet). When a thick recording sheet (over 70 kg/m$^2$) is used as the recording medium, a high temperature is set as the target temperature of the fixing unit 191. When a thin recording sheet (less than 70 kg/m$^2$) is used as the recording medium, a low temperature is set as the target temperature of the fixing unit 191.

After the recording medium has passed between the heat roller 192 and the pressure roller 194, the heat roller 192 is being maintained, for a predetermined time, at a temperature which is to be set in the printing operation in order to provide for the fixing of toner on the next recording sheet. A mode in which the heat roller 192 is being rotated for the predetermined time at the temperature to be set in the printing operation is referred as a wait mode. Due to the waiting mode, the temperature of the fixing unit 191 is not decreased, so that a time for reactivation of the fixing unit 191 can be eliminated and a number of times which the printing operation is performed in a unit time can be prevented from being decreased.

In a case where there is no printing instruction for a predetermined time, the fixing unit 191 is controlled in a stand-by mode in which a predetermined temperature than the temperature to be set in the printing operation is set as the target temperature. In general, in a state where the fixing unit 191 is being controlled in the stand-by mode, an printing instruction is supplied from the external unit.

When the printer receives the printing instruction, the following print starting process is activated to provide for the printing operation.

In the print starting process, the temperature control of the fixing unit 191 starts, an optical system is activated and initial operations of a processing unit (for performing the electrophotographic process) which are performed while a photosensitive drum is being rotated starts. After a time required for the initial operations of the processing unit elapses, it is confirmed that the optical system is activated. After this, when the detected temperature of the fixing unit 191 reaches the predetermined temperature, the printing operation starts.

A description will now be given, with reference to FIGS. 8A, 8B, 9 and 10, of a second example of the conventional image forming apparatus.

FIG. 8A shows a printer according to the second example of the conventional image forming apparatus.

Referring to FIG. 8A, a printer 291 has a temperature detecting device 83, a heater controller 84, a power supply unit 85, an interface control unit 86, a mechanism controller 87 and mechanisms 88. The printer 291 further has a heater 81 and a heater driving circuit 82. The heater 81 is included in a fixing unit used for fixing of toner on a recording sheet. When a detected temperature output from the temperature detecting device 83 is less than a minimum setting temperature, the heater controller 84 supplies an on-signal to the heater driving circuit 82 via a control line (7). When the detected temperature output from the temperature detecting device 83 is equal to or greater than a maximum setting temperature, the heater controller 84 supplies an off-signal to the heater driving circuit 82 via the control line (7). The heater driving circuit 82 which receives the on-signal supplies an AC voltage to the heater 81 via a power line (6). As shown in FIG. 8B, the heater driving circuit 82 has a driving element 92 and a power thermistor 93.

FIG. 9 shows a timing chart illustrating control of the heater 81. The dissipation power of the heater 81 is 1100 watts, and a total dissipation power of other devices in the printer is 100 watts. The heater 81 is controlled at 150° C.±2° C. When the heater control signal has a low level "L", the heater driving circuit 82 turns on the heater 81. When the heater control signal has a high level "H", the heater driving circuit 82 turns off the heater 81. In this control of the heater 81, when the detected temperature is equal to or greater than 152° C., the heater 81 is turned off. In addition, when the detected temperature is less than 148° C., the heater 81 is turned on. In general, an on-state of the heater 81 is continued for a few seconds and an off-state of the heater 81 is continued for a time falling within a range from a few seconds to a few tens seconds. A detailed state where the heater 81 is activated (see a point A in FIG. 9) is shown in FIG. 10.

In general, although the fixing unit should be controlled at a high temperature in order to obtain a high fixing factor, a low temperature should be set as a target temperature of the fixing unit in order to prevent recording sheets from curling and being wrinkled.

The first example of the conventional image forming apparatus has the following disadvantages.

(a) With increasing of the number of times which the printing operation is repeated, the degree of positive curl of the recording sheet is enlarged. The positive curl defines a state where the recording sheet is curled around the heat roller 48 so that a printed side of the recording sheet is inside, as shown in FIG. 36B. When the temperature of the pressure roller 47 is increased, the degree of the positive curl of the recording sheet is enlarged, as shown in FIG. 36A.

(b) In a case where the fixing unit is not sufficiently heated immediately after the power is turned on, the degree of reverse curl of the recording sheet having moisture is large. The reverse curl defines a state where the recording sheet is curled around the pressure roller 47 so that the printed side of the recording sheet outside. When the temperature of the pressure roller 47 is decreased, the degree of the reverse curl of the recording sheet is enlarged, as shown in FIG. 36A.

In a two-sided printing apparatus, when an images are printed on a second side of the recording sheet having a large reverse curl, it is difficult to separate the recording sheet from the photosensitive drum, so that a sheet jam occurs.

(c) Even if the fixing unit is controlled at a required temperature, the predetermined initial operations are performed. Thus, a warm-up time is increased.

(d) A temperature at which the fixing unit is controlled may be too high and a time for which the initial operations are performed may be too long. Thus, the temperature in the printer is increased.

(e) The photosensitive drum is vacantly rotated every time the initial operations are performed and the print starting process is performed. Thus, characteristics of the photosensitive drum may deteriorates in processes and operations other than the printing operation.

(f) Since the photosensitive drum is vacantly rotated every time the print starting process is performed, the first-print time can not be decreased.

The recording sheet is curled (the positive curl and the reverse curl) as follows.

The positive and reverse curls of the recording sheet depend on the temperatures of the heat roller and pressure roller, a type of the recording sheet (a thickness, fibers included therein, material and the like) and a state (the moisture content) of the recording sheet.

FIG. 3 shows an example of temperature transition of the pressure roller in a case where the printing operation is repeated starting from turning-on of the power supply (a cold start operation). In this example, the initial operations are executed after the power supply for the printer is turning on. After this, the print instruction is not received for a predetermined time, so that the fixing unit is brought into the standby mode. In this example, a set of five printing instructions is repeatedly received five times at intervals of five minutes (in the standby mode). In accordance with each set of the five printing instructions, the printing operation in which characters are printed on a recording sheet having a size of A4 is repeatedly executed at intervals of 30 seconds. The printing operation is repeatedly executed page by page. The print starting process is performed every time the printing operation for a page is received.

As shown in FIG. 3, after the initial operation is performed for a short time in a state where the fixing unit is maintained at a relatively low temperature, the fixing unit is controlled in the standby mode. Thus, the temperature of the pressure roller is not almost increased. After the fixing unit is controlled in the standby mode for a predetermined time, the printing operation starts in accordance with the printing instruction. A time for which the print starting process is performed is relatively long. Thus, after starting the printing operation, the temperature of the pressure roller is rapidly increased. The printing operation is repeatedly performed at the intervals, and the temperature of the pressure roller is increased so as to head for a saturation temperature. The saturation temperature depends on the recording sheet which passes between the heat roller and the pressure roller. In this case where the recording sheet having the size of A4 laterally passes between the heat roller and the pressure roller, the saturation temperature is about 130° C.

The positive curl of the recording sheet occurs as follows.

In a general case where the printing operation is repeatedly executed at intervals, the temperature of the pressure roller is increased as shown in FIG. 3. The fixing factor of the fixing unit depends on the temperatures of the heat roller and the pressure roller. The temperature of the heat roller is decided based on a condition in which the required fixing factor is obtained even if the temperature of the pressure roller is low. Thus, the heat roller may be controlled at the predetermined temperature under a condition in which the pressure roller is in a heated-up state. In this case, when the printing operation is repeatedly executed under the condition in which the heat roller is controlled at the predetermined temperature without regard to the temperature of the pressure roller, the fixing factor is increased with creasing of the temperature of the pressure roller. Under a condition in which the temperature of the pressure roller is in a saturated temperature range (e.g., 115° C.), the fixing unit has the necessary and sufficient fixing factor. However, the positive curl of the recording sheet may exceed an allowable level and/or the recording sheet may be easily wrinkled.

The positive curl of the recording sheet is based on the following cause of:

(a) excessive increasing of the temperature of the pressure roller; and/or (b) overshoot of the temperature of the heat roller in the print starting process.

The temperature of the pressure roller is excessively increased as follows (the above item (a)).

In a general printing operation, only the recording sheet removes heat from the pressure roller and the heat roller is freely heated by the heat roller.

A time for which the recording sheet passes through the fixing unit is less than a total time required for the print starting process and the printing operation. As shown in FIG. 4, after the recording sheet passes through the fixing unit, the heat roller controlled at the predetermined temperature is rotated. Thus, in this case, the pressure roller is freely heated by the heat roller.

FIG. 4 shows a timing chart of on-and-off operation of the heater of the fixing unit.

In a case where the printer having the fixing unit controlled in the standby mode receives a print instruction 1, the photosensitive drum and the optical system are activated to provide for the print operation. After a time $t_1$ elapses, it is confirmed that the photosensitive drum and the optical system have been activated. The printer then returns a VR signal to a host unit. The host transmits printing data to the printer after a time $t_2$ elapses from when the host unit receives the VR signal. After the printer receives the printing instruction 1, a temperature at which the fixing unit should be controlled in the printing operation is set as a target temperature for the fixing unit to provide for the printing operation. When supply of the printing data to the printer is suspended, the printer waits for the next printing instruction for the predetermined time $t_4$ under a condition in which the fixing unit is controlled at the temperature to be set in the printing operation. When the printer receives the next printing instruction 2, the printer transmits the VR signal to the host unit. When the host unit receives the VR signal, the host unit starts to transmit printing data to the printer from a time $t_2$. In the conventional printer, as has described above, when supply of the printing data to the printer is suspended, the fixing unit is controlled at the temperature to be set in the printing operation for the time $t_4$. In a case where there is no printing instruction for the predetermined time $t_4$, the photosensitive drum, the optical system and the fixing unit are controlled in the standby mode.

In the conventional control system, even if the printing operation is terminated, the fixing unit is controlled at the temperature to be set in the printing operation. As a result, the pressure roller is excessively heated.

Further, after the power supply of the printer is turned on, a regular warm-up operation is always performed without regard to whether or not the fixing unit has been warmed up. In a case where the fixing unit is cold (the cold start operation), the fixing unit is not easily warmed up to the predetermined temperature. After the power supply is reset for some reason, after the open-and-close operations of the covers of the printer with the power supply in the on state are performed to remove jammed papers and/or to change the consumables and after the printer receives the reset signal from the host unit, such as a computer unit, the predetermined warm-up operation of the fixing unit is executed. In these cases, the fixing unit is excessively warmed up.

The overshoot of the temperature of the heat roller occurs as follows (the above item (b)).

On the assumption that the printing operation is continuously repeated (a continuous printing condition), a target temperature is set for the fixing unit so that the temperature of the fixing unit is maintained at the predetermined temperature to be controlled in the printing operation. In addition, when the printing instruction is received by the printer, the target temperature is changed to the predetermined temperature. Thus, as shown in FIGS. 5, 6 and 7, when a recording sheet enters the fixing unit after the printing operation starts, the overshoot of the temperature of the heat roller occurs, so that the controlled temperature of the heat roller exceeds the target temperature set in the continuous printing condition. Thus, developer (toner) on the first recording sheet is fixed at the overshot temperature by the fixing unit. In a case where the printing operation is continuously repeated, the intervals at which recording sheets are supplied to the fixing unit is short, so that developer (toner) on each recording sheet is not excessively fixed (fused).

In a case where the printing operation is intermittently performed, the temperature of the heat roller is overshot at each print starting time. Examples of the overshoot of the temperature of the heat rollers is shown in FIGS. 5, 6 and 7.

Further, in the case where the printing operation is intermittently performed, the intervals at which a recording sheet passes through the fixing unit is long. As a result, due to the overshot temperature of the heat roller, the pressure roller is excessively heated. Thus, in the case where the printing operation is intermittently performed, the developer on the recording sheet is excessively fixed (fused), so that a large positive curl of the recording sheet occurs.

The above phenomena are summarized in a table shown in FIG. 29.

The reverse curl of the recording sheet occurs as follows.

Immediately after the power supply of the printer is turned on, the initial operations for the fixing unit are performed so that the heat roller and the pressure roller are warmed up.

After a predetermined waiting time elapses, the fixing unit is controlled in the standby mode to provide for start of the printing mode.

Referring to the temperature transition of the pressure roller as shown in FIG. 3, in the initial operations, the pressure roller is not almost heated. After the printing operation starts, although the temperature of the pressure roller is increased by 30° C., the pressure roller is not sufficiently warmed up. At this time, the developer on the recording sheet fixed mainly due to the temperature of the heat roller.

In general, after recording sheets are set in a sheet cassette, the recording sheets may be left alone in the sheet cassette for few hours or more. In this condition, the recording sheets may absorb moisture. In the printing operation using a recording sheet which absorbs moisture immediately after the power supply is turned on, the recording sheet is curled such that a side opposite to a printed side is inside. That is, the reverse curl of the recording sheet occurs. Due to the reverse curl of the recording sheet, the print quality deteriorates.

Handling of one-sided prints which are reverse curled is troublesome. In a case where two-sided prints are formed, when printing is performed on the second side of the recording sheet which has been reverse curled in printing on the first side, it is difficult to separate the recording sheet from the photosensitive drum. As a result, the recording sheet may be jammed.

As the result of investigation, it was ascertained that when a recording sheet with moisture absorption passes through the pressure roller having a low temperature, a large amount of reverse curl of the recording sheet occurred. That is, in a case where although the pressure roller is controlled at a temperature by which the predetermined fixing factor can be obtained, the controlled temperature is lower than the predetermined temperature, the reverse curl of the recording sheet occurs.

Thus, to avoid the reverse curl, the pressure roller must be warmed-up to a temperature higher than the temperature by which the predetermined fixing factor can be obtained. Although the pressure roller is freely heated by the heat roller as has been described above, immediately after the power supply is turned on, the temperature of the pressure roller does not reach a temperature sufficient to prevent the reverse curl of the recording sheet.

The above phenomena is summarized on a table shown in FIG. 30.

The above disadvantages (c) and (d) are based on the following causes.

The initial operations is performed to warm up the fixing unit which is cold. In the case where the open/close operations of the covers of the printer are performed and in the case where the reset signal is received from the host unit, such as the computer unit, the initial operations are performed. In these cases, since the fixing unit is warm, a time for the warm-up operation is too long.

In the above cases, the target temperature of the heat roller in the warm-up operation is too high. That is, the fixing unit is heated at the high temperature for the long time. As a result, the temperature on the inside of the printer is increased. Further, the overshoot of the temperature of the heat roller causes the temperature of the inside of the printer to increase. Thus, thermal deterioration of parts of the printer and thermal stress in toner stored in a process cartridge may occur. In addition, the toner is fused and fixed on parts of the printer, so that various operation troubles may occur. To avoid operation trouble, a cooling fan may be provided in the printer. However, in this case, the production cost is increased.

In addition, after the recording sheet completely pass though the fixing unit, the heater roller controlled at the predetermined temperature is rotated for a predetermined time. This control of the fixing unit is one of causes of increasing of the temperature in the printer.

The above disadvantages (e) and (f) are based on the following causes.

In a printer in which the heat roller of the fixing unit is interlocked with the photosensitive roller, the initial operations which are continued for a long time causes the photosensitive drum to deteriorate.

Further, as shown as a conventional case in FIG. 33A, every time the printing operation starts, the heat roller is rotated to warm up the pressure roller. In a case where the pressure roller has been warmed up, it is not necessary to perform this warm-up operation. In this case, the first-print-time is increased.

In addition, every time the print operation starts, the photosensitive drum interlocked with heat roller is rotated for a purpose other than the printing purpose. Thus, the lifetime of the photosensitive drum is decreased.

The following disadvantages occur in the second example of the conventional image forming apparatus.

In a page printer, the dissipation power in a case where the heater is in the off state is $\frac{1}{20}$ to $\frac{1}{10}$ as large as the dissipation power in a case where the heater is in the on state. That is, the dissipation power of the printer almost depends on the operation of the heater. In such a case, the on and off operations of the heater cause rapid variation of a current through power lines in the page printer. Due to the rapid variation of the current, a voltage of the power supply is varied. There may be a case where the standard regarding the voltage variation of the power supply is not satisfied.

Printing operation in the page printer is accelerated year by year. Thus, it is required that the heater is rapidly controlled to a target temperature. The current which flows in an on-operation and an off-operation of the power supply tends to be increased. It is further difficult, due to this tendency, to satisfy the standard regarding the voltage variation.

The standard regarding the voltage variation specifies allowable voltage variation of the power supply line. When the voltage of the power supply line is varied, lighting fixtures connected to the power supply line may be flickered and characteristics of the other electronic units connected to the power supply line may be affected thereby.

As to the voltage variation of the power supply line, the second example of the conventional image forming apparatus has the following disadvantages.

In the on-operation of the heater and the off-operation thereof, the dissipation power is greatly varied so that the current flowing through an AC cable is greatly varied. That is, the output voltage of the AC power line is varied so that there is a case where the standard regarding the voltage variation is not satisfied.

To satisfy the standard regarding the voltage variation, the difference between currents in periods N and F shown in FIG. 9 should be minimized.

As shown in FIGS. 8A and 8B, the power line ⑥ for the heater driving circuit 82 is serially provided with the power thermistor 93. The power thermistor 93 has a characteristic by which the higher the temperature the lower the resistance. Due to this characteristic, when the heater 81 has a low temperature, a large current is not supplied from the heater driving circuit 82 to the heater 81. The heater 81 which is a resistor has a low resistance at a low temperature and a high resistance at a high temperature. Thus, at a low temperature, the power thermistor 93 having the high resistance limits the current supplied to the heater 81. At a high temperature, although the power thermistor 93 has a low resistance, the current flowing through the heater 81 is limited by the high resistance of the heater 81 itself. As a result, almost a constant current flows through the heater 81 without regard to the temperature of the heater 81. In addition, a large amount of current is not momentarily supplied to the heater 81.

In the printing operation of the page printer, every time a recording sheet passes through the fixing unit, the recording sheet removes the heat from the heater 81. Although a central portion of the heater 81 is warm, the temperature detecting unit detects that the surface temperature of the heater 81 has been decreased. The power thermistor 93 is hardly cooled in contrast to the heater 81. Thus, when the heater 81 is turned on again after turning off, the current is supplied to the heater 81 under a condition in which the resistance of the power thermistor 93 is not sufficiently increased. However, since temperature detecting unit detects decreasing of the temperature of the heater 81 under the condition in which the central portion of the heater 81, the current starts to flow through the heater 81 having a large resistance. As a result, a large amount of current does not flow through the heater 81.

On the other hand, in a case where the page printer is in the idle state, when the heater 81 is turned off, the temperature of the central portion of the heater 81 and the temperature of the surface of the heater 81 are simultaneously decreased. Thus, when the heater is turned on again, an phenomenon in which the heater 81 is sufficiently cooled but the power thermistor 93 is not sufficiently cooled may occur. In this case, a large amount of current flows through the heater 81.

In addition, in order that the standard regarding the voltage variation is satisfied, a current rapidly flowing through the heater 81 when heater 81 is changed from the off state to the on state should be restrained.

The period F, shown in FIG. 9, in the printing operation greatly differs from that in the idling state. Thus, there may be a case where the power thermistor 92 is sufficiently cooled in the period F and a case where the power thermistor 92 is not sufficiently cooled. That is, the standard regarding the voltage variation cannot be satisfied simultaneously both in the printing operation and in the idle state.

If the heater 81 is repeatedly turned on and off at short intervals so that the current is intermittently supplied to the heater 81 in the period N shown in FIG. 9, the difference between the amounts of currents in the periods N and F shown in FIG. 9 may be decreased. In a case where the period N is merely shortened, a long time is needed to control the heater 81 which has been cooled to a target temperature. As a result, the start of the printing operation is delayed.

The environmental temperature and the operation sate of the printer may be varied. Thus, the heater 81 cannot be effectively controlled by a single manner. Due to the rapid temperature variation, variation of the thickness of the recording sheet which passes through the heater 81 and removes heat from the heater 81, variation of timing at which the recording sheet passes though the heater 81 and the like, a speed at which the heater 81 is warmed up and a speed at which the heater 81 is cooled down may be varied.

In a case where the heater 81 is warm up and cooled down at a constant speed, after the actual temperature of the heater 81 exceeds the maximum target temperature and is below the minimum target temperature, the heater 81 may be turned off and turned on. In this case, the recording sheet is excessively heated and cooled. As a result, the recording sheet may be curled and the toner may not be completely fixed on the recording sheet.

SUMMARY OF THE INVENTION

Accordingly, a general object of the present invention is to provide novel and useful image forming apparatus and temperature control apparatus in which the disadvantages of the aforementioned prior art are eliminated.

A first specific object of the present invention is to provide an image forming apparatus in which the positive curl of a recording sheet is small.

A second specific object of the present invention is to provide an image forming apparatus in which the reverse curl of a recording sheet having moisture absorption is small, so that the recording sheet is prevented from being jammed.

A third specific object of the present invention is to provide an image forming apparatus in which the warm-up time is short, so that the printing operation can rapidly start.

A fourth specific object of the present invention is to provide an image forming apparatus in which the temperature therein is not excessively increased, so that the dissipation power can be saved.

A fifth specific object of the present invention is to provide an image forming apparatus in which the lifetime of the photosensitive drum can be improved.

A sixth specific object of the present invention is to provide an image forming apparatus in which a first-print-time is short, so that a first print can be rapidly formed.

A seventh specific object of the present invention is to provide an image forming apparatus in which a voltage variation of the power supply line does not cause the lighting fixtures connected the power supply line to be flickered and does not affect other electric product connected to the power supply line, so that a standard regarding the voltage variation is satisfied.

A eighth specific object of the present invention is to provide an image forming apparatus in which a standard regarding the voltage variation is satisfied both in the printing operation and in the idle state.

A ninth specific object of the present invention is to provide an image forming apparatus in which a standard regarding the voltage variation is satisfied without affecting initial operations.

A tenth specific object of the present invention is to provide an image forming apparatus in which a fixing unit is not excessively warmed up and cooled down so that the recording sheet is prevented from being curled and the toner is can be completely fixed on the recording sheet.

The above objects of the present invention are achieved by the following image forming apparatuses in which:

An image forming apparatus comprising a fixing unit having a heat source, temperature detecting means for detecting a temperature of said fixing unit, initial operation necessity detecting means for determining whether an initial operation should be performed in said image forming apparatus, initial operation selecting control means for selecting an initial operation from among a plurality of predetermined initial operations based on the temperature detected by said temperature detecting means when said initial operation necessity detecting means detects that the initial operation should be performed; and control means for controlling said fixing unit so that said fixing unit performs the initial operation selected by said initial operation selecting control means;

An image forming apparatus comprising a fixing unit having a heat roller in which a heat source is mounted and a pressure roller pressing a recording sheet against said heat roller, temperature detecting means for detecting a surface temperature of said heat roller, initial operation necessity detecting means for determining whether an initial operation should be performed, printing instruction detecting means for detecting a printing instruction supplied from an external unit, means for setting, as a target temperature, a temperature (A) higher than a temperature which should be set in a continuous print operation and outputting an instruction for activating said heat source immediately after the initial operation starts and rotating said heat roller to warm up said pressure roller after the detected temperature reaches a predetermined temperature (C), in a case where a temperature detected by said temperature detecting means when said initial operation necessity detecting means determines that the initial operation should be performed is lower than a first temperature, means for setting a target temperature corresponding to an idle state and outputting an instruction for driving said fixing unit after the initial operation is completed, in a case where said printing instruction detecting means has not yet detected the printing instruction before the initial operation is completed; means for outputting an instruction for a print operation after the initial operation is completed, in a case where said printing instruction detecting means has detected the printing instruction before the initial operation is completed, temperature control means for controlling fixing unit so that the detected temperature agrees with the target temperature, and driving means for driving said fixing unit in accordance with the instruction;

An image forming apparatus comprising, a fixing unit having a heat roller in which a heat source is mounted and a pressure roller pressing a recording sheet against said heat roller, temperature detecting means for detecting a surface temperature of said heat roller, initial operation necessity detecting means for determining whether an initial operation should be performed, printing instruction detecting means for detecting a printing instruction supplied from an external unit, means for setting, as a target temperature, a temperature (B) lower than a temperature (A) higher than a temperature which should be set in a continuous print operation and outputting an instruction for activating said heat source immediately after the initial operation starts and rotating said heat roller to warm up said pressure roller, in a case where a temperature which is detected by said temperature detecting means when said initial operation necessity detecting means determines that the initial operation should be performed falls within a range between a first temperature and a second temperature, means for setting a target temperature corresponding to an idle state and outputting an instruction for driving said fixing unit after the initial operation is completed, in a case where said printing instruction detecting means has not yet detected a printing instruction before the initial operation is completed, means for outputting an instruction for the print operation in a case where said printing instruction detecting means have detected before the initial operation is completed, temperature control means for controlling fixing unit so that the detected temperature agrees with the target temperature, and driving means for driving said fixing unit in accordance with the instruction;

An image forming apparatus comprising a fixing unit having a heat roller in which a heat source is mounted and a pressure roller pressing a recording sheet against said heat roller, temperature detecting means for detecting a surface temperature of said heat roller, initial operation necessity detecting means for determining whether an initial operation should be performed, printing instruction detecting means for detecting a printing instruction supplied from an external unit, means for setting, as a target temperature, a stand-by temperature which should be set when supply of the printing instruction pauses and said image forming apparatus is on stand-by and outputting an instruction for activating said heat source immediately after the initial operation starts and rotating said heat roller to warm up said pressure roller, in a case where a temperature which is detected by said temperature detecting means when said initial operation necessity detecting means detects that the initial operation should be performed is higher than a second temperature, means for setting a target temperature corresponding to an idle state and outputting an instruction for driving said fixing unit, in a case where said printing instruction detecting means has not yet detected a printing instruction before the initial operation is completed, means for outputting an instruction for a print operation in a case where said printing instruction detecting means have detected a printing instruction before the initial operation is completed, temperature control means for controlling fixing unit so that the detected temperature agrees with the target temperature, and driving means for driving said fixing unit in accordance with the instruction;

An image forming apparatus comprising a fixing unit having a heat roller in which a heat source is mounted and a pressure roller pressing a recording sheet against said heat roller, temperature detecting means for detecting a surface temperature of said heat roller, temperature control means for controlling fixing unit so that a temperature detected by said temperature detecting means agrees with a target temperature, printing instruction detecting means for detecting a printing instruction supplied from an external unit, sheet passing detecting means for detecting whether a recording sheet passes through said fixing unit, and idle state setting means for informing said temperature control means that said fixing unit should be controlled in an idle state, when said sheet passing detecting means detects that the recording sheet passes through said fixing unit, in a case where said print instruction detecting means have not yet a next printing instruction during a print operation;

An image forming apparatus comprising a fixing unit having a heat roller in which a heat source is mounted and a pressure roller pressing a recording sheet against said pressure roller, temperature detecting means for detecting a surface temperature of said heat roller, print start detecting means for detecting a print start time at which a print operation based on printing instruction received in an idle state after an initial operation is completed or after a previous print operation is completed should start, target temperature setting means for setting, as a target temperature, a temperature lower than a temperature which should be set in a continuous print operation when said print start detecting means detects the print start time, and temperature control means for controlling the fixing unit so that a temperature detected by said temperature detecting means agrees with the target temperature set by said target temperature setting means;

An image forming apparatus comprising a fixing unit having a heat roller in which a heat source is mounted and a pressure roller pressing a recording sheet against said heat roller, temperature detecting means for detecting a surface temperature of said heat roller, print start detecting means for detecting a print start time at which a print operation based on printing instruction received in an idle state after an initial operation is completed or after a previous print operation is completed should start, target temperature setting means for setting a target temperature so that a overshot temperature of the fixing unit is equal to a temperature which should be set in the continuous print operation, and temperature control means for controlling the fixing unit so that a temperature detected by said temperature detecting means agrees with the target temperature set by said target temperature setting means;

An image forming apparatus comprising a fixing unit having a heat roller in which a heat source is mounted and a pressure roller pressing a recording sheet against said heat roller temperature detecting means for detecting a surface temperature of said heat roller, print start detecting means for detecting a print start time at which a print operation based on printing instruction received in an idle state after an initial operation is completed or after a previous print operation is completed should start, printing instruction detecting means for detecting a print instruction supplied from an external unit, target temperature setting means for setting, as a target temperature, a temperature lower than a temperature which should be set in a continuous print operation when said print start detecting means detects the print start time, and immediately setting, as the target temperature, the temperature which should be set in the continuous print operation when said printing instruction detecting means detects the next printing instruction during a print operation, and temperature control means for controlling the fixing unit so that a temperature detected by said temperature detecting means agrees with the target temperature set by said target temperature setting means;

An image forming apparatus comprising a fixing unit having a heat roller in which a heat source is mounted and a pressure roller pressing a recording sheet against said heat roller, temperature detecting means for detecting a surface temperature of said heat roller, initial operation necessity detecting means for determining whether an initial operation should be performed, printing instruction detecting means for detecting a printing instruction from an external unit, target temperature setting means for setting, as a target temperature, a temperature (A) higher than a temperature which should be set in a continuous print operation when said printing instruction detecting means detects the next printing instruction during a print operation based on an printing instruction detected by said printing instruction detecting means before the initial operation is completed, in a case where a temperature which is detected by said temperature detecting means when said initial operation necessity detecting means detects that the initial operation should be performed is less than a first temperature, and temperature control means for controlling the fixing unit so that a temperature detected by said temperature detecting means agrees with the target temperature set by said target temperature setting means; and An image forming apparatus comprising a fixing unit having a heat source, temperature detecting means for detecting a temperature of said fixing unit, power supply control means for supplying a voltage to said heat source of said fixing unit in an on-period and for shutting off the voltage to said heat source in an off-period alternately so that the temperature detected by said temperature detecting means agrees with a target temperature, and on-and-off control means for repeatedly turning on and off the voltage to said heat source at a cycle less than a minimum cycle of a range which is not perceived by people, in the on-period.

Some of the above objects of the present invention are achieved by the following temperature control apparatuses in which:

A temperature control apparatus for controlling a temperature of a body which is heated by a heater connected to an AC power supply based on a detected temperature of said body so that the temperature of said body falls in a predetermined temperature range, said temperature control apparatus comprising determination means for determining, based on the detected temperature of said body, whether the temperature of said body should be increased or decreased, temperature increasing control means for applying an AC voltage from said AC power supply to said heater so that the temperature of said body is increased when said determination means determines that the temperature of said body should be increased, and temperature decreasing control means for applying to said heater a pulse-shaped AC voltage which is repeatedly turned on and off at a frequency so that the temperature of said body is decreased when said determination means determined that the temperature of said body should be decreased, the frequency being generally not perceived by people;

A temperature control apparatus for controlling a temperature of a body which is heated by a heater connected to an AC power supply based on a detected temperature of said body so that the temperature of said body falls in a predetermined temperature range, said temperature control apparatus comprising a plurality of heater elements into which said heater is divided, determination means for determining, based on the detected temperature of said body, whether the temperature of said body should be increased or decreased, and connection switching means for connecting said plurality of heater elements so that said heater radiates an amount of heat which makes the temperature of said body be increased when said determination means determines that the temperature of said body should be increased and for connecting said plurality of heater elements so that said heater radiates an amount of heat which makes the temperature of said body be decreased when said determination means determines that the temperature of said body should be decreased; and A temperature control apparatus for controlling a temperature of a body which is heated by a heater connected to an AC power supply based on a detected temperature of said body so that the temperature of said body falls in a predetermined temperature range, said temperature control apparatus comprising a power dissipation element connected to said AC power supply so as to be connected to said heater in parallel, current by-pass means for supplying the AC current to said heater by-passing said power dissipation element when a predetermined control signal is supplied to said current by-pass means, determination means for determining, based on the detected temperature of said body, whether the temperature of said body should be increased or decreased, temperature increasing control means for supplying the predetermined control signal to said current by-pass means when said determination means determines that the temperature of said body should be increased, and temperature decreasing control means for supplying the AC current to said heater via said power dissipation element when said determination means determines that the temperature of said body should be decreased.

BRIEF DESCRIPTION OF THE DRAWINGS

Other objects, features and advantages of the present invention

FIG. 7 is a diagram illustrating the conventional temperature control of the fixing unit in printing operations which are continuously performed;

FIG. 28 is a block diagram illustrating a structure of a printer engine provided in the printer;

FIG. 29 is a table illustrating a relationship between occurrence of positive curl of a recording sheet and a temperature of the fixing unit;

FIG. 30 is a table illustrating a relationship between occurrence of reverse curl of a recording sheet and a temperature of the fixing unit;

FIG. 37 is a diagram illustrating temperature transition of the pressure roller;

FIG. 38 is a diagram illustrating the temperature control of the fixing unit in printing operations which are intermittently performed in the printer according to the first embodiment of the present invention (a first case);

FIG. 39 is a diagram illustrating the temperature control of the fixing unit in printing operations which are intermittently performed in the printer according to the first embodiment of the present invention (a second case);

FIG. 40 is a diagram illustrating the temperature control of the fixing unit in printing operations which are continuously performed in the printer according to the first embodiment of the present invention;

FIG. 48A is a diagram illustrating a rate at which the temperature is sampled;

FIG. 48B is a table illustrating relationships between temperature variations of the fixing unit and waveforms of the clock signal C;

FIG. 48C is a waveform diagram illustrating a waveform of the clock signal C;

FIG. 84 is a diagram illustrating a structure of each screening plate used in the temperature controller shown in FIG. 83;

DESCRIPTION OF THE PREFERRED EMBODIMENTS

A description will now be given of aspects of the present invention.

Figure 11:
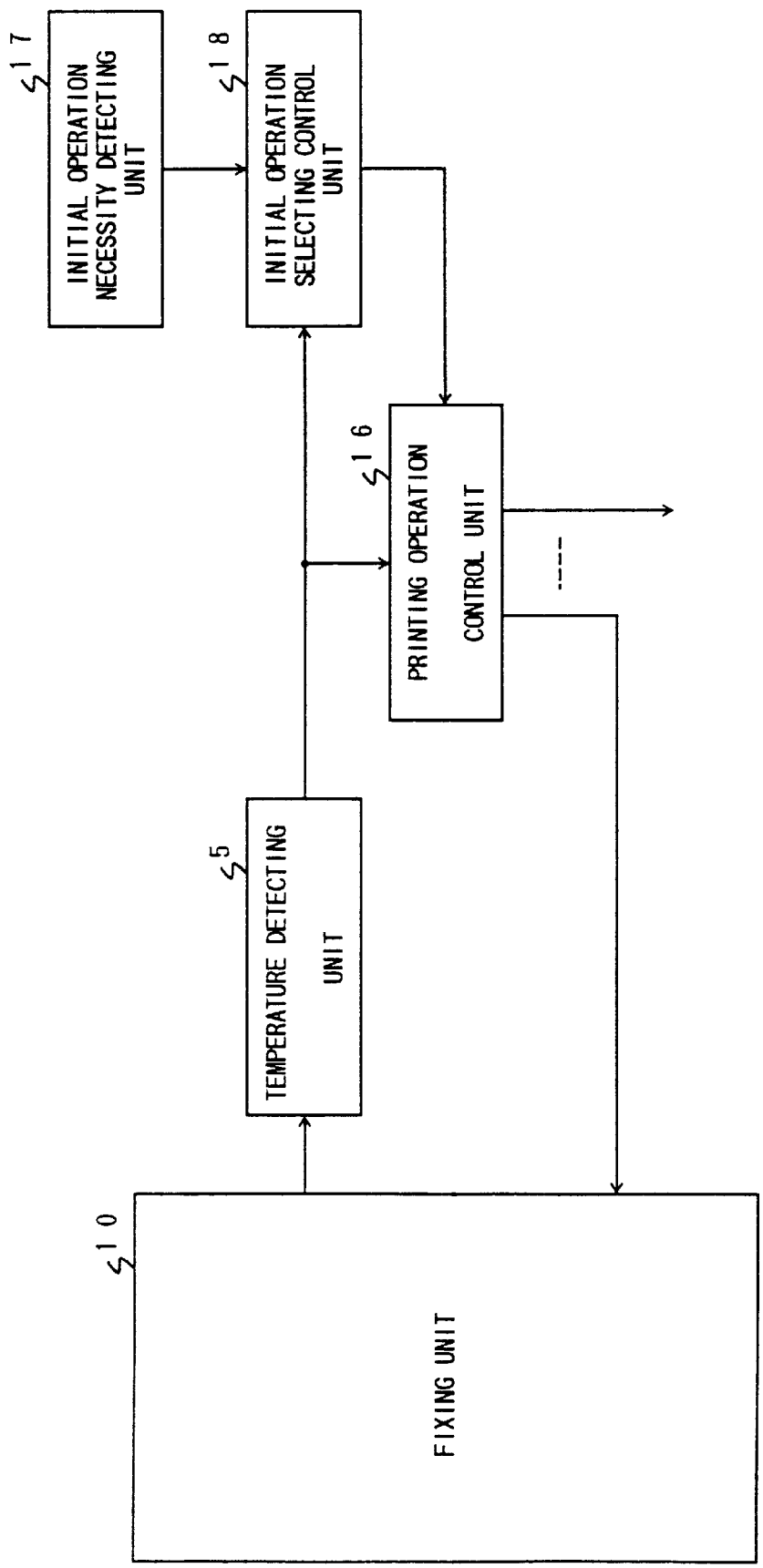
FIG. 11 is a block diagram illustrating a first aspect of the present invention.

FIG. 11 shows a first aspect of the present invention. Referring to FIG. 11, an image forming apparatus includes a fixing unit 10 having a heat source, a temperature detecting unit 5, an initial operation necessity detecting unit 17, an initial operation selecting control unit 18 and a printing operation control unit 16. The temperature detecting unit 5 detects the temperature of the fixing unit. The initial operation necessity detecting unit 17 determines whether or not initial operations should be performed. For example, after power supply of the image forming apparatus is turned on, after the open-and-close operations of covers of the image forming apparatus with the power supply in the on state are performed to remove jammed sheet and/or to change consumables and after a reset signal is received from a host unit, such as computer unit, for supplying printing data, the initial operations should be performed. When the initial operation necessity detecting unit 17 determines that the initial operations should be performed, the initial operation selecting control unit 18 selects, based on a detected temperature from the temperature detecting unit 5, an initial operations from among a plurality of initial operations and outputs an instruction for executing the selected initial operation. The printing operation control unit 16 controls the fixing unit 10 and other units (not shown) in accordance with the instruction from the initial operation selecting control unit 18 so that the selected initial operation is performed.

The initial operations is an operation for warming up the fixing unit 10 to provide for thermal fixing of developer (toner) in a printing operation. For example, a heat roller in the fixing unit 10 is rotated with a heater in an active state, as the initial operation.

The fixing unit 10 has, for example, a heat roller including a heat source and a pressure roller pressing a recording sheet against the heater roller.

Figure 17:
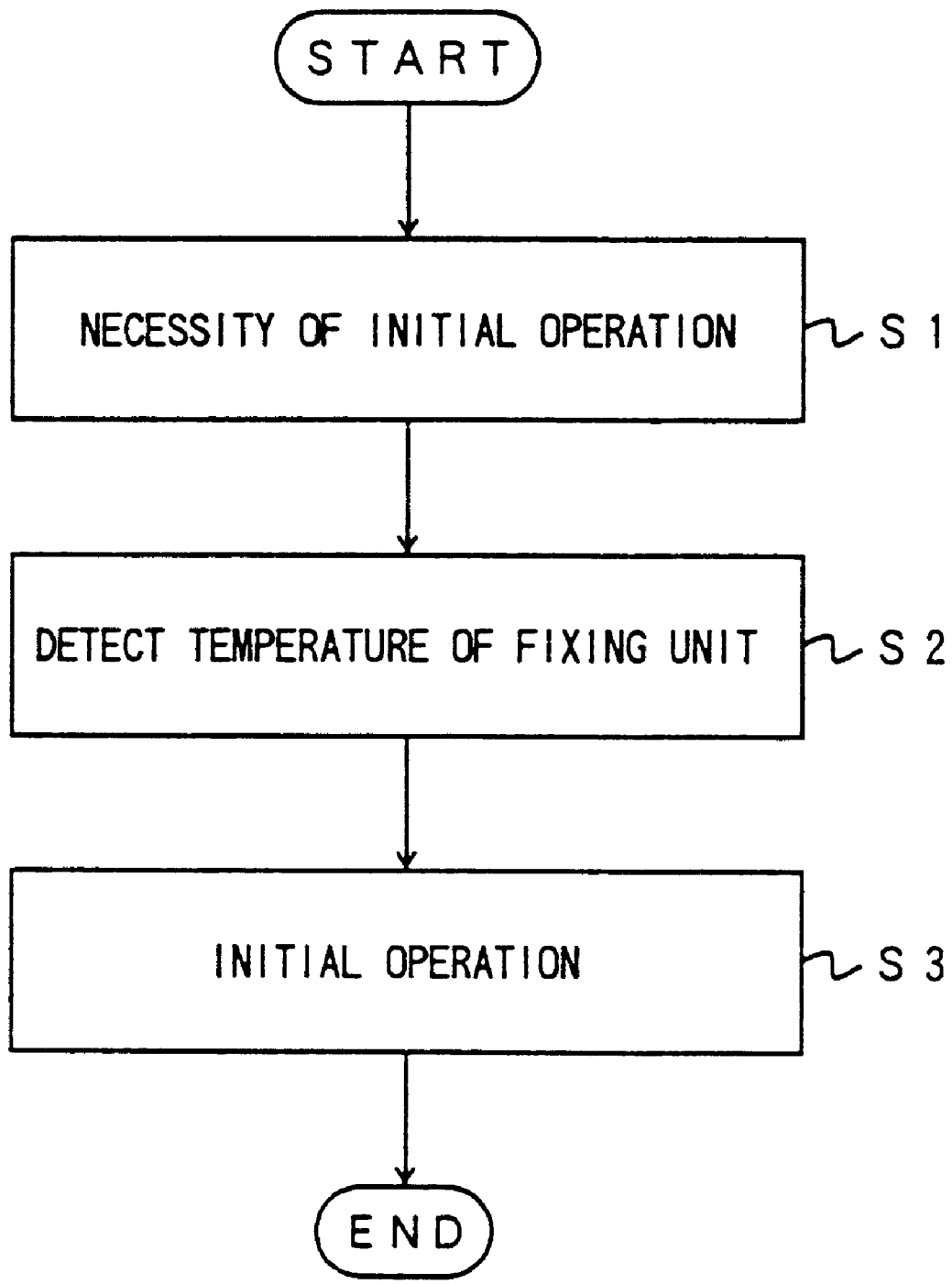
FIG. 17 is a flowchart illustrating a first example of an control operation performed in the image forming apparatus according to the present invention.

The image forming apparatus according the first aspect of the present invention is operated in accordance with a procedure shown in FIG. 17.

Referring to FIG. 17, in step S1, the initial operation necessity detecting unit determines that the initial operation should be performed. In step S2, then, the temperature detecting unit 5 detects the temperature of the fixing unit 10. After this, the initial operation selecting control unit 18 selects, based on the detected temperature, an initial operation from among a plurality of initial operations, and outputs an instruction for executing the selected initial operation. In step S3, the printing operation control unit 16 controls the fixing unit 10 in accordance with the instruction from the initial operation selecting control unit 18.

The initial operation selecting control unit 18 may select, for example, a target temperature for the fixing unit 10 among from a plurality of target temperature, as an selecting operation for the initial operation. In this case, if the temperature of the fixing unit 10 is low when the initial operation should be performed, the initial operation selecting control unit 16 select a high target temperature. On the other hand, if the temperature of the fixing unit 10 is high when the initial operation should be performed, a low target temperature is selected. As a result, a time for a warm-up operation of the fixing unit 10 can be decreased and the fixing unit 10 can be effectively warmed up.

In addition, since the warm-up time is decreased, in the apparatus having a photosensitive drum interlocked with the fixing unit 10, a time for which the photosensitive drum is rotated in the initial operation is decreased. As a result, the photosensitive drum is not wastefully rotated in the initial operation. Thus, the lifetime of the photosensitive drum can be improved.

Figure 12:
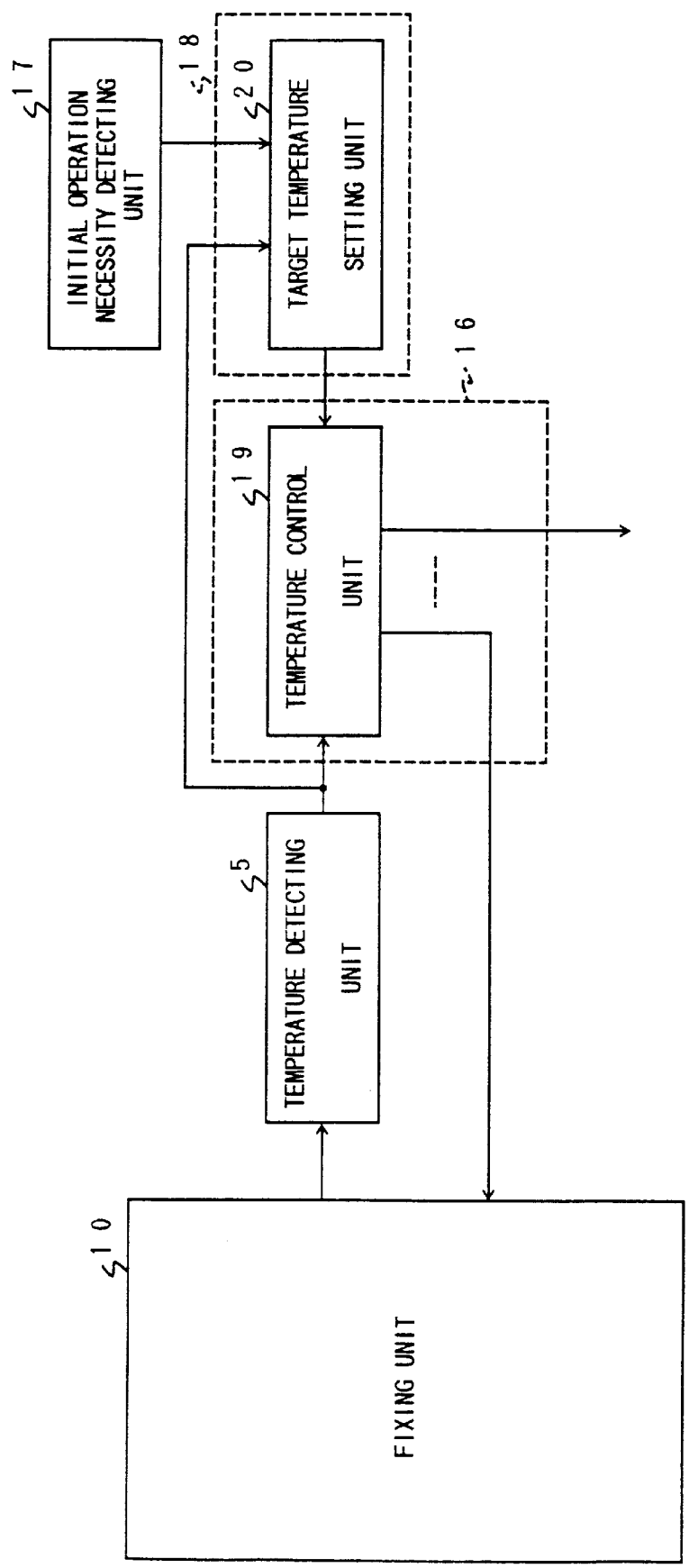
FIG. 12 is a block diagram illustrating a second aspect of the present invention.

FIG. 12 shows a second aspect of the present invention. In FIG. 12, those parts which are the same as those shown in FIG. 11 are given the same reference numbers.

Referring to FIG. 12, the initial operation selecting unit 18 has a target temperature setting unit 20, and the printing operation control unit 16 has a temperature control unit 19. When the initial operation necessity detecting unit 17 determines that the initial operation should be performed, the target temperature setting unit 20 sets a target temperature at which the fixing unit 10 should be controlled, based on the detected temperature from the temperature detecting unit 5. The temperature control unit 20 controls the temperature of the fixing unit 10 so that the detected temperature reaches the target temperature set by the target temperature setting unit 20.

When the detected temperature is low, the reverse curl of the recording sheet may occur. In this case, the target temperature set by the target temperature setting unit 20 is higher than a temperature which should be normally set in a continuous printing operation. As a result, the actual temperature rapidly reaches the target temperature which should be normally set in the continuous printing operation. On the other hand, when the detected temperature is high, the positive curl of the recording sheet may occur. In this case, the target temperature is lower than the temperature which should be normally set in the continuous printing operation. As a result, the temperature of the fixing unit 10 can be prevented from being excessively increased by the initial operation.

Thus, the pressure roller can be effectively warmed up by the initial operation. It is not necessary to rotate the heat roller to warm up the pressure roller every time the printing operation starts. As a result, a first-print-time which is a time required for forming of a first print can be shortened.

Figure 13:
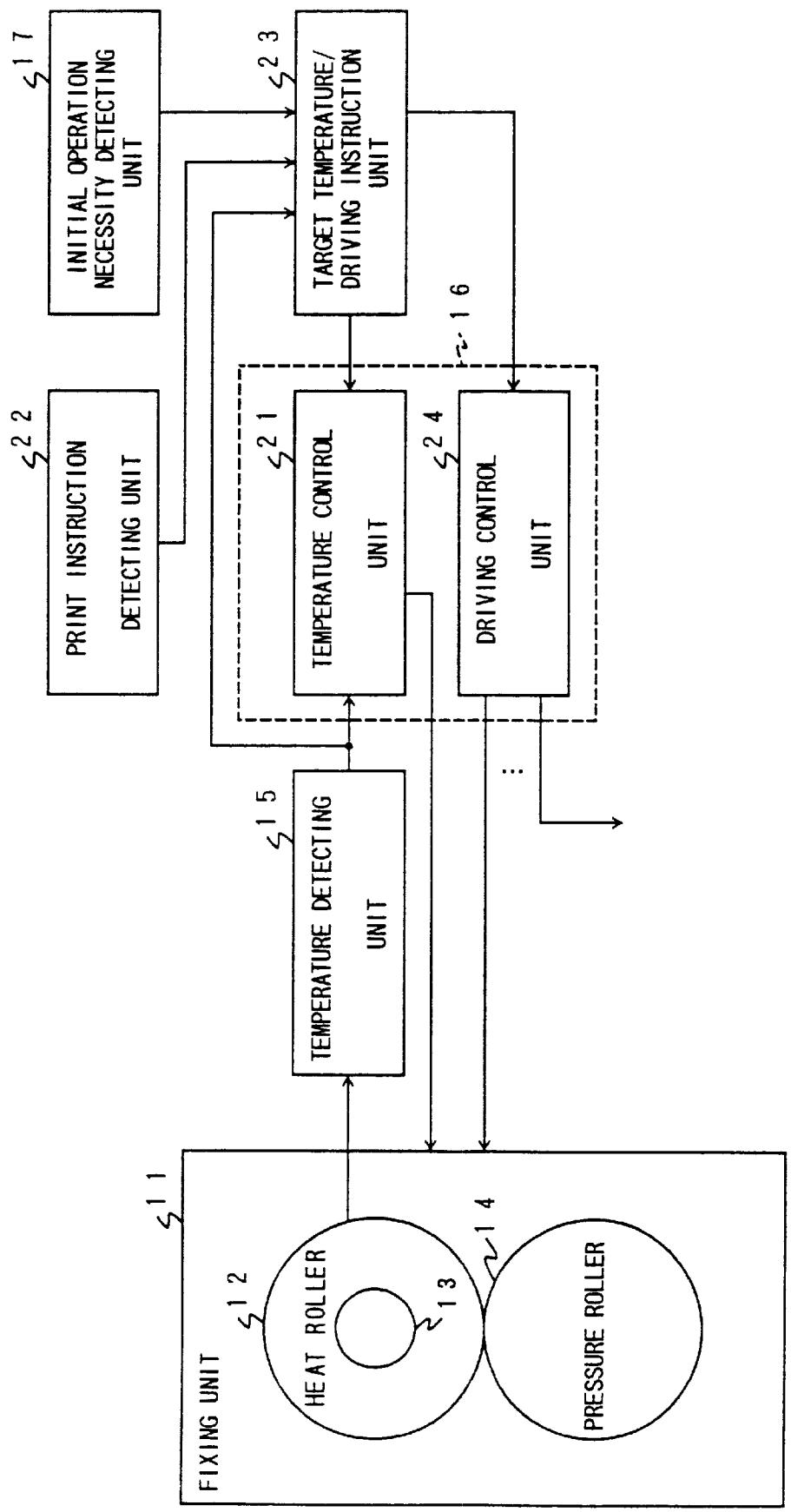
FIG. 13 is a block diagram illustrating a third aspect of the present invention.

FIG. 13 shows a third aspect of the present invention. Referring to FIG. 13, the image forming apparatus includes a fixing unit 11, a temperature detecting unit 15, the initial operation necessity detecting unit 17, a print instruction detecting unit 22, a target temperature/driving instruction unit 23 and the printing operation control unit 16. The printing operation control unit 16 has a temperature control unit 21 and a driving control unit 24. The fixing unit 11 has a heat roller 12 including a heat source 13 and a pressure roller 14 for pressing a recording sheet against the heat roller 12. The temperature detecting unit 15 detects a surface temperature of the heat roller 12. The print instruction detecting unit 22 detects a print instruction from an external unit, such as a computer unit. When the initial operation necessity detecting unit 17 determines that the initial operation should be performed and when the detected temperature is lower than a predetermined temperature 1, the target temperature/driving instruction unit 23 sets, as a target temperature, a temperature A higher than a temperature which should be set in the continuous printing operation. The target temperature/driving instruction unit 23 outputs instructions to activate the heat source 13 immediately after the initial operation starts and to rotate the heat roller 12 so that the pressure roller is warmed up after the detected temperature reaches a temperature C. In a case where a printing instruction is not received before the initial operation is completed, the target temperature/driving instruction unit 23 outputs a target temperature at which the fixing unit 11 should be controlled in an idle state after the initial operation is completed and outputs an instruction to drive the heat roller 12 of the fixing unit 11. Further, in a case where a printing instruction is received before the initial operation is completed, the target temperature/driving instruction unit 23 outputs an instruction to start a printing operation after the initial operation is completed. The temperature control unit 21 controls the heat source 13 of the fixing unit 11 so that the detected temperature is maintained at the target temperature. The driving control unit 24 performs driving control for the fixing unit 11.

The temperature C is less than the temperature A. The predetermined temperature 1 and the temperatures A and C depend on characteristics and performance of the fixing unit 11. These temperatures are experimentally decided.

Figure 18:
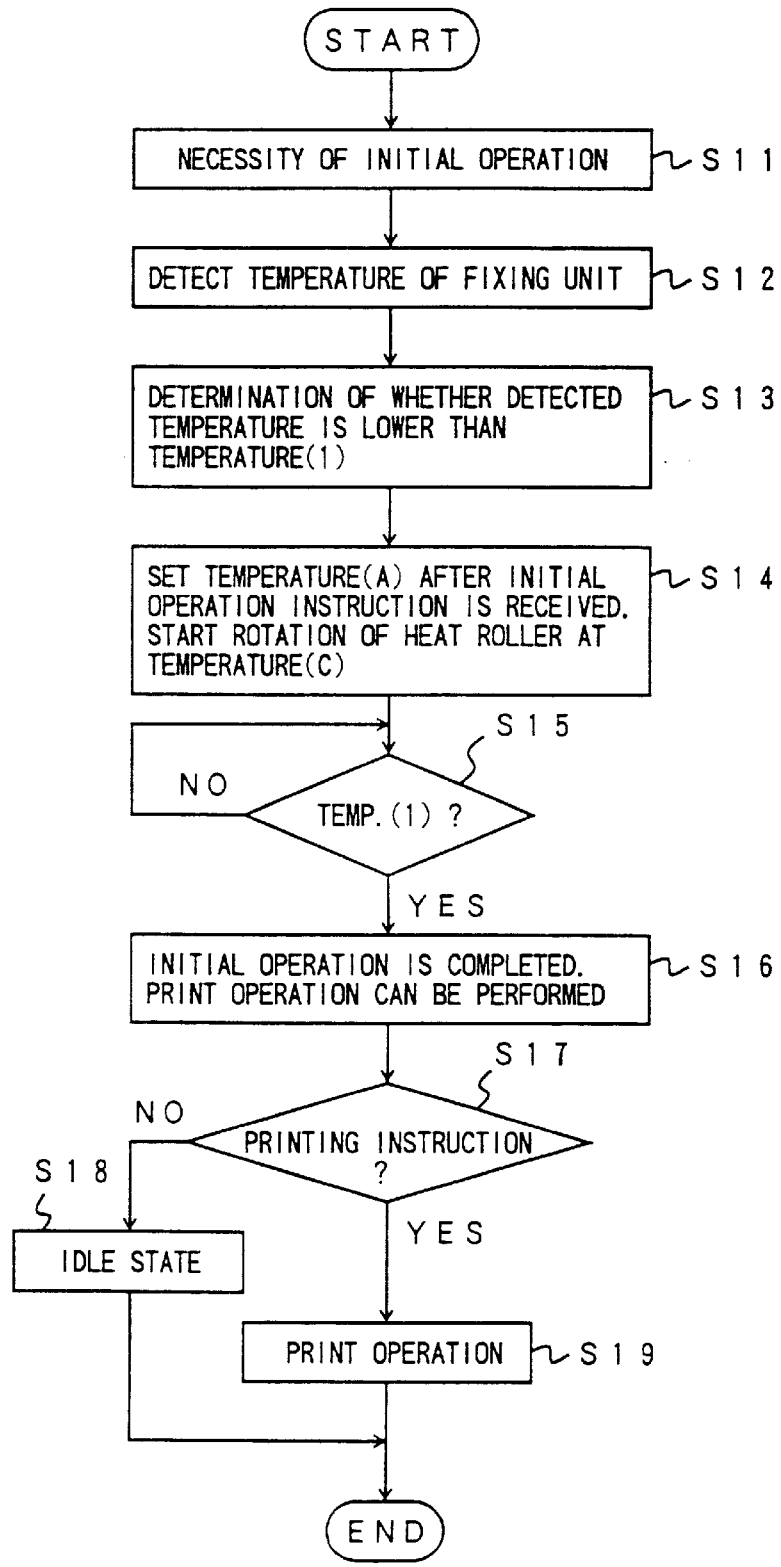
FIG. 18 is a flowchart illustrating a second example of the control operation performed in the image forming apparatus according to the present invention.

The image forming apparatus according the third aspect of the present invention is operated in accordance with a procedure shown in FIG. 18.

Referring to FIG. 18, in step S11, the initial operation necessity detecting unit 17 determines that the initial operation should be performed. In step S12, then, the temperature detecting unit 15 detects the surface temperature of the heat roller 12 of the fixing unit 11. The target temperature/driving instruction unit 23 carries out the following steps based on the detected temperature from the temperature detecting unit 15.

In step S13, the target temperature/driving instruction unit 23 determines whether the detected temperature is less than the temperature 1. The temperature 1 is near a room temperature which is sufficiently less than a temperature at which the fixing unit 10 should be controlled in a standby mode. The temperature 1 is decided based on performance of the image forming apparatus, and is set, for example, at 40° C.

When the detected temperature is less than the temperature 1, the process proceeds to step S14. In step S14, the target temperature/driving instruction unit 23 supplies to the driving control unit an instruction to carry out the initial operation. At this time, the temperature A which is higher than the temperature which should be set in the continuous printing operation is set as a target temperature.

The target temperature/driving instruction unit 23 further supplies to the driving control unit 24 instructions to activate the heat source 13 and to rotate the heat roller 12 of the fixing unit 11 after the detected temperature reaches the temperature C so that the pressure roller 14 is warmed up.

Since the detected temperature is less than the temperature 1, the heat roller 12 is rotated after the detected temperature reaches the temperature C. As a result, the pressure roller 14 can be efficiently warmed up. The temperature is less than the temperature A, and is set, for example, at 120° C.

In step S15, it is determined that the surface temperature (the detected temperature) reaches the temperature 1, the process proceeds to step S16 and the initial operation is then completed. As a result, the image forming apparatus is brought into a state where the printing operation can be executed.

In a case where, in step S17, the printing instruction detecting unit 22 detects an printing instruction supplied from the host unit before the initial operation is completed, an instruction to start the printing operation is supplied from the target temperature/driving unit 23 to the driving control unit 24, in step S19. On the other hand, in a case where, in step S17, the printing instruction detecting unit 22 does not detect an printing instruction before the initial operation is completed, an instruction to control the fixing unit 11 in the idle state, in step S18.

According to the third aspect of the present invention, the temperature at which the pressure roller is controlled is not too low, so that the reverse curl of the recording sheet can be prevented.

When the printing instruction detecting unit 22 does not detect the printing instruction before the initial operation is completed, the target temperature/driving unit 23 sets a target temperature corresponding to the idling state and outputs a driving instruction. When a first printing instruction is received, the target temperature/driving unit 23 sets the temperature A as the target temperature and outputs an instruction for the printing operation.

When the initial operation necessity detecting unit 17 determines that the initial operation should be performed and when the detected temperature is lower than a predetermined temperature 2 which is higher than the predetermined temperature 1, the target temperature/driving instruction unit 23 sets, as the target temperature, a temperature B lower than the above temperature A. The target temperature/driving instruction unit 23 outputs instructions to activate the heat source 13 immediately after the initial operation starts and to rotate the heat roller 12 so that the pressure roller is warmed up. In a case where a printing instruction is received before the initial operation is completed, the target temperature/driving instruction unit 23 outputs an instruction to start a printing operation after the initial operation is completed.

Figure 19:
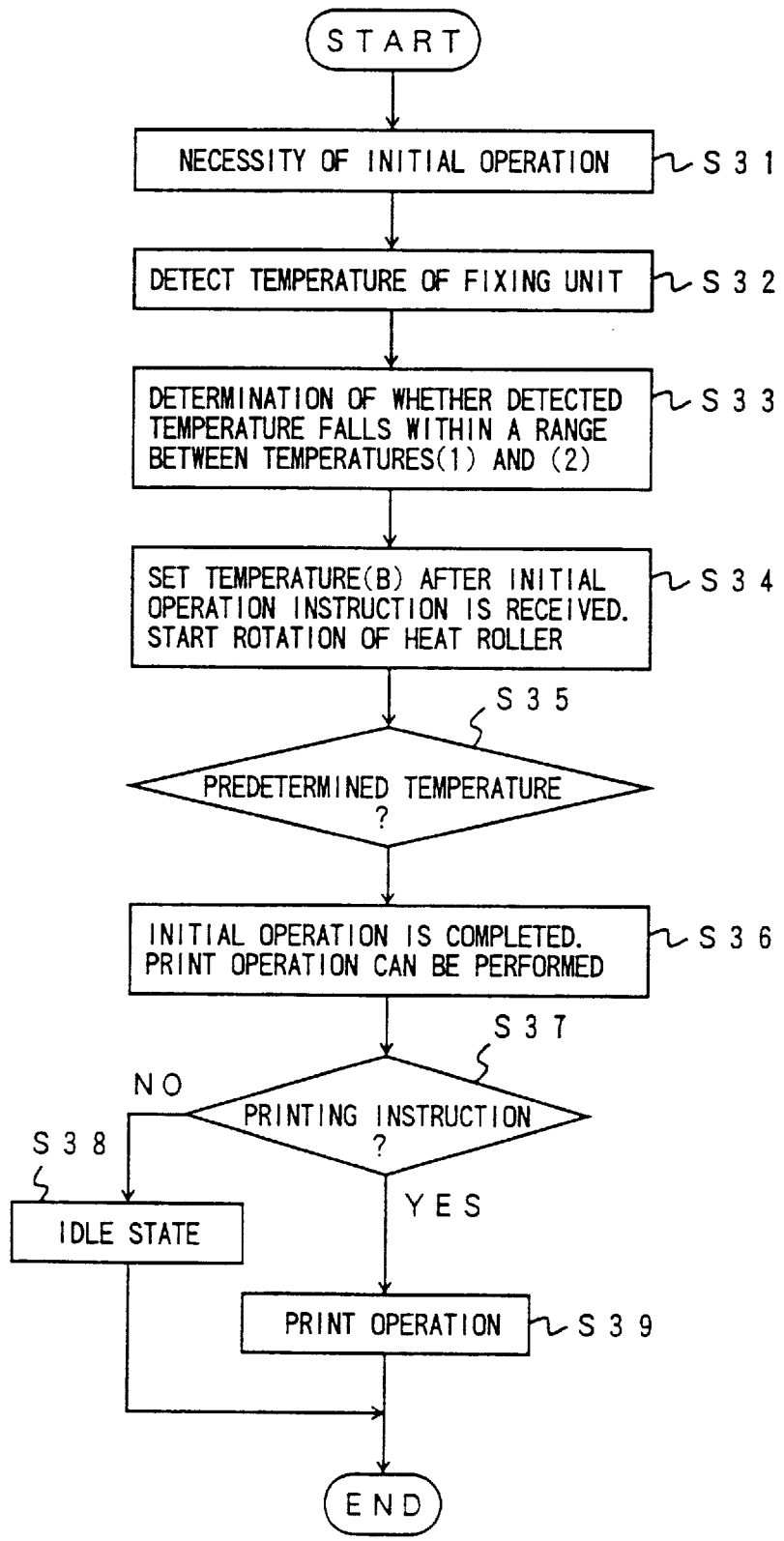
FIG. 19 is a flowchart illustrating a third example of the control operation performed in the image forming apparatus according to the present invention.

The detailed operation in this case shown in FIG. 19.

Referring to FIG. 19, when the initial operation necessity detecting unit 17 determines, in step S31, that the initial operation should be performed, the target temperature/driving instruction unit 23 operates as follows based on the surface temperature of the heat roller 12 of the fixing unit 11 which is detected by the temperature detecting unit 15.

The target temperature/driving instruction unit 23 determines, in step S33, whether or not the detected temperature falls within a range between the predetermined temperatures 1 and 2.

The predetermined temperature 2 is sufficiently higher than a room temperature, but less than the standby temperature. The predetermined temperature 2 depends on characteristics of the image forming apparatus, and is set, for example, at 100° C.

When it is determined that the detected temperature falls within the range, the target temperature/driving instruction unit 23 sets the temperature B as the target temperature after the initial operation starts, in step S34. The temperature B is a temperature at which the heat roller 12 should be controlled in the continuous printing operation. Since the fixing unit 11 has been sufficiently warmed up, the heat roller 12 starts to be rotated immediately after the heat source 13 is activated.

When the detected temperature reaches the predetermined temperature (in step S35), it is determined, in step S36, the initial operation is completed and the image forming apparatus is in a state where the printing operation can be performed.

In step S37, when a print instruction is detected by the print instruction detecting unit 22 before the initial operation is completed, the process proceeds to step S39. In step S39, the printing operation is performed. On the other hand, when a print instruction is not detected, the image forming apparatus is controlled in the idle state.

According to the above operations of the target temperature/driving unit 23, the heat roller 12 is not excessively increased, so that the recording sheet is prevented from being curled (the positive curl) and the image forming apparatus is prevented from being wasteful with the dissipation power.

Further, when the initial operation necessity detecting unit 17 determines that the initial operation should be performed and when the detected temperature is higher than the predetermined temperature 2, the target temperature/driving instruction unit 23 sets, as the target temperature, a standby temperature which should be controlled in the standby state. The target temperature/driving instruction unit 23 outputs instructions to activate the heat source 13 immediately after the initial operation starts and to rotate the heat roller 12 so the pressure roller is warmed up. In a case where a printing instruction is not received before the initial operation is completed, the target temperature/driving instruction unit 23 sets a target temperature corresponding to the idle state and outputs a driving instruction. On the other hand, in a case where a printing instruction is received before the initial operation is completed, the target temperature/driving instruction unit 23 outputs an instruction to start a printing operation after the initial operation is completed.

Figure 20:
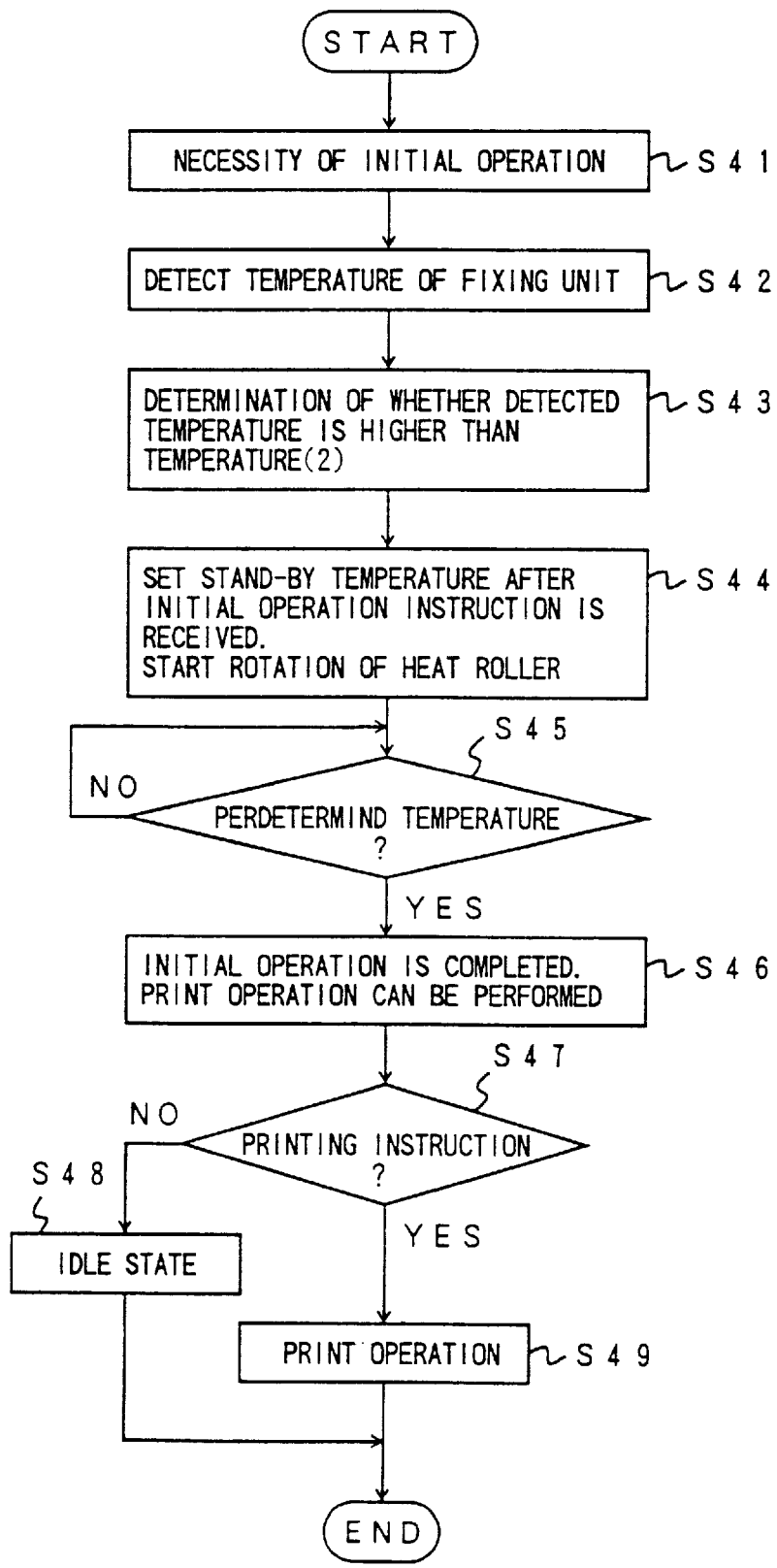
FIG. 20 is a flowchart illustrating a fourth example of the control operation performed in the image forming apparatus according to the present invention.

The detailed operation in this case shown in FIG. 20.

Referring to FIG. 20, after it is determined, in step S41, that the initial operation should be performed and the temperature of the fixing unit 11 is detected in step S42, it is determined, in step S43, whether or not the detected temperature obtained in step S42 is higher than the predetermined temperature 2.

When the detected temperature is higher than the predetermined temperature 2, the process proceeds to step S44. In step S44, the target temperature/driving instruction unit 23 sets the standby temperature which should be set in the idle state and supplies to the driving control unit 24 an instruction to rotate the heat roller 12 to warm up the pressure roller 14. When it is determined, in step S45, that the detected temperature reaches the predetermined temperature, the initial operation completed and the image forming apparatus is in a state when the printing operation can be performed.

Due to the above process, the temperature of the pressure roller 14 is not excessively increased, so that the recording sheet is prevented from being curled (the positive curl) and the image forming apparatus can be prevented from being wasteful with the dissipation power.

Figure 14:
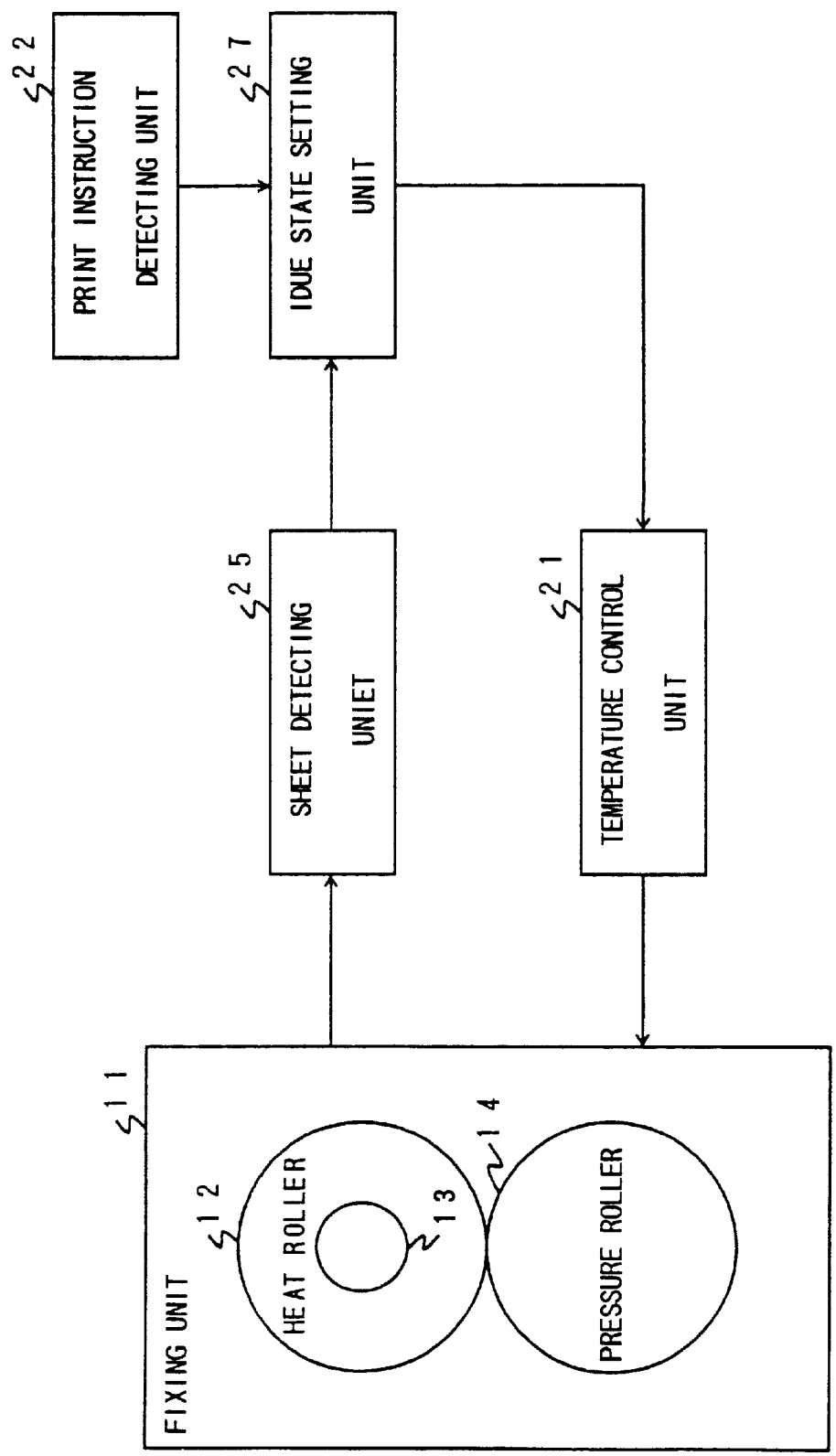
FIG. 14 is a block diagram illustrating a fourth aspect of the present invention.

FIG. 14 shows a fourth aspects of the present invention. Referring to FIG. 14, the image forming apparatus includes the fixing unit 11, the temperature control unit 21, the print instruction detecting unit 22, a sheet detecting unit 25 and an idle state setting unit 2. The fixing unit 11, the temperature control unit 21 and the print instruction detecting unit 22 have the same structures as those shown in FIG. 13. The sheet detecting unit 25 detects whether a recording sheet passes through the fixing unit 11. The idle state setting unit 27 outputs to the temperature control unit 21 an instruction to set the idle state when the sheet detecting unit 25 detects that the recording sheet has passed through the fixing unit 11 in a case where the next printing instruction is not received.

According to the fourth aspect of the present invention, in a case where the next print instruction is not received during the printing operation, when the recording sheet has passed through the fixing unit 11, the fixing unit 11 is set in the idle state. Thus, the pressure roller is not excessively heated, so that the recording sheet is prevented from being curled (the positive curl) and the image forming apparatus is prevented from being wasteful with the dissipation power.

Figure 15:
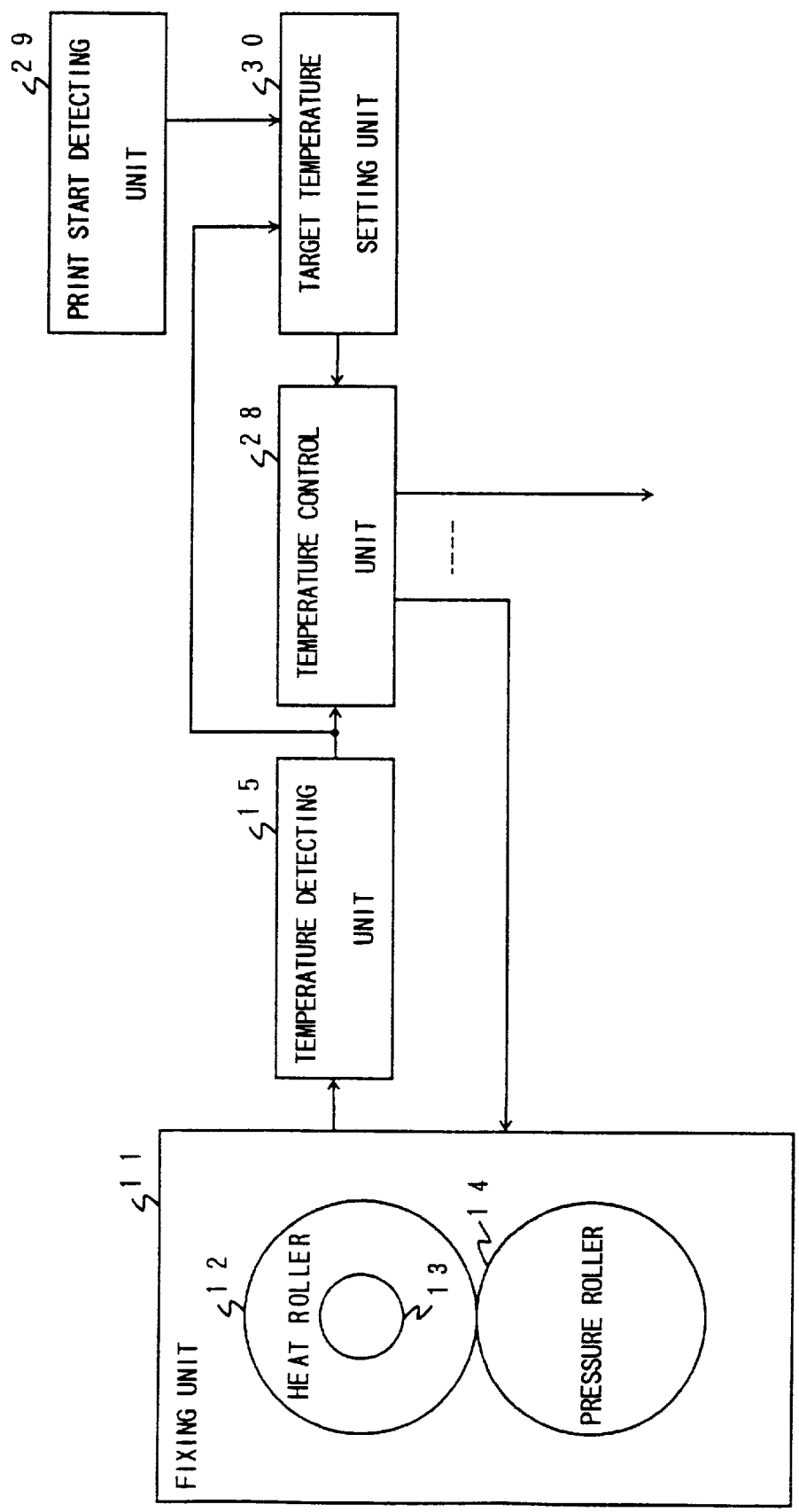
FIG. 15 is a block diagram illustrating a fifth aspect of the present invention.

FIG. 15 shows a fifth aspect of the present invention.

Referring to FIG. 15, the image forming apparatus includes the fixing unit 11, the temperature detecting unit 15, a temperature control unit 28, a print start detecting unit 29 and a target temperature setting unit 30. The fixing unit 11 and the temperature detecting unit have the same structures as those shown in FIG. 13. When a print instruction is received in the idle state after the initial operation is completed or the previous print operation is completed, the print start detecting unit 29 determines that the print operation should start. When the printing operation starts, the target temperature setting unit 30 sets, as the target temperature, a temperature lower than a temperature which should be set in the continuous printing operation. The temperature control unit 28 controls the heat source 13 so that the detected temperature is maintained at the target temperature set by the target temperature setting unit 30.

In the image forming apparatus according to the fifth aspect of the present invention, when the printing operation starts, the temperature lower than the temperature (the temperature B) which should be set in the continuous printing operation is set at the target temperature. Thus, even if the overshoot of the temperature of the heat roller 12 occurs, the maximum temperature in the overshoot is relatively low. Thus, the recording sheet is prevented from being curled (the positive curl).

The target temperature setting unit 30 may set a temperature as the target temperature so that an overshot temperature is equal to a temperature to be controlled in the continuous printing operation.

In this case, the fixing factor is prevented from deteriorating and being excess, so that the optimum fixing factor can be obtained.

Figure 16:
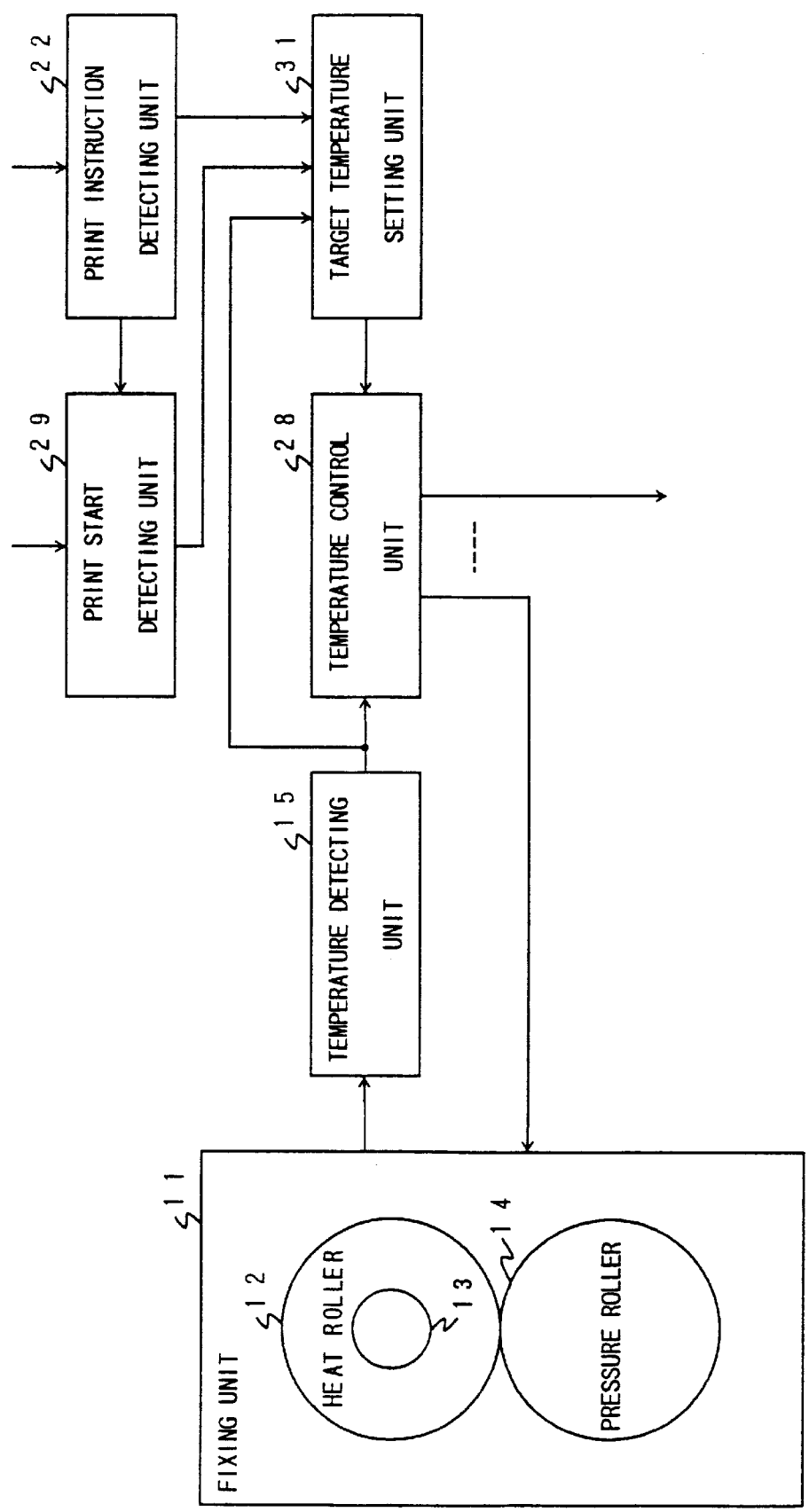
FIG. 16 is a block diagram illustrating a sixth aspect of the present invention.

FIG. 16 shows a sixth aspect of the present invention.

Referring to FIG. 16, the image forming apparatus includes the fixing unit 11, the temperature detecting unit 15, the print instruction detecting unit 22, the print start detecting unit 29 and a target temperature setting unit 31. The fixing unit 11, the temperature detecting unit 15, the print instruction detecting unit 22 and the print start detecting unit 29 have the same structures as those shown in FIGS. 13 and 15. When the printing operation starts, the target temperature setting unit 31 sets, as the target temperature, a temperature lower than a temperature which should be set in the continuous printing operation. When the next print instruction is received during the printing operation, the target temperature setting unit 31 immediately sets, as the target temperature, the temperature which should be set in the continuous printing operation. The temperature control unit 28 controls the heat source 13 so that the detected temperature is maintained at the target temperature set by the target temperature setting unit 31.

In the image forming apparatus according to the sixth aspect of the present invention, when the printing operation starts, the temperature lower than the temperature which should be set in the continuous printing operation is set as the target temperature. In addition, when the next print instruction is received during the printing operation, the temperature which should be set in the continuous operation is immediately set as the target temperature. Thus, the maximum temperature in the overshoot which occurs at start of the printing operation is relatively low. As a result, the recording sheet is prevented from being curled (the positive curl) at the start of the printing operation. In addition, in the continuous printing operation, a relative high temperature is set as the target temperature. Thus, the reverse curl of the recording sheet and a fixing error can be prevented.

Further, there is a case where the surface temperature of the heat roller 12 (the detected temperature) is lower than predetermined temperature 1 when it is determined that the initial operation should be performed. In this case, when the next print instruction is received during the printing operation based on the previous print instruction received before the initial operation is completed, the target temperature setting unit 31 sets, as the target temperature, the temperature A higher than the temperature which should be set as the target temperature in the continuous printing operation.

In this case, even if the temperature of the pressure roller 14 detected when it is determined that the initial operation should be performed is low, the pressure roller 14 can be sufficiently warned up by setting a high temperature as the target temperature. Thus, the reverse curl of the recording sheet can be prevented.

Figure 21:
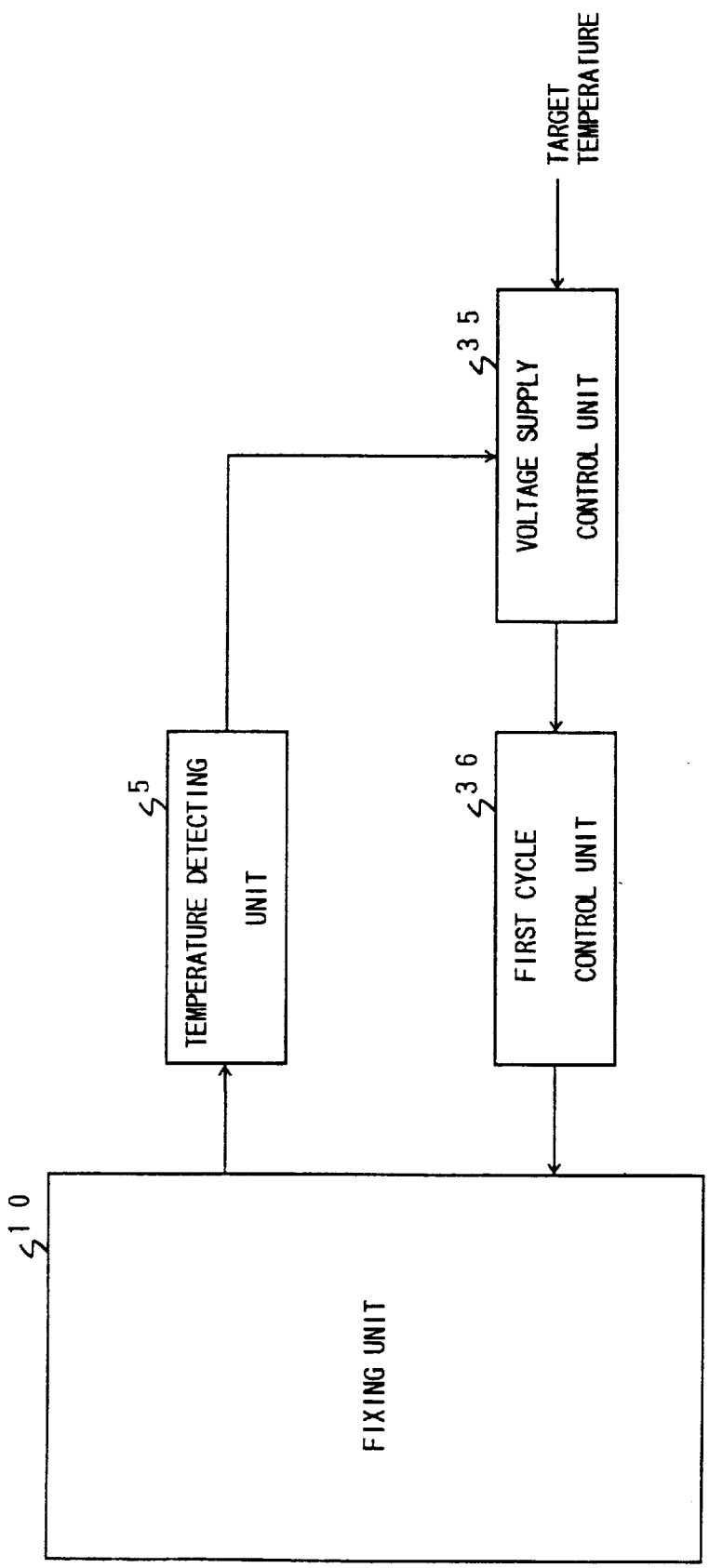
FIG. 21 is a block diagram illustrating a seventh aspect of the present invention.

FIG. 21 shows a seventh aspect of the present invention.

Referring to FIG. 21, the image forming apparatus includes the fixing unit 10, the temperature detecting unit 5, a voltage supply control unit 35 and a first cycle control unit 36. The fixing unit 5 has a heat source. The temperature detecting unit 5 detects the temperature of the fixing unit 10. The voltage supply control unit 35 controls, based on a temperature detected by the temperature detecting unit 5, whether or not the voltage is supplied to the heat source of the fixing unit 10 so that the detected temperature is maintained at a target temperature. While the voltage is being applied to the heat source in accordance with the control of the voltage supply control unit 35, the first cycle control unit 36 repeatedly turns on and off the voltage applied to the heat source at a predetermined cycle (referred to as a first on-and-off cycle). The first on-and-off cycle is less than the minimum cycle in a range which can be perceived by people. The minimum cycle in the range which can be perceived by people is, for example, 40 milliseconds (msec). When light is flickered at an on-and-off cycle of about 110 milliseconds (corresponding to about 8.8 Hz), people generally have the most uncomfortable feeling. In accordance with increasing and decreasing of the on-and-off cycle from about 110 milliseconds, a degree of the unconformable feeling is decreased.

In the image forming apparatus according to the seventh aspect of the present invention, the voltage applied to the heat source of the fixing unit is repeatedly turned on and off at the first on-and-off cycle which is not perceived by people. Thus, even if lighting devices sharing the power supply with the heat source of the fixing unit are flickered at the first on-and-off cycle, the people do not feel uncomfortable. Further, characteristics of the electric devices sharing the power supply for the heat source of the fixing unit do not deteriorate.

The voltage supplied by the voltage supply control unit 35 may be not only AC (alternating current) voltage but also DC (direct current) voltage.

Figure 22:
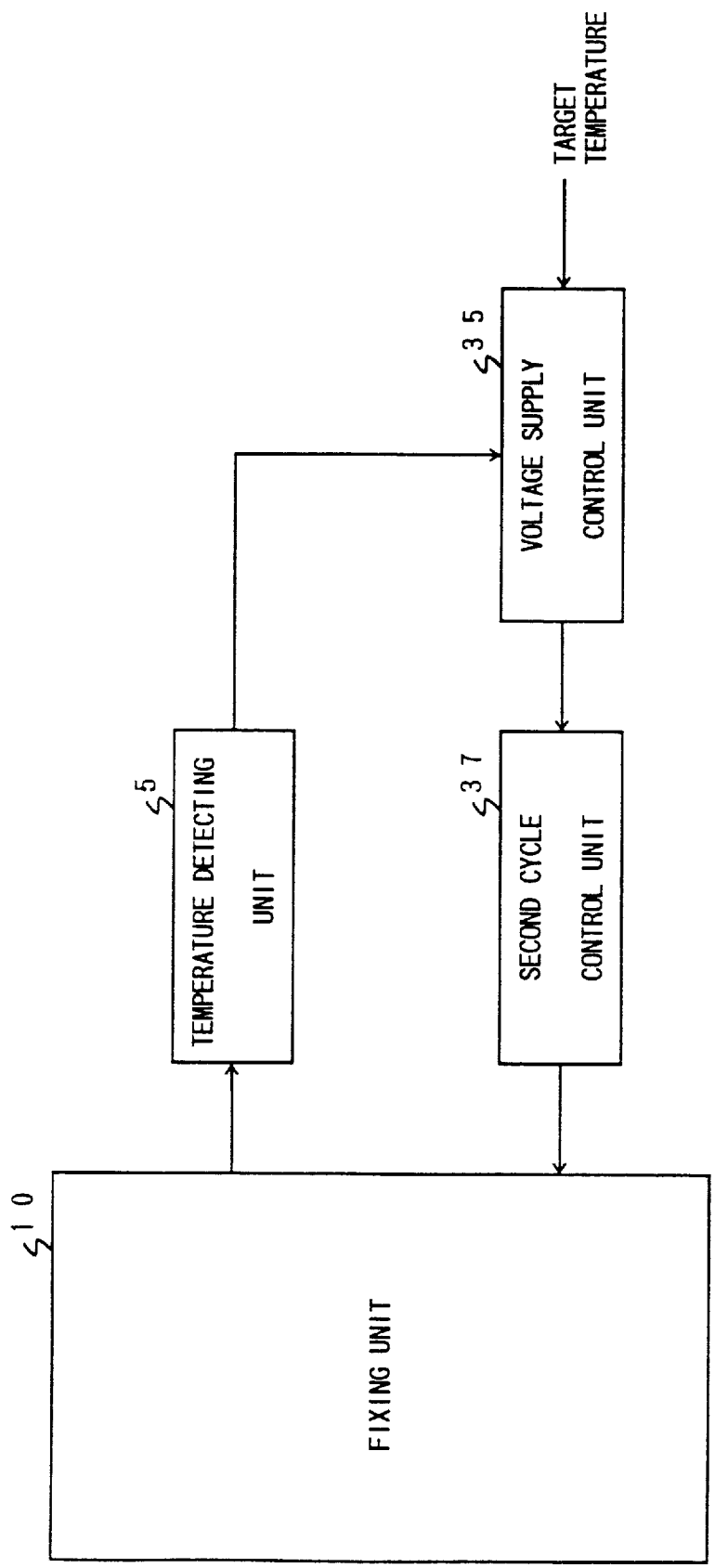
FIG. 22 is a block diagram illustrating a eighth aspect of the present invention.

FIG. 22 shows an eighth aspect of the present invention.

Referring to FIG. 22, the image forming apparatus includes the fixing unit 10, the temperature detecting unit 5 and the voltage supply control unit 35 in the same manner as that shown in FIG. 21. The image forming apparatus according to the eighth aspect of the invention further includes a second cycle control unit 37. In a period in which the voltage supply control unit 35 supplies a voltage to the heat source of the fixing unit 10, the second cycle control unit 37 repeatedly turns on and off the voltage at a predetermined cycle (referred to as a second on-and-off cycle) so that the temperature of the fixing unit 10 reaches the target temperature. The second on-and-off cycle falls within a range to which people generally have slightly uncomfortable feeling, which range is included in the range which can be perceived by people.

People generally can perceive flicker of a lighting device at cycle longer than 40 milliseconds. When the lighting device is flickered at cycle sufficiently longer than 110 milliseconds, people feels slightly uncomfortable. Thus, in the case where the voltage applied to the heat source of the fixing unit 10 is repeatedly turned on and off at the second on-and-off cycle, even if lighting devices sharing the power supply with the heat source of the fixing unit 10 are flickered at the second on-and-off cycle, the uncomfortable feeling of people is generally slight. In addition, characteristics of electric devices sharing the power supply with the heat source of the fixing unit does not deteriorate.

Figure 23:
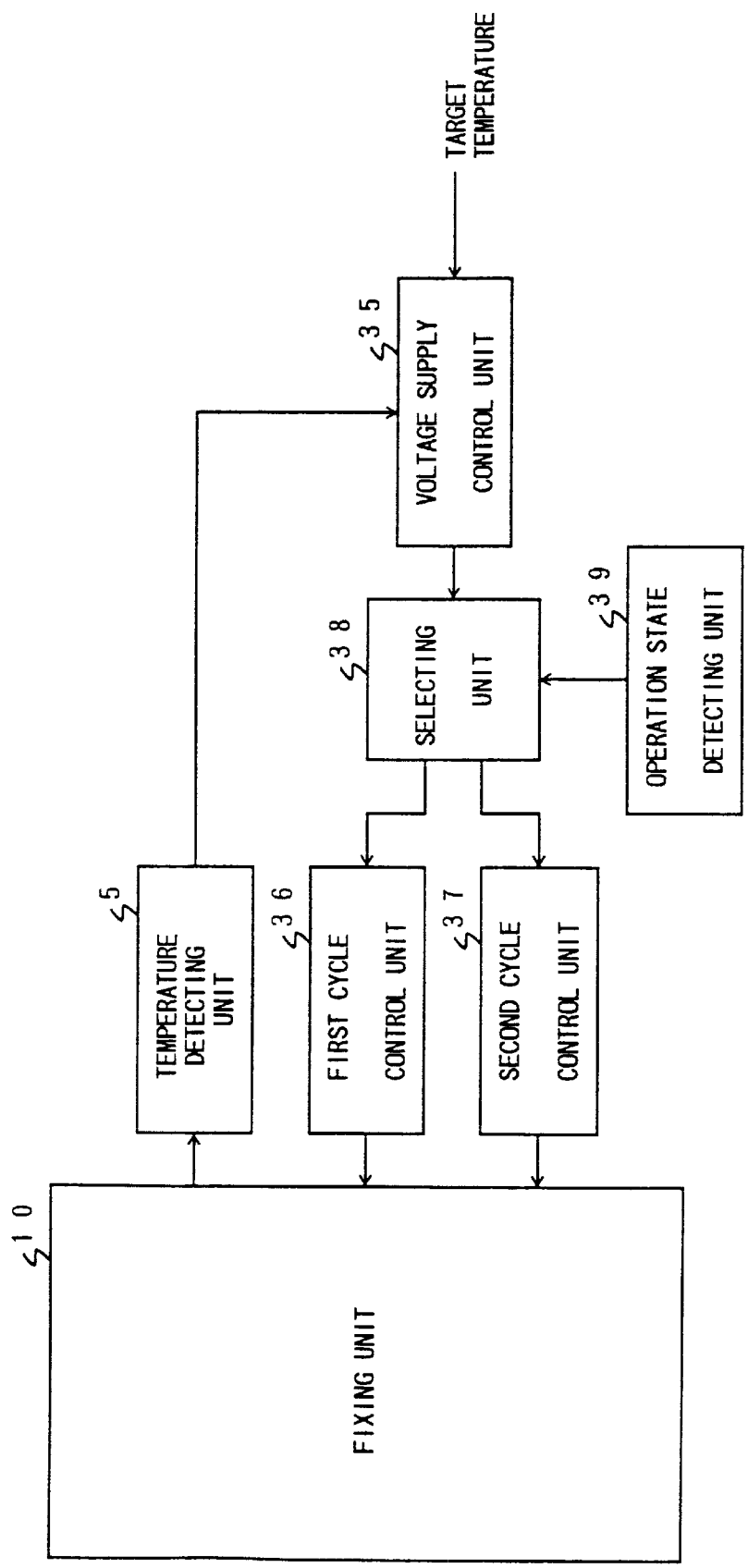
FIG. 23 is a block diagram illustrating a ninth aspect of the present invention.

FIG. 23 shows a ninth aspect of the present invention.

Referring to FIG. 23, the image forming apparatus includes the fixing unit 10, the temperature detecting unit 5 and the voltage supply control unit in the same manner as in the cases shown in FIGS. 21 and 22. The image forming apparatus according to the ninth aspect of the present invention further includes the first cycle control unit 36, the second cycle control unit 37, a selecting unit 38 and an operation state detecting unit 39. The operation state detecting unit 39 detects whether the image forming apparatus is in a state where the printing operation is performed (referred to as a printing state) or in the idle state. When the operation state detecting unit 39 detects that the image forming apparatus is in the printing state, the selecting unit 38 selects the first cycle control unit 36. In this case, in a period in which the voltage supply control unit 35 supplies the voltage to the heat source of the fixing unit 10, the first cycle control unit 36 repeatedly turns on and off the voltage applied to the heat source at the first on-and-off cycle. On the other hand, when the operation sate detecting unit 39 detects that the image forming apparatus is in the idle state, the selecting unit 38 selects the second cycle control unit 37. In this case, in a period in which the voltage supply control unit 35 supplies the voltage to the heat source of the fixing unit 10, the second cycle control unit 37 repeatedly turns on and off the voltage applied to the heat source at the second on-and-off cycle.

When the image forming apparatus is in the printing state, the voltage applied to the heat source of the fixing unit 10 is repeatedly turned on and off at the first on-and-off cycle less than the minimum cycle in the range which can be generally perceived by people. That is, in the printing state, the voltage applied to the heat source of the fixing unit 10 is repeatedly turned on and of at a relatively short cycle.

When the image forming apparatus is in the idle state, the voltage applied to the heat source of the fixing unit 10 is repeatedly turned on and off at the second on-and-off cycle longer than the cycle for which people generally have the most uncomfortable feeling. That is, in the idle state, the voltage applied to the heat source of the fixing unit 10 is repeatedly turned on and off at a relatively long cycle.

Figure 24:
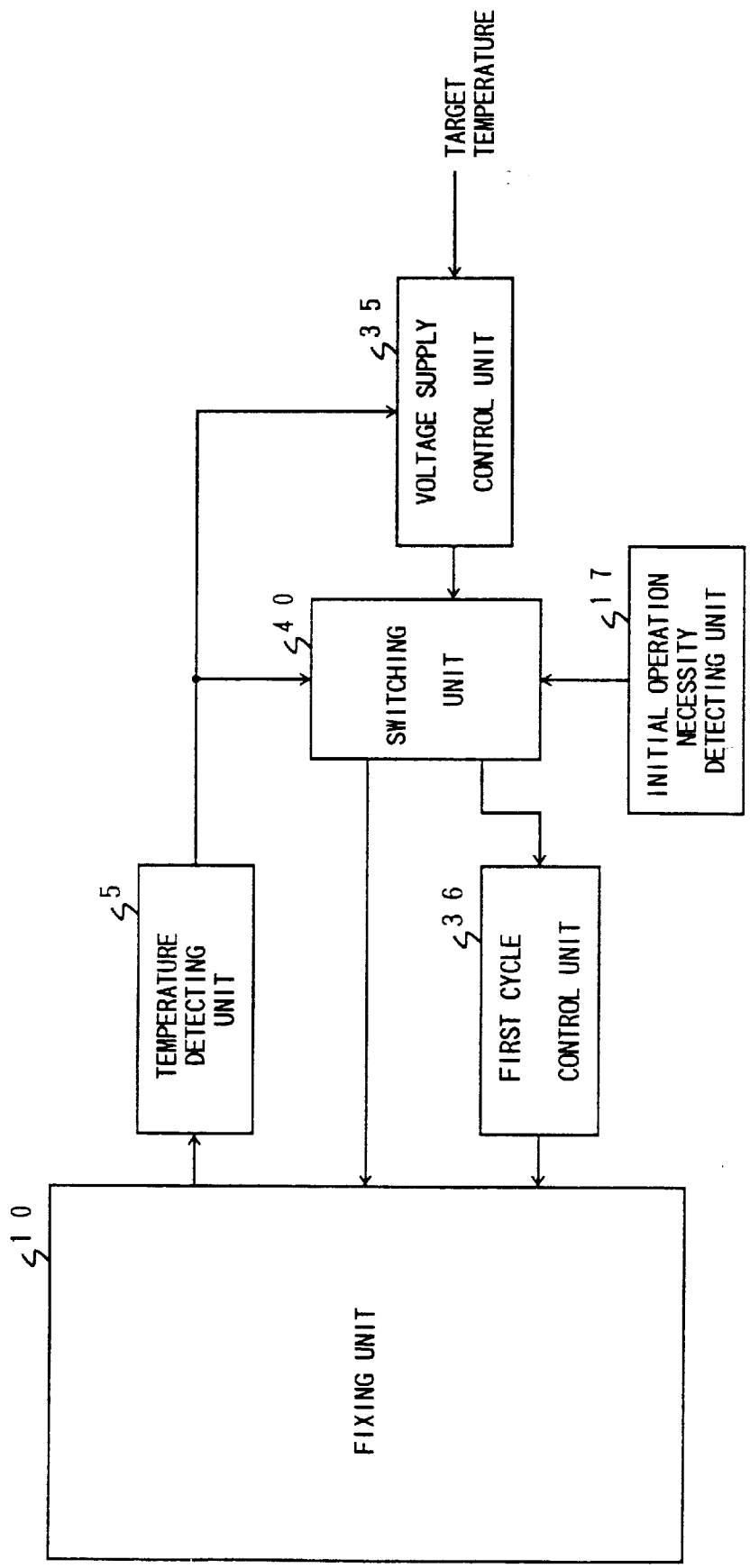
FIG. 24 is a block diagram illustrating a tenth aspect of the present invention.

FIG. 24 shows a tenth aspect of the present invention.

Referring to FIG. 24, the image forming apparatus includes the fixing unit 10, the temperature detecting unit 5, the voltage supply control unit 35 and the first cycle control unit 36 in the same manner as that shown in FIG. 21. The image forming apparatus according the tenth aspect of the present invention further includes the initial operation necessity detecting unit 17 and a switching unit 40. When the initial operation necessity detecting unit 17 determines that the initial operation should be performed, the switching unit 40 performs a switching operation so as to couple the voltage supply control unit 35 to the heat source of the fixing unit 10. In this case, the voltage supply control unit controls, based on the detected temperature, whether or not the voltage is applied to the heat source of the fixing unit 10. As a result, the voltage is applied to the heat source at intervals. In a period in which the voltage is applied to the heat source, the temperature of the fixing unit 10 can rapidly reach the target temperature.

On the other hand, when the detected temperature reaches a predetermined temperature, the switching unit 40 performs the switching operation so as to couple the voltage supply control unit 35 to the first cycle control unit 36. In this case, in a period in which the voltage supply control unit 35 supplies the voltage to the heat source of the fixing unit 10, the voltage is repeatedly turned on and off at the first on-and-off cycle.

Figure 25:
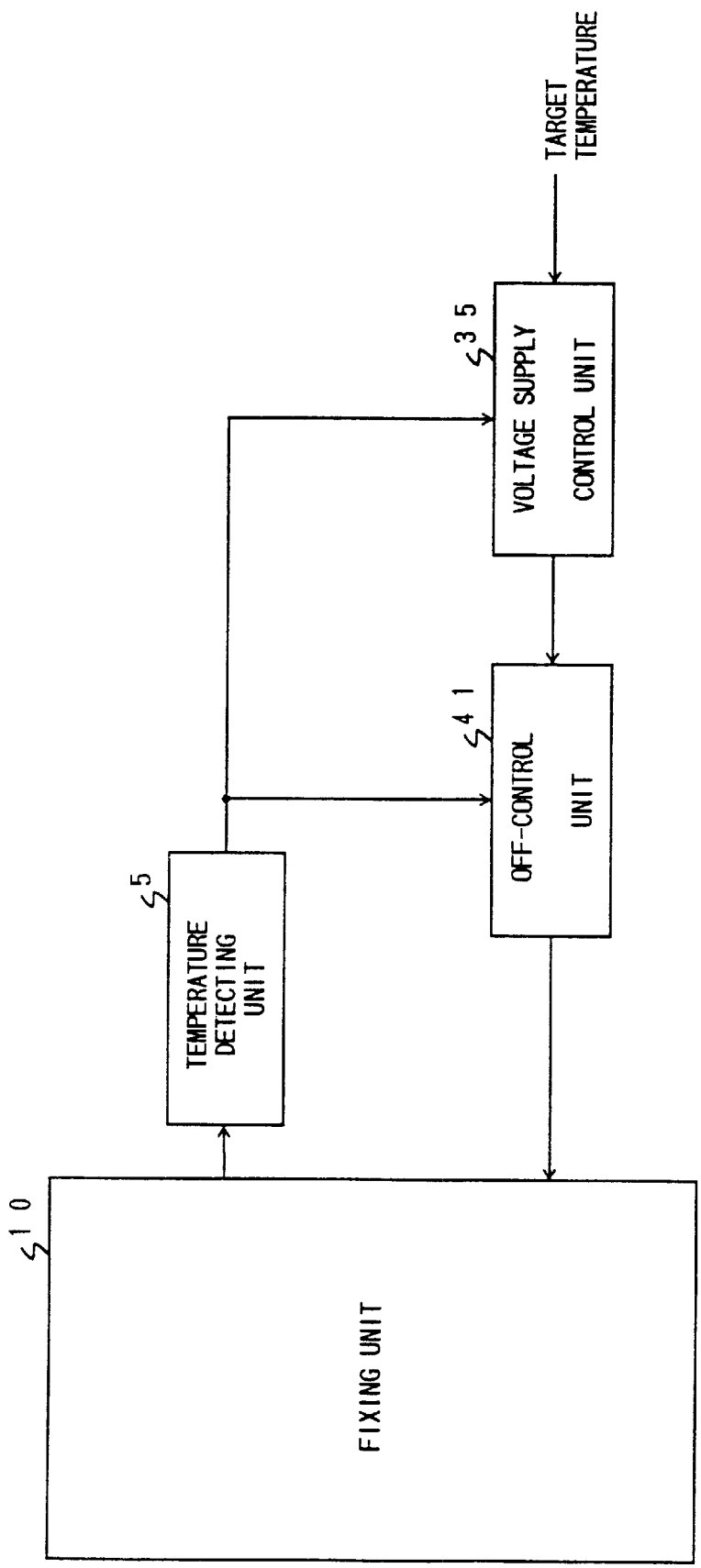
FIG. 25 is a block diagram illustrating a eleventh aspect of the present invention.

FIG. 25 shows an eleventh aspect of the present invention.

Referring to FIG. 25, the image forming apparatus includes the fixing unit 10, the temperature detecting unit 5 and the voltage supply control unit 35. The image forming apparatus according to the eleventh aspect of the present invention further includes an off-control unit 41. In a case where the temperature of the fixing unit 10 (the detected temperature) exceeds a predetermined temperature, in a period in which voltage supply control unit 35 should not supply the voltage to the heat source of the fixing unit 10, the voltage applied to the heat source is completely shut off after the off-control unit 41 repeatedly turns on and off once or a few times.

According to the above control of the voltage supply to the heat source of the fixing unit 10, the temperature of the fixing unit is slowly decreased from the predetermined temperature.

Figure 26:
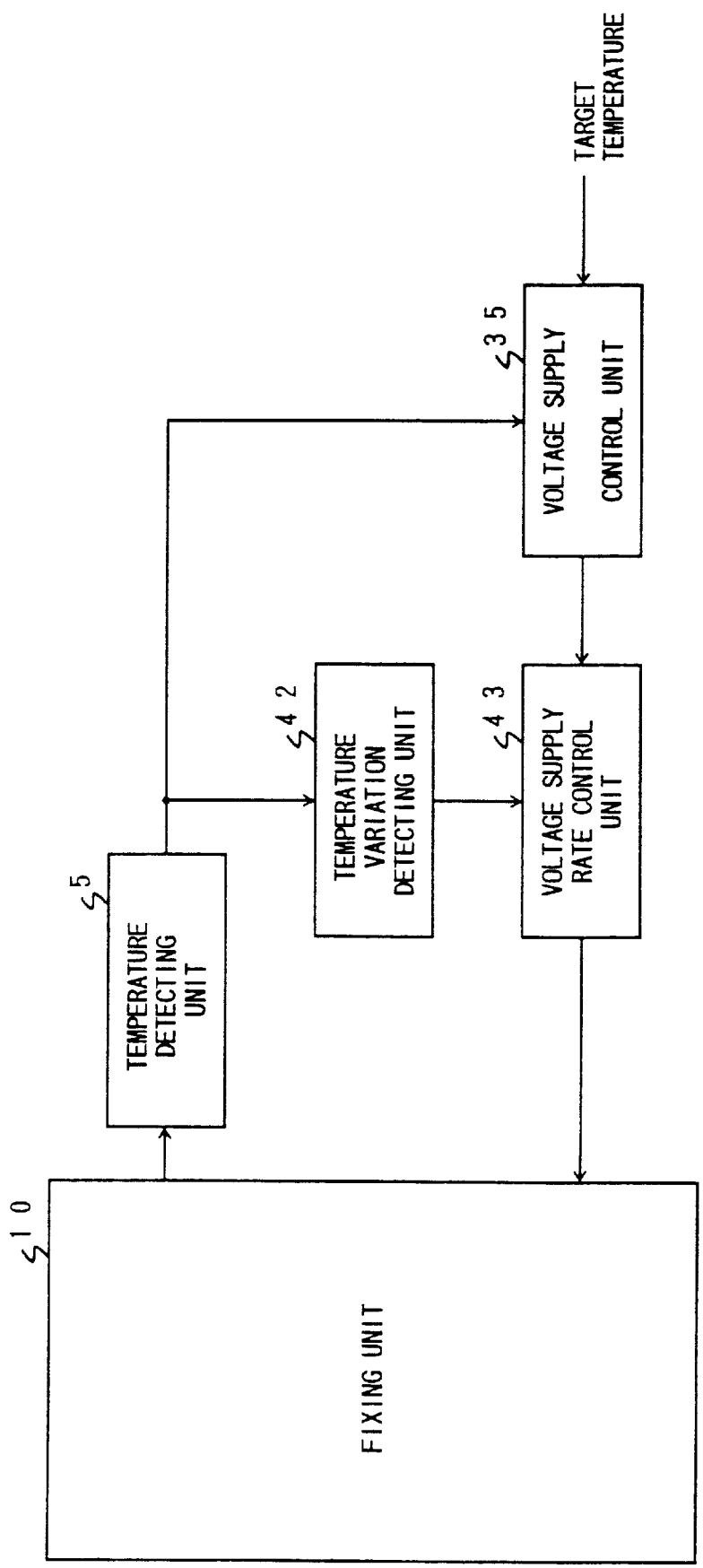
FIG. 26 is a block diagram illustrating a twelfth aspect of the present invention.

FIG. 26 shows a twelfth aspect of the present invention.

Referring to FIG. 26, the image forming apparatus includes the fixing unit 10, the temperature detecting unit 5 and the voltage supply control unit 35. The image forming apparatus according to the twelfth aspect of the present invention further includes a temperature variation detecting unit 42 and a voltage supply rate control unit 43. When the temperature variation detecting unit 42 determines that the detected temperature is increased at a speed which exceeds a predetermined speed, the voltage supply rate control unit 43 decreases a rate at which the voltage is applied to the heat source of the fixing unit. On the other hand, when the temperature variation detecting unit 42 determines that the detected temperature is increased at a speed which is less than a predetermined speed, the voltage supply rate control unit 43 increases the rate at which the voltage is applied to the heat source of the fixing unit 10. The rate at which the voltage is applied to the heat source is a rate of a time for which the voltage is actually applied to the heat source to one cycle at which the voltage applied to the heat source is turned on and off.

According to the above control of the voltage supply to the heat source of the fixing unit 10, in a case where the detected temperature is slowly increased, the rate at which the voltage is applied to the heat source is increased. Thus, the recording sheet is prevented from being curled (the reverse curl) due to a temperature which is too low. In addition, developer (toner) is prevented from being incompletely fixed on the recording sheet.

A description will now be given of embodiments of the present invention.

Figure 27:
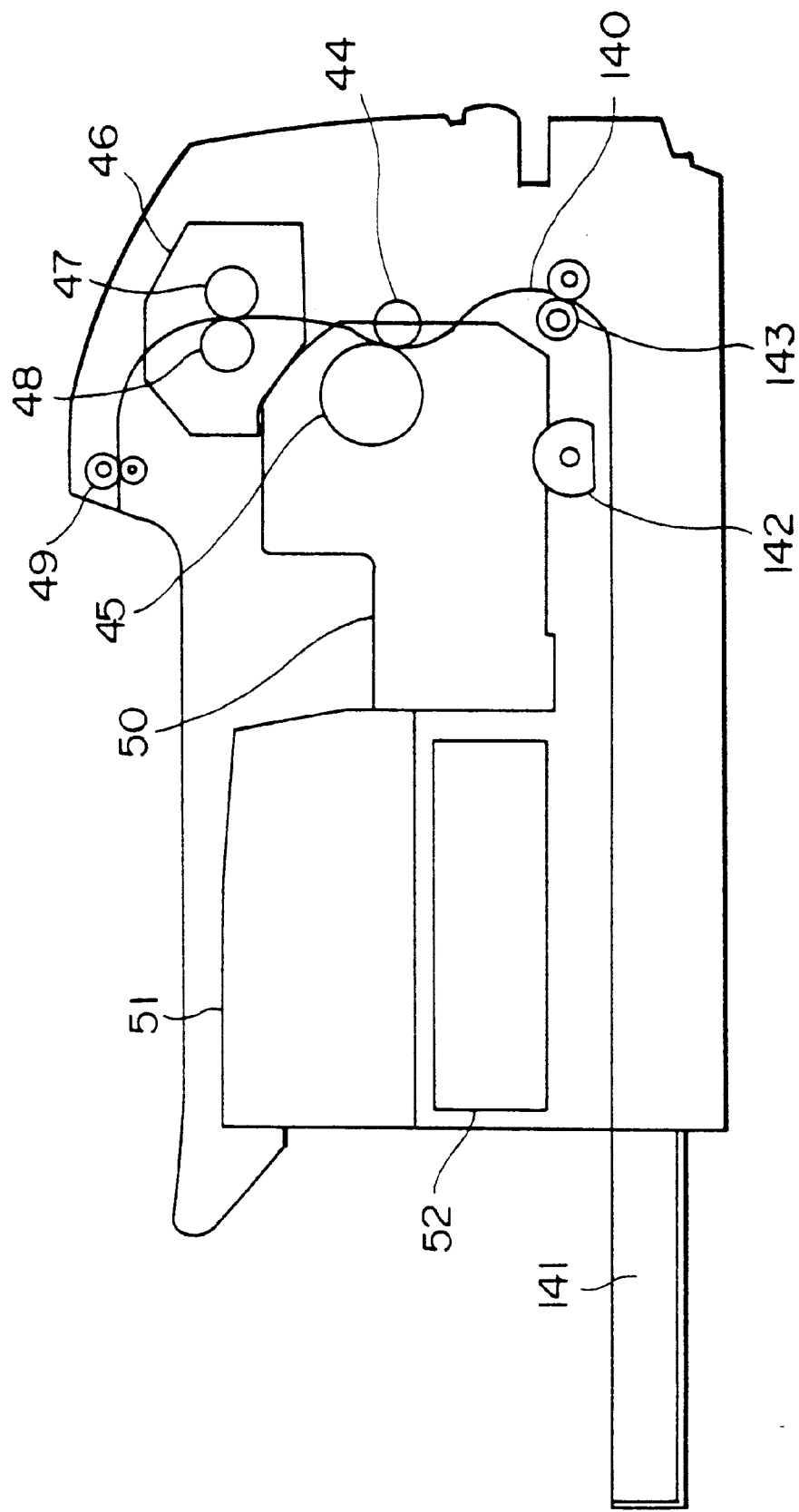
FIG. 27 is a diagram illustrating a printer according to an embodiment of the present invention.

FIG. 27 shows a printer according to an embodiment of the present invention. The printer prints images on a recording sheet in accordance with the electrophotographic process.

Referring to FIG. 27, the printer has a sheet cassette 141, a picking roller 142, a registering roller 143, a transfer roller 44, a photosensitive drum 45, a fixing unit 46, an ejecting roller 49, a process cartridge 50, an optical system 51 and a power supply unit 52. Recording sheets are housed in the sheet cassette 141. The picking roller 142 picks out recording sheets from the sheet cassette 141 one by one. The registering roller 143 registers each recording sheet fed by the piking roller 142 and feeds it toward the process cartridge 50. Toner images are formed on and retained by the photosensitive drum 45. The transfer roller 44 is used to transfer toner images formed on the photosensitive drum 45 to a recording sheet. The fixing unit 46 has a heat roller 48 and a pressure roller 47 and thermally fixes the toner image on the recording sheet. The ejecting roller 49 ejects the recording sheet on which the toner image is fixed. The process cartridge 50 includes the photosensitive drum 45 and the transfer roller 46 and performs the electrophotographic process so that a toner image is formed on a recording sheet. The optical system 51 projects a light beam which is modulated in accordance with image data on the photosensitive drum 45 so that an electrostatic latent image is formed on the photosensitive drum 45 (an exposure process is executed).

When a printing instruction is supplied to the printer, the optical system 51, the process cartridge 50 and the fixing unit 46 are activated. When predetermined preparations are made for the print operation, a recording sheet is picked out from the sheet cassette 141 by the picking roller 141. The recording sheet picked out from the sheet cassette 141 is fed through a path 140. That is, the recording sheet is fed to a transfer position between the photosensitive drum 45 and the transfer roller 44 and a toner image is transferred from the photosensitive drum 45 to the recording sheet. The recording sheet is then fed to the ejecting roller 49 via the fixing unit and is ejected from a housing of the printer.

FIG. 28 shows a structure of a printer engine 53. Referring to FIG. 28, the printer engine 53 has a mechanical system 54 and a mechanical system controller 55. The mechanical system 54 includes the fixing unit 46, a transfer system 73 for transferring a toner image from the photosensitive drum 45 to a recording sheet, the optical system 51 and a sheet feeding system 75 for feeding recording sheets.

The mechanical system controller 55 includes various sensors 57, an optical system control unit 58 for controlling the optical unit 51, a motor control unit 59 for controlling motors so that the photosensitive drum 45 and various rollers are rotated and a fixing temperature control unit 60 for controlling the temperature of the fixing unit 46.

The mechanical system controller 55 receives print control signals including a print instruction and video signals which are print data. The mechanical system controller 55 controls the mechanical system 54 based on the print control signals and the video signals so that preparations for the printing operation and the printing operation are repeatedly performed.

Figure 31:
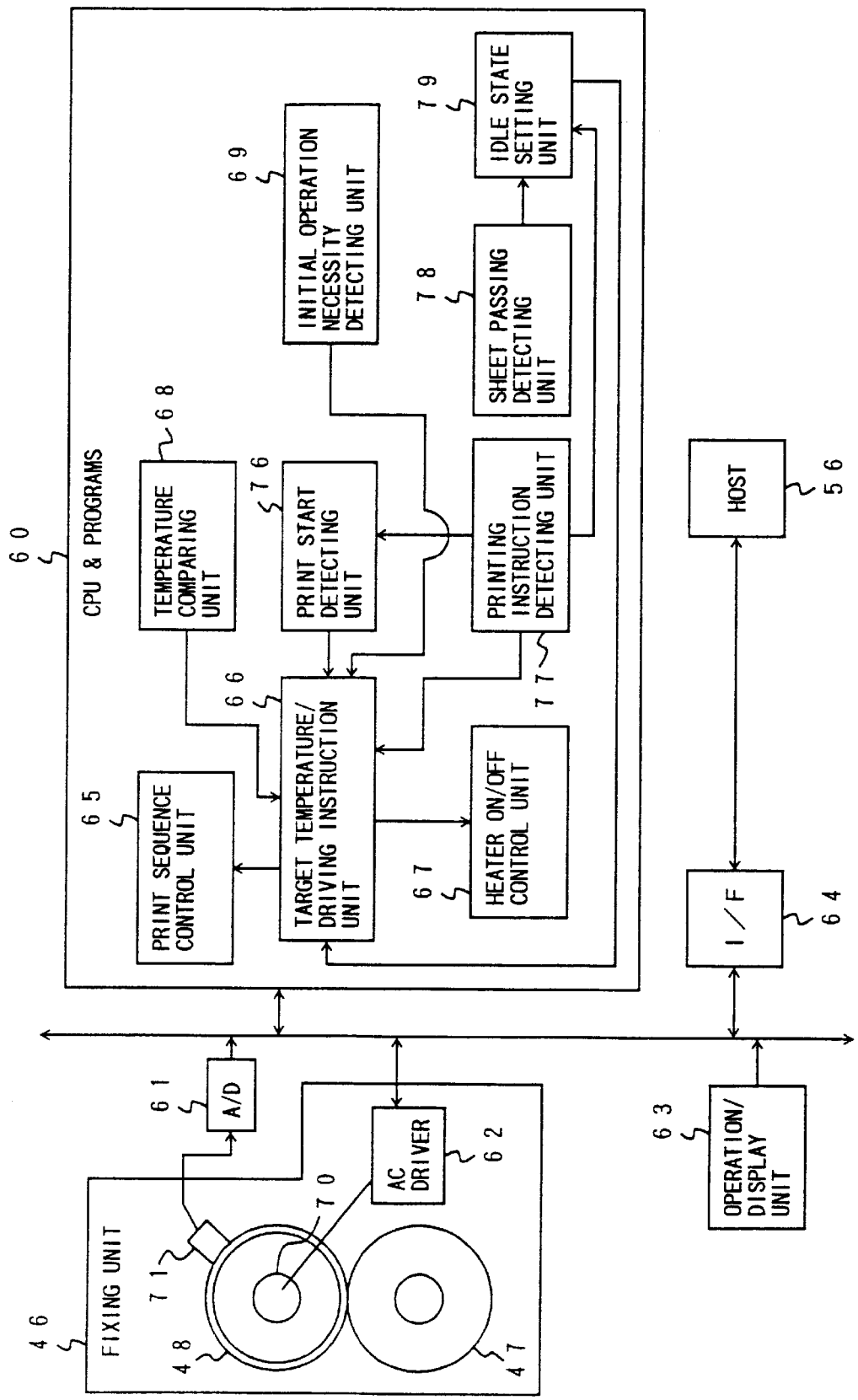
FIG. 31 is a block diagram illustrating a functional structure of a control system of the printer according to a first embodiment of the present invention.

FIG. 31 shows a functional structure of a control system of the printer according to a first embodiment of the present invention.

Referring to FIG. 31, the fixing unit 46 has the heat roller 48 in which a halogen lamp 70 is mounted, the pressure roller 47 pressing a recording sheet against the heat roller 48 and an AC driver 62 for driving the halogen lamp 70. The fixing unit 46 is provided with a temperature sensor 71 (e.g., a thermistor) for detecting the surface temperature of the heat roller 48. The control system includes a control unit 60 formed of a CPU and programs. The output signal of the temperature sensor 71 which is analog data is converted into digital data by an analog-to-digital converter 61. An operation/display unit 63 is used by a user to enter information and display information to be supplied to the user. An interface 64 controls connection of the control system to a host unit 65.

The heat roller 48 is a cylinder made of aluminum. The pressure roller 47 is made of rubber.

The control unit 60 (the CPU and the programs) includes, as functional units, a print sequence control unit 65, a temperature comparing unit 68, an initial operation necessity detecting unit 69, a target temperature/driving instruction unit 66, a heater on/off control unit 67, a print start detecting unit 76, a printing instruction detecting unit 77, a sheet passing detecting unit 78 and an idle state setting unit 79. The print sequence control unit 65 controls printing operations. The temperature comparing unit 68 compares a temperature detected by the temperature sensor 71 with a target temperature. The initial operation necessity detecting unit 66 determines whether or not the initial operation should be performed. Immediately after the power supply unit 52 is turned on, immediately after open/close operations of covers of the printer are performed to remove jammed papers and/or to change consumables under a condition in which the power supply 52 is in the on state and immediately after the printer receives a reset signal from the host unit 56, the initial operations should be performed. The target temperature/driving instruction unit 66 selects a target temperature based on instructions and a comparison result obtained by the temperature comparing unit 68. The target temperature/driving instruction unit 66 further outputs driving instructions. The heater on/off control unit 67 turns on and off an AC voltage supplied to the AC driver 62. The AC driver 62 drives the halogen lamp 70 which is a heat source of the heat roller 48 based on the AC voltage controlled by the heater on/off control unit 67. When a print instruction is received in the idle state after the initial operations are completed or after the print operation is completed, the print operation starts. The print start detecting unit 76 determines that the print operation should start. The printing instruction detecting unit 77 detects whether the printing instruction is received. The sheet passing detecting unit 78 detects whether a recording sheet has passed through the fixing unit 46. When the sheet passing detecting unit 78 detects that a recording sheet has passed through the fixing unit 46 in a case where the next printing instruction has not yet received during the printing operation, the idle setting unit 79 sets a target temperature in the idle state and supplies it to the target temperature/driving instruction unit 66.

A description will now be given, with reference to FIGS. 32 through 40, of temperature control of the fixing unit 46.

Figure 32:
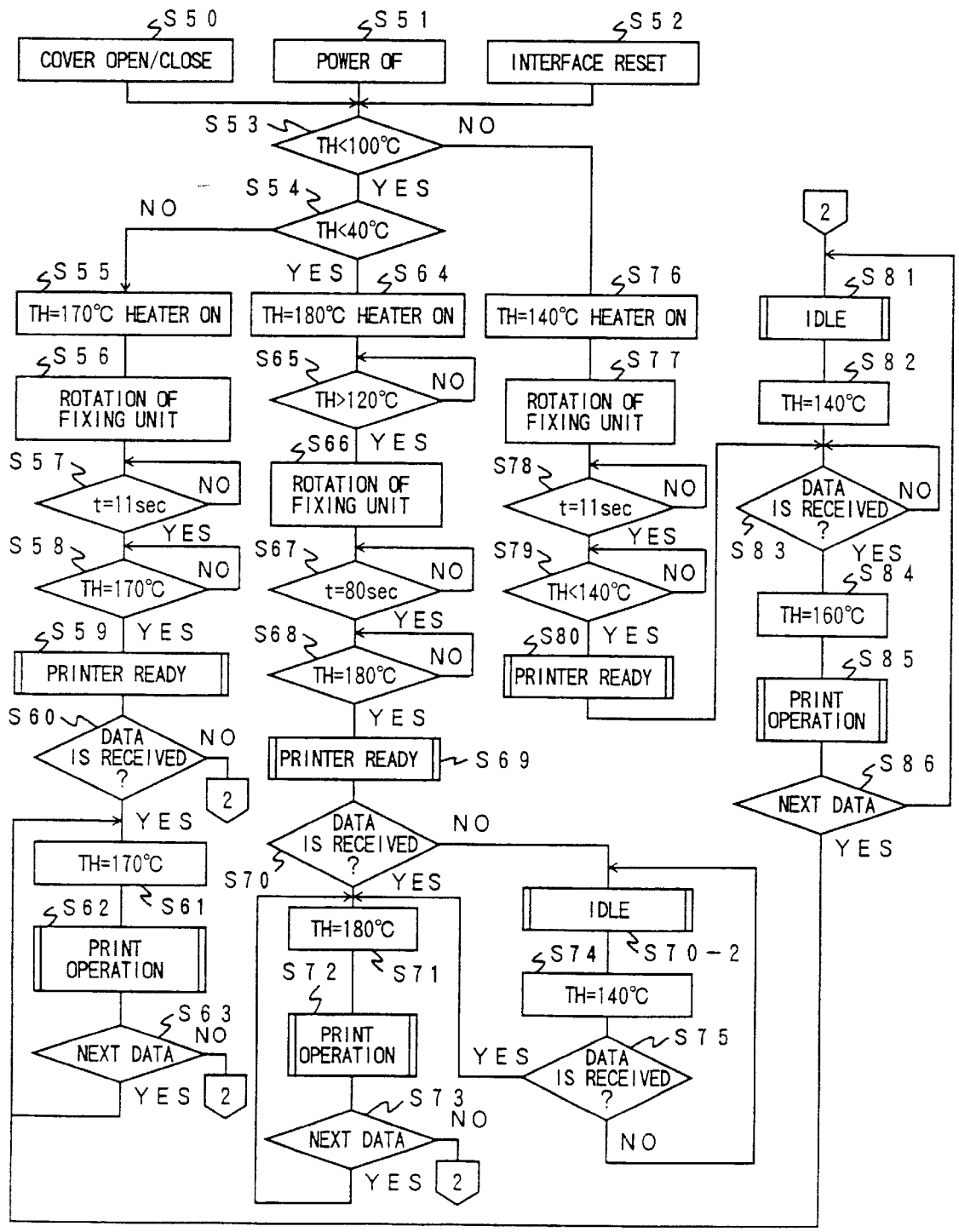
FIG. 32 is a flowchart illustrating a temperature control of the fixing unit in the printer.

FIG. 32 shows procedures of the temperature control. Referring to FIG. 32, the initial operation necessity detecting unit 69 detects, in step S50, that the open/close operation of the covers of the printer, detects, in step S51, that the power supply is turned on, or detects in step S52, that the reset signal is received from the host unit 56, such as a computer unit or a word-processing unit. After this, in step S53, the temperature comparing unit 68 compares the surface temperature of the heat roller 48 detected by the temperature sensor 71 with a reference temperature of 100° C. and determines whether or not the detected temperature is equal to or less than the reference temperature (100° C.). The reference temperature of 100° C. corresponds to the predetermined temperature 2 described above.

If the detected temperature is equal to or less than the reference temperature (100° C.), the temperature comparing unit 68 compares the surface temperature of the heat roller 48 with a reference temperature of 40° C., in step S54. The reference temperature of 40° C. corresponds to the predetermined temperature 1 described above. When it is determined, in step S54, that the surface temperature of the heat roller 48 is equal to or greater than the reference temperature of 48° C., the process proceeds to step S55.

In step S55, the target temperature/driving instruction unit 66 sets, as the target temperature, the temperature B (e.g., 170° C.) which should be set in the continuous print operation. The halogen lamp 71 is then driven by the target temperature/driving instruction unit 66.

In step S56, to warm up the pressure roller 47 made of rubber, the heat roller 48 is rotated. Due to the rotation of the heat roller 48, the pressure roller is rotated.

After the heat roller 48 is rotated for 11 seconds (step S57), the heater on/of control unit 67 controls the AC driver 62 so that the AC voltage applied to the halogen lamp 70 is repeatedly turned on and off. As a result, the surface temperature of the heat roller 48 reaches the target temperature of 170° C.

When it is determined, in step S58, that the surface temperature of the heat roller 48 reaches the target temperature of 170° C., the control system of the printer outputs a print ready signal in step S59.

The temperature control manner in accordance with steps S55 through S59 described above is shown in FIG. 33B (2). After a time of about 40 seconds elapses from when the power supply is turned on (a time at which the initial operation should be performed), the print ready signal is output from the control system.

Returning to FIG. 32, when it is determined, in step S60, that the printing instruction and print data is received before the initial operations are completed, the process proceeds to step S61. On the other hand, it is determined, in step S60, that there is no printing instruction, the process proceeds to step S81.

Figure 34:
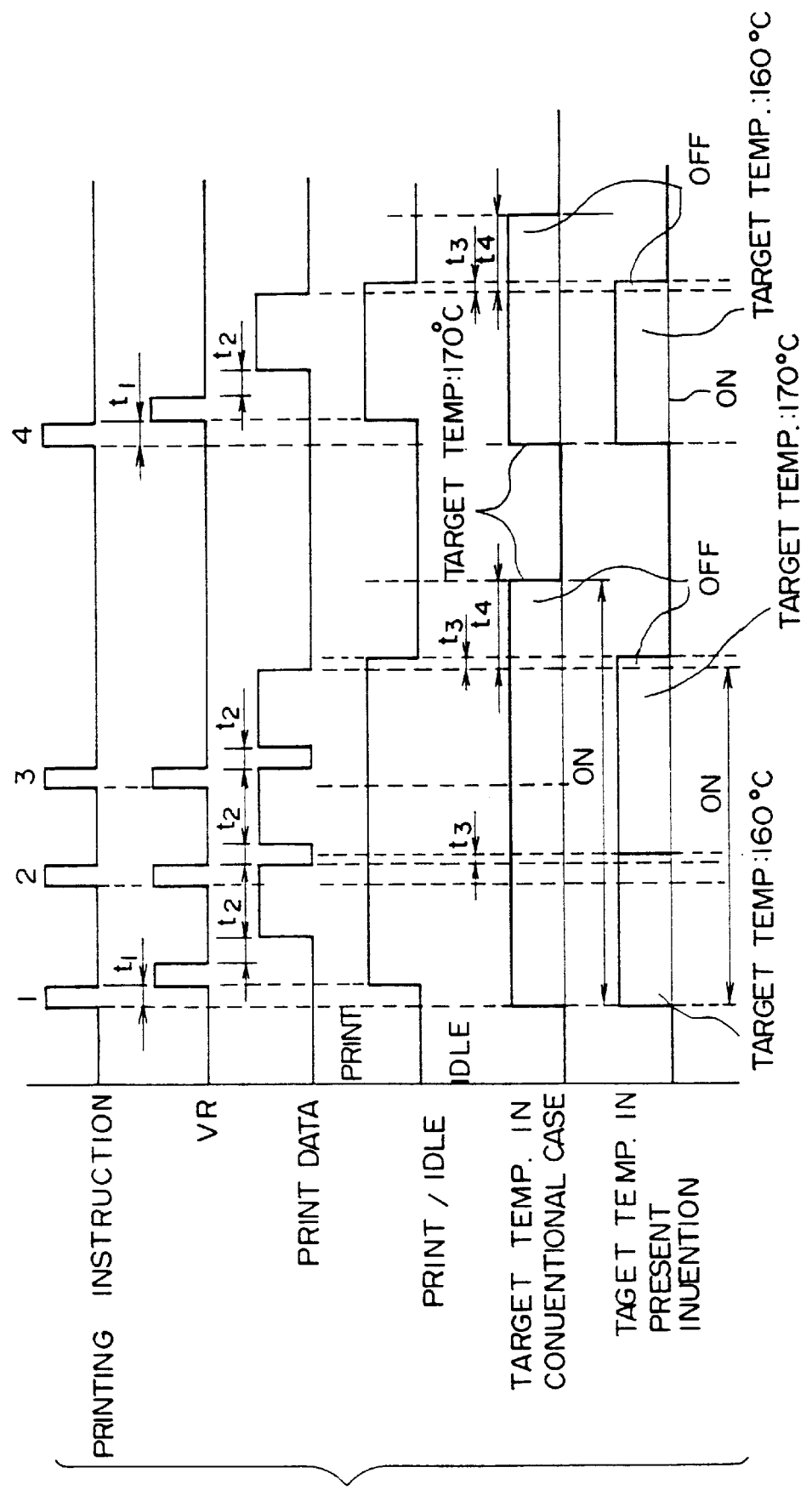
FIG. 34 is a timing chart illustrating the temperature control of the fixing unit in the printer according to the embodiment of the present invention.

The printing instruction and the print data are received at times in the timing chart shown in FIG. 34. after a time $t_1$ elapses from when the first print instruction is received, the control system of the printer returns the VR (Video Synchronized request) signal to the host unit 56 in response to the printing instruction. In addition, after a time $t_2$ elapses from when the VR signal is supplied to the host unit 56, the print data is output from the host unit 56. The print operation starts to be executed in synchronism with rising of the VR signal.

Returning to FIG. 32, when the printing instruction detecting unit determines, in step S60, that the printing instruction is received, a state where the target temperature of 170° C. is set is maintained, in step S61. The print sequence control unit 65 executes the print operation in step S62.

When it is then determined, in step S63, that the next printing instruction is received during the print operation, the process returns to step S61. The printing operation is the executed in the state where the temperature (170° C.) to be set in the continuous print operation is set as the target temperature.

On the other hand, the temperature comparing unit 68 determines, in step S54, that the surface temperature of the heat roller 48 is equal to or less than the reference temperature of 40° C. (the predetermined temperature 1), the target temperature/driving instruction unit 66 sets a temperature of 180° C. as the target temperature, in step S64. The heater on/off control unit 67 then controls the AC driver 62 so that the halogen lamp 70 is turned on.

The temperature of 180° C. corresponds to the temperature A which is to be set in the continuous print operation and is higher than the temperature B, as described above.

When the temperature comparing unit 68 determined, in step S65, that the temperature of the fixing unit 46 is equal to or higher than a reference temperature of 120° C., the process proceeds to step S66. In step S66, the heat roller 48 of the fixing unit 46 is rotated. The reference temperature of 120° C. corresponds to the temperature C described above.

In this case, after the surface temperature of the heat roller 48 reaches 120° C., the heat roller 48 starts to be rotated. Thus, the pressure roller 47 can be effectively warmed up by the heat roller 48.

If it is determined, in step S67, that the heat roller 48 is rotated for 80 seconds, it is determined whether or not the surface temperature of the heat roller 48 has reached the target temperature of 180° C. When the surface temperature of the heat roller 48 has reached the target temperature of 180° C., the control system of the printer outputs the print ready signal, in step S69.

Figure 33A:
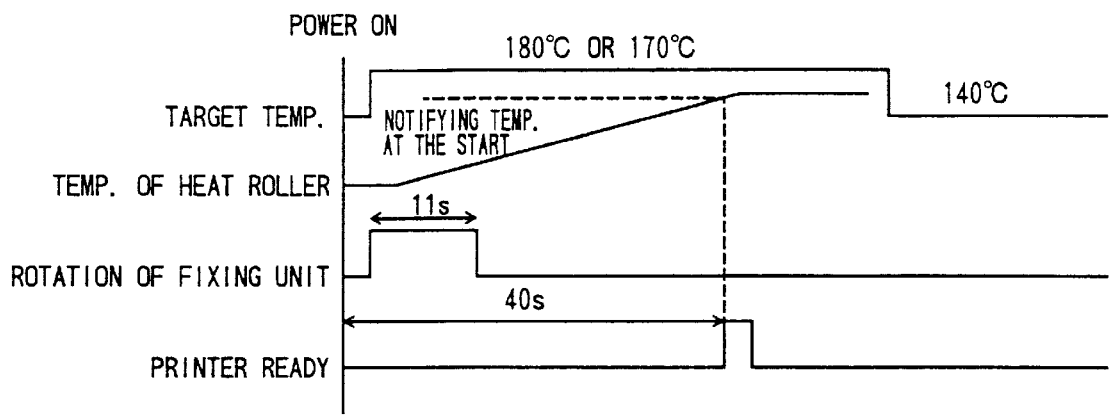
FIG. 33A is a diagram illustrating the conventional temperature control in a case where the fixing unit starts to be warmed up.
Figure 33B:
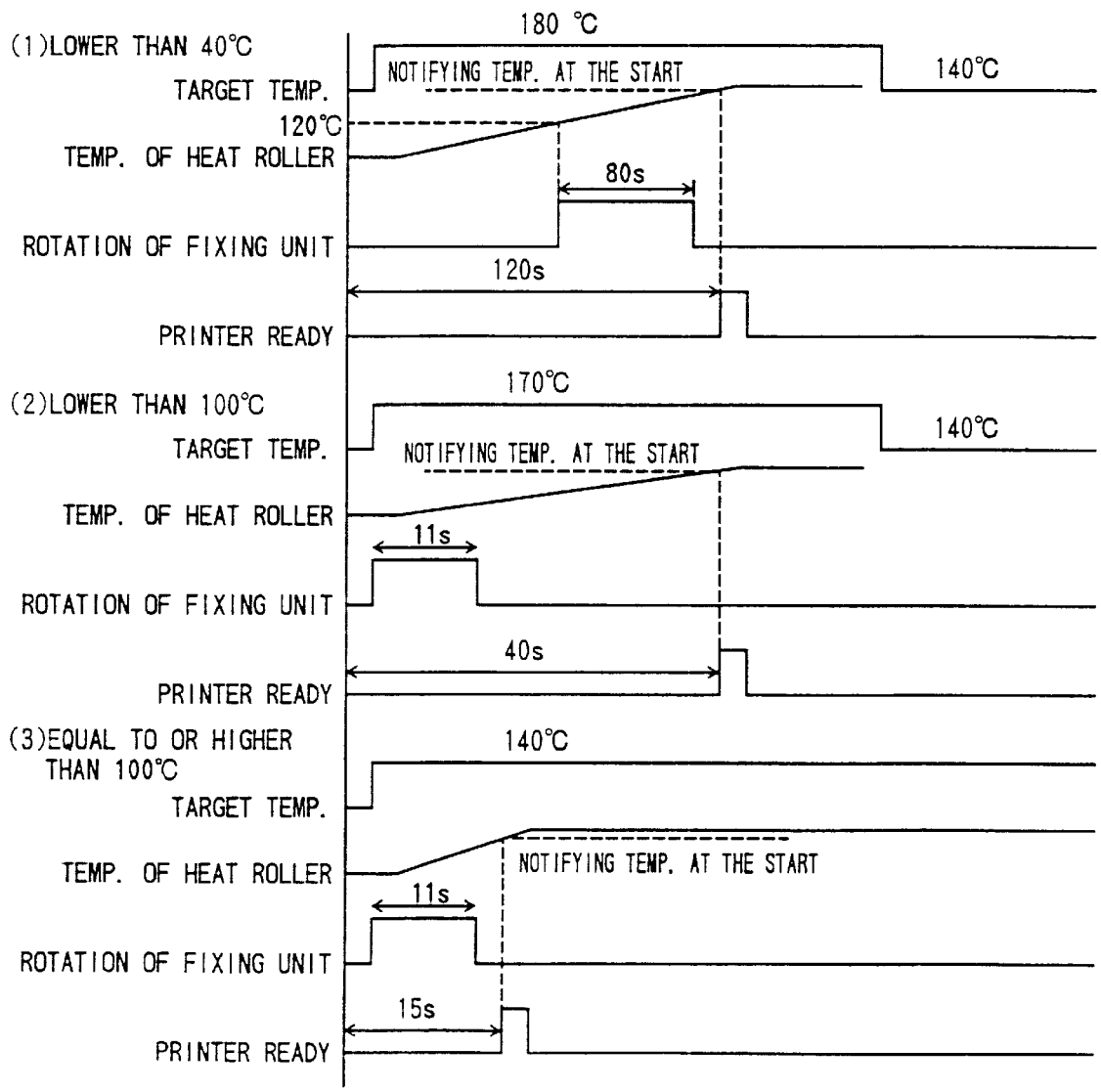
FIG. 33B is a diagram illustrating the temperature control of the fixing unit of the printer according to the embodiment of the present invention in a case where the fixing unit starts to be warmed up.

The temperature control manner in accordance with steps S65 through S69 is shown in FIG. 33B (1). That is, the procedure from turning on the power supply to outputting of the print ready signal takes about 120 seconds.

Returning to FIG. 32, when it is determined, in step S70, that the printing instruction and the print data are received from the host unit 56 before the initial operation is completed, the process proceeds to step S71. In step S71, the temperature 180° C. is set as the target temperature is maintained, and the print operation is performed in step S72.

On the other hand, when it is determined, in step S70, that the printing instruction is not received before the initial operation is completed, the process proceeds to steps 70-2 and 74. As a result, after the initial operation is completed, a temperature of 140° C. is set as the target temperature so that the printer is in the idle state.

After this, if the printing instruction and the print data are received in step S75, the process returns to step S71. In step S71, the target temperature is changed from 140° C. to 180° C. higher than the temperature which should be set in the continuous print operation.

In addition, it is determined, in step 73, that the next printing instruction and the print data are received during the printing operation is being performed, the process returns to step S71. In step S72, the temperature of 180° C. is set as the target temperature.

In this case, since the surface temperature is low (equal to or less than 40° C.), the temperature of 180° C. which is higher than the temperatures (170° C. and 160° C.) to be set in the printing operation is set as the target temperature. As a result, the pressure roller 47 can be sufficiently warmed up by the heat roller 48. Thus, the recording sheet is prevent from being curled (the reverse curl).

On the other hand, it is determined, in step S53, that the surface temperature of the heat roller 48 is equal to or greater than 100° C., the process proceeds to step S76. In step S76, the target temperature/driving instruction unit 66 sets, as the target temperature, a temperature of 140° C. which should be set in the idle state. The heater on/off control unit 67 then controls the AC driver 62 so that the halogen lamp 70 is turned on.

In step S77, the heat roller 48 of the fixing unit 46 is rotated so that the pressure roller 47 is warmed up.

When it is determined, in step S78, that the heat roller 48 has been rotated for 11 seconds, and when it is determined, in step S79, that the surface temperature of the heat roller 48 reaches the target temperature (140° C.), the control system of the printer outputs the print ready signal.

The temperature control manner in accordance with steps S76 through S80 is shown in FIG. 33B (3). In this case, the procedure from turning on the power supply to outputting of the print ready signal takes about 15 seconds.

The printing instruction detecting unit 77 may detects, in step S60, that the printing instruction is not received before the initial operation is completed. Further, the printing instruction detecting unit 77 may detects, in steps S63 and S73, that the next printing instruction is not detected during the print operation. In these cases, when the sheet detecting unit 78 detects that the recording sheet has passed through the fixing unit 46, the process proceeds to step S81. In step S81, the idle setting unit 79 sets the printer in the idle state.

As shown in FIG. 34, in a conventional case, after $t_4$ seconds elapses from a time at which the print data completely transmitted, the printer is set in the idle state. In the present embodiment of the present invention, after $t_3$ seconds elapses from a time at which the print data completely transmitted, the printer is set in the idle state. In the idle state, the target temperature is changed to a temperature of 140° C. which should be set in the standby state (the idle state) and the halogen lamp 70 (the heat source) is turned off.

That is, a period from a time at which the VR signal is output after the printing instruction is received to a time at which $t_3$ elapses from completion of receiving of the print data is defined as a print operation period.

In step S82, the target temperature/driving instruction unit 66 sets the temperature of 140° C. as the target temperature.

After the printer outputs the print ready signal in step S80, or after the temperature of 140° C. is set as the target temperature in step S82, it is determined, in step S83, whether the printing instruction and the print data are received. When the printing instruction and the print data are received, the print start detecting unit 76 detects that the print operation starts.

After this, the target temperature/driving instruction unit 66 sets a temperature of 160° C. as the target temperature in step S84. The maximum value of the overshot temperature of the heat roller 48 which is heated based on the target temperature set at 160° C. may be about 170° C. which should be set in the continuous print operation.

In step S85, the print operation starts.

Figure 35:
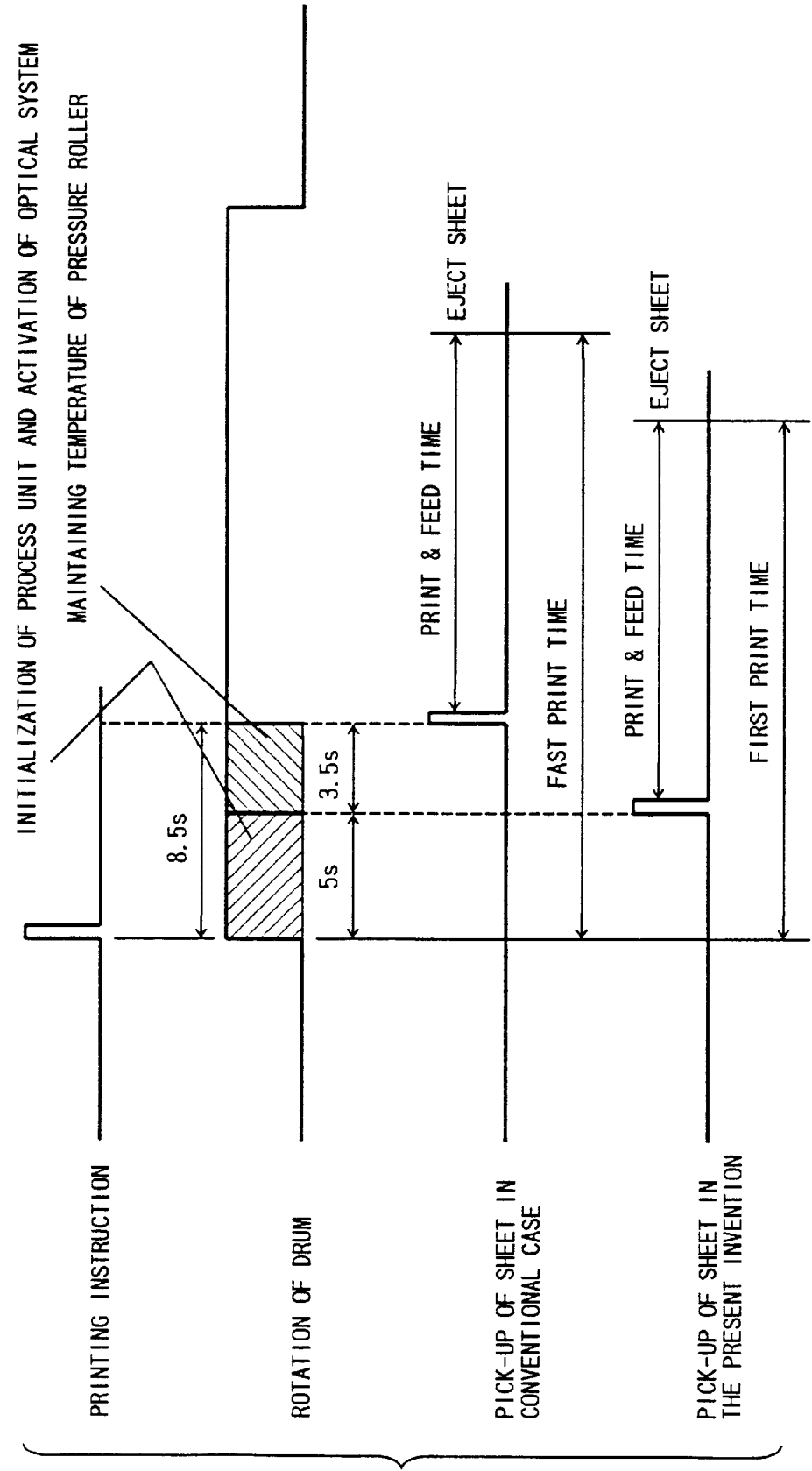
FIG. 35 is a timing chart illustrating a procedure of a start-up operation of the printer according to the first embodiment of the present invention.

The printing operation at the start is shown in FIG. 35. Referring to FIG. 35, when the printing instruction is received in the idle state, the photosensitive drum 45 and the heat roller 48 of the fixing unit 46 start to be rotated.

At the start of the print operation, the rotation of the photosensitive drum 45 and the heat roller 48 is continued for about 8.5 seconds (not 11 seconds). In first about 5 seconds out of 8.5 seconds, the process unit 50 is initialized and the optical system is activated. In second about 3.5 seconds out of 8.5 seconds, the pressure roller 47 is warmed up to a predetermined temperature.

In the conventional case, after 8.5 seconds elapses from receiving of the printing instruction, a recording sheet is picked out from the sheet cassette. On the other hand, in this embodiment of the present invention, immediately after the process unit 50 is initialized and the optical system is activated (about 5 seconds), a recording sheet is picked out from the sheet cassette. Thus, in this embodiment, the first print time is shorter than that in the conventional case.

In the embodiment of the present invention, in the initial operation, the pressure roller is sufficiently warmed up in accordance with, for example, steps S64 through S75. Thus, at the start of the print operation, a time for the idle rotation of the heat roller 48 to warm up the pressure roller 47 can be decreased.

When the printing instruction detecting unit 77 detects, in step S86, that the next printing instruction is received during the printing operation, the control system determines that the continuous print operation is required. As a result, the process proceeds to step S61. The target temperature is thus set at 170° C., and the steps after step S61 are successively executed.

On the other hand, when it is determined, in step S86, that the next printing instruction is not received during the printing operation, the process exceeds to step S81 and the printer is maintained in the idle state.

The temperature control manner in accordance with steps S78 through S80 is shown in FIG. 33B (3).

As has been described above, in the case where the print data is received during the initial operation, the target temperature (e.g., 170° C. or 180° C.) set for the initial operation is maintained in the continuous print operation. As a result, the toner image can be fixed on the recording sheet at a high fixing factor.

A description will now be given of experiment results in the case of the printer according to the above embodiment of the present invention.

Figure 36A:
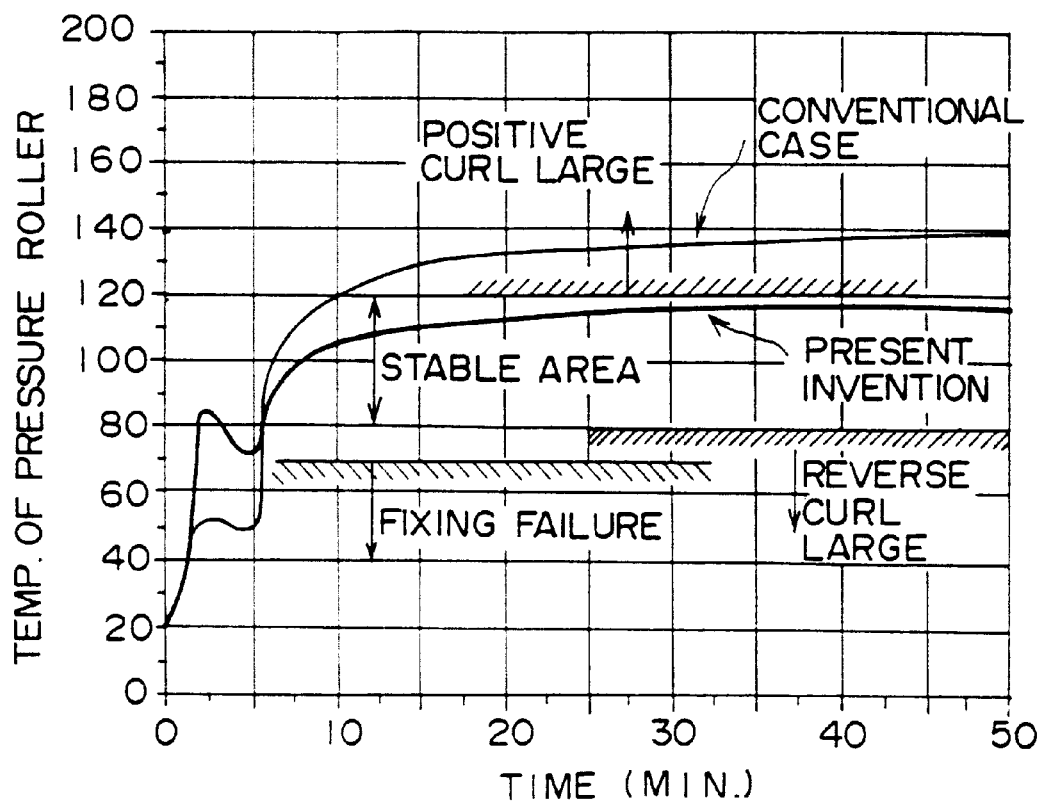
FIG. 36A is a diagram illustrating relationships between the temperature of a pressure roller and fixing ability.
Figure 36B:
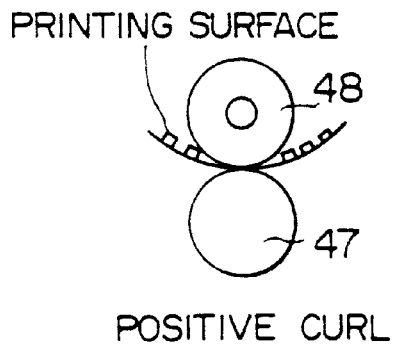
FIG. 36B is a diagram illustrating occurrence of the positive curl of the recording sheet.
Figure 36C:
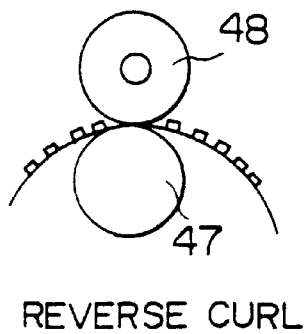
FIG. 36C is a diagram illustrating occurrence of the reverse curl of the recording sheet.

FIG. 36A shows relationships between the temperature of the pressure roller 47 and fixing ability, and FIGS. 36B and 36C show states in which recording sheets are curled (the positive curl and the reverse curl).

Referring to FIG. 36A, when 5 minutes elapsed from turning on the power supply, the printing operation started. Recording sheets having A4 size passed through the fixing unit 46 at intervals of 30 seconds. Each recording sheet was led to the fixing unit 46 from a longitudinal edge thereof. Under the above conditions, the temperature of the pressure roller 47 varied as shown in FIG. 36A.

In FIG. 36A, a thin line indicates temperature variation in the conventional case and a thick line indicates temperature variation in the case of the embodiment of the present invention.

The fixing error (1), a large amount of reverse curl of the recording sheet (2) and a large amount of positive curl of the recording sheet (3) occur based on the temperature of the pressure roller 47. In a case where the pressure roller 47 has a low temperature immediately after the power supply is turned on, the fixing error (1) and the large amount of reverse curl of the recording sheet (2) may occur. In a case where the pressure roller 47 has a high temperature in the printing operation which is repeatedly performed, the large amount of positive curl of the recording sheet may occur. Thus, to avoid these problems, it is necessary to control the temperature of the pressure roller 47 in a stable region shown in FIG. 36A in a period in which the printing operation starts and is repeatedly performed.

In the conventional case, at the start of the printing operation, the pressure roller is not sufficiently warmed up. In the first and second print operations, the heat roller 48 is rotated for a long time so that the pressure roller 47 is rapidly warmed up. However, the pressure roller 47 can not be warmed up at a temperature sufficient to avoid the reverse curl of the recording sheet. As a result, the quality of the recording sheet may deteriorate and the recording sheet may be jammed in the printing operation.

Further, while the printing operation is repeatedly performed, the temperature of the pressure roller 48 is increased. Thus, the large amount of positive curl of the recording sheet may occur.

In the embodiment of the present invention, the pressure roller is sufficiently warmed up in the initial operation. Although the temperature of the pressure roller 47 is slightly decreased until the print operation starts, at the start of the print operation, the pressure roller 47 is warmed up for a short time. As a result, the amount of reverse curl of the recording sheet can be decreased.

Figure 1:
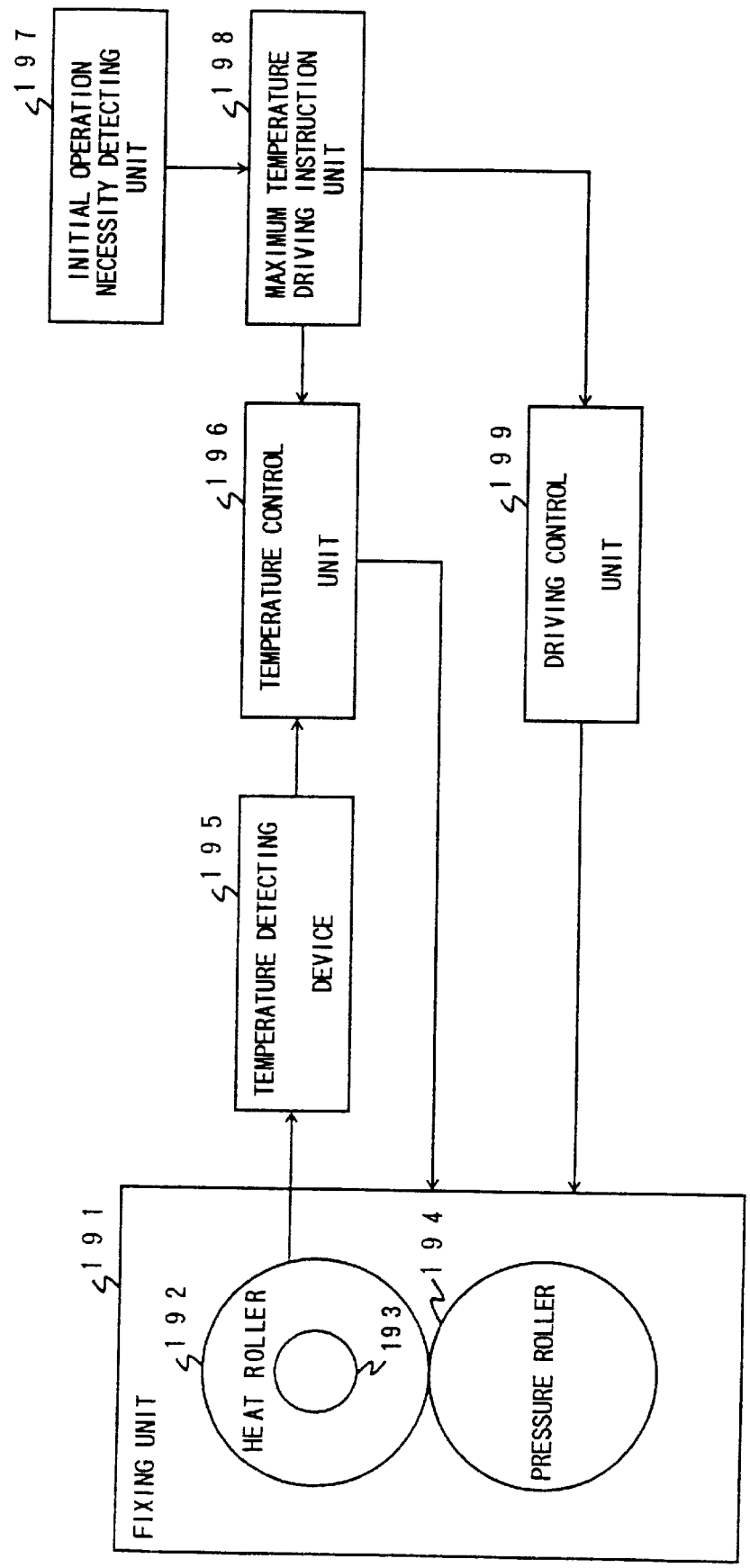
FIG. 1 is a block diagram illustrating a first example of a conventional image forming apparatus.
Figure 2:
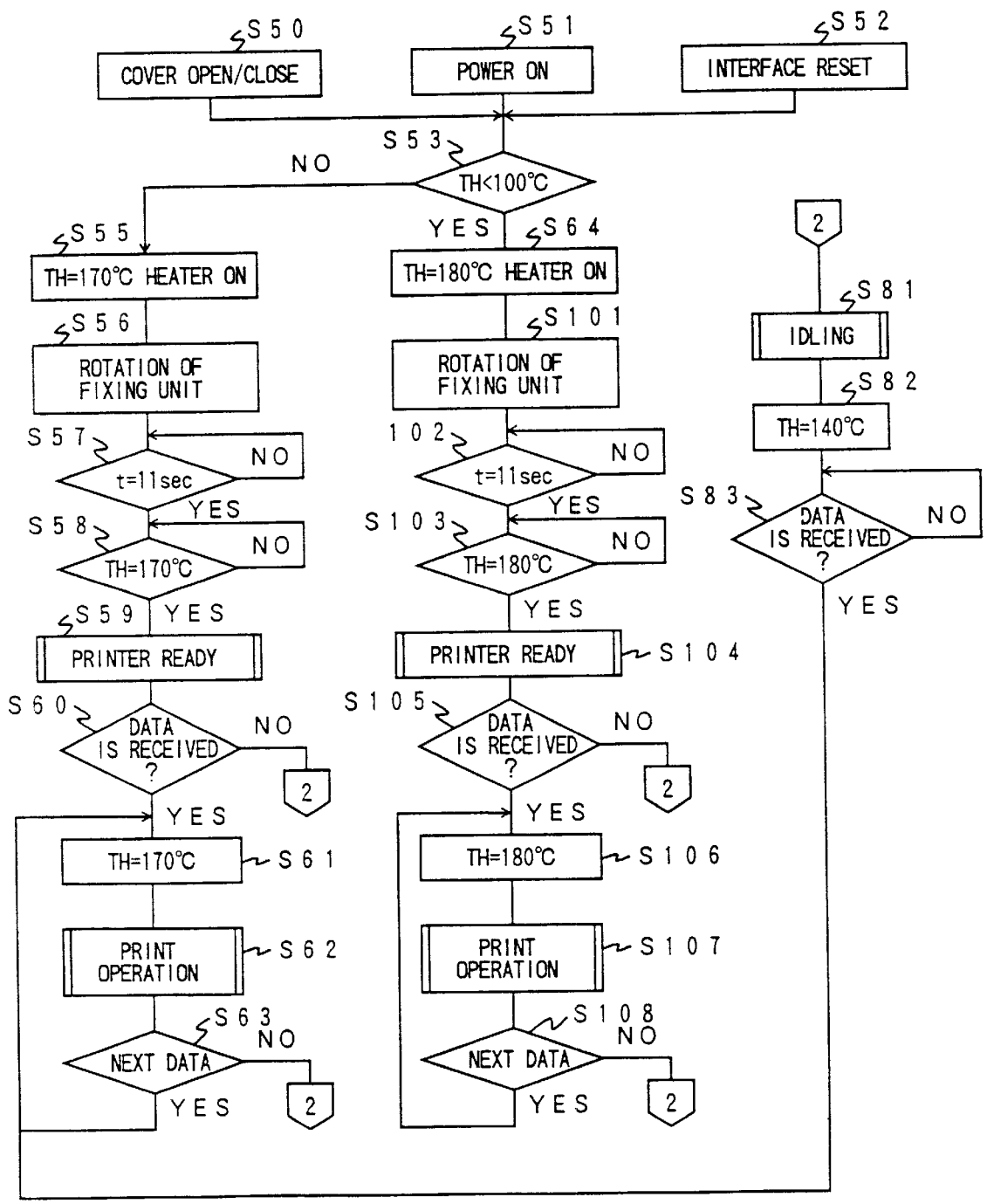
FIG. 2 is a flow chart illustrating a conventional control process for controlling a temperature of a fixing unit of the image forming apparatus.
Figure 3:
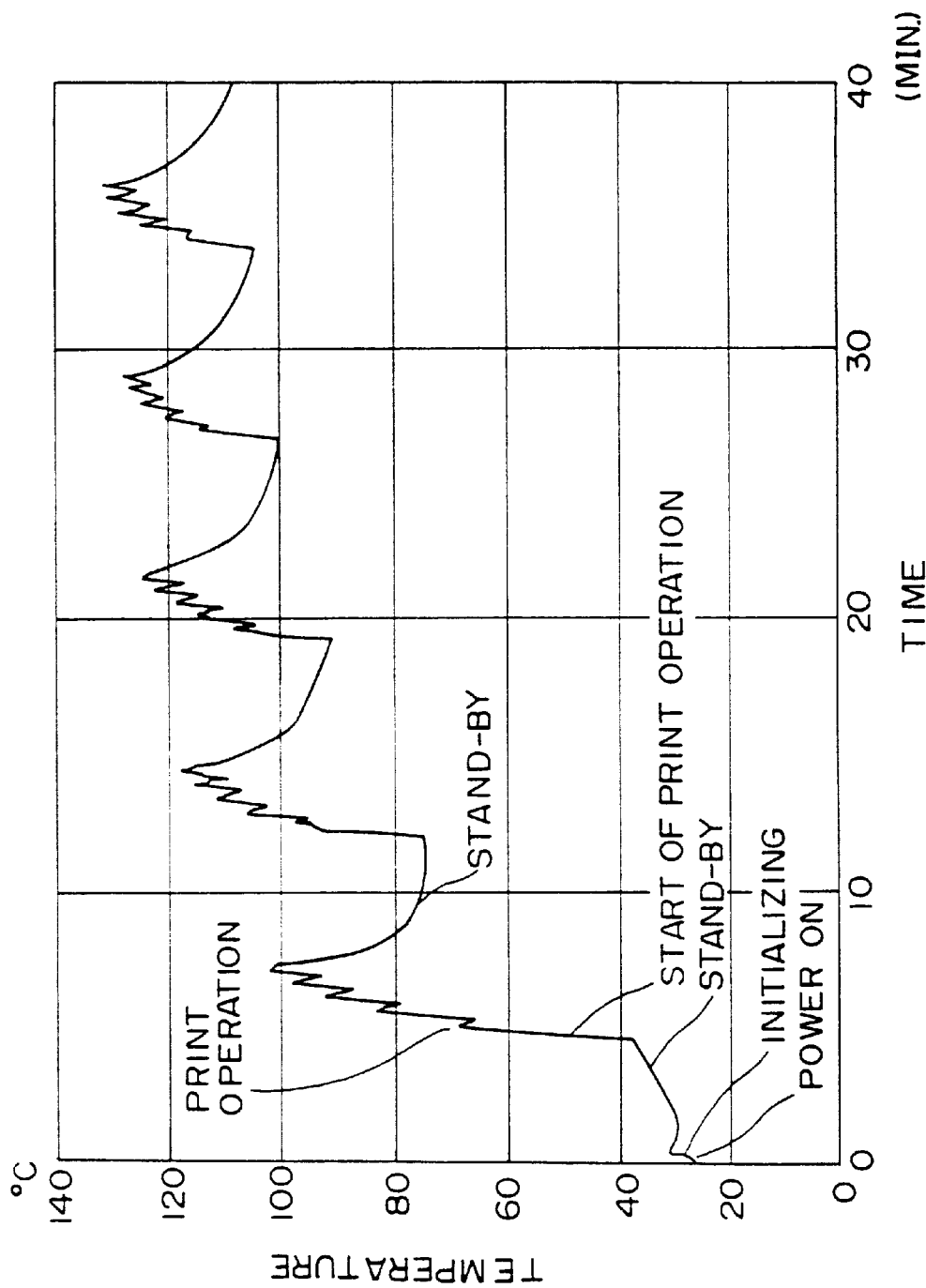
FIG. 3 is a diagram illustrating a temperature transition of a pressure roller of the fixing unit.
Figure 4:
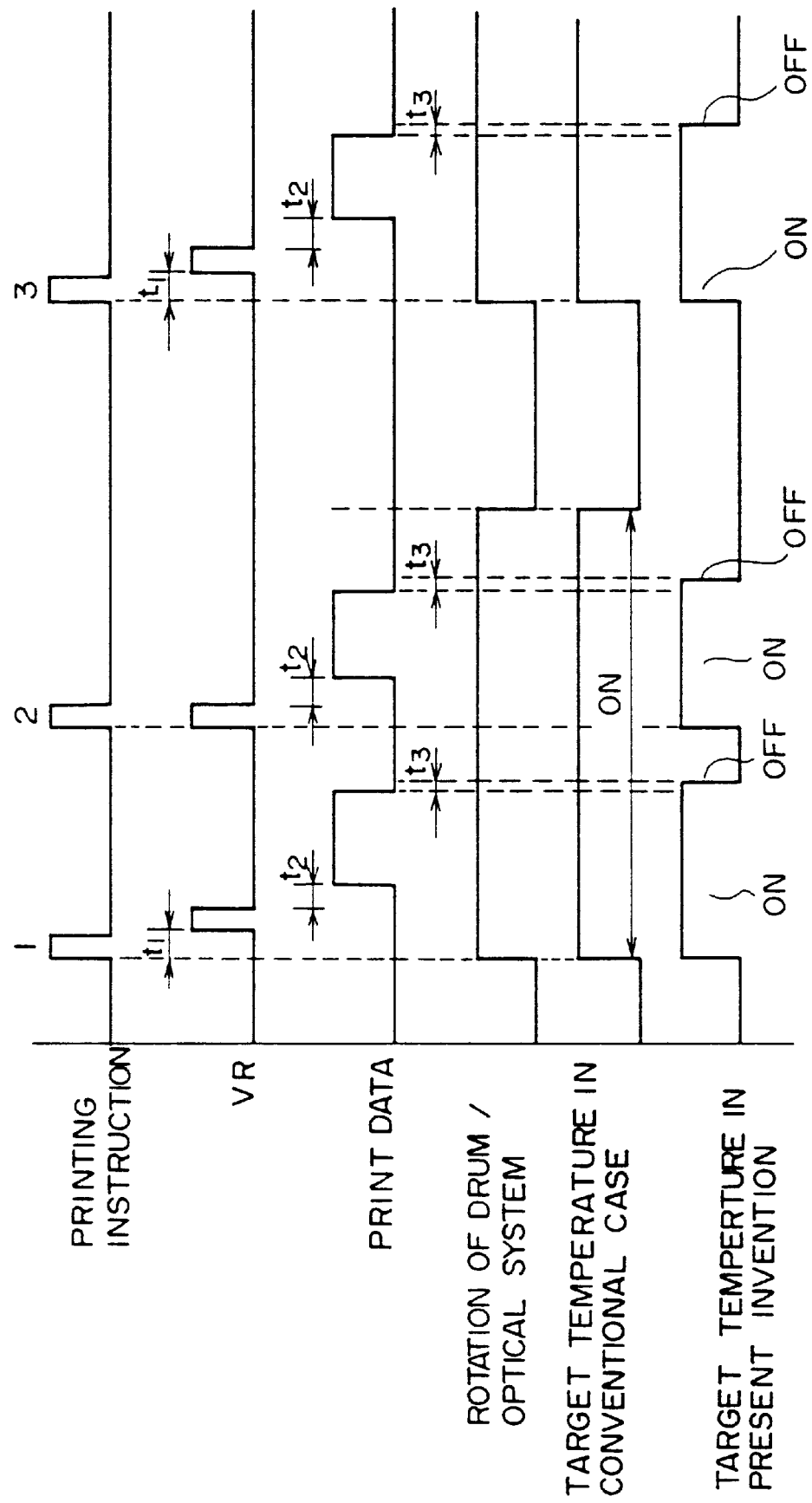
FIG. 4 is a timing chart illustrating on-and-off control of the fixing unit.
Figure 5:
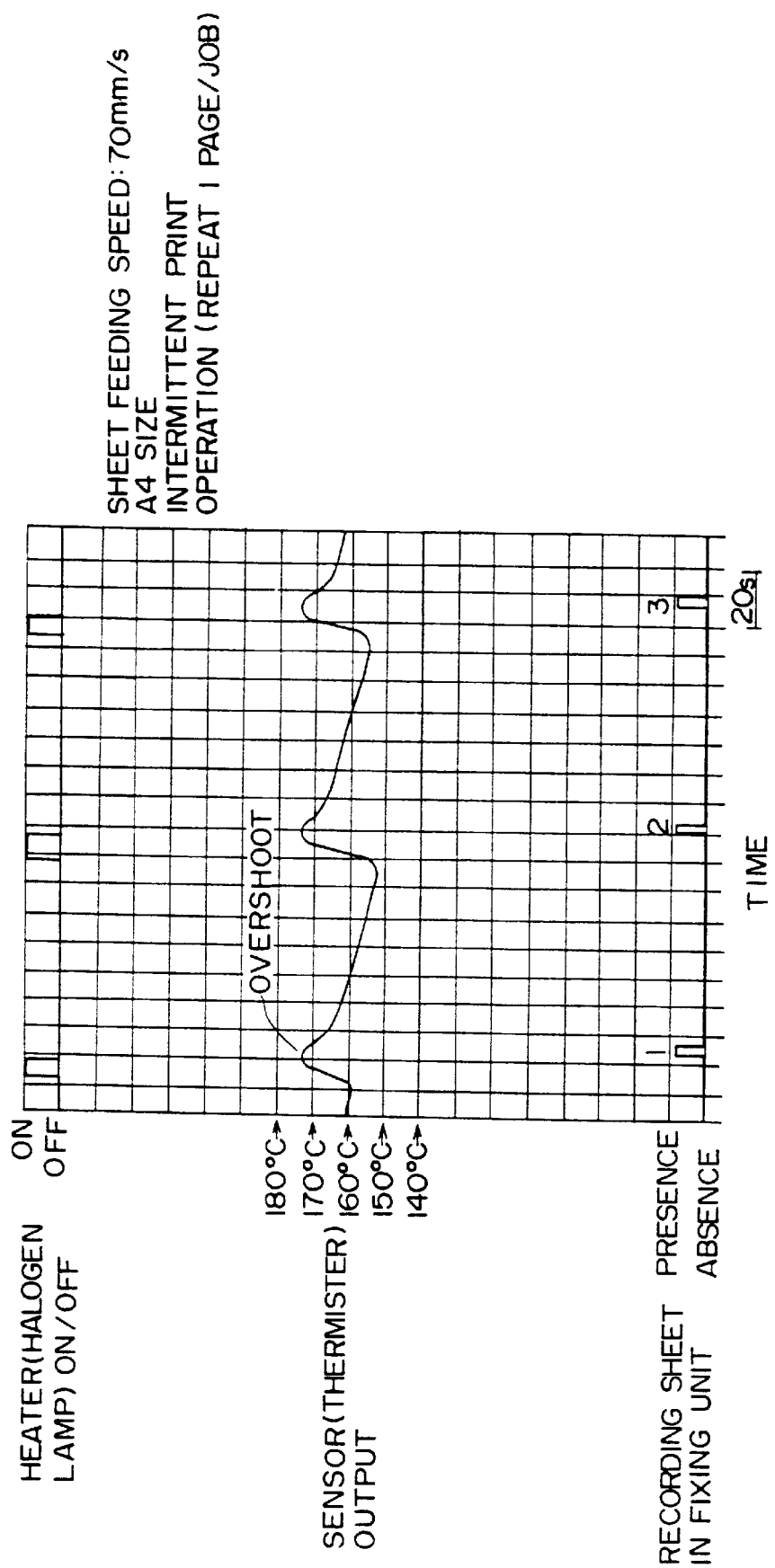
FIG. 5 is a diagram illustrating a conventional temperature control of the fixing unit in printing operations which are intermittently performed (a first case)
Figure 6:
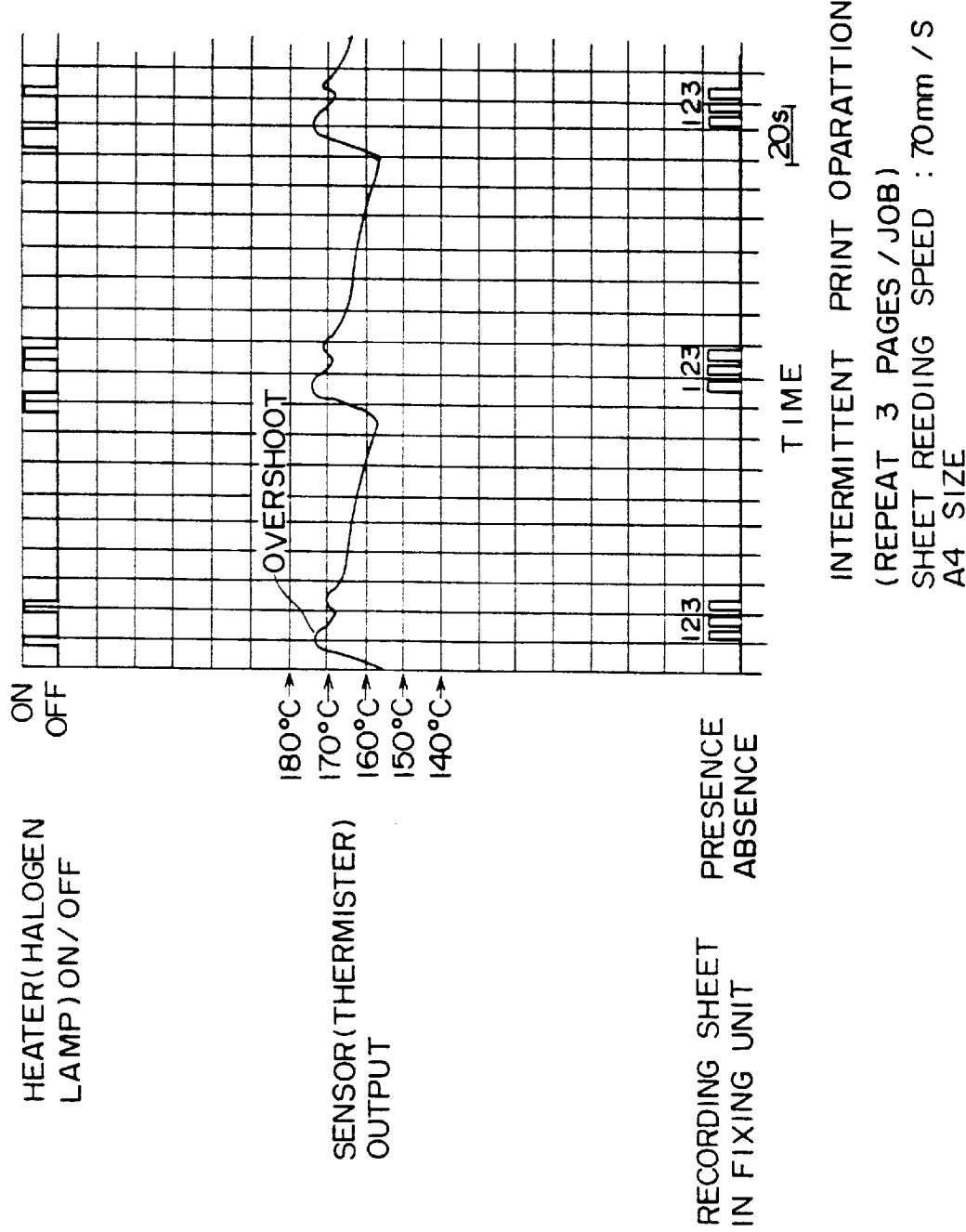
FIG. 6 is a diagram illustrating the conventional temperature control of the fixing unit in printing operations which are intermittently performed (a second case)
Figure 8A:
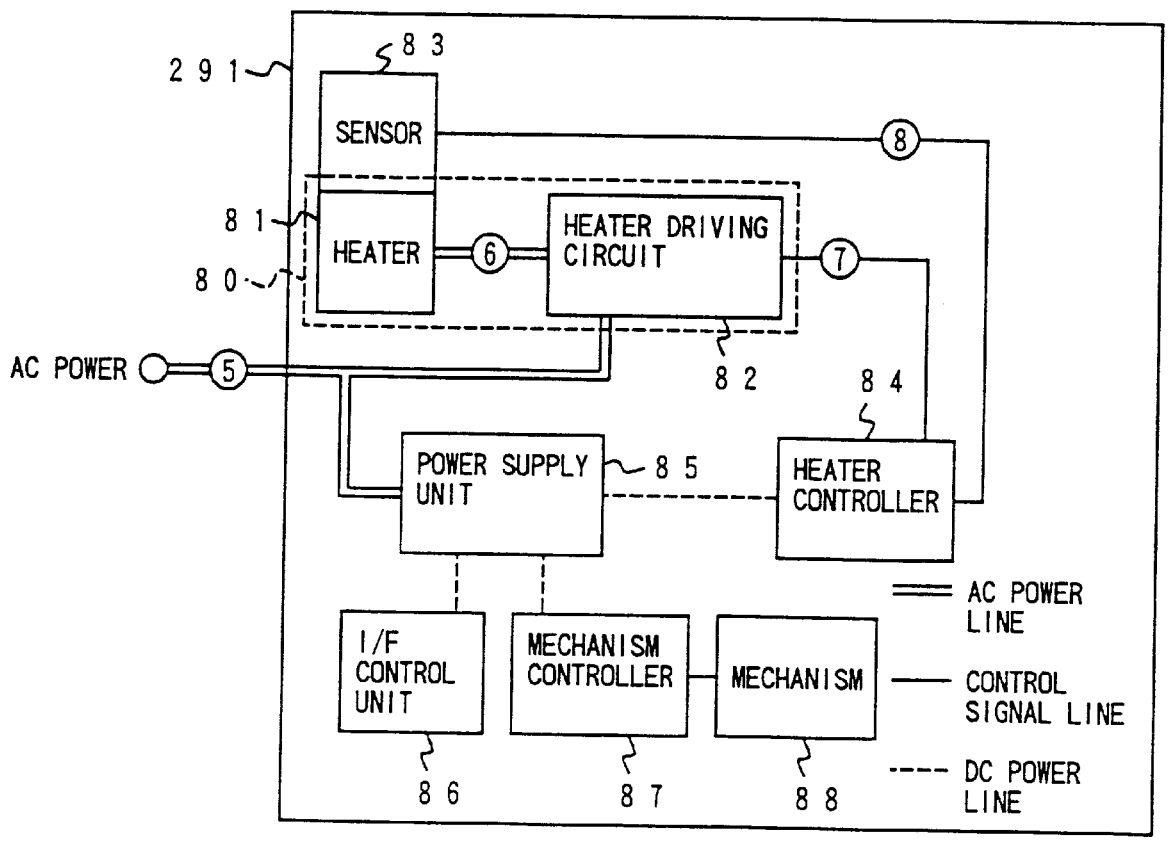
FIG. 8A is a block diagram illustrating a second example of the conventional image forming apparatus.
Figure 8B:
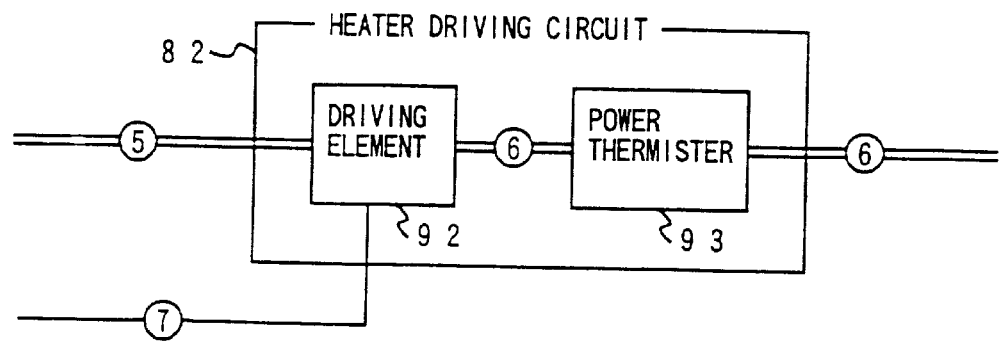
FIG. 8B is a block diagram illustrating a heater driving circuit included in the image forming apparatus shown in FIG. 8A.

Variations of the temperature detected by the temperature sensor 71 (the surface temperature of the heat roller 46) in the case of the embodiment of the present invention are shown in FIGS. 38, 39 and 40. Corresponding variations of the detected temperature in the conventional case are shown in FIGS. 5, 6 and 7.

In the cases of the embodiment of the present invention, a low temperature is selected as the target temperature at the start of the print operation. Thus, the overshoot of the temperature is suppressed. As a result, the large amount of positive curl of the recording sheet is prevented from occurring.

According to the above embodiment of the invention, the following effects can be obtained.

In the initial operation, if the surface temperature of the heat roller 48 is low, a relatively high temperature is set as the target temperature so that the heat roller 48 is sufficiently heated. In the initial operation, on the other hand, if the surface temperature of the heat roller 48 is high, a relatively low temperature is set as the target temperature so that the heat roller 48 is not excessively heated.

Further, in the case where the surface temperature of the heat roller 48 is low, after the surface temperature of the heat roller 48 reaches a predetermined temperature, the heat roller 48 starts to be rotated (see steps 65 and 66 in FIG. 32). That is, after the heat roller 48 is sufficiently heated, the heat roller is rotated 48, so that the pressure roller 47 is effectively warmed up. In the case where the surface temperature of the heat roller 48 is higher than a predetermined temperature, a relatively low temperature is set as the target temperature and the heat roller 48 immediately starts to be rotated. After the heat roller 48 is rotated for a predetermined time, the initial operation is completed.

In the case where the next printing instruction is not received during the print operation, when the recording sheet has passed through the fixing unit 46, the target temperature for the fixing unit 41 is changed to a relatively low temperature. As a result, the pressure roller 47 is not excessively warmed up.

At the start of the print operation, the temperature lower than the temperature which should be set in the continuous print operation is set as the target temperature. Even if the temperature of the heat roller 48 is overshot, the maximum temperature is less than that in the conventional case. As a result, the amount of positive curl of the recording sheet can be reduced.

In this case, the target temperature is set so that the overshot temperature is in a range suitable for the heat roller 48 in the continuous print operation. As a result, the toner image can be fixed on the recording sheet with the optimum fixing factor.

For example, as shown in FIG. 33B (1), (2) and (3), an initial operation type is selected from a plurality of initial operation types based on the detected temperature of the fixing unit 46. In one type of the initial operation, a relatively high temperature is set as the target temperature and the heat roller is rotated for a long time. In another type of the initial operation, a relative low temperature is set as the target temperature and the heat roller is rotated for a short time. As a result, the initial operation is prevented from excessively continuing.

In addition, since the initial operation does not excessively continue, a time for which the photosensitive drum is idled is reduced. Further, it is not necessary to rotate the pressure roller 48 with the photosensitive drum every time the print operation starts. The life time of the photosensitive drum can be improved and the fast print time can be reduced.

A description will now be given, with reference to FIGS. 41A through 43.

Figure 41A:
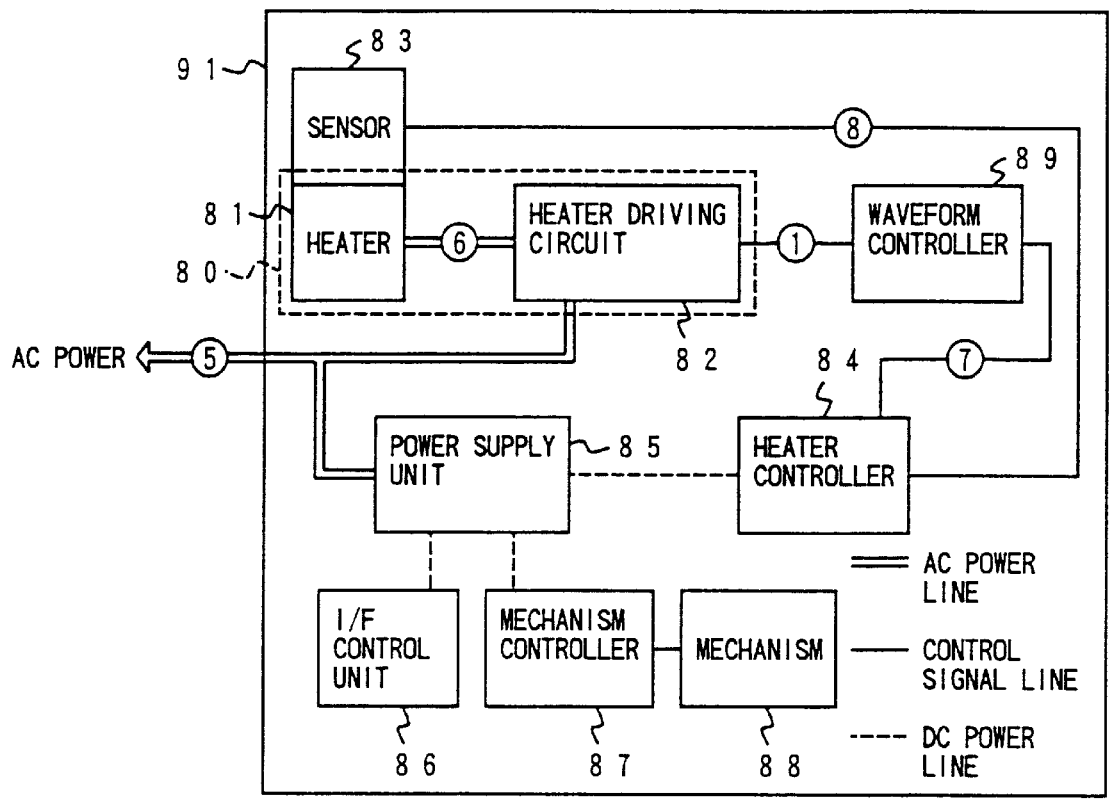
FIG. 41A is a block diagram illustrating a printer according to a second embodiment of the present invention.

A printer 91 according to the second embodiment is shown in FIG. 41A. Referring to FIG. 41A, the printer 91 has a fixing unit 80, a temperature sensor 83, a heater controller 84, a waveform controller 89. The printer 91 further has a power supply unit 85, an IF controller 86, a mechanism controller 87.

The fixing unit 80 has a heater 81 (the heat source) and a heater driving circuit 82. The temperature sensor 83 detects the temperature of the fixing unit 80. The heater controller 84 performs an on-and-off control of an AC voltage used to drive the heater 81, based on the detected temperature, so that the detected temperature controlled at the target temperature. In the on-and-off control, an on-period in which the AC voltage is to be applied to the heater 81 and an off-period in which the AC voltage is not applied to the heater 81 are determined by the heater controller 84. In the on-period, the waveform controller 84 supplies to the heater driving circuit 82 a control signal to repeatedly turn on and off the AC voltage applied to the heater 81 at an on-and-off cycle less than a minimum value in a range which can be perceived by people. The power supply unit 85 supplies the AC voltage to the heater 81 via the heater driving circuit 82 and supplies a DC voltage to the IF controller 86, the mechanism controller 87 and the heater controller 84.

Figure 41B:
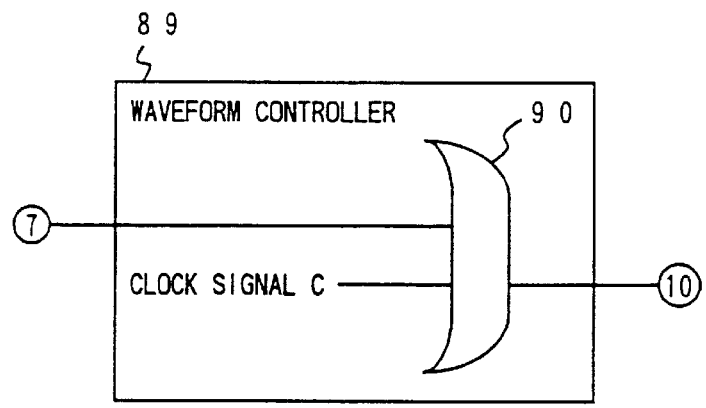
FIG. 41B is a block diagram illustrating a structure of a waveform control unit included in the printer shown in FIG. 41A.
Figure 41C:
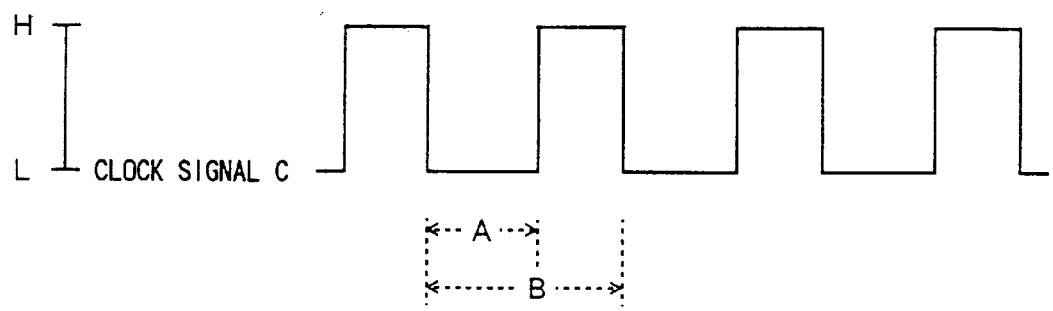
FIG. 41C is a waveform diagram illustrating a clock signal C supplied to the waveform control unit shown in FIG. 41B.

The waveform controller 89 is formed, for example, of an OR gate 90, as shown in FIG. 41B. The OR gate 90 outputs a logical sum signal of the control signal ⑦ from the heater controller 84 and a clock signal C as shown in FIG. 41C.

The minimum cycle in the range which can be perceived by people is about 40 milliseconds. An on-and-off cycle in a range which cannot be perceived by people is less than 40 milliseconds.

Figure 42:
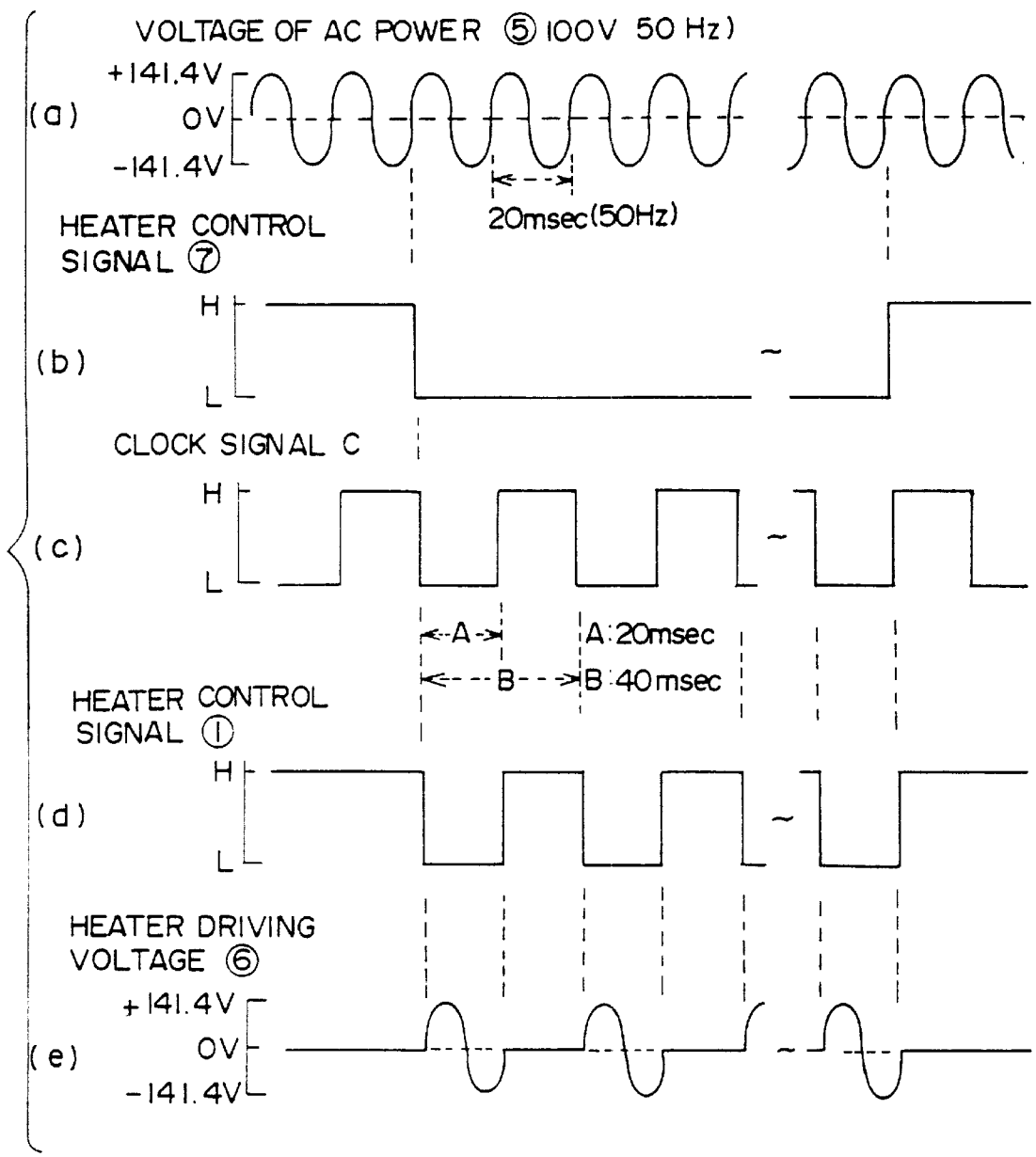
FIG. 42 is a waveform diagram illustrating examples of heater control signals, the clock signals and the AC voltage supplied to the heater of the fixing unit.

The waveform of the AC voltage output from the power supply unit 85 is shown in FIG. 42 (a). The on-and-off cycle of the AC voltage is 20 milliseconds which is not perceived by people. The waveform of the control signal ⑦ from the heater controller 84 is shown in FIG. 42 (b). A period in which the control signal has a high level (H) corresponds to the off-period described above. A period in which the control signal has a low level (L) corresponds to the on-period described above. The clock signal C has, as shown in FIG. 42 (c), a cycle (B) of 40 milliseconds and a low period (A) of 20 milliseconds. Thus, the output signal ① (the logical sum of the control signal ⑦ and the clock signal C) of the waveform controller 89 has the waveform as shown in FIG. 42 (d). The heater driving circuit 82 generates a driving voltage, as shown in FIG. 42 (e), based on the output signal ① of the waveform controller 86 and the AC voltage supplied from the power supply unit 85. The driving voltage is applied to the heater 81. In the on-period N of the driving voltage, an AC voltage is repeatedly turned on and off for one cycle. The AC voltage may be in the on state for a half cycle and in the off state for one cycle alternately. The on-and-off cycle at which the AC voltage is repeatedly turned on and off in the on-period is equal to or less than 40 milliseconds.

The printer according to the second embodiment of the present invention operates as follows.

When the temperature detected by the temperature sensor 83 is less than the minimum target temperature, the heater controller 84 supplies to the waveform controller 89 the control signal having the low level which represents the on-period. When the temperature detected by the temperature sensor 83 is equal to or greater than the maximum target temperature, the heater controller 84 outputs the control signal having the high level which represents the off-period.

The waveform controller 89 outputs to the heater driving circuit 82 the logical sum signal of the control signal ⑦ and the clock signal C. When the signal ① output from the waveform controller 89 has the low level (L), the AC voltage is supplied to the heater 81 as the driving voltage ⑥. On the other hand, when the signal ① output from the waveform controller 89 has the high level (H), the AC voltage is not supplied to the heater 81.

The low-period (A) and the cycle (B) of the clock signal C are variable. In FIG. 42, the low-peirod (A) of the clock signal C is set at 20 milliseconds and the cycle (B) of the clock signal C is set at 40 milliseconds (see FIG. 42 (c)). According to the clock signal C, the AC voltage applied to the heater 81 is repeatedly turned on and off for one cycle.

Figure 43:
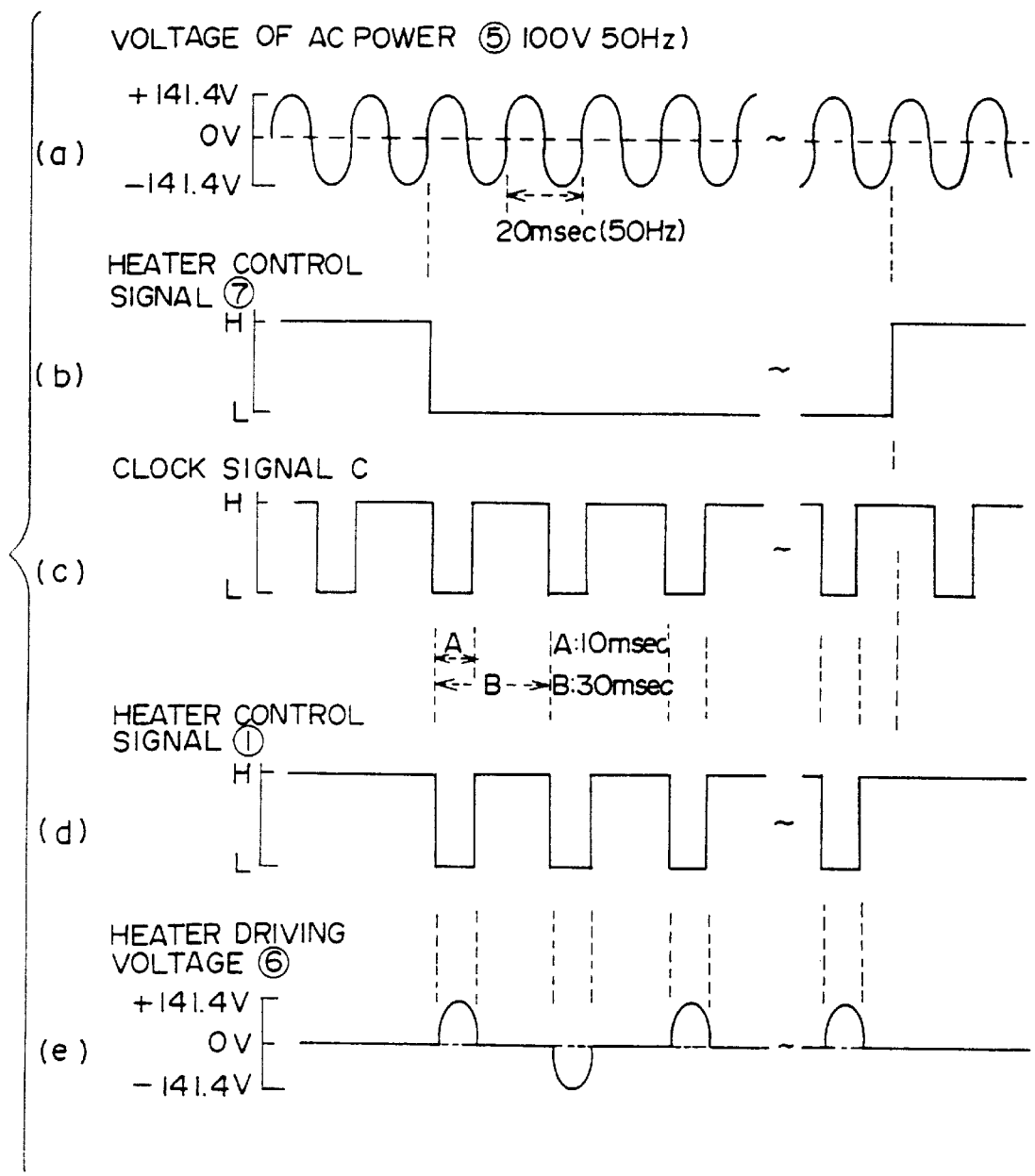
FIG. 43 is a waveform diagram illustrating other examples of the heater control signals, the clock signal and the AC voltage supplied to the heater of the fixing unit.

In FIG. 43, the low-period (A) of the clock signal C is set at 10 milliseconds, and the cycle (B) of the clock signal C is set at 30 milliseconds. As a result, the AC voltage is in the on state for the half cycle and in the off state for one cycle alternately.

In the second embodiment, the heater 81 is not applied with the AC voltage at a rate (a duty-cycle) of 100%. Since the rate at which the AC voltage is actually applied to the heater 81 is less than 100%, the difference between amounts of current which pass through the heater 81 in the on-period (N) and the off-period (F) can be reduced.

In the example shown in FIG. 42, the rate at which the AC voltage is actually applied to the heater 81 is 50%. In the example shown in FIG. 43, the rate at which the AC voltage is actually applied to the heater 81 is 33.3%. In both the cases, the on-and-off cycle at which the AC voltages is repeatedly turned on and off is less than 40 milliseconds. Thus, the standard regarding the voltage variation of the power supply can be satisfied.

Figure 44:
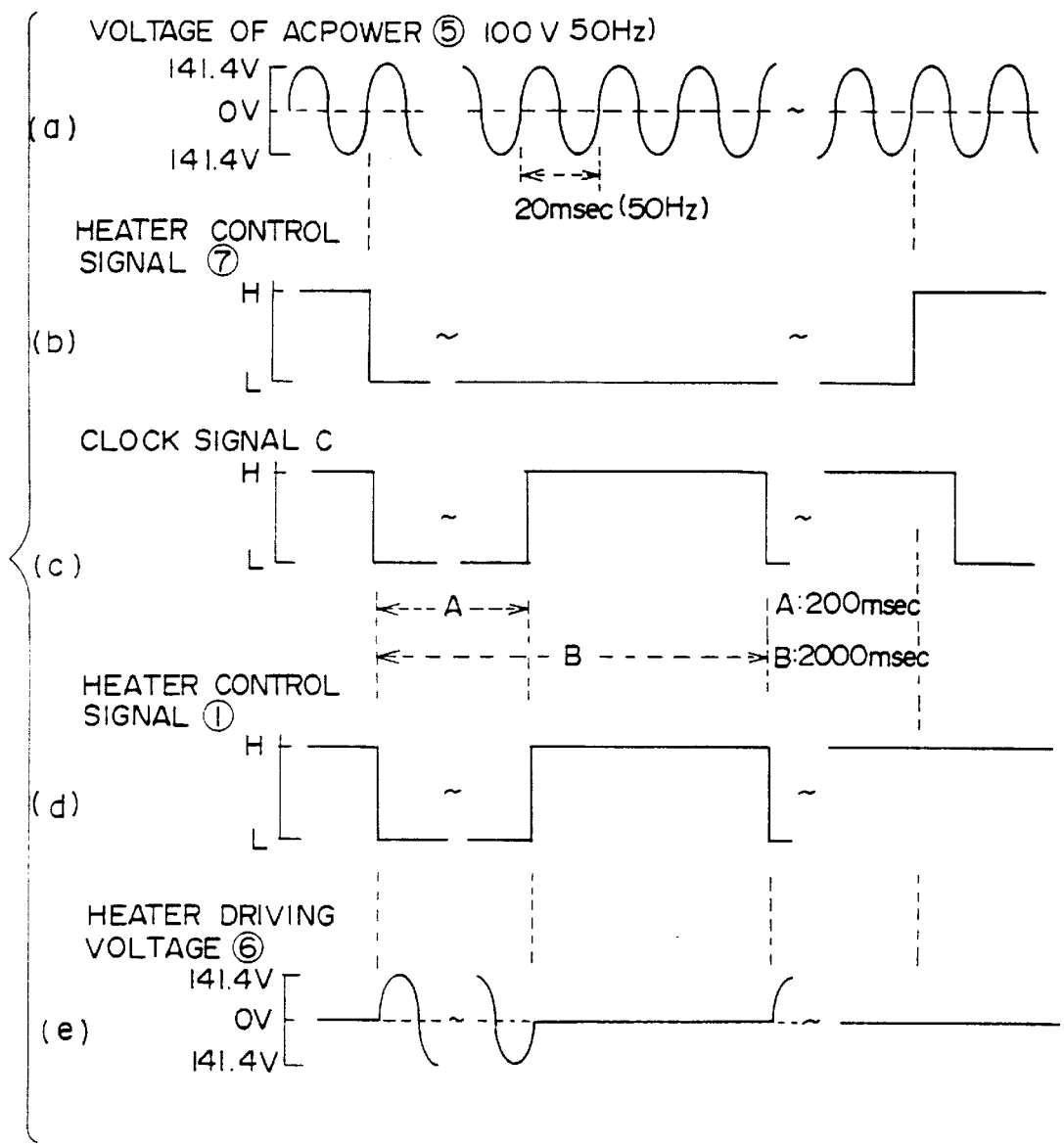
FIG. 44 is a waveform diagram illustrating the heater control signals, the clock signal C and the AC voltage supplied to the heater of the fixing unit in the printer according to a third embodiment of the present invention.

A description will now be given, with reference to FIG. 44, of a third embodiment of the present invention.

The printer according to the third embodiment has the same structure as the printer shown in FIG. 41A. However, a function of the waveform controller in the third embodiment differs from that of the waveform controller 89 in the second embodiment.

The waveform controller 89 in the third embodiment of the present invention controls the heater driving circuit 82 so that the AC voltage is repeatedly turned on and off at an on-and-off cycle in the on-period. The on-and-off cycle, in this case, is in a range to which people generally have slightly uncomfortable feeling. This range is included in the range which can be perceived by people.

An on-and-off cycle in the range to which people generally have slightly uncomfortable feeling is greater than 110 milliseconds (corresponding to 8.8 Hz) to which the people generally have the most uncomfortable feeling. Thus, it is preferable that the on-and-off cycle is set as large as possible. In this embodiment, the on-and-off cycle at which the AC voltage is repeatedly turned on and off is set at 2 seconds (2000 milliseconds). However, if the on-and-off cycle is too large, the temperature control of the fixing unit cannot be normally performed. Thus, the on-and-off cycle should be decided so that the temperature control of the fixing unit can be normally performed.

Figure 9:
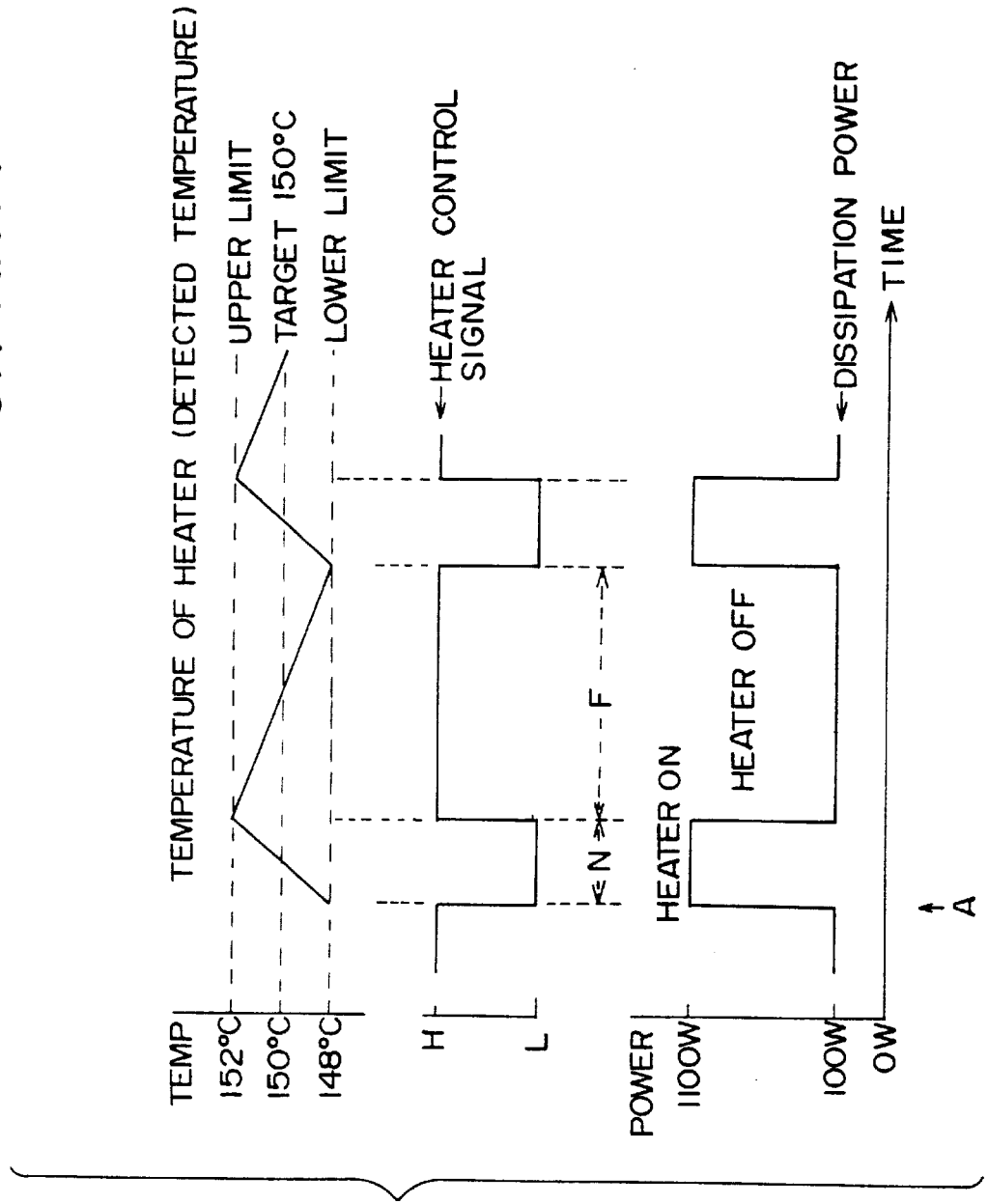
FIG. 9 is a timing chart illustrating the temperature control of the fixing unit in the image forming apparatus shown in FIG. 8A.
Figure 10:
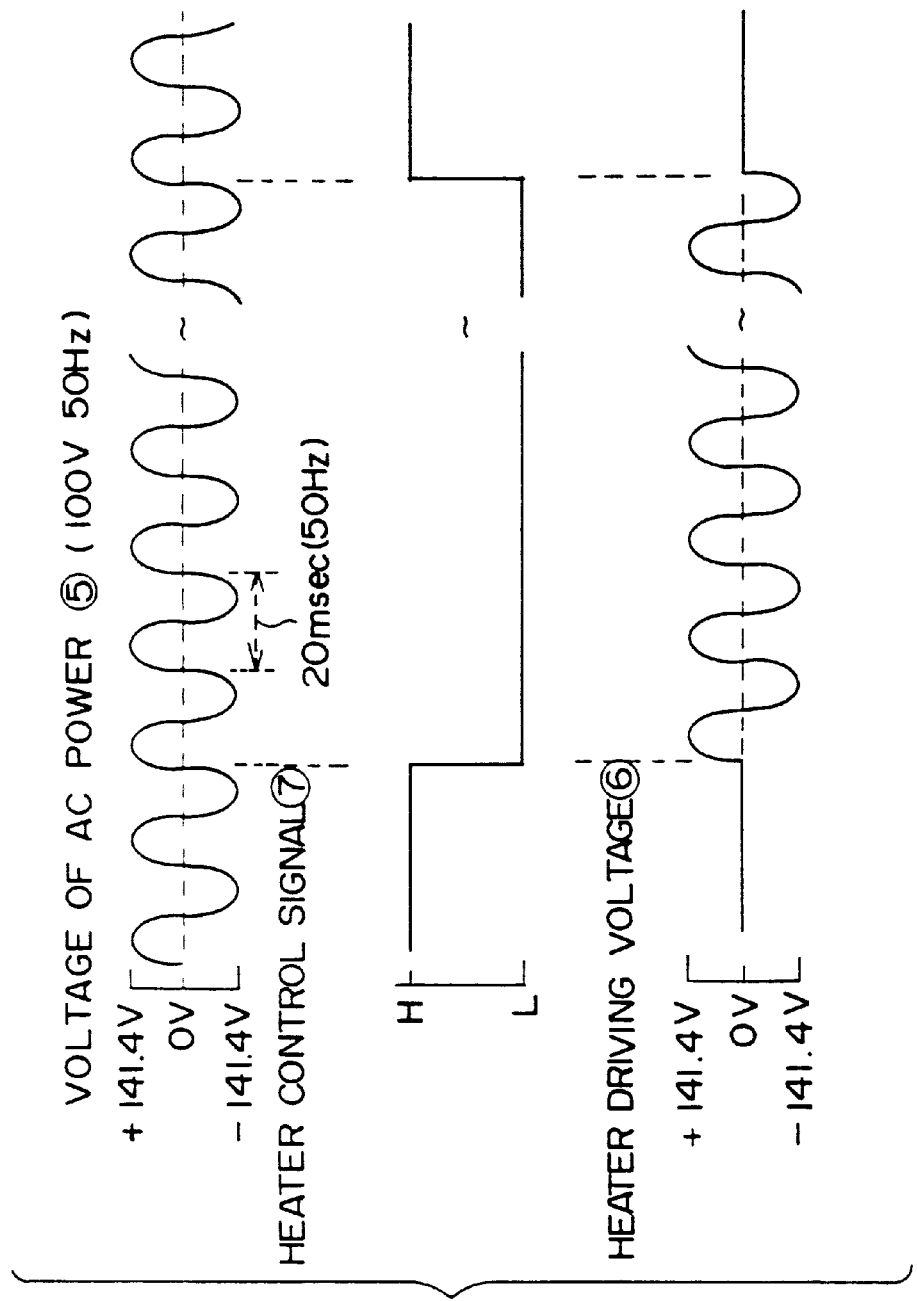
FIG. 10 is a waveform diagram illustrating a waveform of an AC voltage supplied to a heater of the fixing unit in the image forming apparatus shown in FIG. 8A.

In the third embodiment, when the printer is in a predetermined sate such as the idle state, the AC voltage is repeatedly turned on and off at a cycle of 2 seconds in the on-period N shown in FIG. 9. For example, the AC voltage is in the on state for 1800 milliseconds (corresponding to 90 cycles) and in the off state for 200 milliseconds (corresponding to 10 cycles) alternately, as shown in FIG. 44.

According to the above control of the AC voltage applied to the heater 81, the on-period N and the off-period F in the AC voltage supply control can be made longer. This matter is favorable to satisfy the standard regarding the voltage variation of the power supply.

Figure 45:
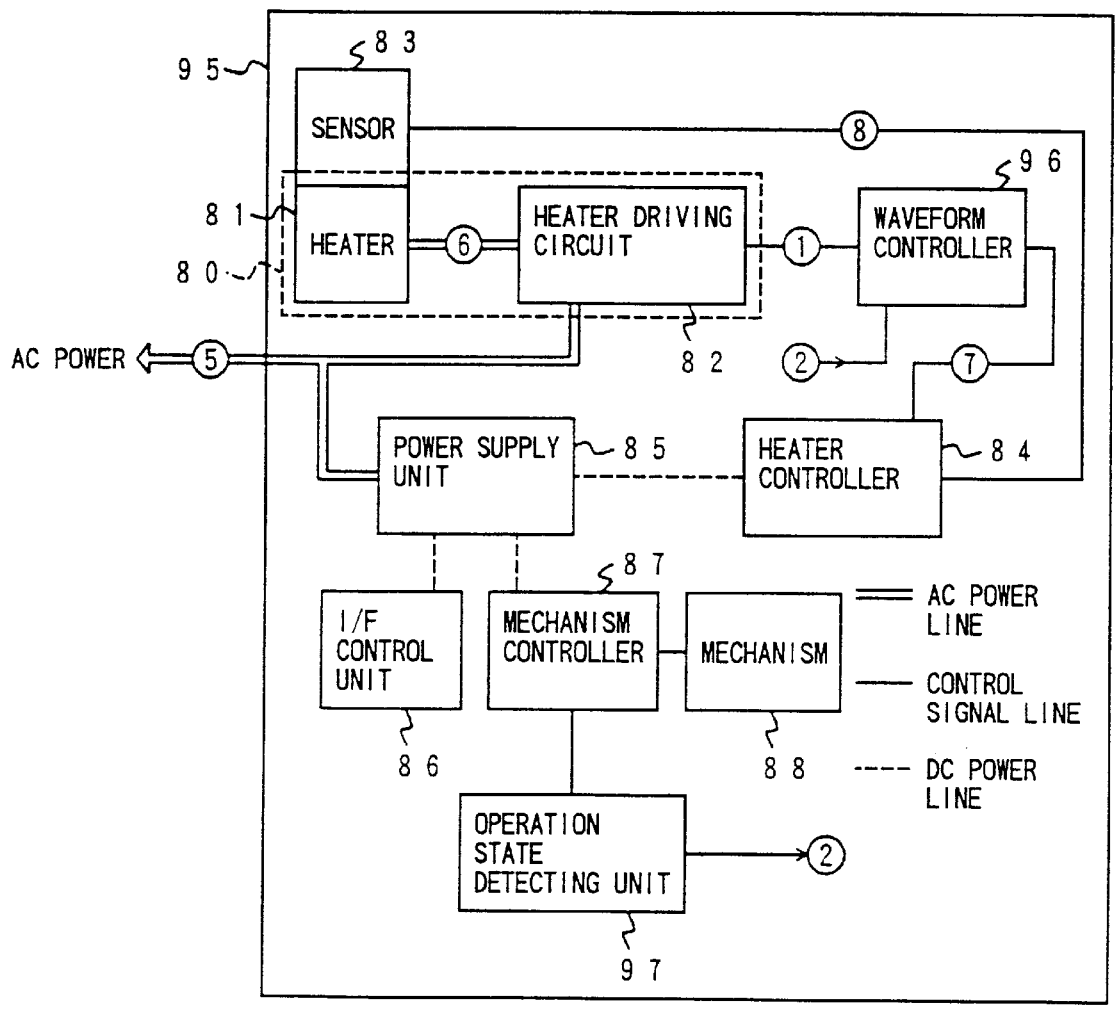
FIG. 45 is a block diagram illustrating the printer according to a fourth embodiment of the present invention.

A description will now be given, with reference to FIG. 45, of a fourth embodiment of the present invention. In FIG. 45, those parts which are the same as those shown in FIG. 41A are given the same reference numbers.

Referring to FIG. 45, a page printer 95 has the fixing unit 80, the temperature sensor 83, the heater controller 84, the power supply unit 85, the IF controller 86, the mechanism controller 87 and the mechanisms 88 in the same manner as that shown in FIG. 41A. The page printer 95 according to the fourth embodiment further has a waveform controller 96 different from that shown in FIG. 41A and an operation state determining unit 97.

The operation state determining unit 97 determines, based on information from the mechanism controller 87, whether the page printer 95 is in the print operation state or in the idle state. The operation state determination unit 97 outputs an operation state signal ② which indicates either the print operation state or the idle state.

The waveform controller 96 controls the heater driving circuit 82 so that the on-period and the off-period in the AC voltage supply control are varied in accordance with the operation state signal ②. As a result, in both the idle state and the print operation state, the standard regarding the voltage variation of the power supply can be satisfied.

When the operation state determining unit 97 determines that the page printer 95 is in the print operation state, the waveform controller 96 functions in the same manner as the waveform controller 89 shown in FIG. 41A in the second embodiment. That is, in this case, the AC voltage applied to the heater 81 is in the on state for one or half cycle and in the off state for one or half cycle alternately in the on-period. On the other hand, when the operation state determining unit 97 determines that the page printer is in the idle state, the waveform controller 96 functions in the same manner as that in the third embodiment as shown in FIG. 44. That is, the AC voltage supplied to the heater 81 is repeatedly turned on and off at a cycle equal to or greater than 2 seconds in the on-period. A period of the on state corresponds to a few cycles of the AC voltage, and a period of the off state corresponds to a number of cycles of the AC voltage expressed in tens.

Figure 46:
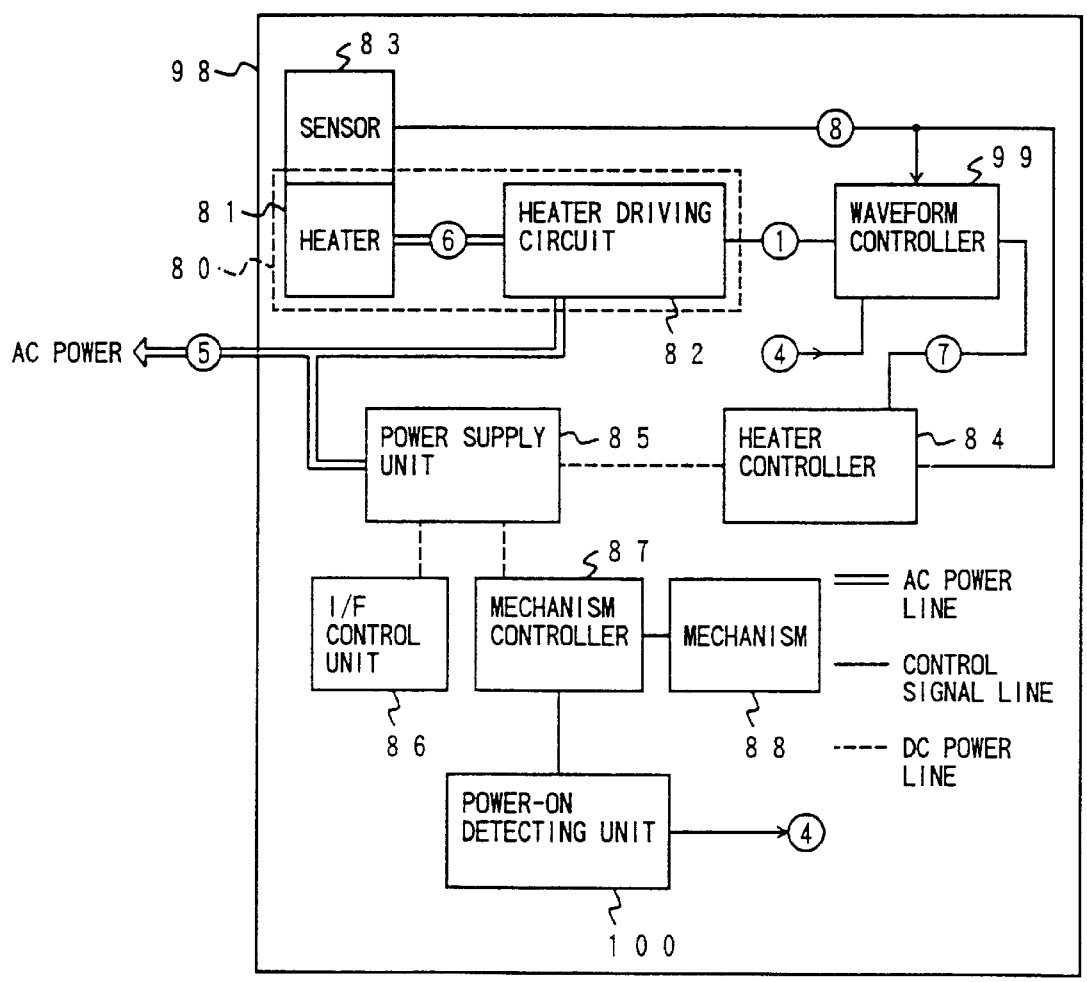
FIG. 46 is a block diagram illustrating the printer according to a fifth embodiment of the present invention.

A description will now be given, with reference to FIG. 46, of a fifth embodiment of the present invention. In FIG. 46, those parts which are the same as those shown in FIG. 41A are given the same reference numbers.

Referring to FIG. 46, a page printer 98 has the fixing unit 80, the temperature sensor 83, the heater controller 84, the power supply unit 85, the IF controller 86, the mechanism controller 87 and the mechanisms 88 in the same manner as that in the second embodiment shown in FIG. 41A. The page printer 98 further has a waveform controller 99 having a function different from the function of the waveform controller 89 shown in FIG. 41A and a power-on detecting unit 100.

When the power of the page printer 98 is turned on, the waveform controller 99 starts to control the heater driving circuit 82 so that the AC voltage is continuously supplied from the power supply unit 85 to the heater 81. When the detected temperature reaches a predetermined temperature, the waveform controller 99 changes the function so as to control the heater driving circuit 82 in the same manner as in the second embodiment. That is, the AC voltage applied to the heater 81 is repeatedly turned on and off at a cycle in the on-period.

When the power-on detecting unit 100 detects that the power of the page printer 98 is turned on, a power-on detecting signal ④ is output from the power-on detecting unit 100. When receiving the power-on detecting signal, the waveform controller 99 outputs the heater control signal ① in which the low-period (A) (see FIGS. 42 and 43) is set to 0 millisecond so that the AC voltage is continuously supplied to the heater 81.

After this, when the detected temperature reaches a predetermined temperature, the waveform controller 99 outputs the heater control signal ① in which the low-period (A) and the cycle (B) are set in the same manner as in the second embodiment. That is, the AC voltage is in the on state for one or half cycle and in the off state for one or half cycle alternately as shown in FIG. 42 or 43.

According to the fifth embodiment, the fixing unit 80 can be rapidly warmed up from when the power of the page printer 98 is turned on (the cold start). Further, after the temperature of the fixing unit 80 reaches the predetermined temperature, the voltage variation of the power line to which the power supply unit 85 is connected can be reduced.

A description will now be given, with reference to FIG. 47, of a sixth embodiment of the present invention.

A page printer according to the sixth embodiment has a waveform controller 101 having a function different from the function of the waveform controller 89 in the second embodiment shown in FIG. 41A.

Figure 47:
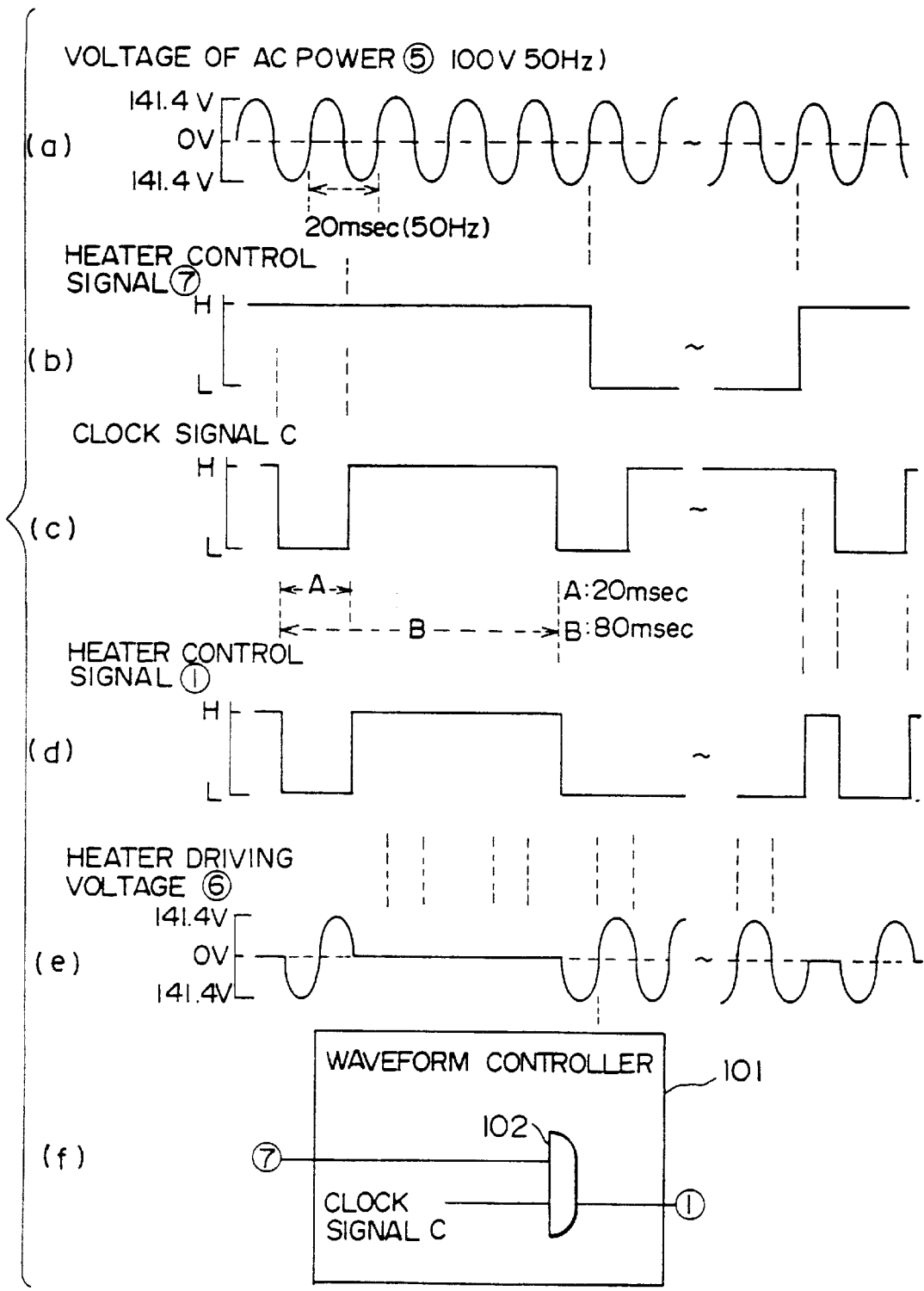
FIG. 47 is a waveform diagram illustrating the heater control signals, the clock signal C and the AC voltage supplied to the heater of the fixing unit in the printer according to a sixth embodiment of the present invention.

The waveform controller 101 of the page printer according to the sixth embodiment is formed as shown in FIG. 47 (*f*). That is, the waveform controller 101 has an AND gate 102 to which the heater control signal ⑦, as shown in FIG. 47 (*b*), supplied from the heater controller 84 and the clock signal C as shown in FIG. 47 (*c*) are input. The waveform controller 101 outputs the heater control signal ① as shown in FIG. 47 (*d*). The heater driving circuit 82 is controlled using the heater control signal ①, so that the AC voltage which varies as shown in FIG. 47 (*e*) is applied to the heater 81.

The waveform controller 101 further has a function for determining whether or not the detected temperature from the temperature sensor 83 reaches a predetermined temperature.

When the detected temperature reaches the predetermined temperature, the power supply to the heater 81 is turned on. The off-period then starts. In the off-period, the AC voltage is not completely in the off state. That is, in the off-state, the AC voltage is repeatedly turned on and off at short intervals one or a few times. As a result, a time for which the fixing unit 80 is cooled to a predetermined temperature is made longer. Thus, in the off-period, when the temperature of the fixing unit 80 reaches the predetermined temperature, the power thermistor of the heater driving circuit 82 is sufficiently cooled so as to have a large resistance. When the AC voltage starts to be applied to the heater element at the next time (the next on-period starts), a large amount of current is prevented from passing through the heater 81. In addition, the total period of the on-period (N) and the off-period (F) is made longer.

Thus, the voltage variation of the power line can be reduced.

A description will now be given, with reference to FIGS. 48A, 48B and 48C, of a seventh embodiment of the present invention.

In the seventh embodiment, the temperature variation of the fixing unit 80 is detected at intervals. If it is determined, based on the detected temperature variation, that the temperature of the fixing unit 80 is excessively increased, a density at which the AC voltage applied to the heater 81 is in the on state is reduced. On the other hand, if it is determined, based on the detected temperature variation, that the temperature of the fixing unit 80 increases at too a low rate or decreases, the density at which the AC voltage applied to the heater 81 is in the on state is increased.

In this embodiment, the waveform controller has a function for monitoring the detected temperature from the temperature sensor and detecting the temperature variation at predetermined intervals, and a function for selecting a on-and-off cycle and a period of the on state.

In the on-period (N) shown in FIG. 9, if it is determined that the temperature of the fixing unit 80 excessively increased, a on-and-off cycle of the AC voltage and a period of the on state thereof are selected so that the density at which the AC voltage applied to the heater 81 is in the on state is decreased. On the other hand, if it is determined that the temperature of the fixing unit 80 increases at too a low rate or decreases, another on-and-off cycle of the AC voltage and another period of the on state are selected so that the density at which the AC voltage applied to the heater is in the on state is increased.

In addition, in the off-period (F) shown in FIG. 9, the power supply control as described above may be performed in accordance with a rate at which the temperature of the fixing unit decreases.

According to the seventh embodiment, the total period of the on-period (N) and the off-period (F) can be made longer. Thus, the level of the AC voltage applied to the heater 81 can be slowly varied.

In the seventh embodiment, the temperature variation of the heater 81 is detected at intervals of 200 milliseconds as shown in FIG. 48A. A clock signal corresponding to the detected temperature variation (t° C.) is selected from among four clock signals in accordance with a rule shown by a table in FIG. 48B.

The density at which the AC voltage applied to the AC voltage applied to the heater 81 is in the on state is defined by a duty ratio A/B of the clock signal C, where A is the period of on state (the low-period) and B is the on-and-off cycle as shown in FIG. 48C.

In addition, according to the above control of the power supply to the heater 81, the fixing unit is not excessively heated and cooled. Thus, the recording sheet is prevented from being curled and toner image is prevented from being fixed on the recording sheet.

As has been described above, in the image forming apparatus, such as a laser printer and a copy machine, in which an image is formed on a recording sheet in accordance with the electrophotographic method, the AC voltage applied to the heater of the fixing unit is repeatedly turned on and off in accordance with the detected temperature of the heater. In this case, the voltage variation occurs in the power line to which the power supply unit of the image forming apparatus is connected. If the voltage variation is large, lighting devices which share the power line may be flickered and the performance of other electronic units which share the power line may deteriorate.

Figure 49:
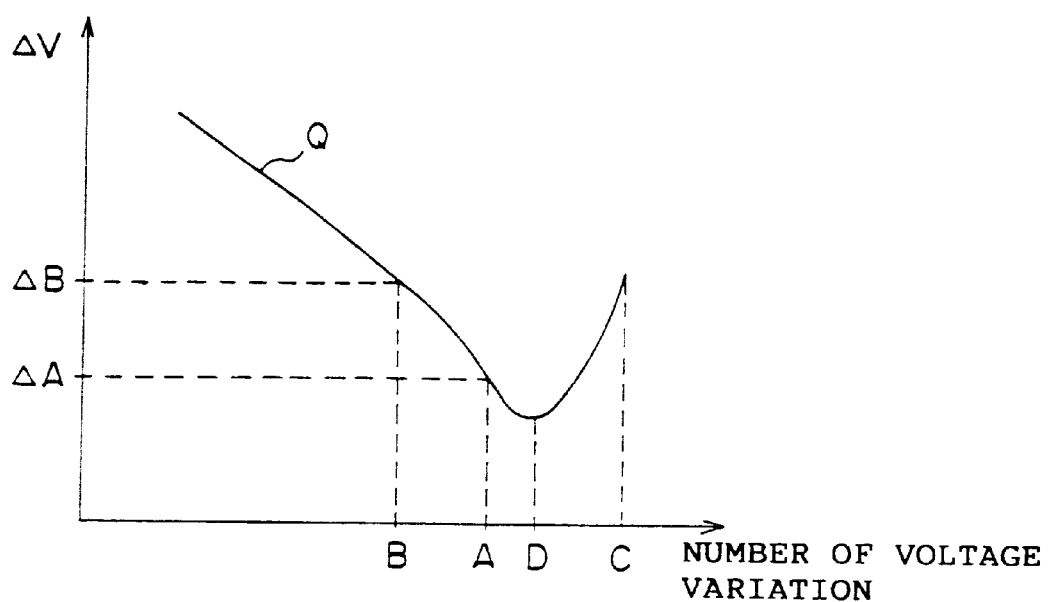
FIG. 49 is a diagram illustrating a characteristic in which people have uncomfortable feeling with respect to voltage variation in rectangular shape.

In a case where the voltage in the power line to which the lighting devices are connected is varied in rectangular shape, it is experimentally known that people generally have uncomfortable feeling in accordance with a characteristic as shown in FIG. 49. In FIG. 49, the axis of ordinate represents the amplitude of voltage variation ΔV (corresponding to the difference between light and darkness of a lighting device), and the axis of abscissas represents a number of times of voltage variation for one minute (corresponding to a number of times of flicker of a lighting device). In a case where an amplitude of the voltage variation and a number of times of the voltage variation are included in an area under a curve Q shown in FIG. 49, people generally do not have the uncomfortable feeling to the flicker of the lighting device. On the other hand, in a case where an amplitude of the voltage variation and a number of times of the voltage variation are included in an area over the curve Q shown in FIG. 49, people generally have the uncomfortable feeling to the flicker of the lighting device. In this characteristic shown in FIG. 49, if the number of times of the voltage variation exceeds "C", the voltage variation cannot be perceived by people. In this case, the flicker of the lighting device based on the voltage variation cannot be perceived by people. Thus, the people do not have the uncomfortable feeling to any amplitude of the voltage variation. The number "C" of times of the voltage variation corresponds to about 33 Hz (the cycle of about 30 milliseconds). When the number of times of the voltage variation is "D", the people generally has the most uncomfortable feeling. The number "D" of times of the voltage variation corresponds to about 8.8 Hz.

According to the above characteristic, in a case where the number of times of the voltage variation is "B" and the amplitude of the voltage variation is "ΔB", if the amplitude of the voltage variation is reduced from "ΔB" to "ΔA", the uncomfortable feeling of the people can be eliminated. In addition, in a case where the number of time of the voltage variation is "A" and the amplitude of the voltage variation is "ΔA", if the number of times of the voltage variation is reduced from the "A" to "B", the uncomfortable feeling of the people can be eliminated.

The temperature control of the fixing unit in the printer according to the second embodiment through the seventh embodiment is performed based on the above characteristic shown in FIG. 49. Hereinafter, furthermore, other examples of temperature controller which is applied to the fixing unit (a heated body) will be described below.

Figure 50:
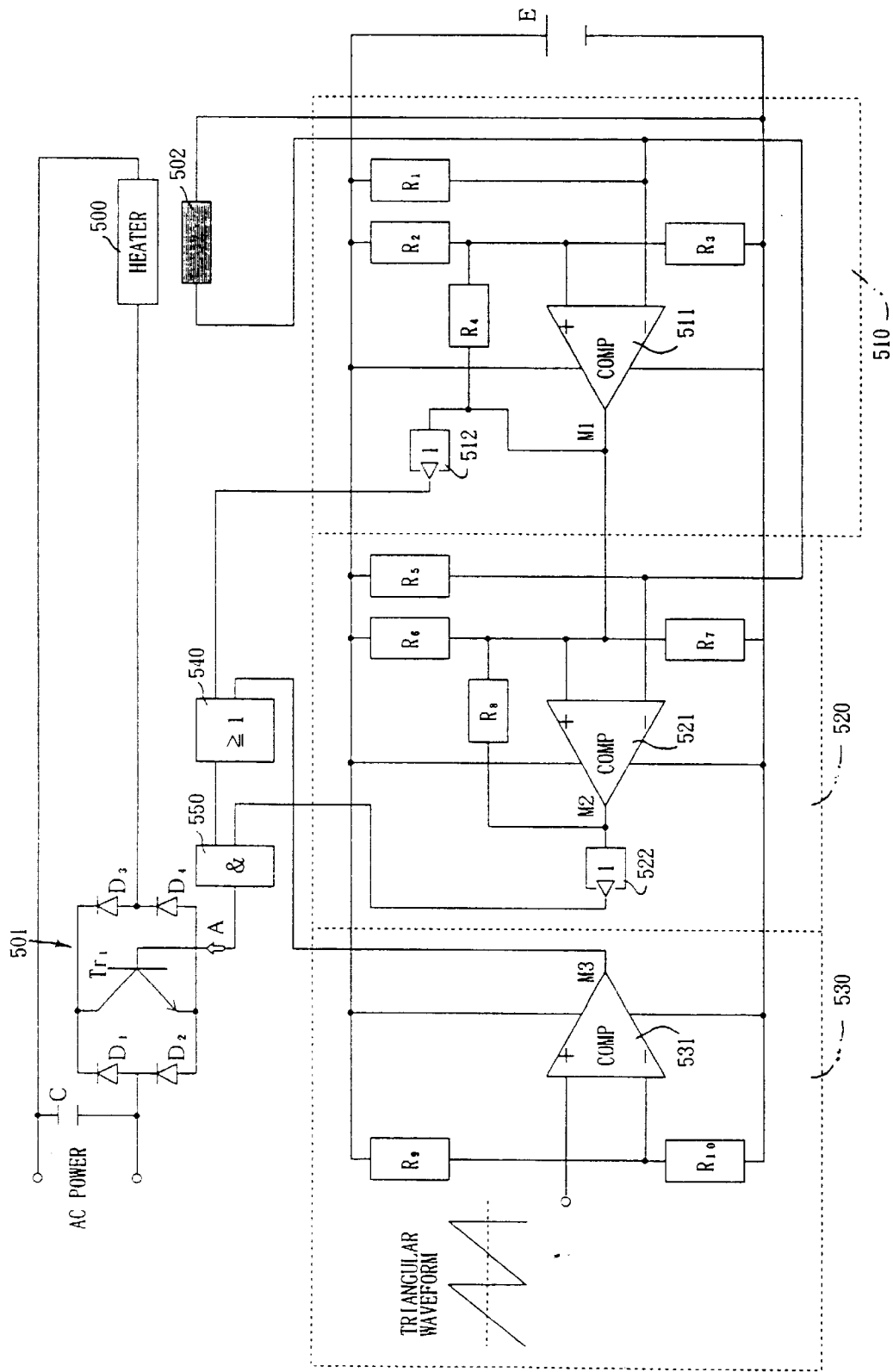
FIG. 50 is a circuit diagram illustrating a first example of a temperature controller for the fixing unit.

A first example of a temperature controller for the fixing unit is formed as shown in FIG. 50. This temperature controller corresponds to a portion formed of the heater controller 84, the waveform controller 89 and the heater driving circuit 82 which has been described above.

Referring to FIG. 50, the temperature controller has a switching circuit 501, a temperature sensor (e.g., a thermistor), a first temperature detecting circuit 510, a second temperature detecting circuit 520, a high frequency oscillator circuit 530, an OR circuit 540 and an AND circuit 550. A DC power E is supplied to the first temperature detecting circuit 510, the second temperature detecting circuit 520 and the high frequency oscillator circuit 530. A capacitor C is connected between AC power lines.

The switching circuit 501 is provided in one of the power lines to which a heater 500 of the fixing unit. The switching circuit 501 is formed of four diodes $D_1$, $D_2$, $D_3$ and $D_4$ and a transistor $Tr_1$. When the transistor $Tr_1$ is turned on and off, the AC voltage supplied from the AC power line to the heater 500 is turned on and off.

Figure 51:
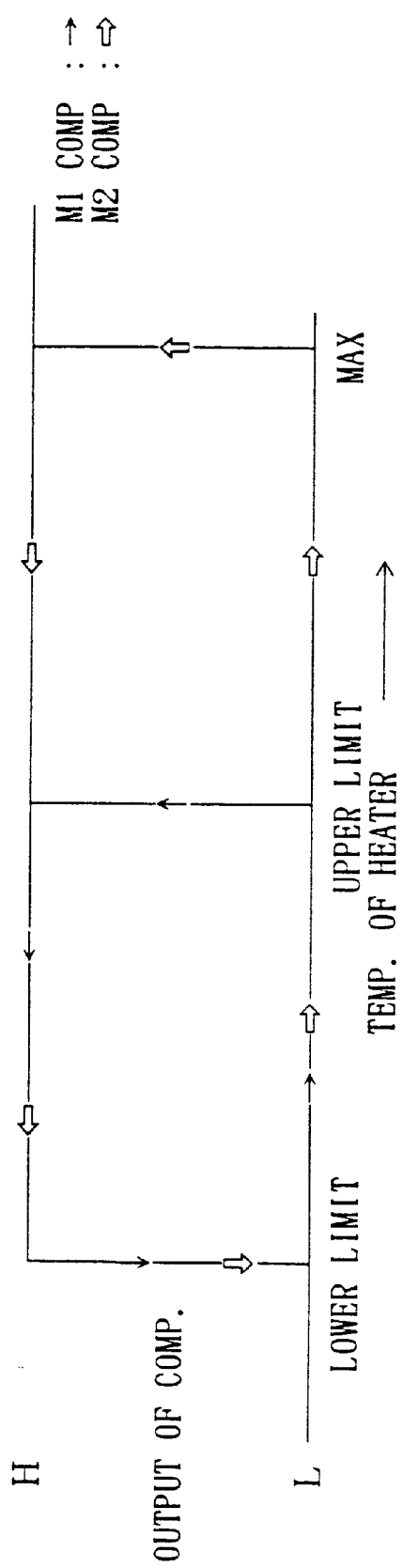
FIG. 51 is a diagram illustrating operations of a first temperature detecting circuit and a second temperature detecting circuit in the temperature controller shown in FIG. 50.

The first temperature detecting circuit 510 has a comparator 511, an inverter circuit 512 and resistors $R_1$ through $R_4$. A combined resistance value of the temperature sensor 502 and the resistor $R_1$ depends on the temperature of the fixing unit. A detecting signal corresponding to the combined resistance value is supplied to an inverting input terminal (−) of the comparator 511. A reference voltage depending on the resistors $R_2$, $R_3$ and $R_4$ is supplied to a non-inverting input terminal (+) of the comparator 511. The reference voltage corresponding to a lower limit of a controlled temperature range depends on the resistors $R_2$ and $R_3$ connected between the DC power lines (E). the reference voltage corresponding to an upper limit of the controlled temperature range depends on the resistor $R_4$ connected between the non-inverting input terminal (+) of the comparator 511 and an output terminal thereof. As shown in FIG. 51, when the temperature of the fixing increases and the detected temperature reaches the upper limit of the controlled temperature range, the output of the comparator 511 (M1) rises to a high level (H). After this, even if the detected temperature is less than the upper limit of the controlled temperature, the output of the comparator 511 (M1) is maintained at the high level. When the detected temperature reaches the lower limit of the controlled temperature range, the output of the comparator 511 (M1) falls to a low level (L). The output signal of the comparator 511 is supplied to the OR circuit 540 via the inverter circuit 512.

The second temperature detecting circuit 520 has a comparator 521, an inverter circuit 522 and resistors $R_5$ through $R_8$. A combined resistance of the temperature sensor 502 and the resistor $R_5$ depends on the temperature of the fixing unit. A detecting signal corresponding to the combined resistance is supplied to an inverting input terminal (−) of the comparator 521. A reference voltage depending on the resistors $R_6$, $R_7$ and $R_8$ is supplied to a non-inverting input terminal of the comparator 521. The lower limit of the controlled temperature range depends on the resistors $R_6$ and $R_7$ connected between the DC power lines (E). A reference voltage corresponding to a maximum temperature (MAX) greater than the upper limit depends on the resistor $R_8$ connected between the non-inverting input terminal of the comparator 521 and an output terminal thereof. As shown in FIG. 51, when the temperature of the fixing unit increases and the detected temperature reaches the maximum temperature (MAX), the output of the comparator 521 (M2) rises to a high level (H). After this, even if the detected temperature is less than the maximum temperature (MAX), the output of the comparator 521 (M2) is maintained at the high level (H). When the detected temperature reaches the lower limit of the controlled temperature range, the output of the comparator 521 falls to a low level (L). The output signal of the comparator 521 is supplied to the AND gate 520 via the inverter circuit 522.

The high frequency oscillator circuit 530 has a comparator 531 and resistors $R_9$ and $R_{10}$. A reference voltage depending on the resistors $R_9$ and $R_{10}$ is supplied to an inverting input terminal (−) of the comparator 531. A non-inverting input terminal (+) of the comparator 531 is provided with a triangular signal supplied from an external unit. As a result, the triangular signal input to the non-inverting input terminal is sliced by the reference voltage level input to the inverting input terminal, so that the comparator 531 outputs a rectangular pulse signal. The output signal (the rectangular pulse signal) is supplied to the OR circuit 540.

The temperature controller having the above structure controls the temperature of the fixing unit (the heater 500) as follows.

Figure 52:
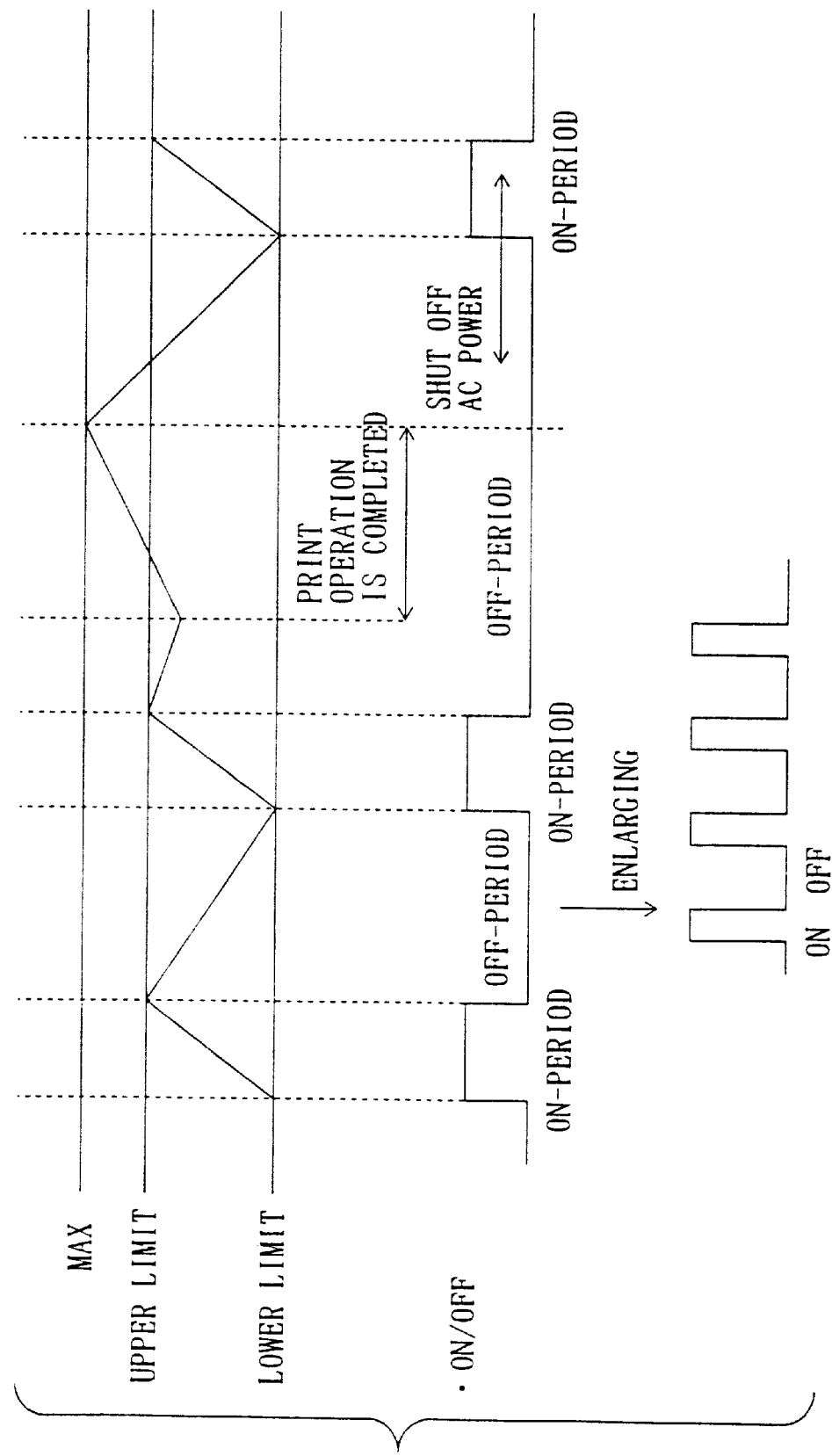
FIG. 52 is a diagram illustrating temperature control of the fixing unit which is performed by the temperature controller shown in FIG. 50.

In a print operation, until the detected temperature (a fixing temperature) reaches the upper limit of the controlled temperature range, both the first temperature detecting circuit 510 and the second temperature detecting circuit 520 output the detecting signals having the high level (H). Thus, a signal having the high level (H) is supplied through the AND circuit 550 to the transistor $Tr_1$ of the switching circuit 501 (an portion A), so that the transistor $Tr_1$ is turned on. The heater 500 is thus continuously provided with the AC voltage. As a result, the fixing temperature (the temperature of the fixing unit) increases in each "on-period" shown in FIG. 52.

When the fixing temperature increases and the detected temperature reaches the upper limit, although the output signal of the second temperature detecting circuit 520 is maintained at the high level (H), the output signal of the first temperature detecting circuit 510 falls to the low level (L). Thus, the pulse signal from the high frequency oscillator circuit 530 is supplied to the transistor $Tr_1$ of the switching circuit 501 via the OR circuit 540 and the AND circuit 550. The transistor $Tr_1$ is repeatedly turned on and off in synchronism with the pulse signal. As a result, the AC voltage is intermittently applied to the heater 500 in synchronism with the pulse signal in each "off-period" shown in FIG. 52. Energy supplied to the heater 500 in the case where the AC voltage is intermittently applied to the heater 500 is less than energy supplied to the heater 500 in the case where the AC voltage is continuously applied to the heater. Thus, in this case, the fixing temperature is gradually decreased. Then, when the fixing temperature reaches the lower limit again, the output signal of the first temperature detecting circuit 510 rises to the high level (H), so that the signal having the high level (H) is supplied to the transistor $Tr_1$ of the switching circuit 501. As a result, the AC voltage is continuously applied to the heater 500, so that the fixing temperature is increased again.

During the print operation, control of the AC voltage applied to the heater 500 in the "on-period" and in the "off-period" as described above is repeatedly performed. As a result, the fixing temperature is controlled so as to be maintained within a range between the lower limit and the upper limit.

The frequency of the pulse signal output from the high frequency oscillator circuit 530 is greater than 33 Hz corresponding to the number "C" of times of the voltage variation shown in FIG. 49. Thus, even if the AC voltage applied to the heater 500 is repeatedly turned on and off in synchronism with the pulse signal in the "off-state", the flicker of a lighting device which shares the power lines connected to the heater 500 is not perceived by people.

The "off-period" depends on the amount of energy emitted from the heater 500, that is, the duty ratio of the above pulse signal. The duty ratio is a ratio of a on-period (the high level) to one cycle of the pulse signal. The duty ratio of the pulse signal is set so that the fixing temperature is decreased in accordance with an allowable characteristic. The duty ratio of the pulse signal is, for example, less than 50%. Further, the duty ratio of the pulse signal is set so that a number of times which the "on-period" and the "off-period" are repeated for a predetermined time (e.g., 1 minute) and the amplitude of the voltage variation are located in the area under the curve Q show in FIG. 49. That is, in a case where the number of times which the "on-period" and the "off-period" are repeated for the predetermined time is increased, the duty ratio is decreased so that the "off-period" is shortened. In addition, in a case where the number of times which the "on-period" and the "off-period" are repeated for the predetermined time is decreased, the duty ratio is increased so that the "off-period" is made longer.

The duty ratio of the pulse signal is controlled by control of the reference voltage level supplied to the comparator 531 of the high frequency oscillator circuit 530. That is, the ratio of the resistances of the resistors $R_9$ and $R_{10}$ is controlled, so that the duty ratio of the pulse signal is controlled.

In a case where the print operation is not performed, recording sheets do not pass through the fixing unit. In this case, the heat of the fixing unit is not radiated via the recording sheets. Thus, in the "off-period", the fixing temperature may not be decreased (see FIG. 52). When the fixing temperature increases and reaches the maximum temperature (MAX), the output signal of the second temperature detecting circuit 520 falls to the low level (L), so that the transistor $Tr_1$ of the switching circuit 501 is turned off. Thus, the power supply to the heater 500 is forced to be shut off. The fixing temperature is decreased. When the fixing temperature reaches the lower limit, the power supply control in the "on-state" and in the "off-state" described above is alternately performed again.

According to the above temperature controller, the duty ratio of the pulse signal from the high frequency oscillator circuit 530 is controlled which duty ratio affects the "off-period". As a result, lighting devices which share the power lines can be prevented from being flickered based on repeatedly turning on and off the power supply to the heater 500.

Figure 53:
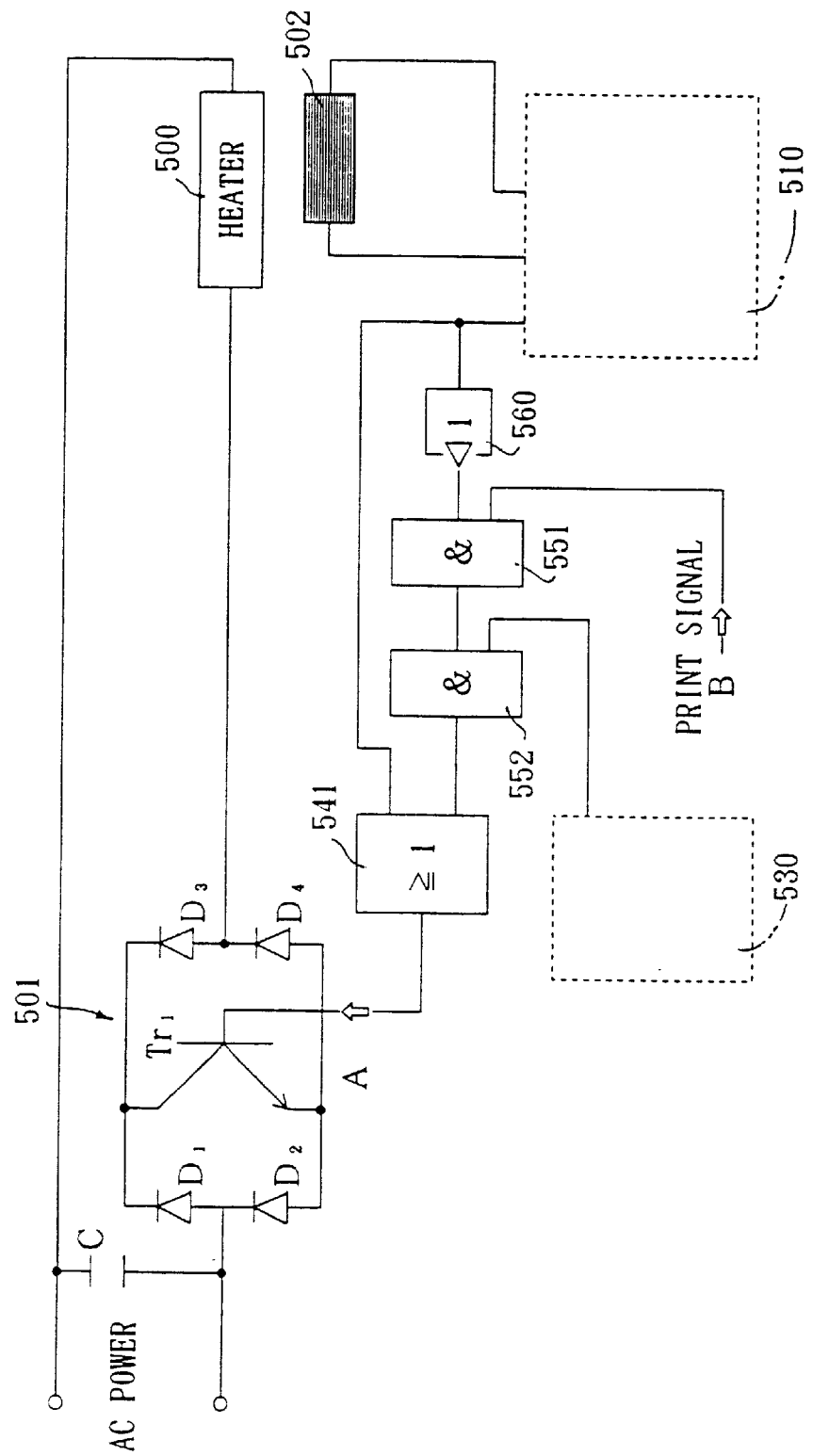
FIG. 53 is a circuit diagram illustrating a second example of the temperature controller for the fixing unit.

A second example of the temperature controller for the fixing unit is shown in FIG. 53. In the first example described above, when the fixing temperature reaches the maximum temperature (MAX), the power supply to the heater 500 is forced to be shut off. Alternatively, in the second example, when the print operation is completed, the power supply to the heater 500 is forced to be shut off. If the fixing temperature decreases to the lower limit, the normal power supply control resumed.

Referring to FIG. 53, the temperature controller has the switching circuit 501, the temperature sensor 502, the first temperature detecting circuit 510 and the high frequency oscillator circuit 530 in the same manner as that in the first example. The output signal of the first temperature detecting circuit 510 is supplied to the OR circuit 540 and is supplied to an AND circuit 551 via an inverter circuit 560. The AND circuit 551 is further provided with a print signal (a portion B). When the print operation is performed, the print signal has the high level (H). When the print operation is not performed, the print signal has the low level (L). The output signal of the AND circuit 551 and the pulse signal from the high frequency oscillator circuit 530 are respectively supplied to an AND circuit 552. The output signal of the AND circuit 552 is supplied to an OR circuit 541.

In the print operation (the print signal having the high level (H)), the detecting signal having the high level (H) is supplied from the first temperature detecting circuit 510 to the transistor $Tr_1$ of the switching circuit 501 via the OR circuit 541 until the fixing temperature reaches the upper limit. As a result, the AC voltage is continuously applied to the heater 500 (the "on-period"). In addition, when the fixing temperature reaches the upper limit, the detecting signal from the first temperature detecting circuit 510 falls to the low level (L). As a result, the pulse signal from the high frequency oscillator circuit 530 is supplied to the transistor $Tr_1$ of the switching circuit 501 via the AND circuit 552 and the OR circuit 541. The AC voltage is intermittently applied to the heater 500 in synchronism with the pulse signal (the "off-period").

On the other hand, in the case where the print operation is not performed (the print signal having the low level (L)), when the fixing temperature reaches the upper limit, the detecting signal from the first temperature detecting circuit 510 falls to the low level in a state where the print signal has the low level (L), so that the transistor $Tr_1$ of the switching circuit 501 is turned on. Thus, in the "off-period", the power supply to the heater 500 is forced to be shut off. After this, when the fixing temperature reaches the lower limit, the detecting signal from the first temperature detecting circuit 510 rises to the high level (H), and the AC voltage is continuously applied to the heater 500.

According to the second example of the temperature controller, in a state where the print operation is completed and there is not recording sheet supplied to the fixing unit, the power supply to the heater 500 is forced to be shut off in the "off-period". Thus, the temperature of the fixing unit to which no recording sheet is supplied can be prevented from being excessively increased.

Figure 54:
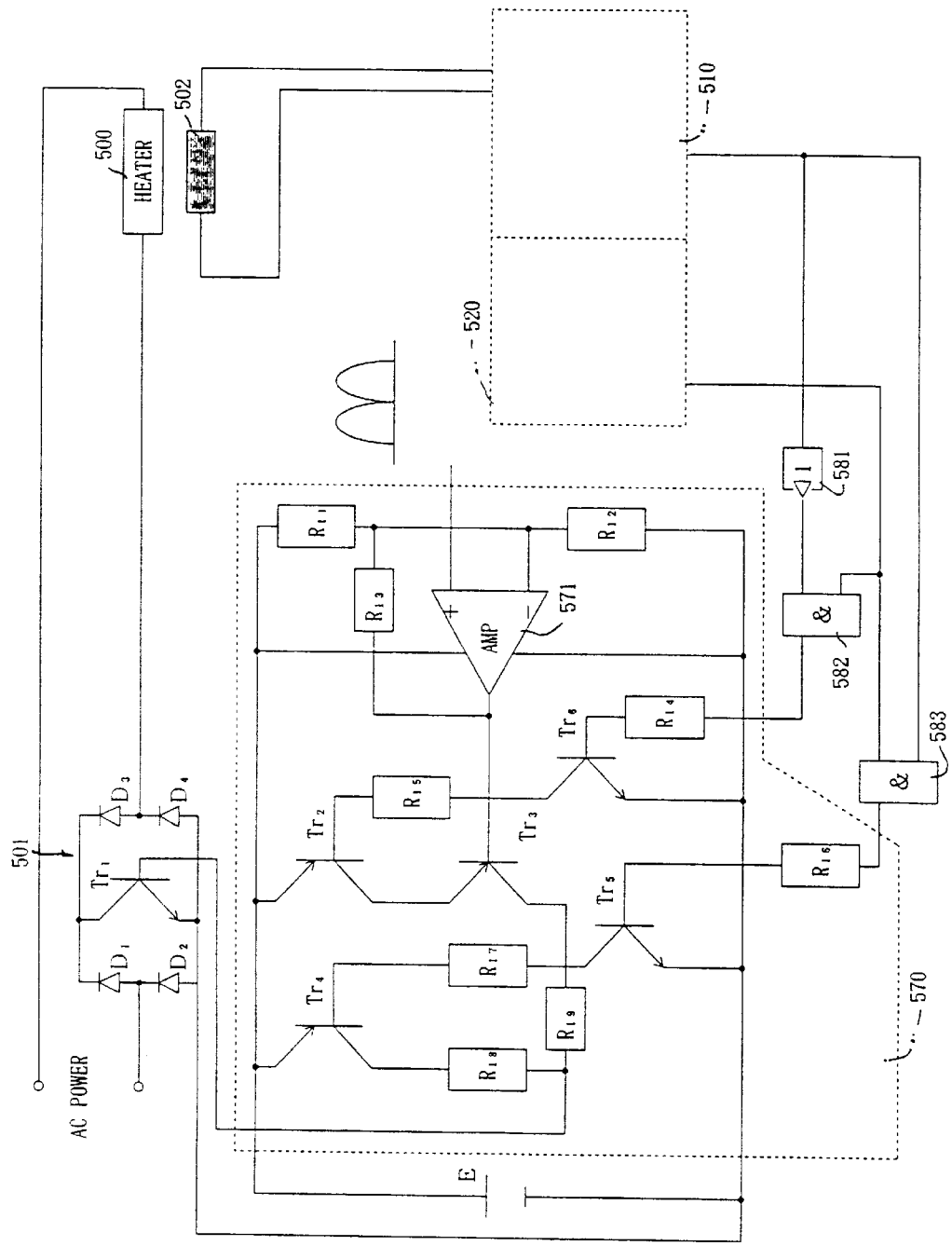
FIG. 54 is a circuit diagram illustrating a third example of the temperature controller for the fixing unit.

A third example of the temperature controller for the fixing unit is shown in FIG. 54. The temperature controller controls the power supply to the heater 500 so that the AC voltage is slightly applied to the heater 500 in the "off-period".

Referring to the FIG. 54, the temperature controller has the switching circuit 501, the temperature sensor 502, the first temperature detecting circuit 510 and the second temperature detecting circuit 520 in the same manner as that of the first example. The temperature controller further as a switching control circuit 570. The switching control circuit 570 performs a driving control for the transistor $Tr_1$ of the switching circuit 501.

The switching control circuit 570 has an amplifier 571, transistors $Tr_2$ through $Tr_6$ and resistors $R_{11}$ through $R_{19}$. An input terminal of the amplifier 571 is provided, from an external unit, with a full-wave rectification signal synchronized with the commercial frequency (the frequency of the AC voltage in the power supply). The DC voltage (E) is applied to the switching control circuit 570. The transistor $Tr_3$ is controlled by the output of the amplifier 571.

The detecting signals from the first temperature detecting circuit 510 and the second temperature detecting circuit 520 are supplied to an AND circuit 583. In addition, the detecting signal from the first temperature detecting circuit 510 is supplied to an AND circuit 582 via an inverter circuit 581, and the detecting signal from the second temperature detecting circuit 520 is directly supplied to the AND circuit 582. The output signal of the AND circuit 582 is supplied to the transistor $Tr_6$ of the switching control circuit 570 via the resistor $R_{14}$ so that the transistor $Tr_6$ is turned on and off by the output signal of the AND circuit 582. The output signal of the AND circuit 583 is supplied to the transistor $Tr_5$ of the switching control circuit 570 via the resistor $R_{16}$ so that the transistor $Tr_5$ is turned on and off by the output signal of the AND circuit 583.

Control currents are supplied from the DC power line (E) to the transistor $Tr_1$ of the switching circuit 501 through two paths in the switching control circuit 57. The first path extends from the DC power line (E) to the transistor $Tr_1$ via the transistor $Tr_4$ and the resistor $R_{18}$. The second path extends from the DC power line (E) to the transistor $Tr_1$ via the transistors $Tr_2$ and $Tr_3$ and the resistor $R_{19}$.

In a case where the fixing temperature increases from the lower limit to the upper limit, both the detecting signals of the first temperature detecting circuit 510 and the second temperature detecting circuit 520 are maintained at the high level (H). Due to the output signal of the AND circuit 583, the transistor $Tr_5$ is in the on state. As a result, the transistor $Tr_4$ is in the on state, and the control current is supplied from the DC power line (E) to the transistor $Tr_1$ of the switching circuit 501 via the transistor $Tr_4$ and the resistor $R_{18}$. In this case, the resistance of the resistor $R_{18}$ and other circuit constants are decided so that an amount of the control current is sufficient to completely turn on the transistor $Tr_1$. Thus, the Ac voltage is continuously supplied to the heater 500 via the transistor $Tr_1$, so that the fixing temperature is increased in the "on-period" shown in FIG. 55.

Figure 55:
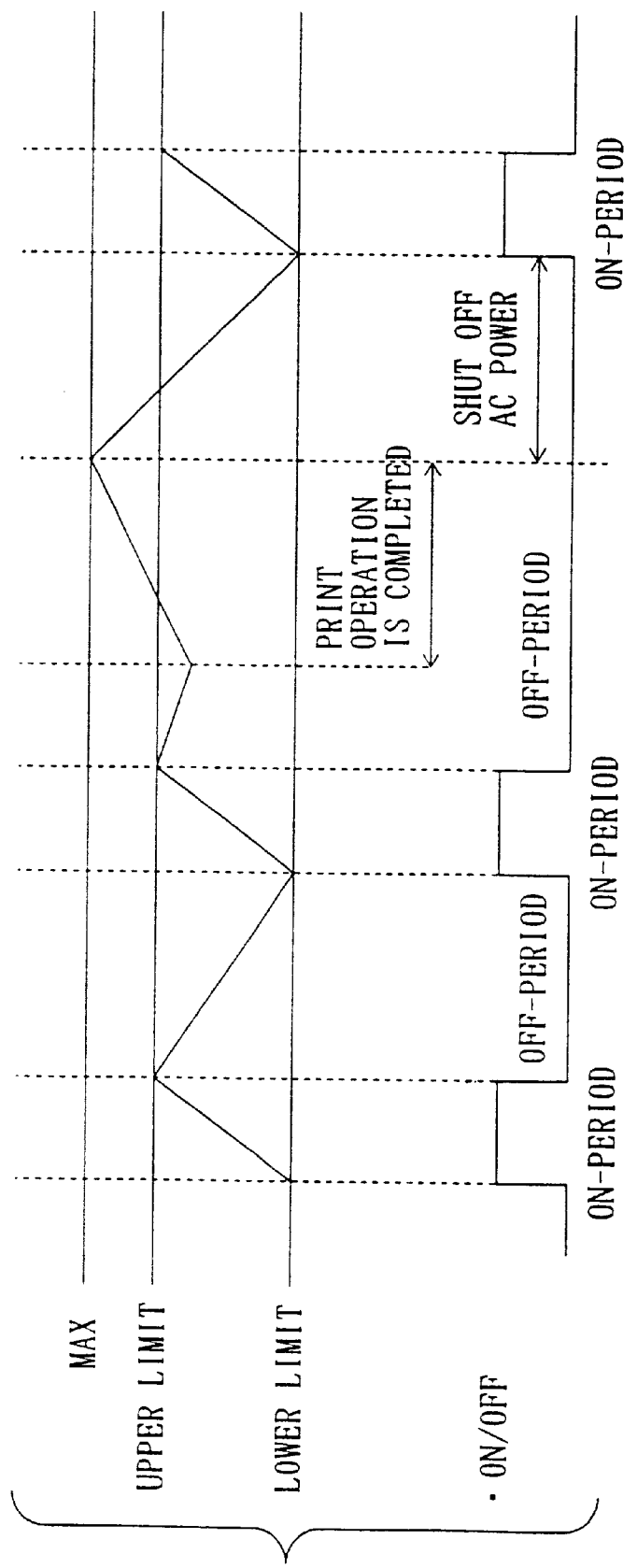
FIG. 55 is a diagram illustrating temperature control of the fixing unit which is performed by the temperature controller shown in FIG. 54.
Figure 56:
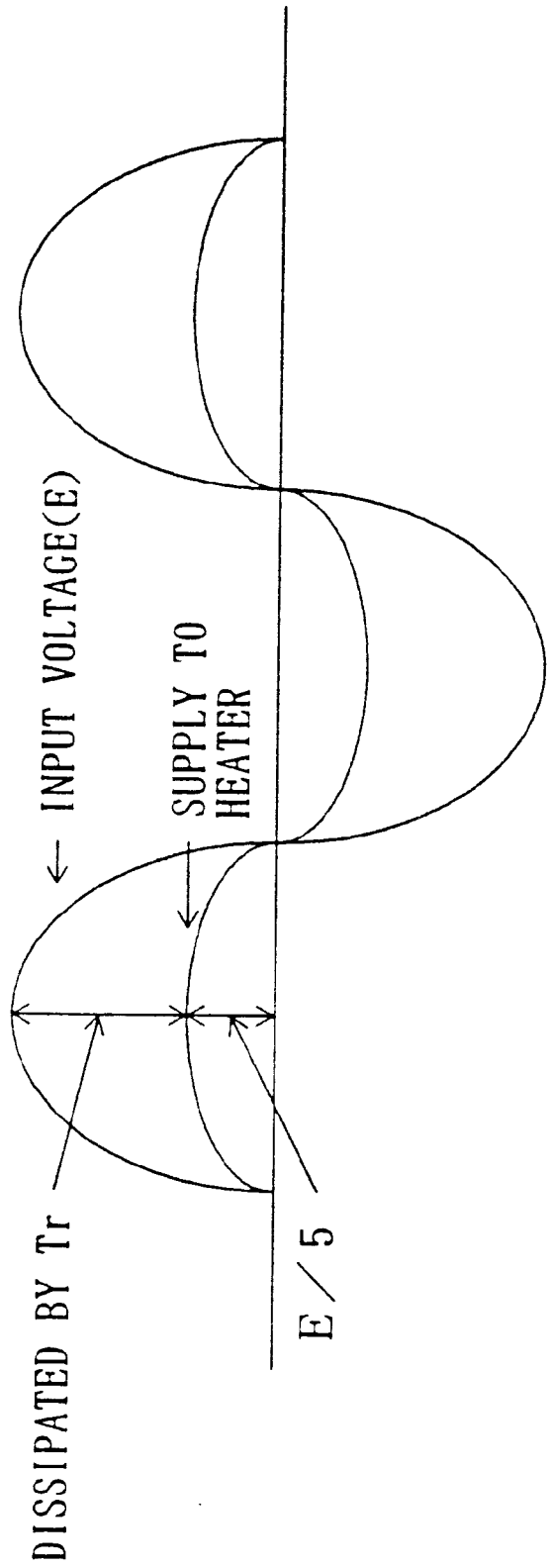
FIG. 56 is a waveform diagram illustrating a waveform of the AC voltage controlled by the temperature controller shown in FIG. 54.

When the fixing temperature is increased and reaches the upper limit, the detecting signal from the first temperature detecting circuit 510 falls to the low level (L). At this time, the output signal of the AND circuit 583 falls to the low level (L) and the output signal of the AND circuit 582 rise to the high level (H). Due to the output signal of the AND circuit 582, the transistor $Tr_6$ is in the on state. As a result, the transistor $Tr_2$ is in the on state, the control current is supplied from the DC power line (E) to the transistor $Tr_1$ of the switching circuit 501 via the transistors $TR_2$ and $Tr_3$ and the resistor $R_{19}$. In this case, the amount of control current is adjusted using the resistance of the resistor $R_{19}$ and other circuit constants so that the amplitude of the AC voltage applied to the heater 500 is reduced as shown in FIG. 56. The amplitude of the AC voltage applied to the heater 500 is reduced, so that the fixing temperature is decreased in the "off-period" shown in FIG. 55.

In a case where there is not recording sheet supplied to the fixing unit (after termination of the print operation), although the amplitude of the AC voltage applied to the heater 500 is reduced, the fixing temperature may be increased. In this case, when the fixing temperature reaches the maximum temperature (MAX), the detecting signal from the second temperature detecting circuit 520 falls to the low level (L). As a result, the output signals of the AND circuits 582 and 583 falls to the low level (L), and the control current is not supplied to the transistor $Tr_1$ of the switching circuit 501. In this case, the AC voltage applied to the heater 500 is forced to be turned off, so that the fixing temperature is decreased from the maximum temperature (MAX) to the lower limit as shown in FIG. 55.

According to the power supply control as has been described above, the variation of the AC voltage applied to the heater 500 in the cases where the "on-period" is changed to the "off-period" and vise versa is reduced. Thus, the flicker of the lighting devices which share the AC power line for the heater 500 is improved. Further, in the case where the AC voltage applied to the heater 500 is forced to be shut off in the "off-period", the "off-period" is made longer. As a result, the number of repeat of the "on-period" and the "off-period" for a predetermined time is reduced. The uncomfortable feeling with respect to the flicker of the lighting devices which share the AC power line for the heater 500 is improved (see the characteristic shown in FIG. 49).

Figure 57:
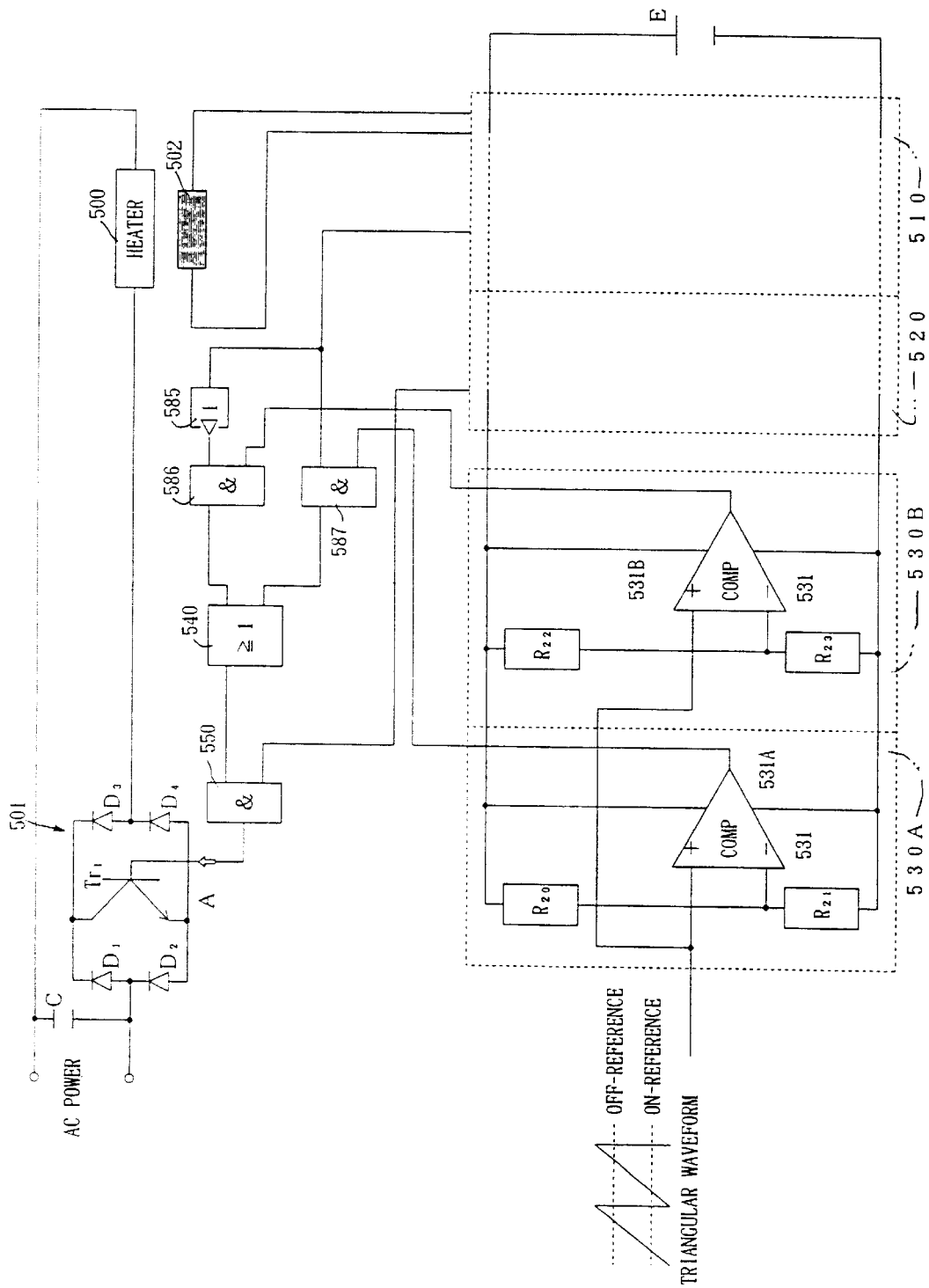
FIG. 57 is a circuit diagram illustrating a fourth example of the temperature controller for the fixing unit.

A fourth example of the temperature controller of the fixing unit is shown in FIG. 57. In this temperature controller, in the "on-period" and the "off-period", the AC voltage to be applied to the heater 500 is modulated using pulse signals having different duty ratios.

Referring to FIG. 57, the temperature controller has the switching circuit 501, the temperature sensor 502, the first temperature detecting circuit 520 and the second temperature detecting circuit 530 in the same manner as that of the first example. The temperature controller further has a first high frequency oscillator circuit 530A and a second high frequency oscillator circuit 530B.

Figure 59:
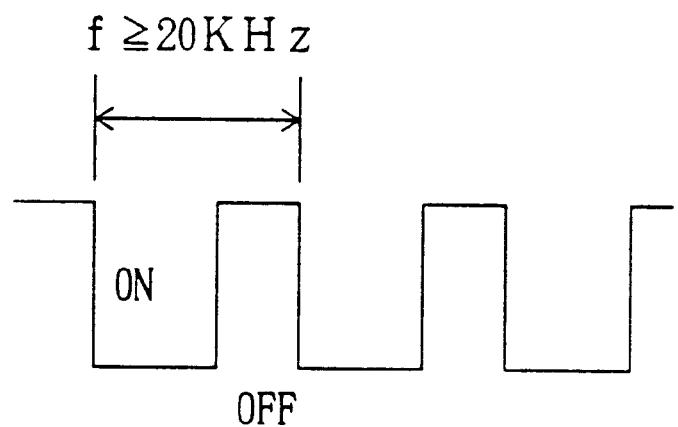
FIG. 59 is a waveform diagram illustrating a waveform of a pulse signal output from a first high frequency oscillator circuit included in the temperature controller shown in FIG. 57.

The first high frequency oscillator circuit 530A has a first comparator 531A and resistors $R_{20}$ and $R_{21}$. The first high frequency oscillator circuit 530A outputs a first pulse signal used to modulate the AC voltage in the "on-period". The duty ratio of the first pulse signal is set, in the same manner as in the first example, based on a reference voltage (an on-reference level) and a triangular signal both of which are supplied to the first comparator 531A. The on-reference level depends on the resistance ratio of the resistors $R_{20}$ and $R_{21}$. The first pulse signal has, for example, a frequency equal to or greater than 20 KHz as shown in FIG. 59. The duty ratio of the first pulse is greater than 50% (a period of the high level is greater than a period of the low level).

Figure 60:
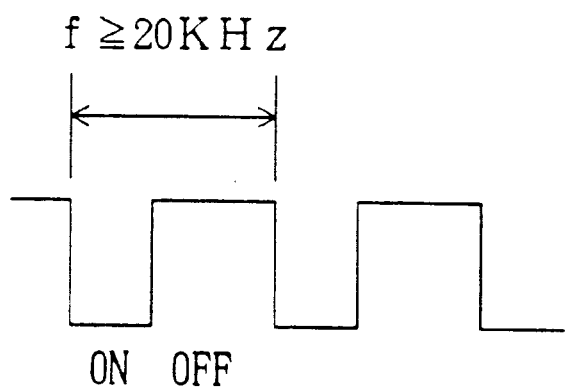
FIG. 60 is a waveform diagram illustrating a waveform of a pulse signal output from a second high frequency oscillator circuit included in the temperature controller shown in FIG. 57.

The second high frequency oscillator circuit 530B has a second comparator 531B and resistors $R_{22}$ and $R_{23}$. The second high frequency oscillator circuit 530B outputs a second pulse signal used to modulate the AC voltage in the "off-period". The duty ratio of the second pulse signal is set, in the same manner as that of the first high frequency oscillator circuit 530A described above, based on a reference voltage (an off-reference level) and the triangle signal both of which are supplied to the second comparator 531B. The off-reference level depends on the resistance ratio of the resistors $R_{22}$ and $R_{23}$. The off-reference level is greater than the on-reference level so that the duty ratio of the second pulse signal is less than the duty ratio of the first pulse. The second pulse signal has, for example, a frequency equal to or greater than 20 KHz as shown in FIG. 60. The duty ratio of the second pulse signal is less than 50% (a period of the high level is less than a period of the low level).

The detecting signal from the first temperature detecting circuit 510 is input to an AND circuit 587 and is input to an AND circuit 586 via an inverter circuit 585. The first pulse signal from the first high frequency oscillator circuit 530A is supplied to the AND circuit 587, and the second pulse signal from the second high frequency oscillator circuit 530B is supplied to the AND circuit 586. The output signals of the AND circuits 586 and 587 are input to the OR circuit 540, and the output signal of the OR circuit 540 is input to the AND circuit 550. The detecting signal from the second temperature detecting circuit 520 is supplied to the AND circuit 550, the output signal of the AND circuit 550 is supplied, as the control signal, to the transistor $Tr_1$ of the switching circuit 501.

When the fixing temperature decreases and reaches the lower limit, the detecting signal from the first temperature detecting circuit 510 rises the high level (H) under a condition in which the detecting signal from the second temperature detecting circuit 520 is maintained at the high level (H). As a result, the first pulse signal from the first high frequency oscillator circuit 530A is supplied, as the control signal, to the transistor $Tr_1$ of the switching circuit 501 via the AND circuit 587, the OR circuit 540 and the AND circuit 550. The transistor $Tr_1$ is repeatedly turned on and off in synchronism with the first pulse signal, so that the AC voltage modulated using the first pulse signal is applied to the heater 500. In this case, since the first pulse signal has a duty ratio greater than 50% (see FIG. 59), the fixing temperature is increased in the "on-period" shown in FIG. 58.

When the fixing temperature reaches the upper limit, the detecting signal from the first temperature detecting circuit 510 falls to the low level (L). As a result, the second pulse signal from the second high frequency oscillator circuit 530B is supplied, as the control signal, to the transistor $Tr_1$ of the switching circuit 501 via the OR circuit 540 and the AND circuit 550. The transistor $Tr_1$ is repeatedly turned on and off in synchronism with the second pulse signal, so that the AC voltage modulated using the second pulse signal is applied to the heater 500. In this case, since the duty ratio of the second pulse signal is less than 50% (see FIG. 60), the fixing temperature is decreased from the upper limit in the "off-state" shown in FIG. 58.

Figure 58:
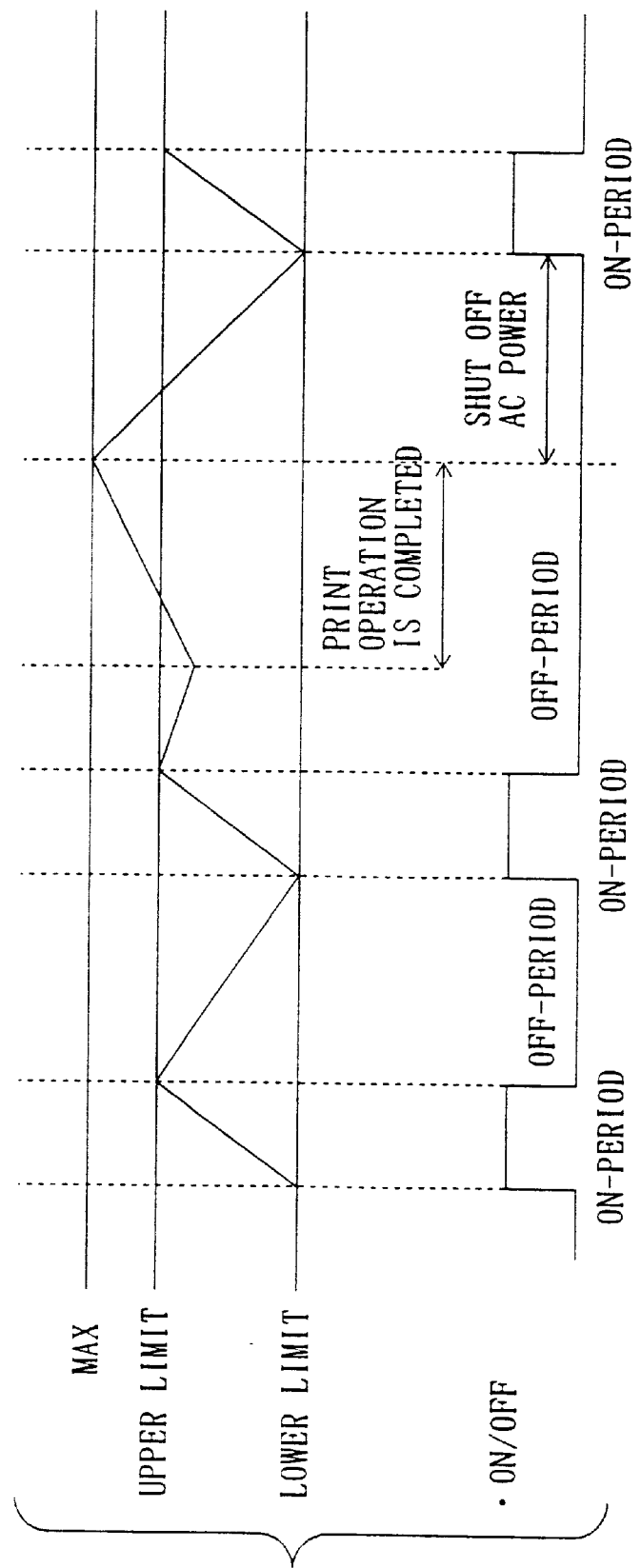
FIG. 58 is a diagram illustrating temperature control of the fixing unit which is performed by the temperature controller shown in FIG. 57.

In a case where no recording sheet is supplied to the fixing unit (after termination of the print operation), the fixing temperature may increase from the upper limit in the "off-period". In this case, when the fixing temperature reaches the maximum temperature (MAX), the detecting signal from the second temperature detecting circuit 520 falls to the low level (L), so that the control signal supplied to the transistor $Tr_1$ of the switching circuit 501 falls to low level (L). As a result, the transistor $Tr_1$ is turned off, and the power supply to the heater 500 is shut off. Thus, the fixing temperature is decreased from the maximum temperature (MAX) as shown in FIG. 58.

In the temperature controller as described above, the "on-period" and the "off-period" are adjusted by adjusting of the duty ratios of the first pulse signal and the second pulse signal so that the number of times which the "on-period" and the "off-period" are repeated for the predetermined time is located in the area under the curve Q shown in FIG. 49.

Figure 61:
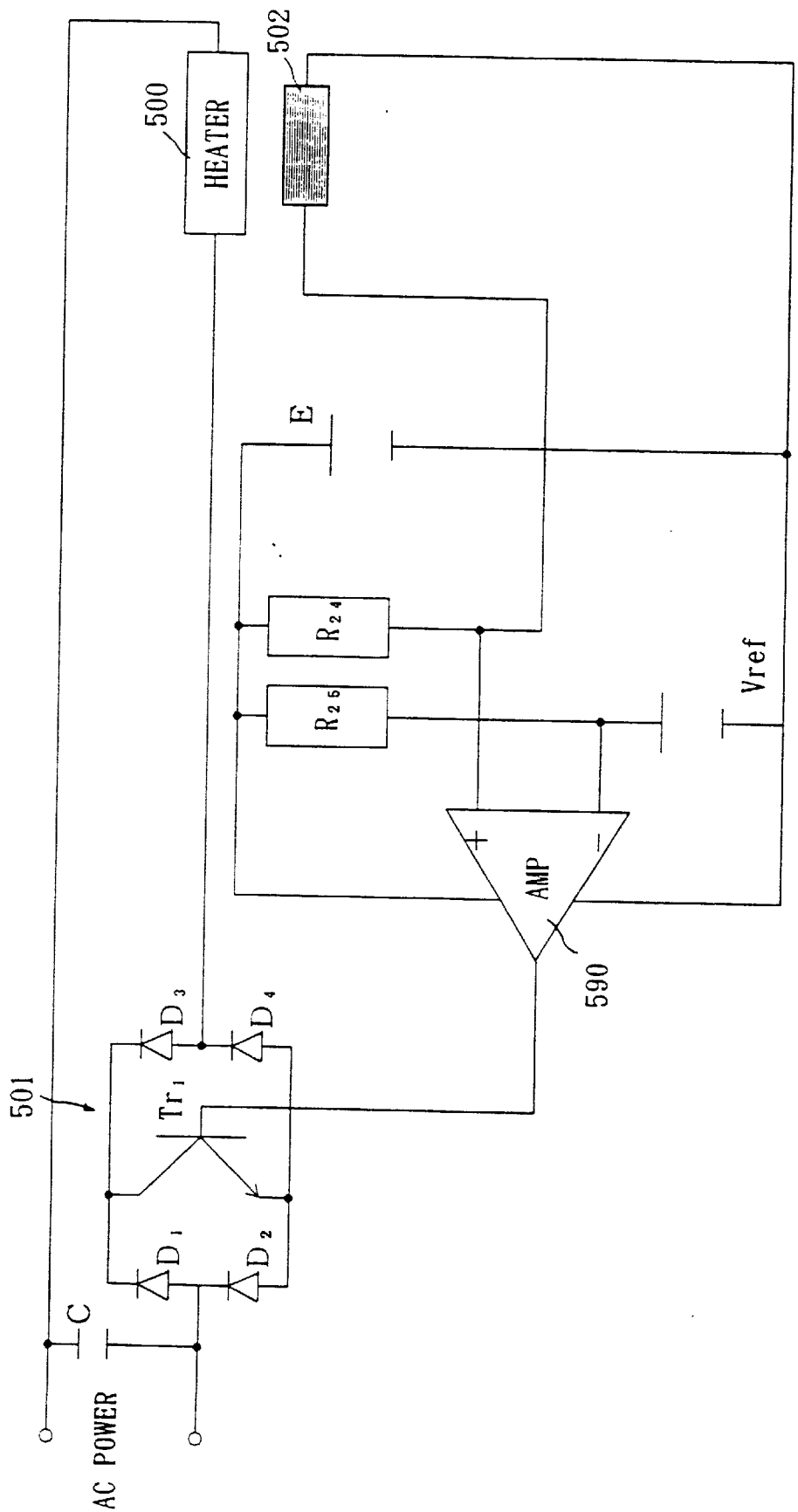
FIG. 61 is a block diagram illustrating a fifth example of the temperature controller for the fixing unit.

A fifth example of the temperature controller is shown in FIG. 61. In this example, the current supplied to the heater 500 is continuously controlled based on the detected temperature.

Referring to FIG. 61, the AC power line to which the heater 500 of the fixing unit is connected is provided with the capacitor C and the switching circuit 501 in the same manner as that in the first example. The detected temperature signal is supplied to a non-inverting input terminal (+) of a differential amplifier 590. The detected temperature signal has a level corresponding to a combined resistance of the temperature sensor 502 (the thermistor) and a resistor $R_{24}$. A reference voltage supply circuit is connected to the DC power line via a resistor $R_{25}$. A reference voltage $V_{ref}$ from the reference voltage supply circuit is supplied to an inverting input terminal of the differential amplifier 590. The differential amplifier 590 outputs a control signal having a level corresponding to the difference between the reference voltage $V_{ref}$ and the level of the detected temperature signal. The control signal is supplied to the transistor $Tr_1$ of the switching circuit 501.

The reference voltage $V_{ref}$ is set at a value based on a temperature at which the fixing unit should be controlled.

According to the temperature controller described above, when the detected temperature increases, the resistance of the temperature sensor 502 decreases so that the level of the detected temperature signal decreases. In this case, the level of the control signal which is supplied from the differential amplifier 590 to the transistor $Tr_1$ of the switching circuit 501 decreases. Thus, the amount of current supplied to the heater 500 is controlled by the transistor $Tr_1$ so as to be decreased. As a result, the fixing temperature is decreased. On the other hand, when the detected temperature decreases, the resistance of the temperature sensor 502 increases so that the level of the detected temperature signal increases. In this case, the level of the control signal which is supplied from the differential amplifier 590 to the transistor $Tr_1$ of the switching circuit 51 increases. Thus, the amount of current supplied to the heater is controlled by the transistor $Tr_1$ so as to be increased. As a result, the fixing temperature is increased.

Figure 62:
FIG. 62 is a diagram illustrating variation of the fixing temperature controlled by the temperature controller shown in FIG. 61.

According to the power supply control for the heater 500, the fixing temperature gently varies within a temperature range including a target temperature corresponding to the reference voltage $V_{ref}$ as shown in FIG. 62.

Since the current supplied to the heater 500 of the fixing unit gently varies, the flicker of the lighting devices which share the power lines for the heater 500 is improved.

Figure 63:
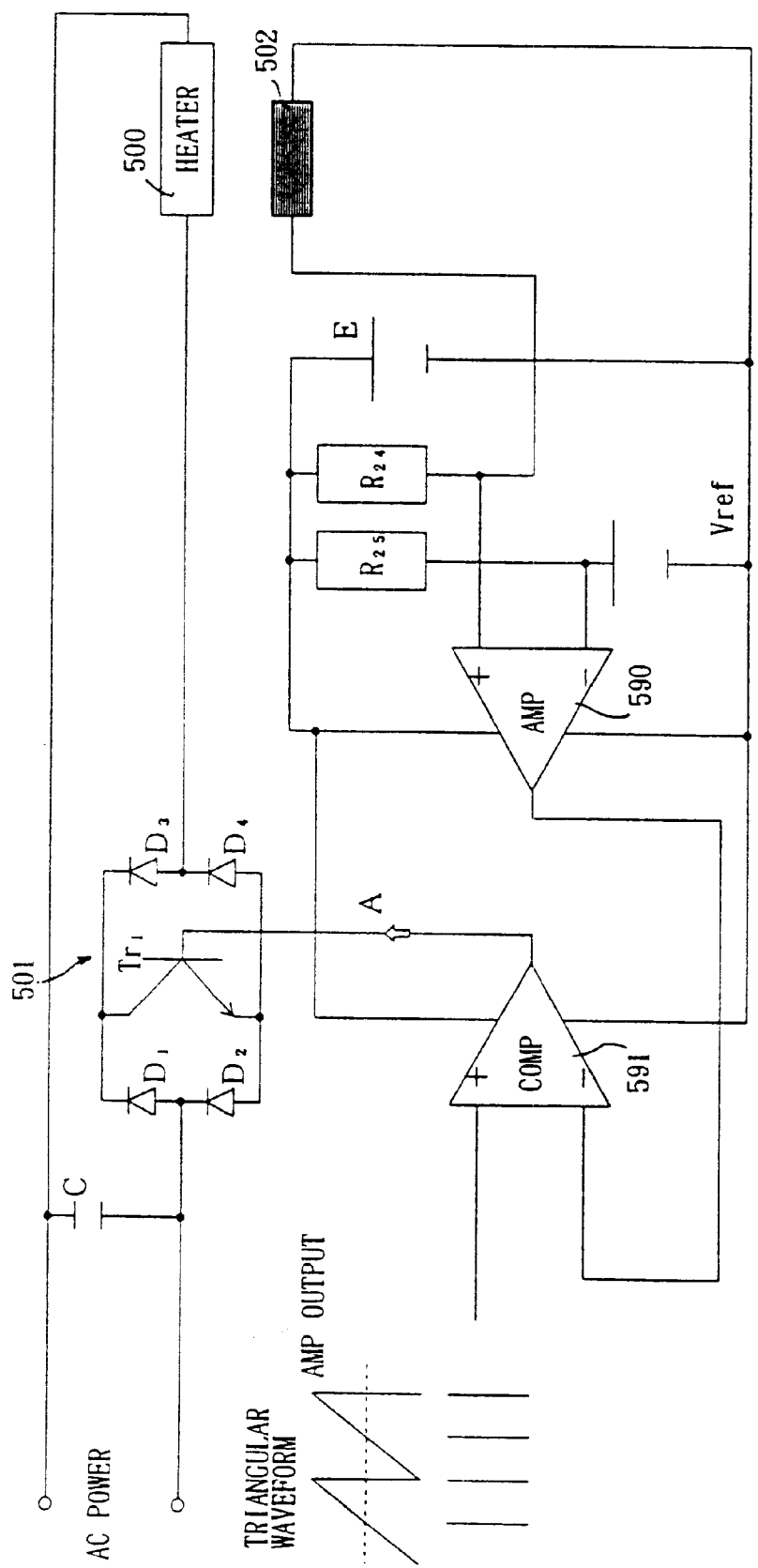
FIG. 63 is a circuit diagram illustrating a sixth example of the temperature controller for the fixing unit.

A sixth example of the temperature controller is shown in FIG. 63. In this example, pulse-width modulation in accordance with the detected temperature is applied to the AC voltage supplied to the heater 500 so that the AC voltage supplied to the heater 500 is continuously controlled.

Referring to FIG. 63, the temperature controller has the switching circuit 501, the temperature sensor 502, the differential amplifier 590, the reference voltage supply circuit outputting the reference voltage $V_{ref}$ and the resistors $R_{24}$ and $R_{25}$, in the same manner as that of the fifth example. The temperature controller further has a comparator 591.

The differential amplifier 590 outputs the signal having the level corresponding to the detected temperature in the same manner as that in the fifth example. The output signal from the differential amplifier 590 is supplied, as a reference, to an inverting input terminal (−) of the comparator 591. A non-inverting input terminal (+) of the comparator 591 is provided with a triangular signal from an external unit. The comparator 591 outputs a pulse signal having a frequency and a duty ratio both of which depend on the reference and the triangular signal. The pulse signal from the comparator 591 is supplied, as the control signal, to the transistor $Tr_1$ of the switching circuit 501. The transistor $Tr_1$ is repeatedly turned on and off in synchronism with the control signal (the pulse signal).

When the fixing temperature decreases, the reference level (the level of the output signal from the differential amplifier 590) for the comparator 591 is decreased. As a result, the duty ratio of the pulse signal output from the comparator 591 is increased. The amount of heat from the heater 500 to which the AC voltage controlled using the pulse signal is applied is increased. Thus, the fixing temperature is increased.

When the fixing temperature increases, the reference level for the comparator 591 is increased. As a result, the duty ratio of the pulse signal output from the comparator 591 is decreased. The amount of heat from the heater 500 to which the AC voltage controlled using the pulse signal is applied is decreased. Thus, the fixing temperature is decreased.

Figure 64:
FIG. 64 is a diagram illustrating variation of the fixing temperature controlled by the temperature controller shown in FIG. 63.

According to the sixth example, in the same manner as the fifth example, the fixing temperature is controlled so as to gently vary within a temperature range including a target temperature corresponding to the reference voltage $V_{ref}$, as shown in FIG. 64. Thus, the flicker of the lighting devices which share the power line for the heater 500 is improved.

Figure 65:
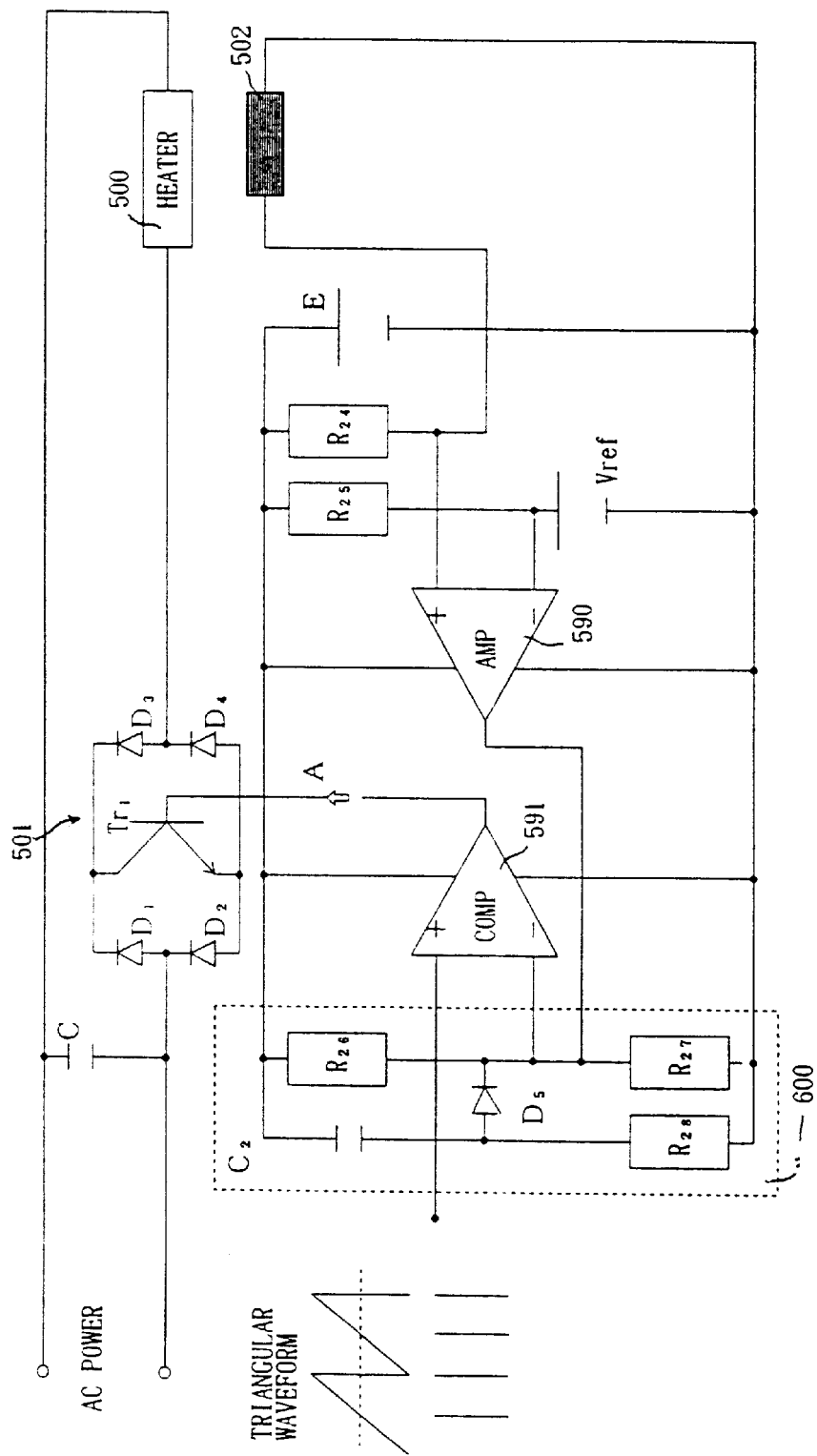
FIG. 65 is a circuit diagram illustrating a seventh example of the temperature controller for the fixing unit.

A seventh example of the temperature controller is shown in FIG. 65.

In the sixth example, since the heater 500 is at a room temperature (a minimum temperature) when the power supply of the printer (the image forming apparatus) is turned on (a cold start). Thus, at the cold start of the printer, the control signal (the output signal of the comparator 591) used to control the AC voltage applied to the heater 500 has a maximum pulse width. When the power supply to the heater 500 is controlled using the control signal having the maximum pulse width at the cold start of the printer, the current rapidly flows through the heater 500. In order to prevent the current from rapidly flowing through the heater 500, in the seventh example, the duty ratio of the control signal used to control the AC voltage applied to the heater 500 is gradually increased from a minimum value when the power supply of the printer is turned on.

Referring to FIG. 65, the temperature controller has the switching circuit 501, the temperature sensor 502, the differential amplifier 590, the comparator 591, the reference voltage supply circuit ($V_{ref}$) and the resistors $R_{24}$ and $R_{25}$ in the same manner as that of the sixth example. The temperature controller further has a reference level control circuit 600.

The reference level control circuit 600 has resistors $R_{26}$, $R_{27}$ and $R_{28}$, a capacitor $C_2$ and a diode $D_5$. At the cold start of the printer, the reference level control circuit 600 controls the reference level supplied to the inverting input terminal (−) of the comparator 591 so that the reference level is gradually decreased from a maximum level.

When the DC power supply is turned on at the cold start of the printer, the DC voltage (E) (the maximum voltage) is supplied, as the reference voltage, to the inverting input terminal (−) of the comparator 591 via the capacitor $C_2$ and the diode $D_5$. After this, while the capacitor $C_2$ is being charged, the voltage level applied to the inverting input terminal (−) of the comparator 591 is gradually decreased. As a result, the duty ratio of the pulse signal which is output from the comparator 591 is gradually increased from the minimum value. When the capacitor $C_2$ is fully charged, the duty ratio of the control signal reaches a value which is decided based on the relationship between the reference voltage depending on the detected temperature and the triangular signal. After this, the duty ratio of the control signal supplied from the comparator 591 to the transistor $Tr_1$ of the switching circuit 501 varies in accordance with the detected temperature. As a result, the fixing temperature gently varies within a temperature range including a target temperature as shown in FIG. 64.

According to the seventh example of the temperature controller, at the cold start of the printer, the amount of current which flows through the heater 500 is not rapidly varied. Thus, the voltage of the AC power line is prevented from being rapidly varied when the power supply of the printer is turned on.

Figure 66:
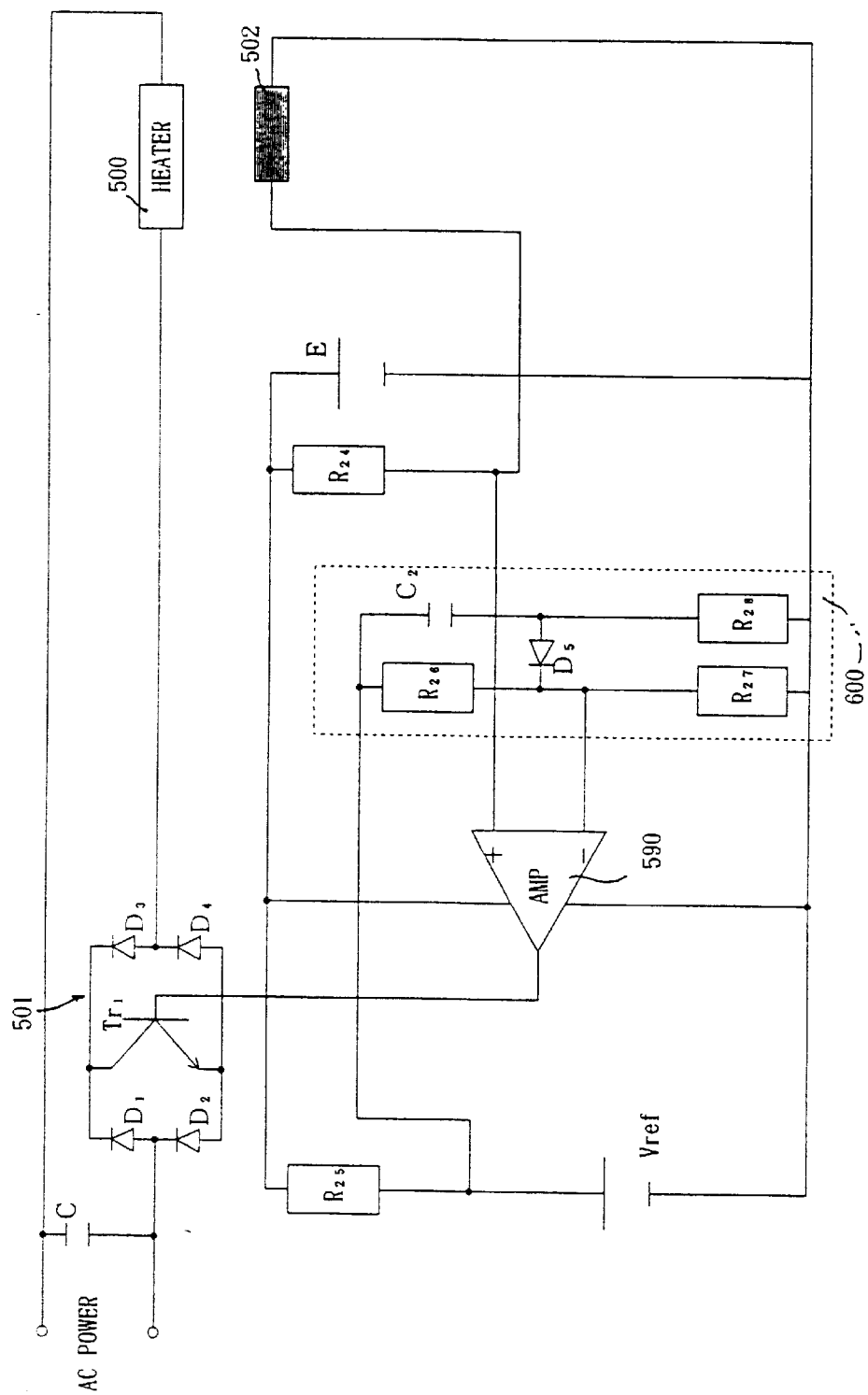
FIG. 66 is a circuit diagram illustrating a eighth example of the temperature controller for the fixing unit.

A eighth example of the temperature controller is shown in FIG. 66.

In the case of the fifth example (see FIG. 61), since the heater 500 is at a room temperature (a minimum temperature) when the power supply of the printer is turned on (at the cold start of the printer), the maximum amount of current flows through the heater 500. In order to prevent the maximum amount of current from flowing through the heater 500 at the cold start, in the eighth example, the amount of current flowing through the heater 500 is controlled so as to be gradually increased from a minimum value.

Referring to FIG. 66, the temperature controller has the switching circuit 501, the temperature sensor 502, the differential amplifier 590, the reference voltage supply circuit ($V_{ref}$) and the resistors $R_{24}$ and $R_{25}$ in the same manner as that of the fifth example (see FIG. 61). The temperature controller further has a reference level control circuit 600. The reference level control circuit 600 has the resistors $R_{26}$, $R_{27}$ and $R_{28}$, the capacitor $C_2$ and the diode $D_5$ in the same manner as that in the seventh example (see FIG. 65). The reference level control circuit 600 controls the level of the reference voltage supplied to the inverting input terminal (−) of the differential amplifier 590 so that the level of the reference voltage is gradually decreased from a maximum value at the cold start of the printer.

When the power supply of the printer is turned on (the cold start) and the DC power supply (E) is turned on, the DC voltage having the maximum level is supplied, as the reference voltage, to the inverting input terminal (−) of the differential amplifier 590 via the capacitor $C_2$ and diode $D_5$. After this, while the capacitor $C_2$ is being charged, the level of the reference voltage is gradually deceased. Finally, the level of the reference voltage reaches a level corresponding to the voltage $V_{ref}$ from the reference voltage supply circuit. In this case, the level of the control signal which is supplied from the differential amplifier 590 to the transistor $Tr_1$ of the switching circuit 501 is gradually increased. As a result, the amount of current which is controlled by the transistor $T_1$ and flows through the heater 500 at the cold start is gradually increased from a minimum value.

After the capacitor $C_2$ is completely charged, the inverting input terminal (−) of the differential amplifier 590 is regularly provided with the voltage corresponding to the reference voltage $V_{ref}$. Thus, the amount of current corresponding to the detected temperature flows through the heater 500. As a result, the fixing temperature is controlled so as to gently vary within a temperature range including a target temperature as shown in FIG. 62.

According to the eighth example, the amount of current which flows through the heater 500 at the cold start is gradually increased, so that the amount of current which flows through the heater 500 is not rapidly increased. Thus, the voltage of the AC power line is prevented from being varied at the cold start.

Figure 67:
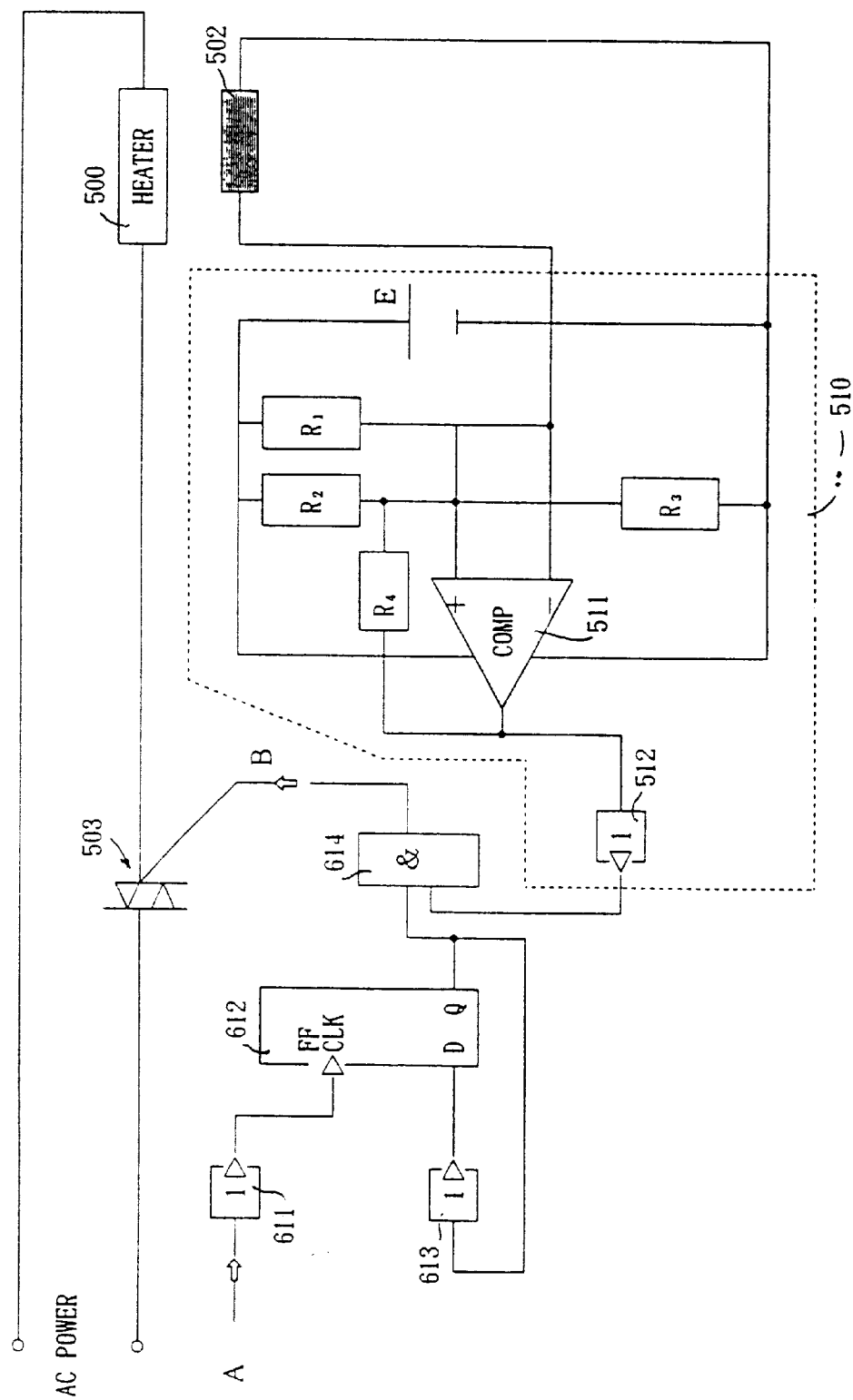
FIG. 67 is a circuit diagram illustrating a ninth example of the temperature controller for the fixing unit.

A ninth example of the temperature controller is shown in FIG. 67. In this example, the AC voltage applied to the heater 500 in the "on-period" is controlled so that the AC current flowing through the heater 500 is repeatedly turned on and off one cycle by one cycle.

Referring to FIG. 67, the temperature controller has the temperature detecting circuit 510 having the same structure as the first temperature detecting circuit 510 in the first example (see FIG. 50). The temperature detecting circuit 510 outputs a detecting signal. While the detected temperature is increasing from the lower limit to the upper limit, the detecting signal from the temperature detecting circuit 510 has the high level (H). On the other hand, while the detected temperature is decreasing from the upper limit to the lower limit, the detecting signal has the low level (L).

Figure 68:
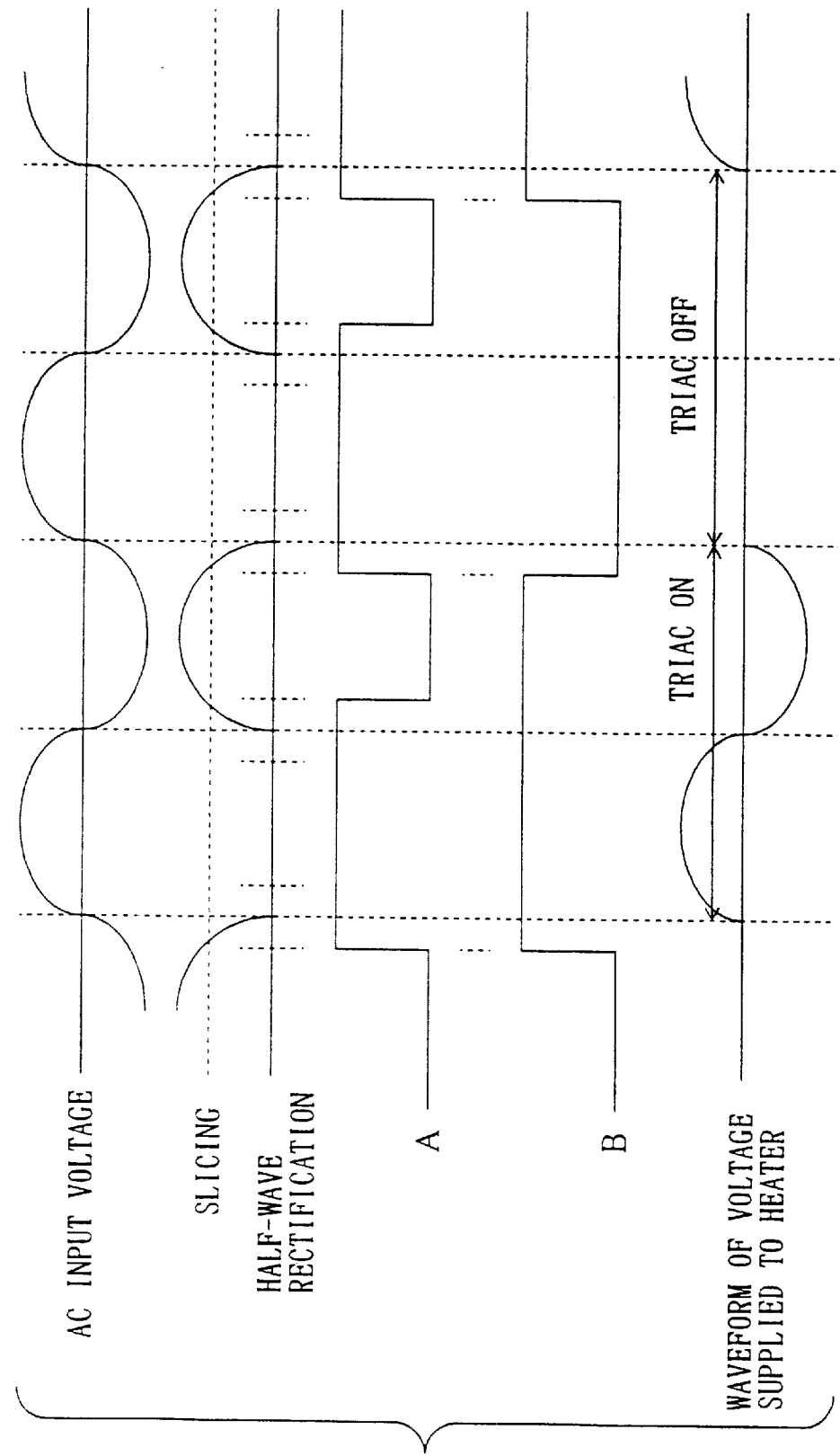
FIG. 68 is a waveform diagram illustrating waveforms of various signals in the temperature controller shown in FIG. 67.

An inverter circuit 611, a flip flop 612 and an inverter circuit 612 form a dividing circuit. The dividing circuit is provided with a clock signal (the portion A) in which the level thereof is repeatedly inverted in synchronism with the AC voltage to be supplied to the heater 500, as shown in FIG. 68. The dividing circuit makes a clock signal (the portion B) in which the level is inverted every cycle of the AC voltage (see FIG. 68). The clock signal from the dividing circuit and the detecting signal from the temperature detecting circuit 510 are supplied to an AND circuit 614. The output signal of the AND circuit 614 is supplied, as a control signal, to a control terminal of a triac 503 provided in the AC power line connected to the heater 500. The triac 503 is a type which is turned on and off in accordance with a zero-crossing method.

Figure 70:
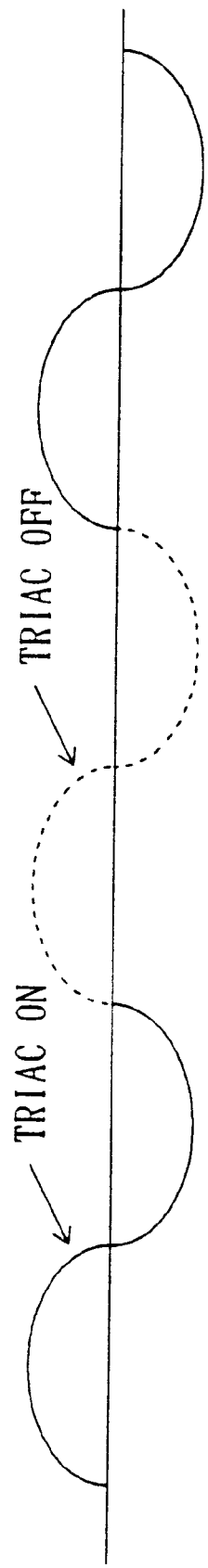
FIG. 70 is a waveform diagram illustrating a waveform of the AC voltage controlled by the temperature controller shown in FIG. 67.

When the detected temperature reaches the lower limit, the detecting signal from the temperature detecting circuit 510 rises to the high level (H) (the "on-period"). In this state, the clock signal (the portion B) in which the level is inverted every one cycle of the AC voltage is supplied, as the control signal, from the flip flop 612 to the control terminal of the triac 503 via the AND circuit 614. As a result, the triac 503 is repeatedly turned on and off by one cycle of the AC voltage. Thus, the AC voltage which is repeatedly turned on and off by one cycle as shown in FIG. 70 is applied to the heater 500.

Figure 69:
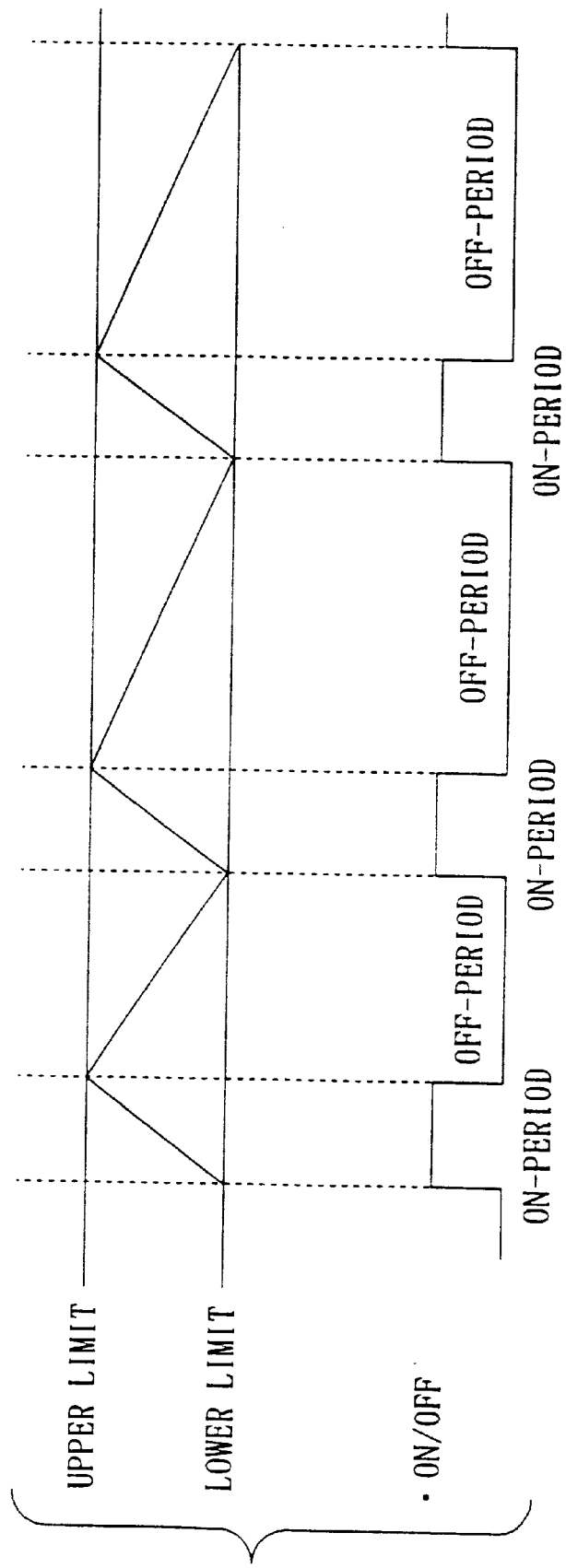
FIG. 69 is a diagram illustrating temperature control of the fixing unit which is performed by the temperature controller shown in FIG. 67.

While the AC voltage as controlled above is being applied to the heater 500, the fixing temperature is increased from the lower limit to the upper limit in the "on-period" shown in FIG. 69. In this case, the frequency at which the AC voltage applied to the heater 500 is turned on and off is close to the maximum value (corresponding to "C" shown in FIG. 49) which can be perceived by people. Thus, even if the voltage variation occurs in the AC power line due to the above temperature control for the fixing unit, people do not have uncomfortable feeling with respect to the flicker of the lighting devices which share the AC power line.

When the fixing temperature is increased and reaches the upper limit, the detecting signal from the temperature detecting circuit 510 falls to the low level (L) (the "off-period"). As a result, the control terminal of the triac 503 is maintained at the low level (L), so that the triac 503 is in the off state. Thus, the AC voltage to the heater 500 is shut off, and the fixing temperature is decreased from the upper limit to the lower limit in the "off-period" shown in FIG. 69.

According to the ninth example, the fixing temperature is repeatedly increased and decreased in a range between the lower limit and the upper limit as shown in FIG. 69.

Figure 71:
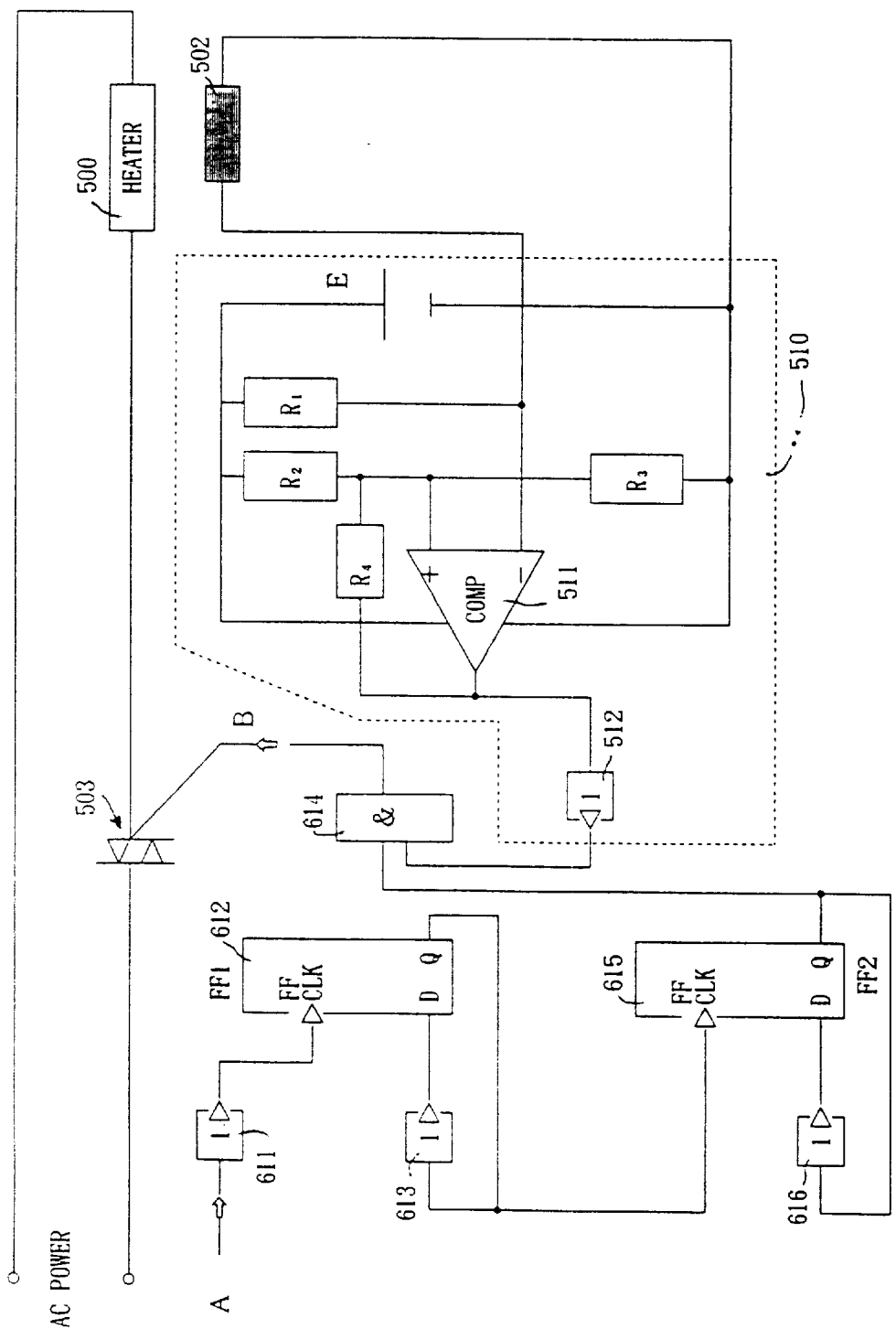
FIG. 71 is a block diagram illustrating another example of the temperature controller which controls the AC voltage to be supplied to the heater in the same manner as the temperature controller shown in FIG. 67.

The AC power control described above can be realized by a control circuit as shown in FIG. 71.

Figure 72:
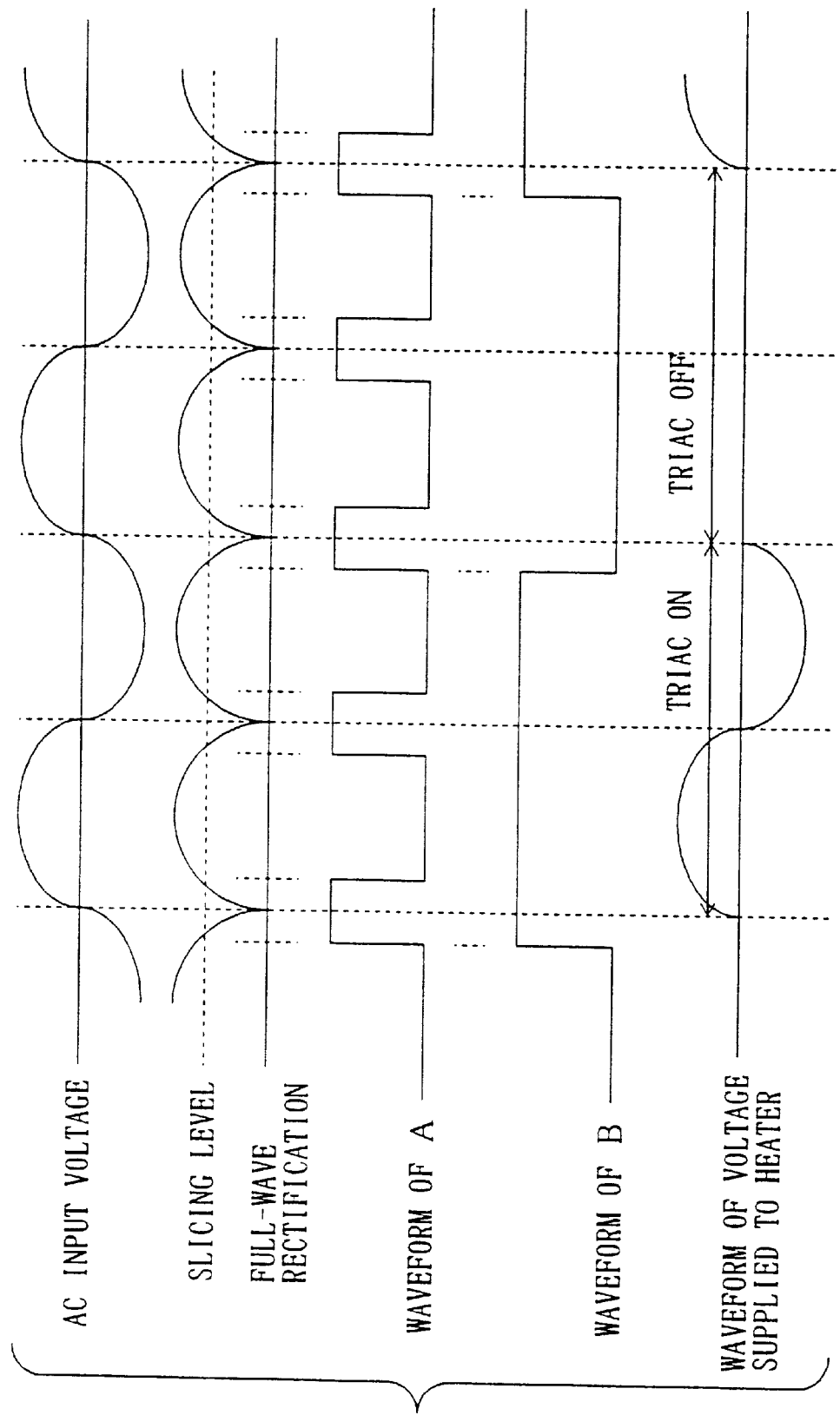
FIG. 72 is a waveform diagram illustrating waveforms of various signals in the temperature controller shown in FIG. 71.

In this control circuit, a flip flop 615 and an inverter circuit 616 are added to the control circuit shown in FIG. 67. As shown in FIG. 72, the control clock signal (the portion B) to be supplied to the triac 503 is generated based on a clock signal (the portion A) which is made from the full-wave rectification waveform of the AC voltage having the commercial frequency. The control clock signal has the same waveform as that shown in FIG. 68.

Figure 73:
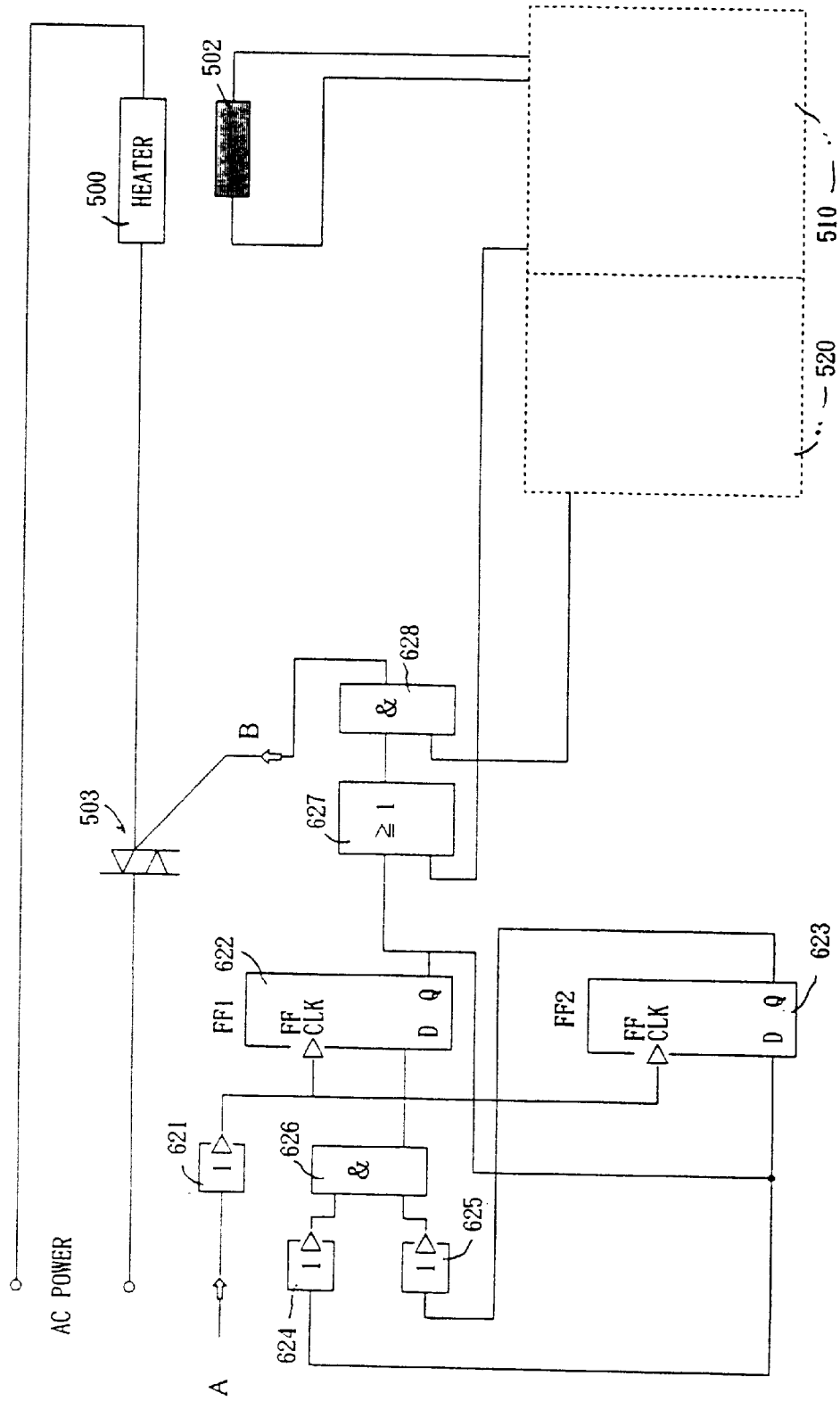
FIG. 73 is a circuit diagram illustrating a tenth example of the temperature controller for the fixing unit.

A tenth example of the temperature controller is shown in FIG. 73. In this example, the power supply to the heater 500 is controlled so that a period in which the AC power supply to the heater 500 is shut off is longer than a period in which the AC power is supplied to the heater 500 in the "off-state".

Referring to FIG. 73, the temperature controller has the first temperature detecting circuit 510 and the second temperature detecting circuit 520 in the same manner as that of the first example. In addition, the triac 503 is provided in the AC power line connected to the heater 500 so that the AC power supply to the heater 500 is controlled due to the on-and-off operation of the triac 503. In this example, also, the triac 503 is a type which is turned on and off in accordance with the zero-crossing method.

Figure 74:
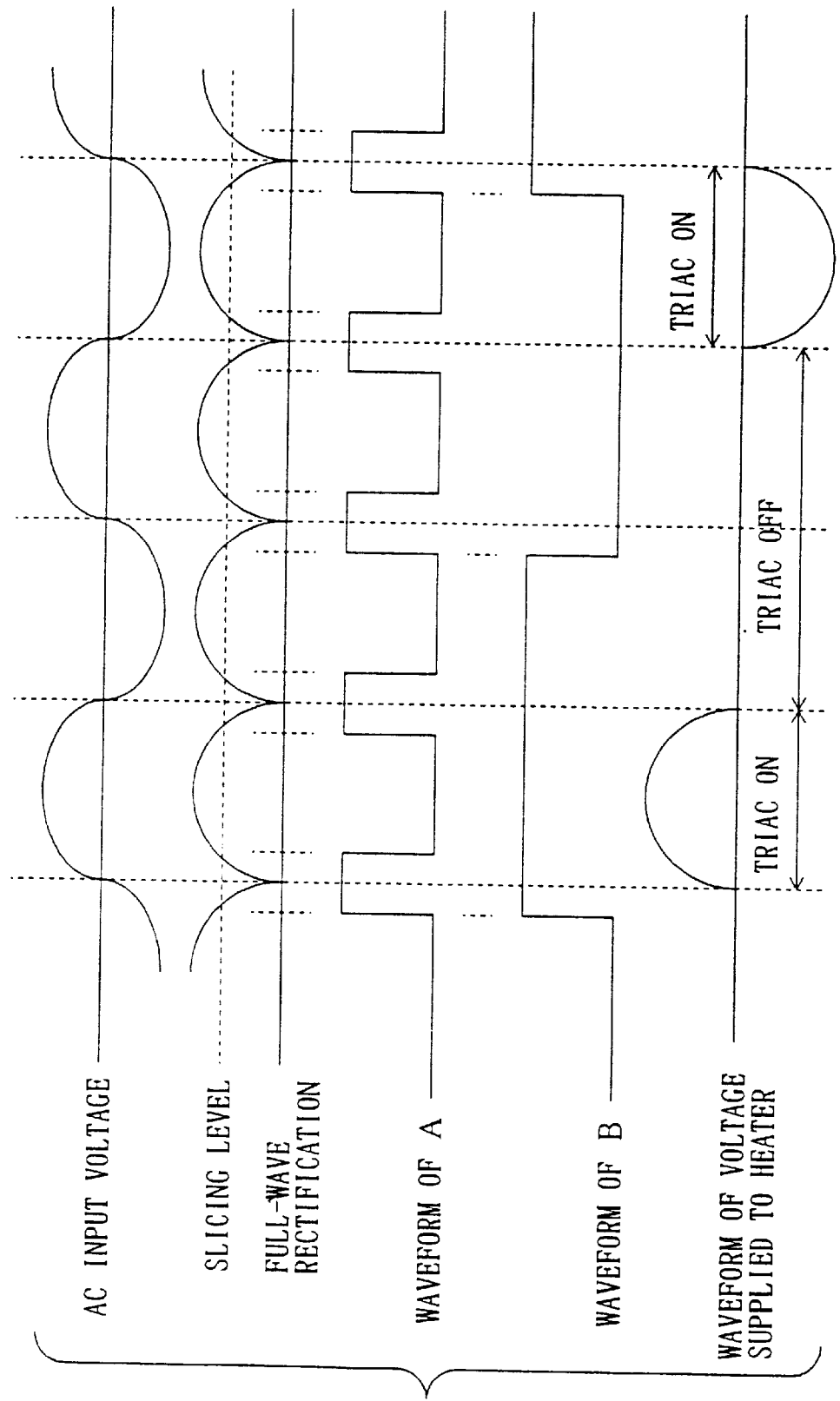
FIG. 74 is a waveform diagram illustrating waveforms of various signals in the temperature controller shown in FIG. 73.

The temperature controller further has an inverter circuit 621, flip flops 622 and 623, inverter circuits 624 and 625, an AND circuit 626, an OR circuit 627 and an AND circuit 628. These circuits form a unit for generating a control signal for the triac 503. A clock signal (the portion A) having the high level (H) at each zero-crossing point of the AC voltage (an input voltage) as shown in FIG. 74 is supplied to a clock terminal of the flip flops 622 and 623 via the AND circuit 621. The flip flop 622 outputs a pulse signal (the portion B) which is in the on state for a half cycle of the AC voltage and in the off-state for one cycle of the AC voltage alternately. This pulse signal (the portion B) is supplied, as the control signal, to the control terminal of the triac 503 via the OR circuit 627 and the AND circuit 628. The OR circuit 627 is controlled by the detecting signal from the first temperature detecting circuit 510 and the AND circuit 628 is controlled by the detecting signal from the second temperature detecting circuit 520.

When the fixing temperature is decreased from the upper limit and reaches the lower limit, the detecting signal from the first temperature detecting circuit 510 rises to the high level (H) and the detecting signal from the second temperature detecting circuit 520 is maintained at the high level (H) (the "on-period"). As a result, the control terminal of the triac 503 is maintained at the high level (H), so that the triac 503 is in the on state. Thus, the AC voltage is continuously applied to the heater 500.

Figure 75:
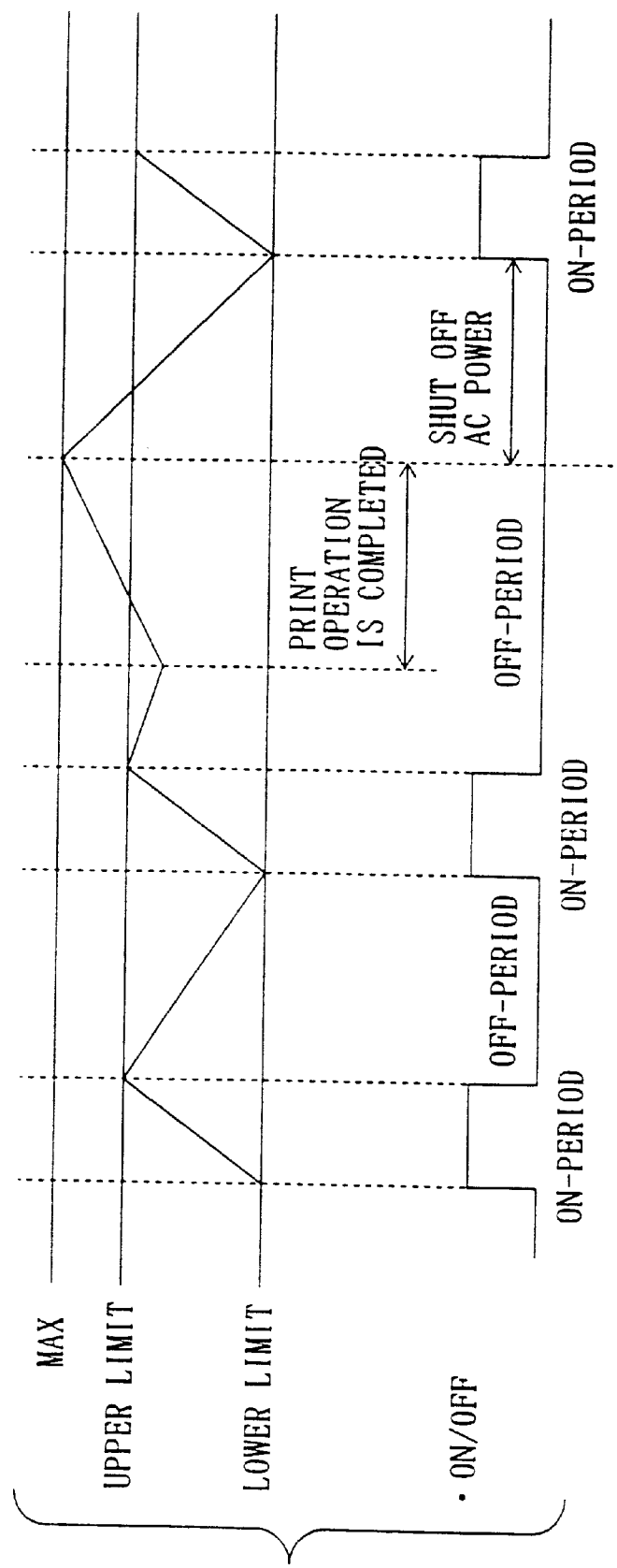
FIG. 75 is a diagram illustrating temperature control of the fixing unit which is performed by the temperature controller shown in FIG. 73.
Figure 76:
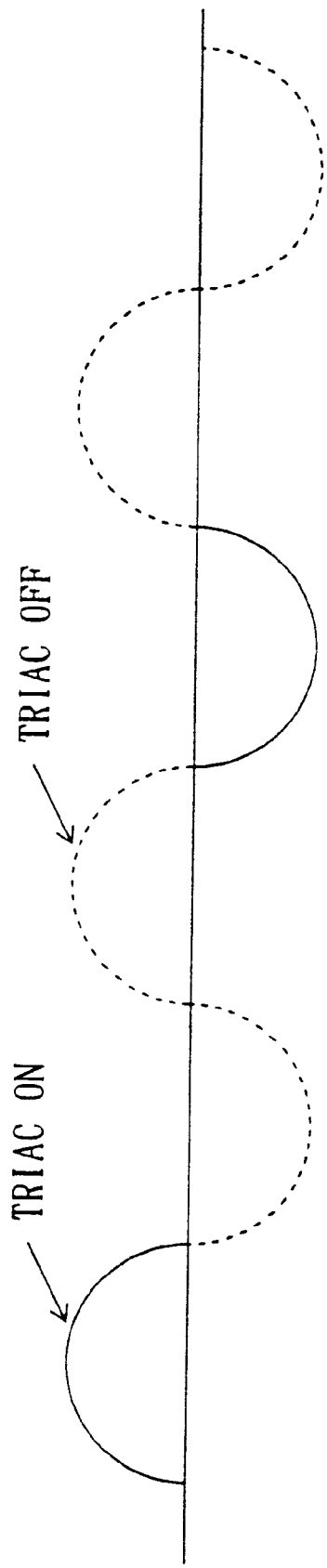
FIG. 76 is a waveform diagram illustrating a waveform of the AC voltage controlled by the temperature controller shown in FIG. 73.

The AC voltage is continuously applied to the heater 500 as described above, so that the fixing temperature is increased from the lower limit to the upper limit in the "on-period" as shown in FIG. 75. When the fixing temperature is increased and reaches the upper limit, the detecting signal from the second temperature detecting circuit 520 is maintained at the high level (H) and the detecting signal from the first temperature detecting circuit 510 falls to the low level (L) (the "off-period"). As a result, the pulse signal which is in the on-state for a half cycle of the AC voltage and in the off-state for one cycle alternately as described above is supplied, as the control signal, from the flip flop 622 to the control terminal of the triac 503 via the OR circuit 627 and the AND circuit 628. The triac 503 is repeatedly turned on and off by the control signal, so that the AC voltage which is in the on-state for a half cycle and in the off-state for one cycle alternately is applied to the heater 500.

In this case, in the "off-period", a period in which the AC voltage is not supplied to the heater 500 is longer than a period in which the AC voltage is supplied to the heater 500. Thus, the fixing temperature is gradually decreased from the upper limit in the "off-period" as shown in FIG. F75. When the fixing temperature reaches the lower limit, the power supply control in the "on-period" as has been described above starts. After this, every time the fixing temperature reaches the upper limit and lower limit, the power supply control to the heater 500 is switched from the manner in the "on-period" to the manner in the "off-period" and vice versa.

Further, for example, in a case where the recording sheet is not supplied to the fixing unit (termination of the print operation), when the fixing temperature is further increased from the upper limit to the maximum temperature (MAX) although the power supply to the heater 500 is controlled in the "off-period", the detecting signal from the second temperature detecting circuit 520 rises to the high level (H). As a result, the control terminal of the triac 503 is maintained at the low level (L), so that the triac 503 is in the off state. Thus, the AC voltage applied to the heater 503 is shut off, so that the fixing temperature is rapidly decreased.

Figure 77:
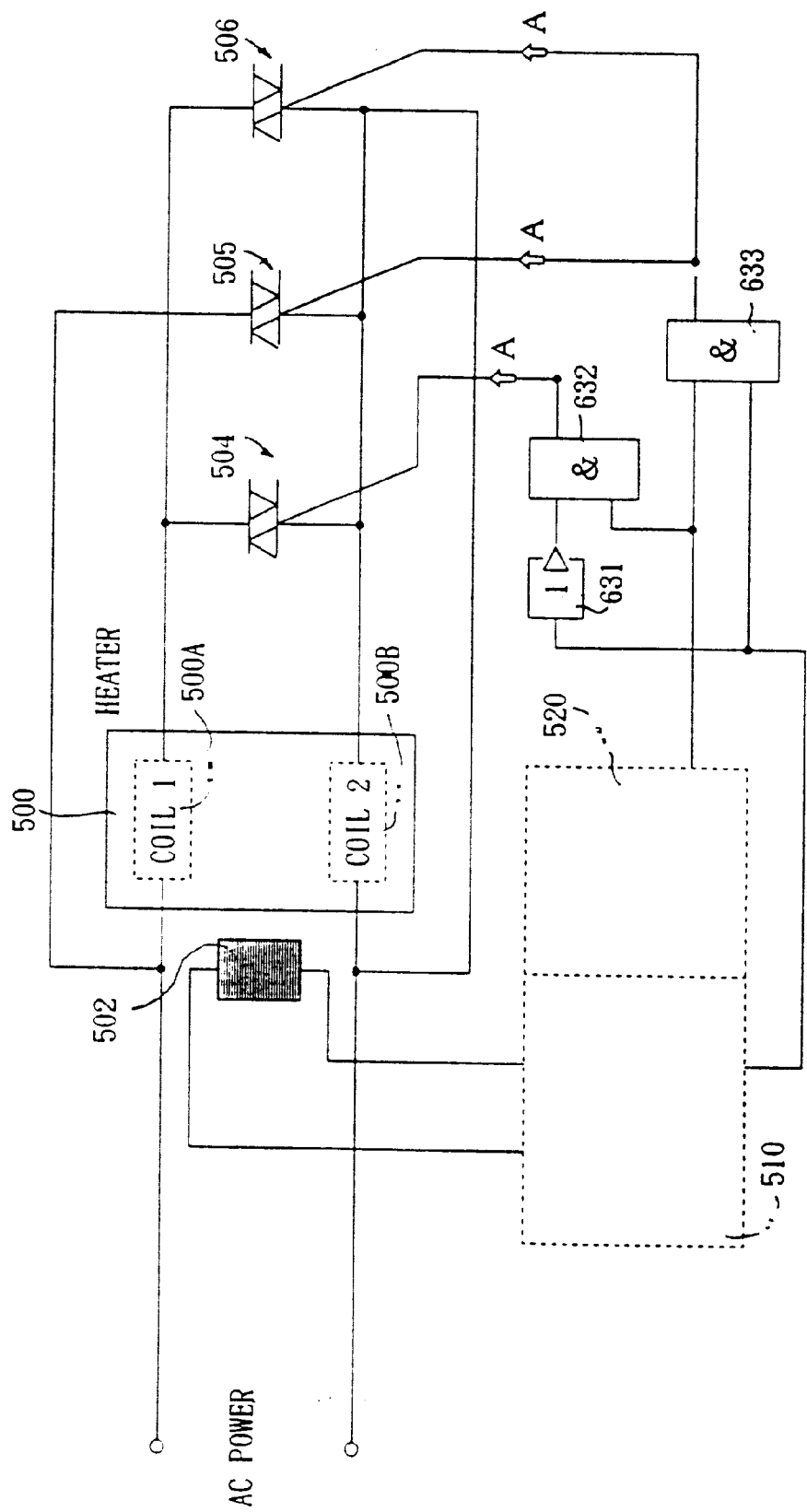
FIG. 77 is a circuit diagram illustrating a eleventh example of the temperature controller for the fixing unit.

A eleventh example of the temperature controller is shown in FIG. 77. In this example, the heater of the fixing unit is divided into two heater elements and a connecting manner of the heater elements (coils) is changed in accordance with the detected temperature.

Referring to FIG. 77, the heater 500 is divided into a first coil 500A and a second coil 500B. The first coil 500A and the second coil 500B are provided in the AC power line. A first triac 504 is provided in a path through which the AC voltage is serially supplied to the first coil 500A and the second coil 500B. A second triac 505 is provided in a path through which the AC voltage is supplied to the second coil 500B. A third triac 506 is provided in a path through which the AC voltage is supplied to the first coil 500A.

The temperature controller which performs the power supply control to the first coil 500A and the second coil 500B has the temperature sensor 502, the first temperature detecting circuit 510 and the second temperature detecting circuit 520 in the same manner as that of the first example. This temperature controller further has an inverter circuit 631 and AND circuits 632 and 633. The respective AND circuits 632 and 633 are controlled by the detecting signal from the second temperature detecting circuit 520. The detecting signal from the first temperature detecting circuit 510 is supplied, as the control signal, to a control terminal of the first triac 504 via the inverter circuit 631 and the AND circuit 632. The detecting signal from the first temperature detecting circuit 510 is supplied also, as the control signal, to control terminals of the second triac 505 and the third triac 506 via the AND circuit 633.

When the fixing temperature is decreased from the upper limit and reaches the lower limit, the detecting signal from the second temperature detecting circuit 520 is maintained at the high level (H) and the detecting signal from the first temperature detecting circuit 510 rises to the high level (H). As a result, the second triac 505 and the third triac 506 are controlled so as to be in the on state. Thus, the first coil 500A and the second coil 500B are provided with the AC voltage in parallel. In this case, the heater 500 radiates a rated amount of heat, so that the fixing temperature is increased from the lower limit.

When the fixing temperature is increased and reaches the upper limit, the detecting signal from the second temperature detecting circuit 520 is maintained at the high level (H) and the detecting signal from the first temperature detecting circuit 510 falls to the low level (L). As a result, the second triac 505 and the third triac 506 are turned off and the first triac 504 is turned on. Thus, the AC voltage is supplied to the first coil 500A and the second coil 500B which are serially connected. In this case, the heater 500 radiates only an amount of heat which is one fourth as much as the rated amount of heat, so that the fixing temperature is gradually decreased from the upper limit.

According to the power supply control to the heater 500, the fixing temperature is maintained within a range between the upper limit and lower limit. In this case, since the fixing temperature is decreased under the condition in which the heater 500 radiates the amount of heat one fourth as much as the rated amount of heat, a temperature gradient at which the fixing unit is decreased is less than the temperature gradient in a case where the AC voltage is completely shut off. Thus, a period which needed to decrease the temperature from the upper limit to the low limit is made longer, so that the respective triacs are turned on and off at long intervals. As a result, even if the AC voltage supplied to the heater 500 is repeatedly turned on and off by the triacs, people do not have uncomfortable feeling with respect to the flicker of the lighting device which share the AC power line (see FIG. 49).

The intervals at which the AC voltage is turned on and off are adjusted, based on the number of coils into which the heater is divided, capacities of the respective coils and the like, within a range (see FIG. 49) in which people do not have uncomfortable feeling with respect to the flicker of the lighting devices which share the AC power line.

If the fixing temperature is further increased from the upper limit to the maximum temperature (MAX) although the heater 50 radiates the amount of heat which is one fourth as much as the rated amount of heat, the detecting signal from the second temperature detecting circuit 520 falls to the low level (L). As a result, all the triacs 504, 505 and 506 are controlled to be in the off state, so that the AC voltage supplied to the heater 500 is shut off. Thus, the fixing temperature is rapidly decreased.

Figure 78:
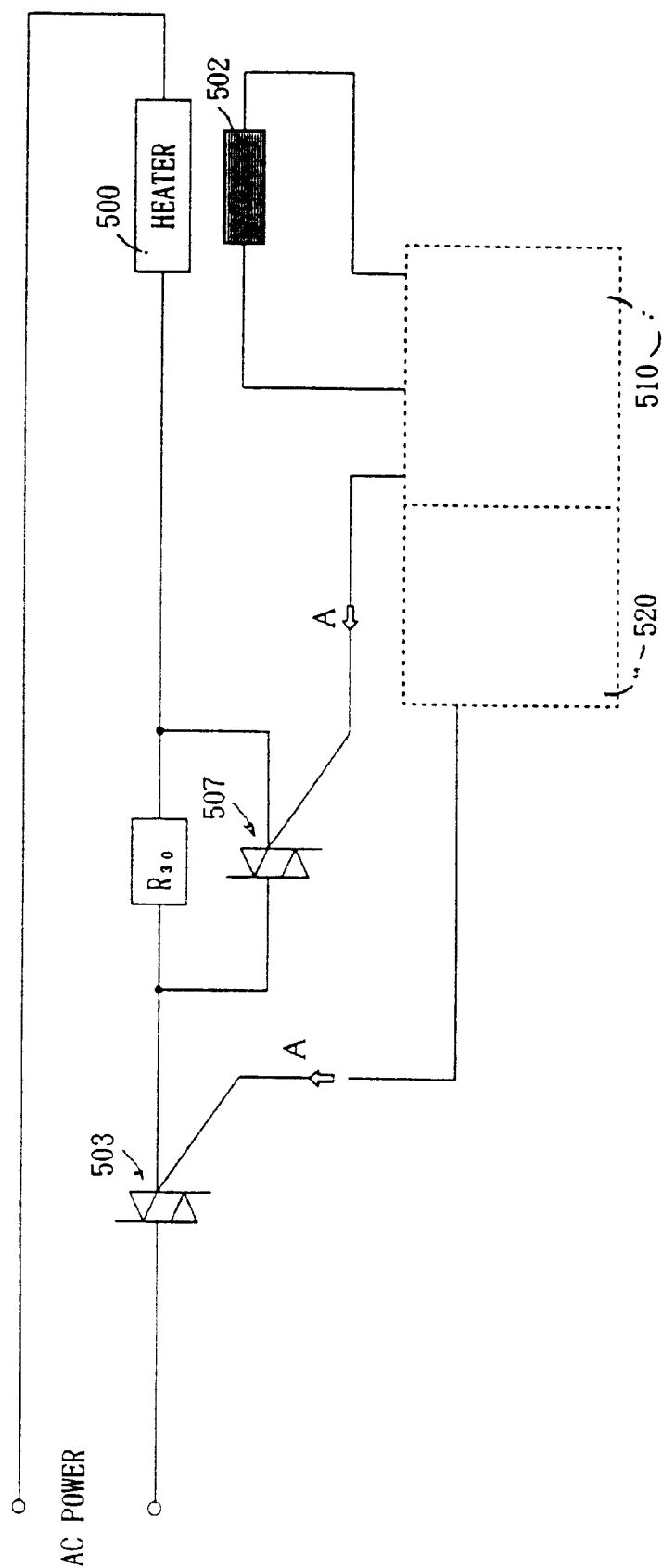
FIG. 78 is a circuit diagram illustrating a twelfth example of the temperature controller for the fixing unit.

A twelfth example of the temperature controller is shown in FIG. 78. In this example, a resistor is serially connected to the heater, so that the voltage applied to the heater is reduced.

Referring to FIG. 78, the heater 500, the first triac 503 and a resistor $R_3$ are provided in the AC line. A second triac 507 is connected to the resistor $R_{30}$ in parallel. When the second triac 507 is in the on state, a current from the AC power supply by-passes the resistor $R_{30}$ and is supplied to the heater 500. The temperature controller has the temperature sensor 502, the first temperature detecting circuit 510 and the second temperature detecting circuit 520 in the same manner as that of the first example (see FIG. 50). The detecting signal from the first temperature detecting circuit 510 is supplied, as the control signal, to the control terminal of the second triac 507. The detecting signal from the second temperature detecting circuit 520 is supplied, as the control signal, to the control terminal of the first triac 503.

When the fixing temperature is decreased is from the upper limit and reaches the lower limit, the detecting signal from the second temperature detecting circuit 520 is maintained in the high level (H) and the detecting signal from the first temperature detecting circuit 510 rises to the high level (H). As a result, the first triac 503 is maintained in the on state and the second triac 507 is turned on. In this state, the current from the AC power supply by-passes the resistor $R_{30}$ and is supplied to the heater 500. Thus, the heater radiates the rated amount of heat, so that the fixing temperature is increased from the lower limit.

When the fixing temperature is increased and reaches the upper limit, the detecting signal from the second temperature detecting circuit 520 is maintained at the high level (H) and the detecting signal from the first temperature detecting circuit 510 falls to the low level (L). As a result, the first triac 503 is maintained in the on state and the second triac 507 is controlled so as to be in the off state. The current from the AC power supply is supplied to the heater via the resistor $R_{30}$. In this case, a part of power from the AC power supply is dissipated by the resistor $R_{30}$ (radiated as heat), so that the heater 500 radiates only an amount of heat less than the rated amount of heat. Thus, the fixing temperature is gradually decreased from the upper limit.

According to the power supply control to the heater 500 as described above, the fixing temperature can be controlled within a range between the upper limit and the lower limit. In this case, since the fixing temperature is decreased under the condition in which the heater 500 radiates the amount of heat less than the rated amount of heat, the temperature gradient at which the fixing temperature is decreased is less than that in a case where the AC voltage is completely shut off. Thus, a period in which the fixing temperature is decreased from the upper limit to the lower limit is made longer, so that the intervals at which the second triac 507 is repeatedly turned on and off is made longer. As a result, even if the AC voltage applied to the heater 500 is controlled by the second triac 507 which is turned on and off as described above, people do not have uncomfortable feeling with respect to the flicker of the lighting devices which share the AC power line (see FIG. 49).

The intervals at which the second triac 507 is turned on and off is adjusted, based on the resistance of the resistor $R_{30}$, within a range in which people do not have the uncomfortable feeling with respect to the flicker of the lighting devices which share the AC power line (see FIG. 49).

In addition, if the fixing temperature is further increased from the upper limit and reaches the maximum temperature (MAX) although the current is supplied to the heater via the resistor $R_{30}$, the detecting signal from the second temperature detecting circuit 520 falls to the low level (L). As a result, the first triac 503 is controlled so as to be off state, and the AC voltage applied to the heater 500 is shut off. Thus, the fixing temperature is rapidly decreased.

Figure 79:
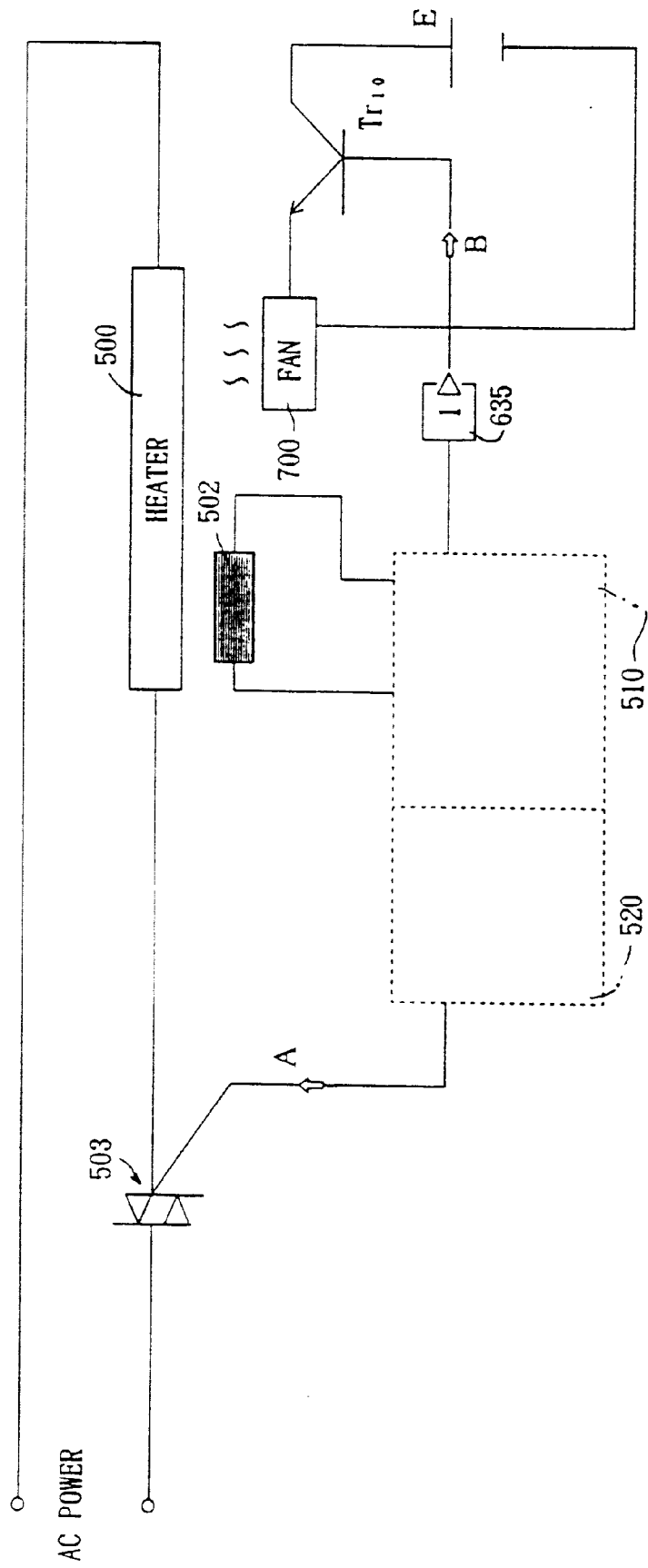
FIG. 79 is a circuit diagram illustrating a thirteenth example of the temperature controller for the fixing unit.

A thirteenth example of the temperature controller is shown in FIG. 79. In this example, the heater of the fixing unit to which the AC voltage is continuously applied is cooled by a cooling fan in accordance with the detected temperature.

Referring to FIG. 79, the AC current is supplied to the heater 500 via the triac 503. The temperature controller has the temperature sensor 502, the first temperature detecting circuit 510 and the second temperature detecting circuit 520 in the same manner as that of the first embodiment (see FIG. 50). The temperature controller further has a cooling fan 700 used to cool the heater 500 and a driving circuit. The driving circuit has an inverter circuit 63, a transistor $Tr_{10}$ and a DC power supply. The driving circuit performs a driving control for the cooling fan 700 based on the detecting signal from the first temperature detecting circuit 510. In addition, the detecting signal from the second temperature detecting circuit 520 is supplied, as the control signal, to the control terminal of the triac 503.

Figure 80:
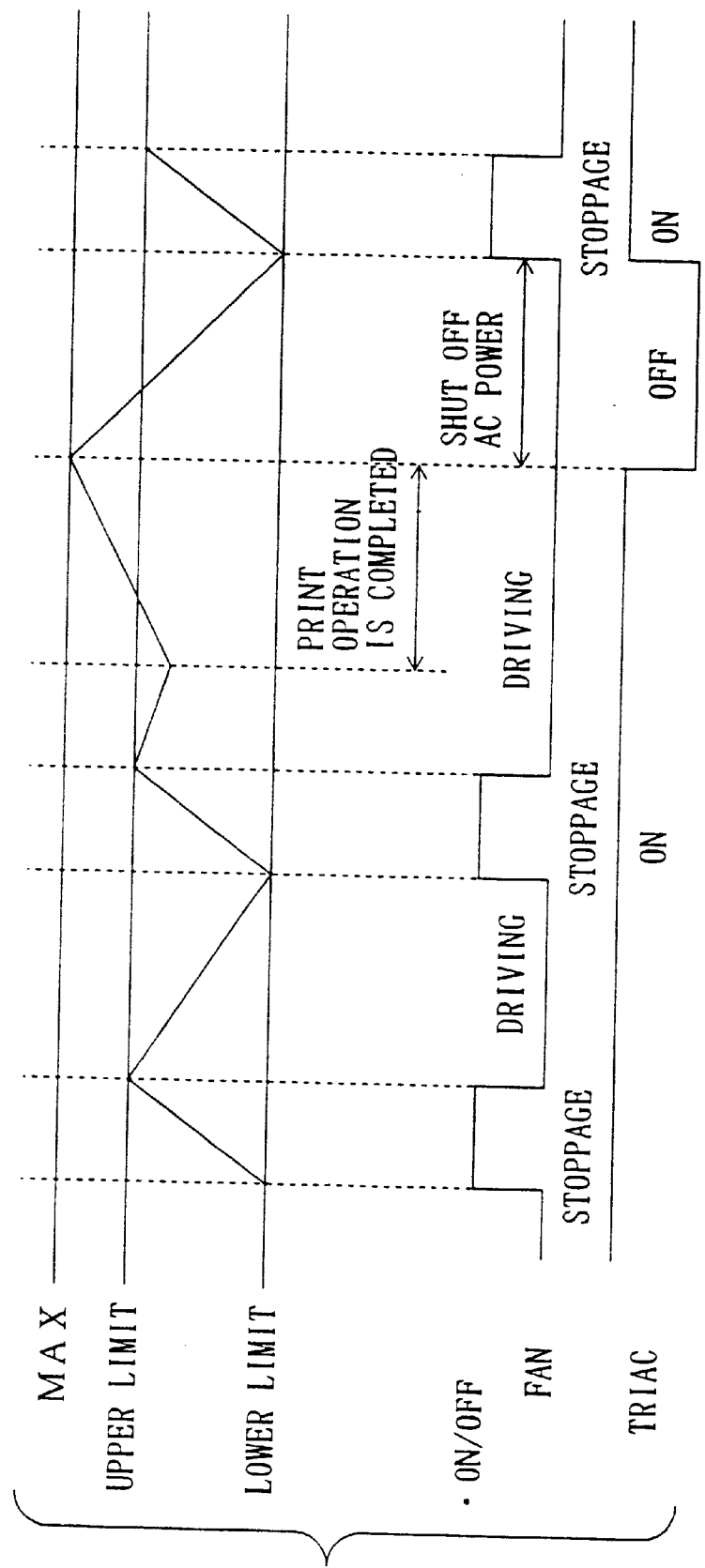
FIG. 80 is a diagram illustrating temperature control of the fixing unit which is performed by the temperature controller shown in FIG. 79.

When the fixing temperature is decreased and reaches the lower limit, the detecting signal from the second temperature detecting circuit 520 is maintained at the high level (H) and the detecting signal from the first temperature detecting circuit 510 rises to the high level (H). As a result, the transistor $Tr_{10}$ is controlled so as to be off state, so that the cooling fan 700 is stopped. In this state, the heater 500 is provided with the AC current through the triac 503, so that the fixing temperature is increased from the lower limit to the upper limit in a "stop-period" as shown in FIG. 80.

When the fixing temperature is increased and reaches the upper limit, the detecting signal from the first temperature detecting circuit 510 falls to the low level (L). As a result, the transistor $Tr_{10}$ is controlled so as to be in the on state, so that the cooling fan 700 is driven. The heater 500 of the fixing unit is cooled by wind from the cooling fan 700, and the fixing temperature is gradually decreased in an "operation-period" as shown in FIG. 80.

As has been described above, the heater 500 is continuously provided with the AC current and the cooling fun 700 is turned on and off in accordance with the detected temperature, so that the fixing temperature is controlled within a range between the upper limit and the lower limit.

In addition, if the fixing temperature is further increased from the upper limit and reaches the maximum temperature (MAX) although the cooling fun 700 is driven, the detecting signal from the second temperature detecting circuit 520 falls to the low level. The triac 503 is thus controlled so as to be in the off state. As a result, the current supplied to the heater 500 is shut off, so that the fixing temperature is rapidly decreased from the maximum temperature.

According to the thirteenth example, since the AC current is continuously supplied to the heater 500. Thus, the light devices which share the AC power line connected to the heater 500 is not affected.

Figure 81:
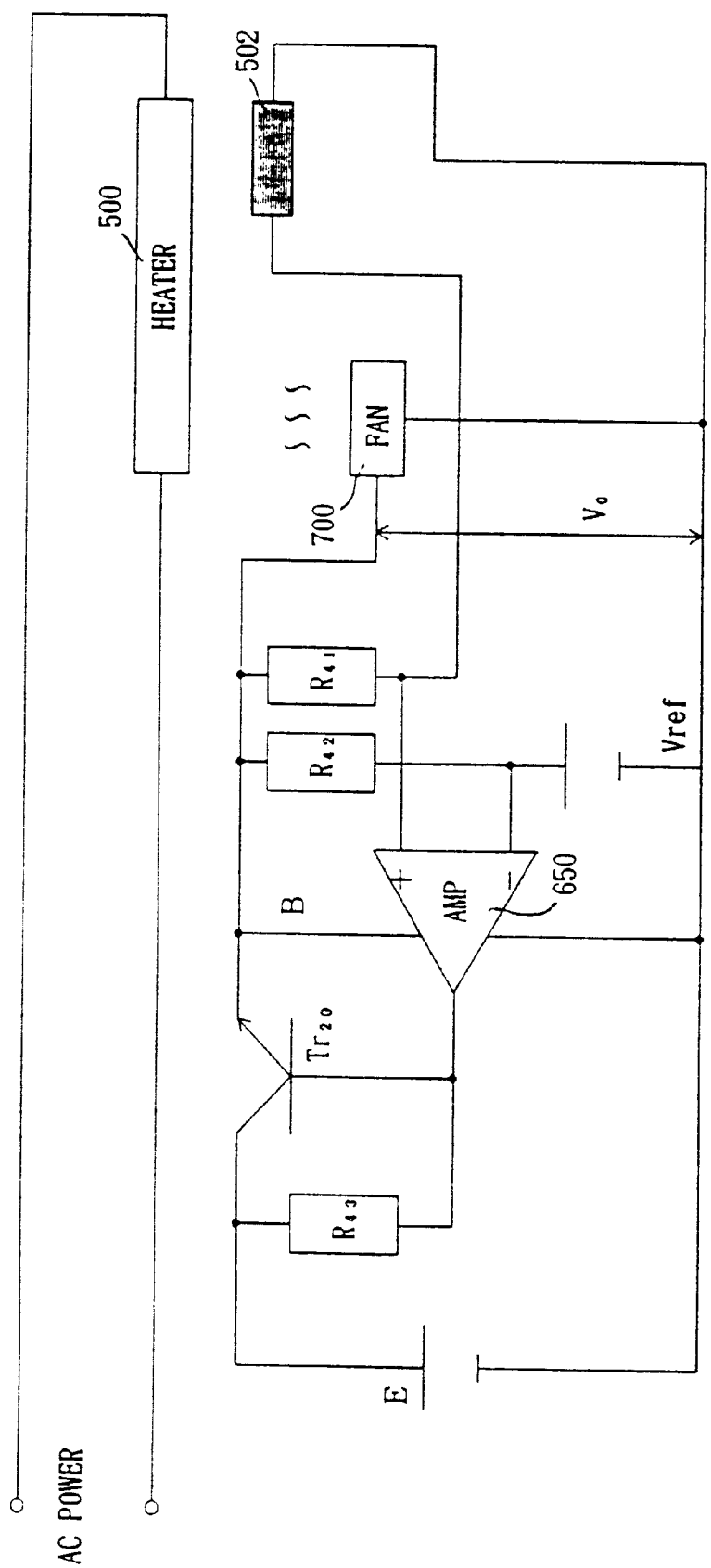
FIG. 81 is a circuit diagram illustrating a fourteenth example of the temperature controller for the fixing unit.

A fourteenth example of the temperature controller is shown in FIG. 81. In this example, the rotation of the cooling fan for cooling the heater is continuously controlled in accordance with the detected temperature.

Referring to FIG. 81, in a state where the power supply of the printer is in the on state, the AC current is supplied to the heater 500. The temperature controller has the cooling fan 700 for cooling the heater 500 and the driving circuit. The driving circuit performs the driving control for the cooling fan 700 in accordance with the detecting signal from the temperature sensor 502. The driving control circuit is formed of an amplifier 650, a reference power supply $V_{ref}$, the DC power supply E, a transistor $Tr_{20}$ and resistors $R_{41}$, $R_{42}$ and $R_{43}$. The driving control circuit supplies to the cooling fan 700 a driving signal $V_o$ having a level depending of the level of the detecting signal from the temperature sensor 502.

Figure 82:
FIG. 82 is a diagram illustrating the variation of the fixing temperature controlled by the temperature controller shown in FIG. 81.
Figure 83:
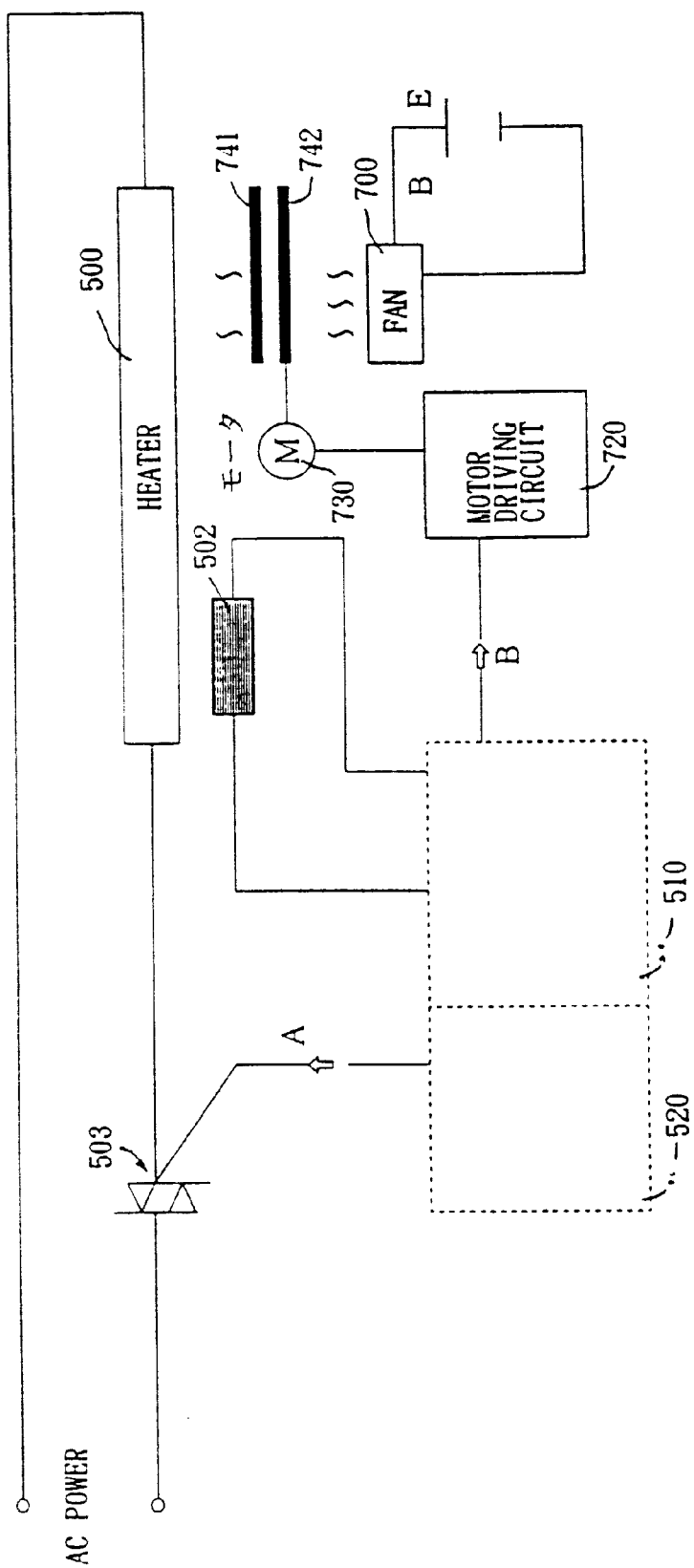
FIG. 83 is a diagram illustrating a fifteenth example of the temperature controller for the fixing unit.

When the level of the detecting signal input to the amplifier 650 is decreased in accordance with increasing of the detected temperature, the level of the driving signal $V_o$ supplied to the cooling fan 700 is increased. When the level of the detecting signal input to the amplifier 650 is increased in accordance with decreasing of the detected temperature, the level of the driving signal $V_o$ is decreased. According to such the characteristic of the driving circuit, the fixing temperature is controlled so as to be maintained within a range including a target temperature corresponding to the reference voltage $V_{ref}$, as shown in FIG. 82.

A fifteenth example of the temperature controller is shown in FIG. 73. In this example, there is a mechanism for controlling an amount of wind supplied from the cooling fun to the heater.

Referring to FIG. 73, the AC current is supplied from the AC power line to the heater 500 of the fixing unit via the triac 503. The temperature controller has the temperature sensor 502, the first temperature detecting circuit 510 and the second temperature detecting circuit 520 in the same manner as that of the first example (see FIG. 50). The temperature controller further has the cooling fan 700 for cooling the heater 500 and a wind control mechanism for controlling amount of wind supplied to the heater 500.

The wind control mechanism has a fixed screening plate 741 and a movable screening plate 742. These screening plates 741 and 742 are located between the cooling fan 700 and the heater 500. Each of these screening plates 741 and 742 has a plurality of holes formed thereon so as to be arranged in a matrix as shown in FIG. 84. The fixed screening plate 741 faces the heater 500 and is fixed. The movable screening plate 742 faces the cooling fan 700 and is located so as to be parallel to the fixed screening plate 741. A motor driving circuit 720 performs a driving control for a motor 730 in accordance with the detected temperature.

Figure 85:
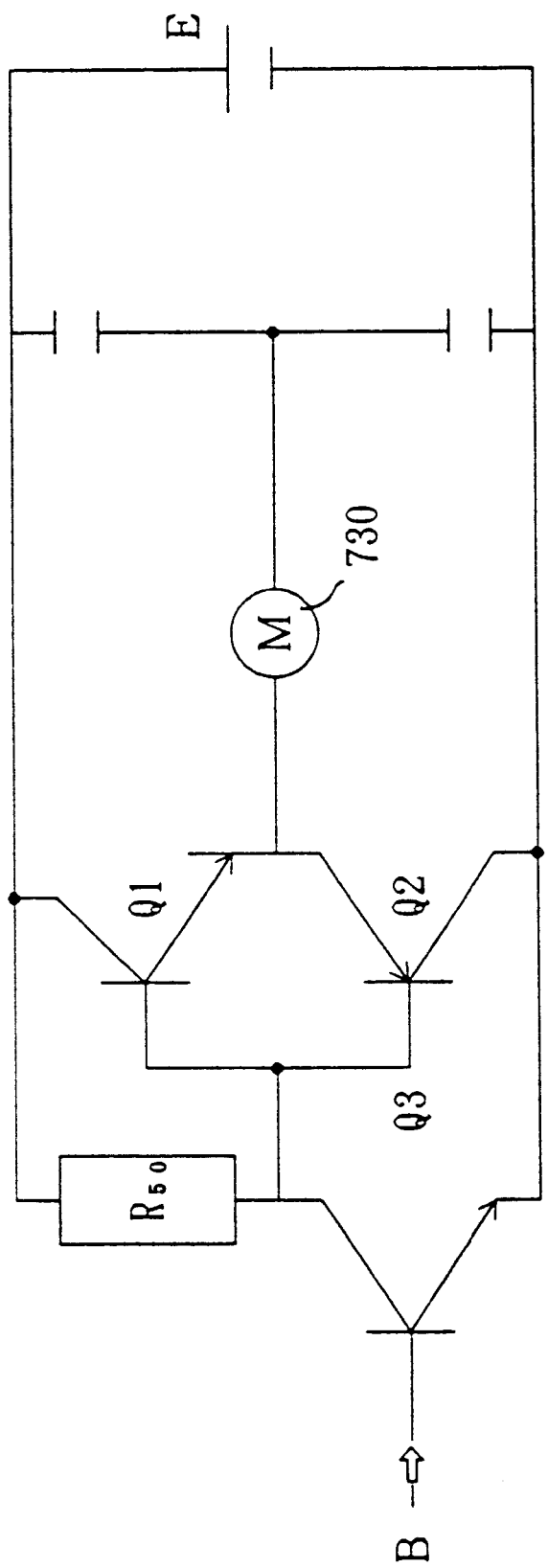
FIG. 85 is a circuit diagram illustrating a motor driving circuit included in the temperature controller shown in FIG. 83.

The motor driving circuit 720 has, as shown in FIG. 85, transistors $Q_1$, $Q_2$ and $Q_3$, a capacitor, a resistor $R_{50}$ and the DC power supply E. The motor driving circuit 720 drives the motor 730 so that the motor 730 is rotated in a direction corresponding to a level (the high level or the low level) of a control signal (the portion B signal) supplied to the transistor $Q_3$. The detecting signal from the first temperature detecting circuit 510 is supplied, as the control signal, to the transistor $Q_3$. The motor 73 is rotated until the capacity is completely charged.

Figure 86:
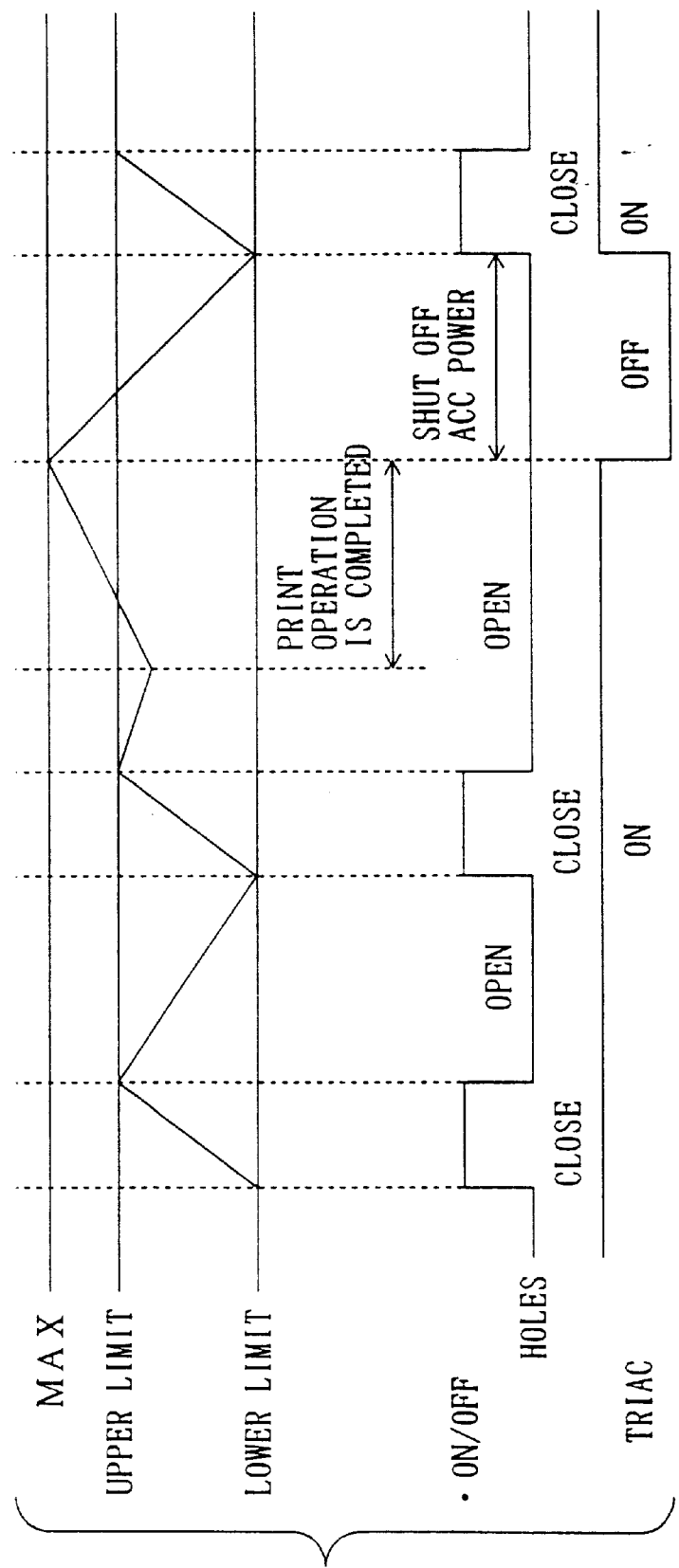
FIG. 86 is a diagram illustrating temperature control of the fixing unit which is performed by the temperature controller shown in FIG. 83.

When the fixing temperature is decreased and reaches the lower limit, the detecting signal from the first temperature detecting circuit 510 rises the high level (H). The motor driving circuit 720 drives the motor 730 so that the motor 730 is rotated in a direction corresponding to the high level (H) of the detecting signal. As a result, the movable screening plate 742 is moved in a direction parallel to the fixed screening plate 741. The movable screening plate 742 is stopped at a position so that the holes of the fixed screening plate 741 and the movable screening plate 742 do not overlap with each other. As a result, the heater 500 is screened from the wind from the cooling fan 700 by these screening plates 741 and 741. Thus, the heater 500 to which the AC current is continuously supplied radiates heat, and the fixing temperature is increased in a "closing-holes-period" as shown in FIG. 86.

When the fixing temperature is increased and reaches the upper limit, the detecting signal from the first temperature detecting circuit 510 falls to the low level (L). The motor driving circuit 729 reversely drives the motor 730 so that the movable screening plate 742 is moved in a reverse direction. The movable screening plate 742 is stopped at a position so that the holes of the fixed screening plate 741 and the movable screening plate 742 overlap with each other. As a result, the wind from the cooling fun 700 passes through the holes of the respective screening plates 741 and 742 and is supplied to the heater 500. Thus, the fixing temperature is gradually decreased in an "opening-holes-period" as shown in FIG. 86.

If the fixing temperature is further increased from the upper limit and reaches the maximum temperature (MAX) although the wind from the cooling fan 700 is supplied to the heater 500 through the holes of the respective screening plates 741 and 742, the detecting signal from the second temperature detecting circuit 520 falls to the low level (L). The triac 503 is thus turned off. As a result, the AC current to the heater 500 is shut off, so that the fixing temperature is rapidly decreased from the maximum temperature (MAX).

In the above fourteenth and fifteenth examples, since the AC current is continuously supplied from the AC power line to the heater 500, the light devices which share the AC power line is not affected in the same manner as in the thirteenth example.

The temperature controller according to the first example through the fifteenth example is applied to the temperature control of the fixing unit in the electrophotographic type printer and copy machine. Further, the temperature controller may be also applicable to a machine in which the on-and-off operation of the AC power supply is performed for the temperature control.

The present invention is not limited to the aforementioned embodiments, and variations and modifications may be made without departing from the scope of the claimed invention.

What is claimed is:

1. An image forming apparatus comprising:

a fixing unit having a heat source;

temperature detecting means for detecting a temperature of said fixing unit;

power supply control means for supplying a voltage to said heat source of said fixing unit in an on-period and for shutting off the voltage to said heat source in an off-period alternately so that the temperature detected by said temperature detecting means agrees with a target temperature; and on-and-off control means for repeatedly turning on and off the voltage to said heat source at a frequency having a period not greater than 40 milliseconds, to prevent perception by humans, in the on-period.

2. An image forming apparatus comprising:

a fixing unit having a heat source;

temperature detecting means for detecting a temperature of said fixing unit;

power supply control means for supplying a voltage to said heat source of said fixing unit in an on-period and for shutting off the voltage to said heat source in an off-period alternately so that the temperature detected by said temperature detecting means agrees with a target temperature; and on-an-off control means for repeatedly turning on and off the voltage to said heat source at a frequency having a period greater than 110 milliseconds, which falls within a range to which humans generally have a slightly uncomfortable feeling, in the on-period when said image forming apparatus is in a predetermined state, including an idle state.

3. An image forming apparatus comprising:

a fixing unit having a heat source;

temperature detecting means for detecting a temperature of said fixing unit;

power supply control means for supplying a voltage to said heat source of said fixing unit in an on-period and for shutting off the voltage to said heat source in an off-period alternately so that the temperature detected by said temperature detecting means agrees with a target temperature;

operation determination means for determining whether said image forming apparatus is in an idle state or in a print operation state where a print operation is performed;

first on-and-off control means for repeatedly turning on and off the voltage to said heat source at a frequency having a period not greater than 40 milliseconds, to prevent perception by humans in the on-period;

second on-and off control means for repeatedly turning on and off the voltage to said heat source at a frequency having a period greater than 110 milliseconds, which falls within a range to which humans generally have a slightly uncomfortable feeling, in the on-period when said image forming apparatus is in a predetermined state, including an idle state; and switching control means for activating said first on-and-off control means when said operation determination means determines that said image forming apparatus is in the print operation state and for activating said second on-and-off control means when said operation determination means determines that said image forming apparatus is in the idle state.

* * * * *